(12) United States Patent
Connop et al.

(10) Patent No.: US 12,441,776 B2
(45) Date of Patent: Oct. 14, 2025

(54) OXYNTOMODULIN PEPTIDE ANALOG FORMULATIONS

(71) Applicant: EirGen Pharma Ltd., Waterford (IE)

(72) Inventors: Bruce Peter Connop, Toronto (CA); Dorothy Melissa Lynn Spencer, Toronto (CA); Jagatraj Singh, Toronto (CA); Pawel Dominik Buczek, Chapel Hill, NC (US); Cale Michael Halbleib, Apex, NC (US); Donald Edmund Kerkow, Durham, NC (US)

(73) Assignee: EirGen Pharma Ltd., Waterford (IE)

( * ) Notice: Subject to any disclaimer, the term of this patent is extended or adjusted under 35 U.S.C. 154(b) by 0 days.

(21) Appl. No.: 16/698,329

(22) Filed: Nov. 27, 2019

(65) Prior Publication Data
US 2020/0262887 A1    Aug. 20, 2020

Related U.S. Application Data

(60) Provisional application No. 62/821,382, filed on Mar. 20, 2019, provisional application No. 62/773,651, filed on Nov. 30, 2018.

(51) Int. Cl.
| | |
|---|---|
| *C07K 14/605* | (2006.01) |
| *A61J 1/05* | (2006.01) |
| *A61K 9/00* | (2006.01) |
| *A61K 47/18* | (2017.01) |
| *A61K 47/26* | (2006.01) |
| *A61K 47/60* | (2017.01) |
| *A61P 3/10* | (2006.01) |
| *C07K 1/02* | (2006.01) |
| *A61K 38/00* | (2006.01) |

(52) U.S. Cl.
CPC ............... *C07K 14/605* (2013.01); *A61J 1/05* (2013.01); *A61K 9/0019* (2013.01); *A61K 47/183* (2013.01); *A61K 47/26* (2013.01); *A61K 47/60* (2017.08); *A61P 3/10* (2018.01); *C07K 1/02* (2013.01); *A61K 38/00* (2013.01)

(58) Field of Classification Search
CPC ........ C07K 14/605; C07K 1/02; A61K 47/60; A61K 9/0019; A61K 47/183; A61K 47/26; A61K 38/00; A61K 38/26; A61K 47/14; A61K 9/08; A61P 3/10; A61J 1/05
See application file for complete search history.

(56) References Cited

U.S. PATENT DOCUMENTS

| | | | |
|---|---|---|---|
| 3,791,932 A | 2/1974 | Schuurs et al. | |
| 3,839,153 A | 10/1974 | Schuurs et al. | |
| 3,850,578 A | 11/1974 | McConnell | |
| 3,850,752 A | 11/1974 | Schuurs et al. | |
| 3,853,987 A | 12/1974 | Dreyer | |
| 3,867,517 A | 2/1975 | Ling | |
| 3,879,262 A | 4/1975 | Schuurs et al. | |
| 3,901,654 A | 8/1975 | Gross | |
| 3,935,074 A | 1/1976 | Leute | |
| 3,984,533 A | 10/1976 | Uzgiris | |
| 3,996,345 A | 12/1976 | Schwarzberg | |
| 4,034,074 A | 7/1977 | Miles | |
| 4,098,876 A | 7/1978 | Piasio et al. | |
| 4,666,828 A | 5/1987 | Gusella | |
| 4,683,202 A | 7/1987 | Mullis | |
| 4,801,531 A | 1/1989 | Frossard | |
| 4,879,219 A | 11/1989 | Schoemaker et al. | |
| 4,880,634 A | 11/1989 | Speiser | |
| 5,011,771 A | 4/1991 | Bellet et al. | |
| 5,192,659 A | 3/1993 | Simons | |
| 5,272,057 A | 12/1993 | Bhatia et al. | |
| 5,281,521 A | 1/1994 | Lee et al. | |
| 5,464,764 A | 11/1995 | Capecchi et al. | |
| 5,487,992 A | 1/1996 | Capecchi et al. | |
| 5,643,575 A | 7/1997 | Greenwald et al. | |
| 5,681,567 A | 10/1997 | Greenwald et al. | |
| 5,858,975 A | 1/1999 | Yano et al. | |
| 5,900,461 A | 5/1999 | Harris | |
| 5,919,455 A | 7/1999 | Greenwald et al. | |
| 5,929,177 A | 7/1999 | Kataoka et al. | |
| 5,932,447 A | 8/1999 | Siegall | |
| 5,932,462 A | 8/1999 | Harris et al. | |
| 6,113,906 A | 9/2000 | Greenwald et al. | |
| 6,433,135 B1 | 8/2002 | El-Tayar et al. | |
| 6,436,386 B1 | 8/2002 | Roberts et al. | |
| 6,448,369 B1 | 9/2002 | Bentley et al. | |
| 6,504,005 B1 | 1/2003 | Fridkin et al. | |

(Continued)

FOREIGN PATENT DOCUMENTS

| | | |
|---|---|---|
| EP | 0374257 A1 | 6/1990 |
| EP | 0167825 | 8/1990 |

(Continued)

OTHER PUBLICATIONS

Adrian, T. E., et al. "Human distribution and release of a putative new gut hormone, peptide YY." Gastroenterology 89.5: 1070-1077 (1985).

(Continued)

*Primary Examiner* — Sudhakar Katakam
(74) *Attorney, Agent, or Firm* — Mark S. Cohen; PEARL COHEN ZEDEK LATZER BARATZ LLP

(57) ABSTRACT

The present invention relates to GLP-1 and/or glucagon receptor agonists (for example, oxyntomodulin peptide analogs), pharmaceutically acceptable salts thereof, formulations comprising the same, and uses thereof for treating diabetes and/or obesity or associated diseases or disorders.

20 Claims, 8 Drawing Sheets
Specification includes a Sequence Listing.

(56) References Cited

U.S. PATENT DOCUMENTS

| | | | |
|---|---|---|---|
| 6,515,100 | B2 | 2/2003 | Harris |
| 7,585,837 | B2 | 9/2009 | Shechter et al. |
| 7,851,491 | B2 | 12/2010 | Nakamoto et al. |
| 8,263,084 | B2 | 9/2012 | Song et al. |
| 8,343,910 | B2 | 1/2013 | Shechter et al. |
| 8,367,607 | B2 * | 2/2013 | Alsina-Fernandez ..... A61P 3/00 514/5.3 |
| 8,415,296 | B2 * | 4/2013 | Alsina-Fernandez ....................... C07K 14/605 514/4.9 |
| 8,415,926 | B2 | 4/2013 | Bhbdwaj et al. |
| 8,729,017 | B2 | 5/2014 | Dimarchi et al. |
| 9,119,883 | B2 | 9/2015 | Shechter et al. |
| 9,301,938 | B2 | 4/2016 | Szewczyk |
| 9,663,565 | B2 | 5/2017 | Jung et al. |
| 9,758,562 | B2 | 9/2017 | Dimarchi et al. |
| 9,821,070 | B2 * | 11/2017 | Fima ..................... A61P 3/04 |
| 2002/0141985 | A1 | 10/2002 | Pittner et al. |
| 2006/0011920 | A1 | 1/2006 | Kim et al. |
| 2006/0171920 | A1 | 8/2006 | Shechter et al. |
| 2006/0189522 | A1 | 8/2006 | Bloom et al. |
| 2009/0298757 | A1 | 12/2009 | Bloom et al. |
| 2010/0016550 | A1 | 1/2010 | Dong et al. |
| 2010/0041867 | A1 | 2/2010 | Shechter et al. |
| 2010/0092566 | A1 | 4/2010 | Alessi et al. |
| 2010/0121032 | A1 | 5/2010 | Cox et al. |
| 2010/0144617 | A1 | 6/2010 | Sinha Roy et al. |
| 2011/0034374 | A1 | 2/2011 | Bloom et al. |
| 2011/0136737 | A1 | 6/2011 | Levy et al. |
| 2011/0152182 | A1 | 6/2011 | Alsina-Fermandez et al. |
| 2011/0166063 | A1 | 7/2011 | Bossard et al. |
| 2012/0183617 | A1 | 7/2012 | Szewczyk |
| 2013/0059780 | A1 | 3/2013 | DeFrees |
| 2013/0085104 | A1 | 4/2013 | Chilkoti |
| 2013/0116175 | A1 | 5/2013 | Shechter et al. |
| 2013/0137631 | A1 | 5/2013 | Levy et al. |
| 2013/0281374 | A1 | 10/2013 | Levy et al. |
| 2014/0128318 | A1 | 5/2014 | Jung et al. |
| 2014/0142023 | A1 | 5/2014 | Sommerfeld et al. |
| 2014/0249299 | A1 | 9/2014 | Levy et al. |
| 2014/0349922 | A1 * | 11/2014 | Fima ..................... A61K 47/60 530/308 |
| 2015/0057219 | A1 | 2/2015 | Shechter et al. |
| 2015/0072924 | A1 | 3/2015 | Fima et al. |
| 2015/0111246 | A1 | 4/2015 | Samant et al. |
| 2015/0119320 | A1 | 4/2015 | Fima et al. |
| 2015/0148289 | A1 | 5/2015 | Fima et al. |
| 2015/0182593 | A1 | 7/2015 | Jung et al. |
| 2015/0258208 | A1 | 9/2015 | Fima et al. |
| 2015/0290324 | A1 * | 10/2015 | Kim ..................... A61K 38/22 424/178.1 |
| 2015/0299282 | A1 | 10/2015 | Kim et al. |
| 2016/0168588 | A1 | 6/2016 | Hershkovitz et al. |
| 2016/0317623 | A1 | 11/2016 | Shen et al. |
| 2017/0088598 | A1 | 3/2017 | Fima et al. |
| 2017/0128589 | A1 | 5/2017 | Lim et al. |
| 2017/0183383 | A1 | 6/2017 | Jang |
| 2017/0226175 | A1 | 8/2017 | Jung et al. |
| 2017/0349642 | A1 | 12/2017 | Dimarchi et al. |

FOREIGN PATENT DOCUMENTS

| | | |
|---|---|---|
| JP | 3148298 | 3/2001 |
| WO | WO 1989/10756 | 11/1989 |
| WO | WO 1998/05361 | 2/1998 |
| WO | WO 2002/07859 | 1/2002 |
| WO | WO 2002/36067 | 5/2002 |
| WO | WO 2004/089280 | 10/2004 |
| WO | WO 2006/134340 | 12/2006 |
| WO | WO 2007/100535 | 9/2007 |
| WO | WO 2008/076933 | 6/2008 |
| WO | WO 2010/033207 | 3/2010 |
| WO | WO 2010/107256 | 9/2010 |
| WO | WO 2011/087671 | 7/2011 |
| WO | WO 2011/087672 | 7/2011 |
| WO | WO 2012/101619 | 8/2012 |
| WO | WO 2012/167251 | 12/2012 |
| WO | WO 2012/173422 | 12/2012 |
| WO | WO 2013/157002 | 10/2013 |
| WO | WO 2013/183052 A1 | 12/2013 |
| WO | WO 2014/073842 A1 | 5/2014 |
| WO | WO 2017/212494 | 12/2017 |

OTHER PUBLICATIONS

Albericio et al., "An improved synthesis of N-[(9-hydroxymethyl)-2-fluorenyl] succinamic acid (HMFS), a versatile handle for the solid-phase synthesis of biomolecules." Synthetic Communications 31.2: 225-232 (2001).

American Diabetes Association. "2. Classification and diagnosis of diabetes: standards of medical care in diabetes—2018." Diabetes care 41.Supplement 1 (2018): S13-S27.

Anonymous, "Long-Acting Reversible PEGylated Oxyntomodulin—MOD-6030", Apr. 2012, 5th Diabetes Drug Discovery & Development Conference; pp. 1-14. https://www.sec.gov/Archives/edgar/data/1268659/000114420412022748/v309878_ex99-1.htm.

Baggio, Laurie L., et al. "Oxyntomodulin and glucagon-like peptide-1 differentially regulate murine food intake and energy expenditure." Gastroenterology 127.2 (2004): 546-558.

Bailon et al. "Rational design of a potent, long-lasting form of interferon: a 40 kDa branched polyethylene glycol-conjugated interferon α-2a for the treatment of hepatitis C." Bioconjugate Chemistry 12.2: 195-202 (2001).

Bailon et al., "Polyethylene glycol-conjugated pharmaceutical proteins." Pharmaceutical Science & Technology Today 1.8: 352-356 (1998).

Baker, "Pegylated interferon plus ribavirin for the treatment of chronic hepatitis C." Reviews in Gastroenterological Disorders 3.2: 93-109 (2003).

Batterham et al., "Gut hormone PYY3-36 physiologically inhibits food intake." Nature 418.6898: 650-654 (2002).

Batterham et al., "Inhibition of food intake in obese subjects by peptide YY3-36." New England Journal of Medicine 349.10: 941-948 (2003).

Bianchi et al. "A PEGylated analog of the gut hormone oxyntomodulin with long-lasting antihyperglycemic, insulinotropic and anorexigenic activity", Bioorg Med Chem. Nov. 15, 2013;21(22):7064-73.

Bitter et al. "Expression and secretion vectors for yeast." Methods in enzymology 153: 516-544 (1987).

Booth et al., "The use of a 'universal' yeast expression vector to produce an antigenic protein of Mycobacterium leprae." Immunology Letters 19.1: 65-69 (1988).

Brisson et al., "Expression of a bacterial gene in plants by using a viral vector." Nature 310.5977: 511-514 (1984).

Broberger et al., "Subtypes Y1 and Y2 of the neuropeptide Y receptor are respectively expressed in pro-opiomelanocortin-and neuropeptide-Y-containing neurons of the rat hypothalamic arcuate nucleus." Neuroendocrinology 66.6: 393-408 (1997).

Broglie et al., "Light-regulated expression of a pea ribulose-1,5-bisphosphate carboxylase small subunit gene in transformed plant cells." Science 224.4651: 838-843 (1984).

Buchwald et al., "Long-term, continuous intravenous heparin administration by an implantable infusion pump in ambulatory patients with recurrent venous thrombosis." Surgery 88.4: 507-516 (1980).

Carter, "Structure of serum albumin." Adv. Protein Chem. 45: 153-203 (1994).

Clark et al., "Long-acting growth hormones produced by conjugation with polyethylene glycol." Journal of Biological Chemistry 271.36: 21969-21977 (1996).

Cohen et al., "Oxyntomodulin suppresses appetite and reduces food intake in humans." Journal of Clinical Endocrinology & Metabolism 88.10: 4696-4701 (2003).

Coruzzi et al., "Tissue-specific and light-regulated expression of a pea nuclear gene encoding the small subunit of ribulose-1, 5-bisphosphate carboxylase." The EMBO Journal 3.8: 1671-1679 (1984).

(56) References Cited

OTHER PUBLICATIONS

Croker Curtis, et al. "An expert virtual instrument approach to the automated, data dependent MS/MS and LC/MS/MS analysis of proteins." Journal of biomolecular techniques: JBT 11.3 (2000): 135.
Cutrone et al., "Identification of critical residues in bovine IFNAR-1 responsible for interferon binding." Journal of Biological Chemistry 276.20: 17140-17148 (2001).
Dakin et al. "Oxyntomodulin inhibits food intake in the rat." Endocrinology 142.10: 4244-4250 (2001).
Dakin et al. "Microsatellite null alleles in parentage analysis", Heredity (2004) 93, 504-509.
Dakin et al., "Peripheral oxyntomodulin reduces food intake and body weight gain in rats." Endocrinology 145.6: 2687-2695 (2004).
Davies, Melanie J., et al. "Efficacy of liraglutide for weight loss among patients with type 2 diabetes: the Scale diabetes randomized clinical trial." Jama 314.7 (2015): 687-699.
Delgado et al., "The uses and properties of PEG-linked proteins." Critical Reviews in Therapeutic Drug Carrier Systems 9.3-4: 249-304 (1991).
Diederichs et al., "Liposome in kosmetika und arzneimitteln." Pharmazeutische Industrie 56.3: 267-275 (1994).
Druce, et al. "Investigation of structure-activity relationships of Oxyntomodulin (Oxm) using Oxm analogs." Endocrinology 150.4: 1712-1722 (2009).
Eisenberg et al., Physicochemical Chemistry with Applications to the Life Sciences. 700-745 (Benjamin Cummings, Menlo Park, CA, 1979).
Eldem et al., "Optimization of Spray-Dried and -Congealed Lipid Micropellets and Characterization of Their Surface Morphology by Scanning Electron Microscopy." Pharmaceutical Research 8.1: 47-54 (1991).
Ellman, "A colorimetric method for determining low concentrations of mercaptans." Archives of Biochemistry and Biophysics 74.2: 443-450 (1958).
Eng et al., "Isolation and characterization of exendin-4, an exendin-3 analogue, from Heloderma suspectum venom. Further evidence for an exendin receptor on dispersed acini from guinea pig pancreas." Journal of Biological Chemistry 267.11: 7402-7405 (1992).
European Search Report for European Patent Application No. 12793107.9 dated Feb. 3, 2015.
Fehmann et al., "Stable expression of the rat GLP-I receptor in CHO cells: activation and binding characteristics utilizing GLP-I (7-36)-amide, oxyntomodulin, exendin-4, and exendin (9-39)." Peptides 15.3: 453-456 (1994).
Fingl et al., "General Principles." The Pharmacological Basis of Therapeutics (ed. Goodman, LS & Gilman, A,): 1-46 (1975).
Freshney, R. I. Culture of Animal Cells. A Manual of Basic Technique, AR Liss, New York (1983): 3-4.
Fuertges et al., "The clinical efficacy of poly (ethylene glycol)-modified proteins." Journal of Controlled Release 11.1: 139-148 (1990).
Fung et al., "Strategies for the preparation and characterization of polyethylene glycol (PEG) conjugated pharmaceutical proteins." Polymer Preprints 38.1: 565-66 (1997).
Gardella et al., "Expression of human parathyroid hormone-(1-84) in *Escherichia coli* as a factor X-cleavable fusion protein." J. Biol. Chem. 265: 15854-15859 (1990).
Garman et al., "The preparation and properties of novel reversible polymer-protein conjugates 2-ω-Methoxypolyethylene (5000) glycoxymethylene-3-methylmaleyl conjugates of plasminogen activators." FEBS letters 223.2: 361-365 (1987).
Gershonov et al., "A novel approach for a water-soluble long-acting insulin prodrug: Design, preparation, and analysis of [(2-sulfo)-9-fluorenylmethoxycarbonyl] 3-insulin." Journal of Medicinal Chemistry 43.13: 2530-2537 (2000).
Gershonov et al., "New concept for long-acting insulin: spontaneous conversion of an inactive modified insulin to the active hormone in circulation: 9-fluorenylmethoxycarbonyl derivative of insulin." Diabetes 48.7: 1437-1442 (1999).

Ghatei et al. "Molecular Forms of Human Enteroglucagon in Tissue and Plasma: Plasma Responses to Nutrient Stimuli in Health and in Disorders of the Upper Gastrointestinal Tract*." The Journal of Clinical Endocrinology & Metabolism 57.3: 488-495 (1983).
Gilboa et al., "Transfer and expression of cloned genes using retrovial vectors." BioTechniques 4.6: 504-512 (1986).
Glue et al., "Hepatitis C Intervention Therapy Group. Pegylated interferon-alpha2b: pharmacokinetics, pharmacodynamics, safety, and preliminary efficacy data." Clinical Pharmacology & Therapeutics 68.5: 556-567 (2000).
Goke et al., "Exendin-4 is a high potency agonist and truncated exendin-(9-39)-amide an antagonist at the glucagon-like peptide 1-(7-36)-amide receptor of insulin-secreting beta-cells." Journal of Biological Chemistry 268.26: 19650-19655 (1993).
Goodman and Gilman, The Pharmacological Basis of Therapeutics (Goodman, L. S., Gilman, A. G., Limbird, L. E., and Hardman, J. G. Eds.) 9th ed., 1211-1213 (2001).
Goodson, "Dental applications." Medical Applications of Controlled Release 2: 115-138 (1984).
Grandt et al., "Two molecular forms of peptide YY (PYY) are abundant in human blood: characterization of a radioimmunoassay recognizing PYY 1-36 and PYY 3-36." Regulatory Peptides 51.2: 151-159 (1994).
Greenwald et al., "Drug delivery systems based on trimethyl lock lactonization: poly (ethylene glycol) prodrugs of amino-containing compounds." Journal of Medicinal Chemistry 43.3: 475-487 (2000).
Greenwald et al., "Drug delivery systems employing 1, 4-or 1, 6-elimination: poly (ethylene glycol) prodrugs of amine-containing compounds." Journal of Medicinal Chemistry 42.18: 3657-3667 (1999).
Greenwald et al., "Effective drug delivery by PEGylated drug conjugates." Avanced Drug Delivery Reviews 55.2: 217-250 (2003).
Greenwald, "Peg drugs: an overview." Journal of Controlled Release 74: 159-171 (2001).
Greenwood, et al. "The preparation of 131I-labelled human growth hormone of high specific radioactivity." Biochemical journal 89.1: 114 (1963).
Gurley et al., "Upstream sequences required for efficient expression of a soybean heat shock gene." Mol. Cell. Biol. 6.2: 559-565 (1986).
Harris et al., "Effect of pegylation on pharmaceuticals." Nature Reviews Drug Discovery 2.3: 214-221 (2003).
Hartley et al., "The Relation of Free Sulfhydryl Groups to Chromatographic Heterogeneity and Polymerization of Bovine Plasma Albumin*." Biochemistry 1.1: 60-68 (1962).
Hazum et al., "Preparation and application of radioiodinated sulfhydryl reagents for the covalent labeling of SH-proteins present in minute quantities." Journal of Biochemical and Biophysical Methods 24.1: 95-106 (1992).
Hershkovitz et al. "MOD-6030, a long-acting dual GLP-1/Glucagon agonist improves glycemic control and induces a prolonged anti-obesity effect in Diet Induced Obesity mice, with a potential once weekly injection in humans", Apr. 19, 2012.
Holmes et al., "Site specific 1: 1 opioid: albumin conjugate with in vitro activity and long in vivo duration." Bioconjugate Chemistry 11.4: 439-444 (2000).
Holst, Jens Juul. "Enteroglucagon." Annual Review of Physiology 59.1: 257-271 (1997).
International Search Report for PCT Application No. PCT/IL2013/050481 mailed on Oct. 11, 2013.
Jarrousse et al. "A Pure Enteroglucagon, Oxyntomodulin (Glucagon 37), Stimulates Insulin Release in Perfused Rat Pancreas", Endocrinology, 1984, 115(1):102-105.
Kalra et al., "Interacting Appetite-Regulating Pathways in the Hypothalamic Regulation of Body Weight 1." Endocrine Reviews 20.1: 68-100 (1999).
Katre, Nandini V. "The conjugation of proteins with polyethylene glycol and other polymers: altering properties of proteins to enhance their therapeutic potential." Advanced Drug Delivery Reviews 10.1: 91-114 (1993).
Kosinski, Jennifer R., et al. "The glucagon receptor is involved in mediating the body weight-lowering effects of oxyntomodulin." Obesity 20.8 (2012): 1566-1571.

(56) References Cited

OTHER PUBLICATIONS

Kurtzhals et al., "Albumin binding and time action of acylated insulins in various species." Journal of Pharmaceutical Sciences 85.3: 304-308 (1996).
Kurtzhals et al., "Albumin binding of insulins acylated with fatty acids: characterization of the ligand-protein interaction and correlation between binding affinity and timing of the insulin effect in vivo." Biochemical Journal 312: 725-731 (1995).
Kurtzhals et al., "Correlations of receptor binding and metabolic and mitogenic potencies of insulin analogs designed for clinical use." Diabetes 49.6: 999-1005 (2000).
Kurtzhals et al., "Effect of fatty acids and selected drugs on the albumin binding of a long-acting, acylated insulin analogue." Journal of pharmaceutical sciences 86.12: 1365-1368 (1997).
Langer, "New methods of drug delivery." Science 249.4976: 1527-1533 (1990).
Le Quellec et al., "Oxyntomodulin-like immunoreactivity: diurnal profile of a new potential enterogastrone." The Journal of Clinical Endocrinology and Metabolism 74.6: 1405-1409 (1992).
Lee et al., "Drug delivery systems employing 1, 6-elimination: releasable poly (ethylene glycol) conjugates of proteins." Bioconjugate Chemistry 12.2: 163-169 (2001).
Leger et al., "Kringle 5 peptide-albumin conjugates with antimigratory activity." Bioorganic & Medicinal Chemistry Letters 14.4: 841-845 (2004).
Leger et al., "Synthesis and in vitro analysis of atrial natriuretic peptide-albumin conjugates." Bioorganic & Medicinal Chemistry letters 13.20: 3571-3575 (2003).
Long Acting Reversible PEGylated Oxyntomdulin-MOD-6030—5th Diabetes Drug Discovery and Development Conference, Apr. 19, 2012. Retrieved from the internet on Feb. 27, 2017 at: <URL:http://www.barchart.com/plmodules/?module=secFilings&filingid=8553514&type=CONVPDF&popup=1&override=1&symbol=PBTH>.
Lopez-Berestein et al. "Treatment of systemic fungal infections with liposomal amphotericin B", Liposomes in the therapy of infectious diseases and cancer. (1989): 317-327.
Madia et al. "Longevity mutation in SCH9 prevents recombination errors and premature genomic instability in a Werner/Bloom model system", J Cell Biol. Jan. 14, 2008;180(1):67-81.
Maida et al. "The glucagon-like peptide-1 receptor agonist oxyntomodulin enhances β-cell function but does not inhibit gastric emptying in mice." Endocrinology 149.11: 5670-5678 (2008).
Merrifield et al., "9-(2-Sulfo)fluorenylmethyloxycarbonyl chloride, a new reagent for the purification of synthetic peptides." J. Org. Chem. 1978, 43 (25), pp. 4808-4816.
Meyerovitch et al., "Oral administration of vanadate normalizes blood glucose levels in streptozotocin-treated rats. Characterization and mode of action." Journal of Biological Chemistry 262.14: 6658-6662 (1987).
Moody et al., "A simple free fat cell bioassay for insulin." Hormone and Metabolic Research 6.1: 12-16 (1974).
Mutter "Studies on the coupling rates in liquid-phase peptide synthesis using competition experiments", Int J Pept Protein Res. Mar. 1979;13(3):274-7.
Mutter et al., "A New Base-Labile Anchoring Group for Polymer-Supported Peptide Synthesis." Helvetica Chimica Acta 67.7: 2009-2016 (1984).
Nesher et al. "Reversible pegylation prolongs the hypotensive effect of atrial natriuretic peptide", Bioconjug Chem. Jan. 2008;19(1):342-8.
Nucci et al., "The therapeutic value of poly (ethylene glycol)-modified proteins." Advanced Drug Delivery Reviews 6.2: 133-151 (1991).
O'Kelly et al., "Inactivation of interferon by serum and synovial fluids." Experimental Biology and Medicine 178.3: 407-411 (1985).
Parlevliet "Gut Hormones—Novel Tools in the Treatment of Insulin Resistance", thesis 2008.
Parlevliet et al. "Oxyntomodulin increases insulin secretion but does not affect insulin sensitivity in high-fat-fed C57B1/6 mice", Jun. 2007.
Parlevliet et al., "Oxyntomodulin ameliorates glucose intolerance in mice fed a high-fat diet." American Journal of Physiology-Endocrinology and Metabolism 294.1: E142-E147 (2008).
Partial International Search Report from PCT/EP2019/083022 dated Mar. 24, 2020.
Pedersen-Bjergaard et al., "Influence of meal composition on postprandial peripheral plasma concentrations of vasoactive peptides in man." Scandinavian Journal of Clinical & Laboratory Investigation 56.6: 497-503 (1996).
Pellissier et al. "The glycosylation of steroids", Tetrahedron vol. 60, Issue 24, Jun. 7, 2004, pp. 5123-5162.
Pellissier, et al. "Oxyntomodulin and glicentin are potent inhibitors of the fed motility pattern in small intestine." Neurogastroenterology & Motility 16.4: 455-463 (2004).
Peters, "The albumin molecule: its structure and chemical properties." All About Albumin: Biochemistry, Genetics and Medical Applications: 24-54 (1996).
Piehler et al., "Biophysical analysis of the interaction of human ifnar2 expressed in E. coli with IFNα2." Journal of Molecular Biology 289.1: 57-67 (1999).
Piehler et al., "Fast transient cytokine-receptor interactions monitored in real time by reflectometric interference spectroscopy." Analytical biochemistry 289.2: 173-186 (2001).
Pocai et al. "Glucagon-Like Peptide 1/Glucagon Receptor Dual Agonism Reverses Obesity in Mice", Diabetes, vol. 58, Oct. 2009, pp. 2258-2266.
Pocai, Alessandro. "Unraveling oxyntomodulin, GLP1's enigmatic brother." Journal of Endocrinology 215.3: 335-346 (2012).
Pocai, Alessandro. "Action and Therapeutic Potential of Oxyntomodulin". Molecular Metabolism 3 (2014) 241-251.
Pullen et al., "Receptor-binding region of insulin." Nature 259. 5542: 369-373 (1976).
Ramsden "Quantitative Drug Design", Chapter 17.2, F. Choplin Pergamon Press (1990).
Reddy et al., "Use of peginterferon alfa-2a (40 KD)(Pegasys) for the treatment of hepatitis C." Advanced Drug Delivery Reviews 54.4: 571-586 (2002).
Reddy, "Controlled-release, pegylation, liposomal formulations: new mechanisms in the delivery of injectable drugs." Annals of Pharmacotherapy 34.7-8: 915-923 (2000).
Roberts et al., "Chemistry for peptide and protein PEGylation." Advanced Drug Delivery Reviews 54.4: 459-476 (2002).
Rodbell, "Metabolism of Isolated Fat Cells: I. Effects of Hormones on Glucose Metabolism and Lipolysis." Journal of Biological Chemistry 239.2:375-380 (1964).
Romerio et al., "Interferon-α 2b reduces phosphorylation and activity of MEK and ERK through a Ras/Raf-independent mechanism." British Journal of Cancer 83.4: 532-538 (2000).
Rostaing et al. "Pharmacokinetics of alphaIFN-2b in chronic hepatitis C virus patients undergoing chronic hemodialysis or with normal renal function: clinical implications." Journal of the American Society of Nephrology 9.12: 2344-2348 (1998).
Rubinstein, "Convenient assay for interferons." Journal of Virology 37.2: 755-758 (1981).
Sambrook et al., Molecular Cloning: A Laboratory Manual, Cold Springs Harbor Laboratory, New Yorkxxi-xxii (1991).
Santoprete, Alessia, et al. "DPP-IV-resistant, long-acting oxyntomodulin derivatives." Journal of Peptide Science 17.4 (2011): 270-280.
Saudek et al., "A preliminary trial of the programmable implantable medication system for insulin delivery." N. Engl. J. Med. 321.9: 574-579 (1989).
Schepp et al. "Oxyntomodulin: a cAMP-dependent stimulus of rat parietal cell function via the receptor for glucagon-like peptide-1 (7-36)NH2", Digestion. Nov.-Dec. 1996;57(6):398-405.
Schepp et al., "Exendin-4 and exendin-(9-39) NH2: agonist and antagonist, respectively, at the rat parietal cell receptor for glucagon-like peptide-1 (7-36) NH2."European Journal of Pharmacology: Molecular Pharmacology 269.2: 183-191 (1994).
Schwartz et al., "Central nervous system control of food intake." Nature 404.6778: 661-671 (2000).
Schwartz et al., "Obesity: keeping hunger at bay." Nature 418.6898: 595-597 (2002).

(56) References Cited

OTHER PUBLICATIONS

Sefton, "Implantable Pumps." CRC Critical Reviews in Miomedical Engineering 14.3: 201-240 (1987).
Shechter et al. "Reversible pegylation of insulin facilitates its prolonged action in vivo", Eur J Pharm Biopharm. Sep. 2008;70(1):19-28.
Shechter et al. "Reversible PEGylation of peptide YY3-36 prolongs its inhibition of food intake in mice", FEBS Lett. Apr. 25, 2005;579(11):2439-44.
Shechter et al., "[2-Sulfo-9-fluorenylmethoxycarbonyl]3-exendin-4-a long-acting glucose-lowering prodrug." Biochemical and Biophysical Research Communications 305: 386-391 (2003).
Shechter et al., "A new approach for prolonging the half-life of peptides, proteins and low-molecular-weight drugs in vivo." Drugs Future 26: 669-676 (2001).
Shechter et al., "N-[(2-Sulfo)-9-fluorenylmethoxycarbonyl]3-gentamicin C1 Is a Long-Acting Prodrug Derivative." Journal of Medicinal Chemistry 45.19: 4264-4270 (2002).
Shechter et al., Prolonging the half-life of human interferon-α2 in circulation: Design, preparation, and analysis of (2-sulfo-9-fluorenylmethoxycarbonyl) 7-interferon-α2. Proceedings of the National Academy of Sciences 98.3: 1212-1217 (2001).
Sowden, Gillian L., et al. "Oxyntomodulin increases intrinsic heart rate in mice independent of the glucagon-like peptide-1 receptor." American Journal of Physiology-Regulatory, Integrative and Comparative Physiology 292.2 (2007): R962-R970.
Stanley et al., "Gastrointestinal satiety signals III. Glucagon-like peptide 1, oxyntomodulin, peptide YY, and pancreatic polypeptide." American Journal of Physiology-Gastrointestinal and Liver Physiology 286.5: G693-G697 (2004).
Studier et al., "Use of T7 RNA polymerase to direct expression of cloned genes." Methods in Enzymology 185: 60-89 (1990).
Supplemental European Search Report for European Patent Application No. 13800444.5 dated Apr. 5, 2016.
Supplemental European Search Report for European Patent Application No. 16802685.4 dated Jan. 3, 2019.
Supplementary European Search Report for European Application No. 12793107.9 dated Feb. 3, 2015.
Takamatsu et al., "Expression of bacterial chloramphenicol acetyltransferase gene in tobacco plants mediated by TMV-RNA." The EMBO Journal 6.2: 307-311 (1987).
Treat, in "Liposomes in the Therapy of Infectious Disease and Cancer." Lopez-Berestein and Fidler eds., Liss, New York 353-365 (1989).
Tsubery et al. "Prolonging the action of protein and peptide drugs by a novel approach of reversible polyethylene glycol modification", J Biol Chem. Sep. 10, 2004;279(37):38118-24.
Tsushima et al., "Characteristics of solubilized human-somatotropin-binding protein from the liver of pregnant rabbits." Biochemical Journal 187: 479-492 (1980).
Veronese, "Peptide and protein PEGylation: a review of problems and solutions." Biomaterials 22.5: 405-417 (2001).
Vettor et al., "Effects of intravenous neuropeptide Y on insulin secretion and insulin sensitivity in skeletal muscle in normal rats." Diabetologia 41.11: 1361-1367 (1998).
Weissbach and Weissbach, "Methods for Plant Molecular Biology." Selected Methods in Enzymology (USA) Section VIII: 421-463 (1988).
Wellings et al., "[4] Standard Fmoc protocols" Methods in enzymology. Dec. 31, 1997; 289:44-67.
Working et al., "Safety of poly (ethylene glycol) and poly (ethylene glycol) derivatives." in Polyethylene Glycol Chemistry and Biological Applications: 45-57 (1997).
Wynne et al., "Subcutaneous Oxyntomodulin Reduces Body Weight in Overweight and Obese Subjects." Diabetes 54: 2390-2395 (2005).
Wynne, Katie, B. C. Field, and Stephen R. Bloom. "The mechanism of action for oxyntomodulin in the regulation of obesity." *Curr Opin Investig Drugs* 11.10 (2010): 1151-1157.
Zalipsky et al., "New detachable poly (ethylene glycol) conjugates: cysteine-cleavable lipopolymers regenerating natural phospholipid, diacyl phosphatidylethanolamine." Bioconjugate Chemistry 10.5: 703-707 (1999).
Zier et al., "Polyethylene glycol bound benzyl-and fluorenyl derivatives as solubilizing side-chain protecting groups in peptide synthesis." Tetrahedron Letters 35.7: 1039-1042 (1994).
Freshney "Culture of Animal Cells—A Manual of Basic Technique", Wiley-Liss, N. Y. (1986). , pp. 1-4.

* cited by examiner

|          | N-Terminal Ion Series |       |       |       |       | C-Terminal Ion Series |        |        |        |        |
|----------|------|-------|-------|-------|-------|--------|--------|--------|--------|--------|
| Position | b°   | b²⁺   | b³⁺   | b⁴⁺   | b⁵⁺   | y°     | y²⁺    | y³⁺    | y⁴⁺    | y⁵⁺    |
| 0        |      |       |       |       |       |        |        |        |        | 901.7* |
| 1        |      |       |       |       |       |        |        |        |        | 1092.5 |
| 2        |      |       |       |       |       |        |        |        |        | 1071.2 |
| 3        | 351.2|       |       |       |       |        |        | 1385.3 |        | 1039.2 |
| 4        |      |       |       |       |       |        |        | 1366.2 |        | 1025.0 |
| 5        | 509.3|       |       |       |       |        |        | 1332.6 |        | 999.7  |
| 6        | 656.3|       |       |       |       |        |        | 1283.8 |        |        |
| 7        | 757.4|       |       |       |       |        |        | 1249.9 |        | 937.7  |
| 8        | 844.4|       |       |       |       |        |        | 1220.9 |        |        |
| 9        | 959.4|       |       |       |       |        |        |        |        | 887.2  |
| 10       | 1122.4|      |       |       |       |        |        | 1128.1 |        |        |
| 11       | 1209.5|      |       |       |       |        |        | 1099.1 |        | 824.6  |
| 12       | 1337.5|      |       |       |       |        | 1584.2 | 1056.5 |        | 792.6  |
| 13       |      | 750.8 |       |       |       |        | 1502.7 | 1002.1 |        |        |
| 14       |      | 807.3 |       |       |       |        | 1446.1 | 964.5  |        |        |
| 15       |      | 864.8 |       |       |       |        | 1388.6 | 926.1  |        |        |
| 16       |      |       |       |       |       |        | 1345.2 |        |        |        |
| 17       |      | 972.4 |       |       |       |        | 1281.1 | 854.4  |        |        |
| 18       |      |       | 691.3 |       |       |        | 1217.0 |        |        |        |
| 19       |      |       | 715.0 |       |       |        | 1181.5 |        |        |        |
| 20       |      |       | 757.7 |       |       |        | 1117.5 |        |        |        |
| 21       |      |       | 800.7 |       |       |        | 1053.0 |        |        |        |
| 22       |      |       | 849.7 |       |       |        | 979.5  |        |        |        |
| 23       |      |       | 882.8 |       |       |        | 929.9  |        |        |        |
| 24       |      |       |       |       |       |        |        |        |        |        |
| 25       |      |       | 987.5 |       |       |        | 772.9  |        |        |        |
| 26       |      |       |       |       |       |        | 716.3  |        |        |        |
| 27       |      |       |       |       |       |        | 659.8  |        |        |        |
| 28       |      |       |       |       |       |        |        |        |        |        |
| 29       |      |       |       |       |       |        |        |        |        |        |
| 30       |      |       |       |       |       |        |        |        |        |        |
| 31       |      |       |       |       |       |        |        |        |        |        |
| 32       |      |       |       |       |       |        |        |        |        |        |
| 33       |      |       |       |       |       |        |        |        |        |        |
| 34       |      |       |       |       |       |        |        |        |        |        |
| 35       |      |       |       |       |       |        |        |        |        |        |
| 36       |      |       |       |       |       |        |        |        |        |        |
| 37       |      |       |       |       |       |        |        |        |        |        |
| 38       |      |       |       |       |       |        |        |        |        |        |
| 39       |      |       |       |       |       |        |        |        |        |        |

All ion series are numbered from the N-terminus.
*Observed as the parent ion.

FIG. 3

| Position | N-Terminal Ion Series | | | | C-Terminal Ion Series | | | |
|---|---|---|---|---|---|---|---|---|
| | $c^1$ | $c^2$ | $c^3$ | $c^4$ | $z^1$ | $z^2$ | $z^3$ | $z^4$ |
| 0 | | | | | | | 1497.1' | 1123.1' |
| 1 | 155.1' | | | | | | 1451.4' | |
| 2 | 240.1' | | | | | | 1423.0' | |
| 3 | 368.2' | | | | | | 1380.3' | |
| 4 | 425.2' | | | | | | 1361.3' | |
| 5 | 525.3' | | | | | 1991.0' | 1327.7' | |
| 6 | 673.3' | | | | | 1917.4' | 1278.6' | |
| 7 | 774.4' | | | | | 1866.9' | | |
| 8 | 861.4' | | | | | 1823.4' | | |
| 9 | 976.4' | | | | | 1765.9' | | |
| 10 | 1139.5' | | | | | 1684.4' | | |
| 11 | 1226.5' | | | | | 1640.8' | | |
| 12 | 1354.6' | | | | | 1576.8' | 1051.2 | |
| 13 | 1517.7' | | | | | 1495.3' | 996.8 | |
| 14 | 1630.8' | | | | | 1438.7 | | |
| 15 | 1745.8' | | | | | 1381.2' | | |
| 16 | 1832.9' | 916.4 | | | | 1337.7' | | |
| 17 | 1961.0' | 981.0' | | | | | | |
| 18 | | 1045.0' | | | | 1209.1 | | |
| 19 | | | | | | | | |
| 20 | | 1144.6' | | | | | | |
| 21 | | 1209.1' | | | | | | |
| 22 | | | | | | | | |
| 23 | | | | | 1843.9' | | | |
| 24 | | 1396.2' | | | 1715.9' | 857.9 | | |
| 25 | | | | | | 764.9 | | |
| 26 | | 1545.8' | | | | 708.4 | | |
| 27 | | 1602.3' | | | 1303.6' | 651.8 | | |
| 28 | | 1659.3' | | | 1189.6' | | | |
| 29 | | 1701.9' | | | | | | |
| 30 | | 1730.4' | | | 1047.5' | | | |
| 31 | | 1808.4' | 1205.6 | | 890.4 | | | |
| 32 | | 1865.4' | 1244.0' | | 776.3 | | | |
| 33 | | 1943.5' | 1296.0' | | | | | |
| 34 | | | 1334.0' | | | | | |
| 35 | | | 1372.0' | | | | | |
| 36 | | | 1409.7' | 1057.5' | | | | |
| 37 | | | 1433.7" | 1075.3' | | | | |
| 38 | | | 1468.1" | | | | | |
| 39 | | | | | | | | |

All ion series are numbered from the N-terminus.
'Observed as the prime (+1H) ion.
"Observed as the double prime (+2H) ion.

FIG. 4

OXYNTOMODULIN PEPTIDE ANALOG FORMULATIONS

CROSS-REFERENCE TO RELATED APPLICATIONS

This Application claims the benefit of U.S. Provisional Application Ser. No. 62/773,651, filed Nov. 30, 2018 and U.S. Provisional Application Ser. No. 62/821,382, filed Mar. 20, 2019. All of these applications are hereby incorporated by reference in their entirety herein.

FIELD OF THE INVENTION

The present invention relates to GLP-1 and/or glucagon receptor agonists (for example, oxyntomodulin peptide analogs), pharmaceutically acceptable salts thereof, formulations comprising the same, and uses thereof for treating diabetes, obesity, and associated diseases or disorders.

BACKGROUND OF THE INVENTION

Type 2 diabetes mellitus (T2DM) is a progressive disease characterized by insulin resistance and loss of β-cell function and progressive loss of β-cell insulin secretion. Obesity is a major contributor to the progression of insulin resistance in T2DM. Correlations between adiposity and insulin resistance have been reported in both adults and children.

Oxyntomodulin (OXM) is a 37 amino acid peptide hormone that is released with an additional hormone [glucagon-Like peptide 1 (GLP-1)] from the L-cells of the small intestine. OXM reduces body weight in obese patients as a result of enhanced satiety and increased energy expenditure (Wynne et al, *Curr Opin Investig Drugs* 2010; 11:1151-1157). The satiety-inducing effects of OXM are believed to be mediated through the activation of the GLP-1R antagonist exendin (Baggio et al, *Gastroenterol* 2004: 127: 546-558), (Sowden at al. *Am J Physiol. Reg, Integr comp. Physiol.* 2007; 292: R962-R970)). Other effects of OXM such as further improvement of β-cell function and increased energy expenditure are attributed to the glucagon receptor pathway (Kosinski et al, *Obesity* 2012; 20:1566-1571).

Oxyntomodulin (OXM) improves glucose tolerance and stimulates insulin secretion in mice (Maida et al, *Endocrinol* 2008; 149:5670-5678). The oxyntomodulin peptide analog, for example, PEGylated derivatives, are found useful in treating type 2 diabetes and related disorders. These PEGylated derivatives are long acting analogs which bind to and activate both the glucagon-like peptide-1 receptor (GLP-1R) and the glucagon receptor (GcgR). There is a need for such derivatives to be chemically and physically stable in a liquid formulation for both quality/safety/delivery purposes and for shelf-life purposes.

SUMMARY OF THE INVENTION

The present invention provides a stable GLP-1 and/or Glucagon receptor agonist liquid formulation comprising a pharmaceutically effective amount of a GLP-1 and/or glucagon receptor agonist, or a pharmaceutically acceptable salt thereof, and an aqueous buffer solution, wherein the formulation has a pH value of from about 3.5 to about 8.0, and wherein the GLP-1 and/or Glucagon receptor agonist is native oxyntomodulin, an oxyntomodulin peptide analog, or an active fragment thereof. In one embodiment, the GLP-1 and/or Glucagon receptor agonist is a PEGylated oxyntomodulin peptide analog.

In one embodiment, the GLP-1 and/or glucagon receptor agonist comprises any one of SEQ ID NOS: 1-9 or an active fragment thereof, or the GLP-1 and/or glucagon receptor agonist is represented by a structure of Formula 3, Formula 4, or Formula 5, wherein Formula 3 is represented by the following structure

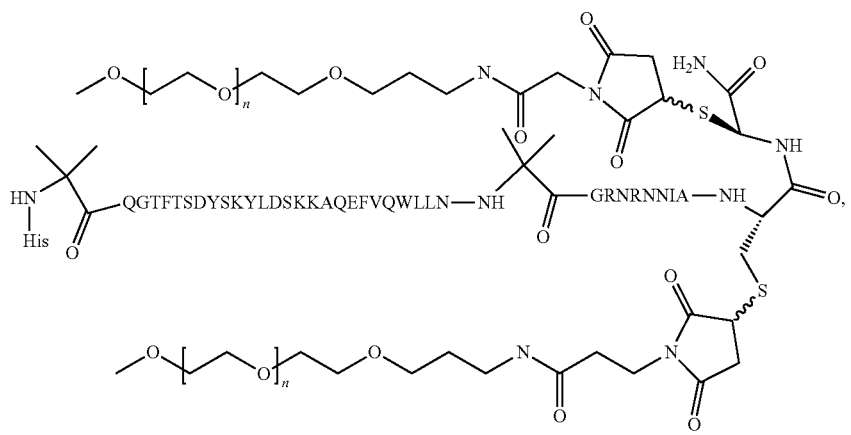

(Formula 3)

n = 425-475 wherein Formula 4 is represented by the following structure

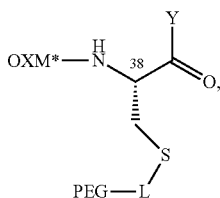

Formula 4 wherein
L is a linking group,
OXM* is native OXM, an OXM peptide analog, or an active fragment thereof,
PEG is a branched or linear polyethylene glycol polymer,
Y is —OH, OR, $NR_2$, or an amino acid, wherein said amino acid is optionally substituted with an L-PEG, and wherein said amino acid is optionally amidated, and
R is H or a $C_1$-$C_4$alkyl group,
and wherein Formula 5 is represented by the following structure In one embodiment, the GLP-1 and/or Glucagon receptor agonist comprises the amino acid sequence:

(SEQ ID NO: 6)
His-(D-Ser)-Gln-Gly-Thr-Phe-Thr-Ser-Asp-(1-Nal)-

Ser-Lys-Tyr-Leu-Asp-Glu-Lys-Ala-Ala-Gln-Glu-Phe-

Val-Gln-Trp-Leu-Leu-Asn-(Aib)-Ala-Arg-Asn-Arg-Asn-

Asn-Ile-Ala-$Xaa_{38}$-$Xaa_{39}$ wherein
$Xaa_{38}$ is Cys, Cys-PEG, or is absent, and
$Xaa_{39}$ is Cys, Cys-PEG, or is absent,
wherein the C-terminal amino acid is optionally amidated.

The present invention further provides a stable PEGylated-oxyntomodulin liquid formulation comprising a PEGylated oxyntomodulin peptide analog, or a pharmaceutically acceptable salt thereof, and an aqueous buffer solution, wherein said formulation is substantially free of a destabilizing substance and having a pH value of from about 3.5 to about 8.0, wherein said PEGylated oxyntomodulin peptide analog comprises any one of SEQ ID NOS: 1-9 or an active fragment thereof, or is represented by a structure of Formula 3, Formula 4, or Formula 5.

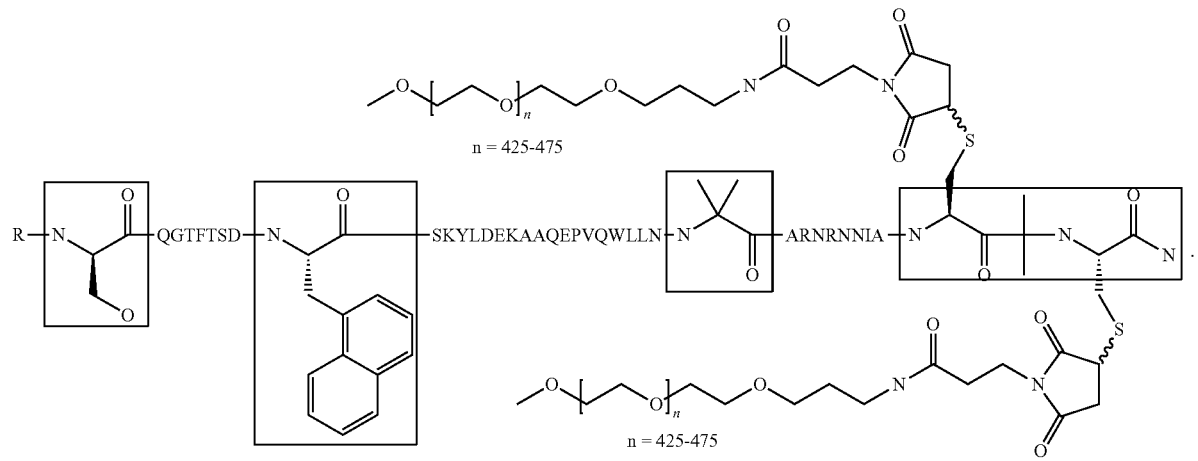

(Formula 5)

In one embodiment, the GLP-1 and/or Glucagon receptor agonist comprises the amino acid sequence:

(SEQ ID NO: 1)
His-(Aib)-Gln-Gly-Thr-Phe-Thr-Ser-Asp-Tyr-Ser-Lys-

Tyr-Leu-Asp-Ser-Lys-Lys-Ala-Gln-Glu-Phe-Val-Gln-

Trp-Leu-Leu-Asn-(Aib)-Gly-Arg-Asn-Arg-Asn-Asn-Ile-

Ala-$Xaa_{38}$-$Xaa_{39}$ wherein
$Xaa_{38}$ is Cys, Cys-PEG, or is absent, and
$Xaa_{39}$ is Cys, Cys-PEG, or is absent,
wherein the C-terminal amino acid is optionally amidated.

In another aspect, the present invention provides a pharmaceutical composition comprising a GLP-1 and/or Glucagon receptor agonist, or a pharmaceutically acceptable salt thereof, and a pharmaceutically acceptable excipient selected from the group consisting of methionine, sorbitol, and a buffer solution, wherein the GLP-1 and/or Glucagon receptor agonist comprises any one of SEQ ID NOS: 1-9 or an active fragment thereof, or is represented by a compound of formula 3, 4, or 5. In one embodiment, the present invention provides a formulation comprising 70 mg/mL of a PEGylated oxyntomodulin peptide analog of Formula 3 in a 10 mM acetate buffer solution with a pH value of about 4.5.

In another aspect, the present invention provides a method of treating a patient having type 2 diabetes, obesity or any associated medical disorder, disease or condition treated or treatable by a GLP-1 and/or glucagon receptor agonist comprising administering to the patient a pharmaceutically effective amount of a liquid dosage form of a GLP-1 and/or glucagon receptor agonist formulation of the invention. The diseases and conditions include but are not limited to patients having glucose related metabolic diseases or disorders or obesity related diseases and disorders. Diseases such as fatty liver disease or cardiovascular diseases and disorders may be mitigated or positively affected by the treatment regimens contemplated hereunder.

Patients treated or treatable hereunder with the formulation of the invention receive a stable liquid dosage form comprising the active ingredient. Such liquid dosage forms may be administered at any suitable dosing interval. In a preferred aspect, such patients are treated once weekly with a stable PEGylated oxyntomodulin formulation at any suitable dose or dosage range.

In another aspect, the present invention provides a method of lowering HbA1c in a patient in need thereof comprising administering to the patient a pharmaceutically effective amount of a liquid dosage form of a GLP-1 and/or Glucagon receptor agonist formulation of the invention.

In one aspect, the present invention provides a method of treating a type 2 diabetic patient comprising administering to the patient a pharmaceutically effective amount of a GLP-1 and/or Glucagon receptor agonist formulation of the invention by once-a-week subcutaneous administration wherein the effective weekly dose of the GLP-1 and/or Glucagon receptor agonist ranges from about 10 to about 150 mgs/week.

In another aspect, the present invention provides a prefilled syringe having a stable GLP-1 and/or Glucagon receptor agonist formulation of the invention.

In yet another aspect, the present invention provides a multidose container comprising a stable liquid formulation of the invention.

In yet another aspect, the present invention provides a method of treating a patient having a disease or condition selected from the group consisting of obesity, metabolic disease, type 1 or 2 diabetes, and any other condition selected from improper glucose metabolism, impaired glucose tolerance, and impaired fasting glucose, comprising administering to the patient a pharmaceutically effective amount of a GLP-1 and/or Glucagon receptor agonist formulation of the invention by subcutaneous administration wherein the effective weekly dose of the GLP-1 and/or Glucagon receptor agonist ranges from about 10 to about 150 mgs/week.

The present invention further provides a method of treating, suppressing, inhibiting, or reducing the incidence of type II diabetes, obesity or obesity associated metabolic disorder, weight loss, glucose intolerance, hyperinsulinemia, insulin resistance, high blood pressure, fatty liver disease, diabetic nephropathy, diabetic neuropathy, diabetic retinopathy, cardiovascular disease, atherosclerosis, cerebrovascular conditions, Alzheimer's disease, and/or stroke in a patient in need thereof, comprising administering to the patient a GLP-1 and/or glucagon receptor agonist formulation of the invention.

In yet another aspect, the present invention provides a pharmaceutically acceptable salt of a GLP-1 and/or Glucagon receptor agonist, wherein said GLP-1 and/or Glucagon receptor agonist comprises any one of SEQ ID NOS: 1-9 or an active fragment thereof, or is represented by a compound of formula 3, 4, or 5.

In one aspect, the present invention provides an acetate salt of a GLP-1 and/or Glucagon receptor agonist, wherein said GLP-1 and/or Glucagon receptor agonist comprises any one of SEQ ID NOS: 1-9 or an active fragment thereof, or is represented by a compound of formula 3, 4, or 5. In one embodiment, the GLP-1 and/or Glucagon receptor agonist is represented by a compound of Formula 3.

In one aspect, the present invention provides a hydrochloride salt of a GLP-1 and/or Glucagon receptor agonist, wherein said GLP-1 and/or Glucagon receptor agonist comprises any one of SEQ ID NOS: 1-9 or an active fragment thereof, or is represented by a compound of formula 3, 4, or 5. In one embodiment, the GLP-1 and/or Glucagon receptor agonist is represented by a compound of Formula 3.

In another aspect, the present invention provides a GLP-1 and/or Glucagon receptor agonist formulation comprising an acetate salt of a GLP-1 and/or Glucagon receptor agonist as described herein and an aqueous buffer solution, wherein the formulation has a pH range of from about 3.5 to about 8.0 and one or more additional pharmaceutically acceptable excipients.

In yet another aspect, the present invention provides a method of administering the formulation of the invention, wherein the method comprises a first administration period at a first once-weekly (QW) dose of a PEGylated oxyntomodulin peptide analog, followed by a second administration period at a second once-weekly (QW) dose, prior to administration of the pharmaceutically effective amount of a QW stable liquid dosage formulation, wherein the second QW dose is greater than the first QW dose.

The present invention further provides a process of preparing an acetate salt of a PEGylated oxyntomodulin peptide analog, comprising
  (a) dissolving an oxyntomodulin (OXM) peptide analog in a buffer solution to form an OXM peptide analog solution, wherein the buffer solution has a pH value of from about 6.6 to about 7.0;
  (b) adding the OXM peptide analog solution to a stirred solution of PEG to produce a reaction mixture containing a crude PEGylated oxyntomodulin peptide analog product, wherein the solution of PEG is formed by dissolving PEG in the same buffered solution as the one to dissolve the OXM peptide analog of step (a);
  (c) adjusting the reaction mixture to a pH of from about 3.95 to about 4.05 with acetic acid; and
  (d) purifying the crude PEGylated oxyntomodulin peptide analog product on a HPLC column with a gradient of acetonitrile and dilute aqueous acetic acid, followed by concentration and lyophilization to provide the acetate salt of the PEGylated oxyntomodulin peptide analog.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 depicts the sequence ions detected in the CID-MS/MS spectrum of the peptide intermediate ([M+5H]$^{5+}$ m/z 902.0).

FIG. 4 depicts the sequence ions detected in the ECD-MS/MS spectrum of the peptide intermediate ([M+5H]$^{5+}$ m/z 902.0).

Figure 1:
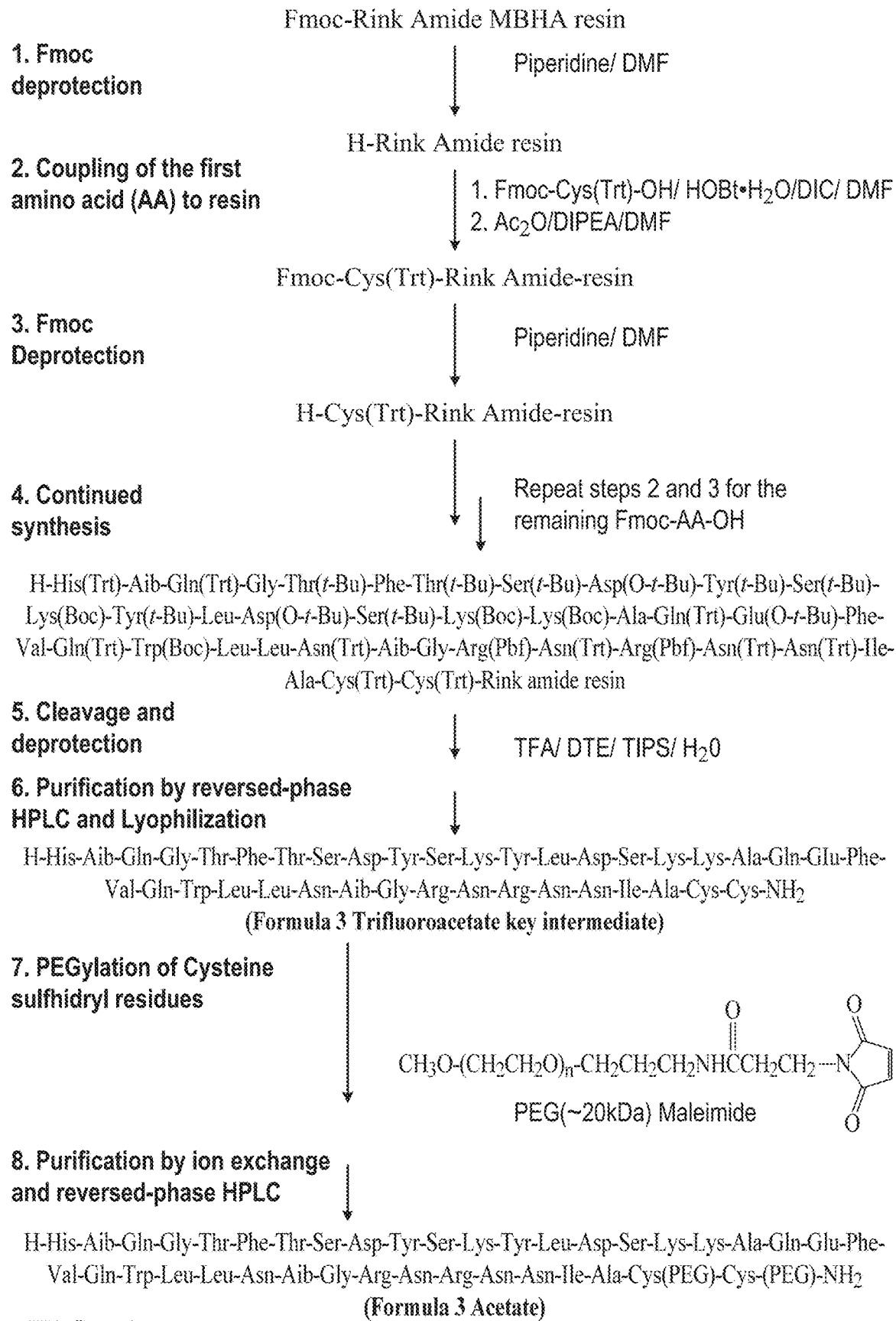
FIG. 1 depicts a flow diagram for preparation of an acetate salt of Formula 3.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

The present invention provides a stable GLP-1 and/or Glucagon receptor agonist liquid formulation comprising a pharmaceutically effective amount of a GLP-1 and/or glucagon receptor agonist, or a pharmaceutically acceptable salt thereof, and an aqueous buffer solution, wherein the formulation has a pH value of from about 3.5 to about 8.0.

The present invention further provides a stable GLP-1 and/or Glucagon receptor agonist liquid formulation comprising a pharmaceutically effective amount of a GLP-1 and/or glucagon receptor agonist, or a pharmaceutically acceptable salt thereof, and an aqueous buffer solution, wherein the formulation has a pH value of from about 3.5 to about 8.0, wherein the GLP-1 and/or Glucagon receptor agonist is native oxyntomodulin, an oxyntomodulin peptide analog or an active fragment thereof.

In one embodiment, the GLP-1 and/or Glucagon receptor agonist is a PEGylated oxyntomodulin peptide analog.

In one embodiment, the "activity" or "active" as used herein means having agonist activity at the GLP-1 receptor and/or the glucagon receptor.

In one embodiment, the GLP-1 and/or Glucagon receptor agonist comprises the amino acid sequence:

(SEQ ID NO: 1)
His-(Aib)-Gln-Gly-Thr-Phe-Thr-Ser-Asp-Tyr-Ser-Lys-

Tyr-Leu-Asp-Ser-Lys-Lys-Ala-Gln-Glu-Phe-Val-Gln-

Trp-Leu-Leu-Asn-(Aib)-Gly-Arg-Asn-Arg-Asn-Asn-Ile-

Ala-Xaa$_{38}$-Xaa$_{39}$ wherein
Xaa$_{38}$ is Cys, Cys-PEG, or is absent, and
Xaa$_{39}$ is Cys, Cys-PEG, or is absent,
wherein the C-terminal amino acid is optionally amidated; and
wherein if both Xaa$_{38}$ and Xaa$_{39}$ are absent, the NH$_2$ group of Ala$_{37}$ is PEGylated and has an optional linker.

As used herein, "Cys-PEG" refers to the attachment of one or more poly (ethylene glycol) (PEG) molecules to a Cysteine residue directly or through a linking group. The PEG and the linking group are as described herein or known in the art.

In one embodiment, the GLP-1 and/or Glucagon receptor agonist comprises the amino acid sequence:

(SEQ ID NO: 1)
His-(Aib)-Gln-Gly-Thr-Phe-Thr-Ser-Asp-Tyr-Ser-Lys-

Tyr-Leu-Asp-Ser-Lys-Lys-Ala-Gln-Glu-Phe-Val-Gln-

Trp-Leu-Leu-Asn-(Aib)-Gly-Arg-Asn-Arg-Asn-Asn-Ile-

Ala-Xaa$_{38}$-Xaa$_{39}$ wherein
Xaa$_{38}$ is Cys, Cys-PEG, or is absent, and
Xaa$_{39}$ is Cys, Cys-PEG, or is absent,
wherein the C-terminal amino acid is optionally amidated.

In one embodiment, Xaa$_{38}$ is Cys-PEG and Xaa$_{39}$ is absent. In one embodiment, Xaa$_{38}$ is Cys and Xaa$_{39}$ is Cys-PEG. In another embodiment, Xaa$_{38}$ is Cys-PEG and Xaa$_{39}$ is Cys. In one embodiment, Xaa$_{38}$ is Cys-PEG and Xaa$_{39}$ is Cys-PEG. In certain embodiment, both Xaa$_{38}$ and Xaa$_{39}$ are absent and the NH$_2$ group of Ala$_{37}$ is PEGylated. In one embodiment, the NH$_2$ group of Ala$_{37}$ is PEGylated optionally through a linker.

In one embodiment, the GLP-1 and/or Glucagon receptor agonist comprises the amino acid sequence (SEQ ID NO: 2)
His-(Aib)-Gln-Gly-Thr-Phe-Thr-Ser-Asp-Tyr-Ser-Lys- Tyr-Leu-Asp-Ser-Lys-Lys-Ala-Gln-Glu-Phe-Val-Gln- Trp-Leu-Leu-Asn-(Aib)-Gly-Arg-Asn-Arg-Asn-Asn-Ile- Ala-Cys-Cys wherein
the Cys residue at position 38 is optionally PEGylated,
the Cys residue at position 39 is optionally PEGylated, and
the carboxyl group of the Cys at position 39 is optionally amidated.

In one embodiment, the GLP-1 and/or Glucagon receptor agonist (e.g., PEGylated oxyntomodulin peptide analog) is PEGylated at the 38 and/or 39 position of SEQ ID NO: 1 or SEQ ID NO: 2, wherein the PEG molecule is covalently linked to the thiol group of the Cys residue directly or via a linking group attached to the PEG molecule. In one embodiment, the PEG molecule is linear or branched. In one embodiment, the PEG molecule has a molecular weight of about 20-40 kDa, for example, about 20 kDa, or about 30 kDa, or about 40 kDa.

In one embodiment, GLP-1 and/or Glucagon receptor agonist comprises the amino acid sequence:

(SEQ ID NO: 3)
His-(Aib)-Gln-Gly-Thr-Phe-Thr-Ser-Asp-Tyr-Ser-Lys-

Tyr-Leu-Asp-Ser-Lys-Lys-Ala-Gln-Glu-Phe-Val-Gln-

Trp-Leu-Leu-Asn-(Aib)-Gly-Arg-Asn-Arg-Asn-Asn-Ile-

Ala-Cys(20 kDa PEG)-Cys (20 kD PEG), wherein the carboxyl group of the Cys at position 39 is optionally amidated.

In one embodiment, the carboxyl group of the PEGylated Cys at position 39 is amidated.

In one embodiment, the GLP-1 and/or Glucagon receptor agonist is the compound of formula 4:

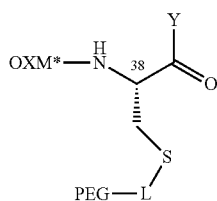

Formula 4 wherein
L is a linking group,
OXM* is native OXM, an OXM peptide analog, or an active fragment thereof,
PEG is a branched or linear polyethylene glycol polymer,
Y is —OH, OR, NR$_2$, or an amino acid, wherein said amino acid is optionally substituted with an L-PEG, and wherein said amino acid is optionally amidated, and
R is a C$_1$-C$_4$alkyl group.

In one embodiment, wherein the amino acid is cysteine substituted with a L-PEG group and wherein the linking group L is attached to the S atom on the cysteine.

In one embodiment, the GLP-1 and/or Glucagon receptor agonist comprises the amino acid sequence:

(SEQ ID NO: 5)
His-(Aib)-Gln-Gly-Thr-Phe-Thr-Ser-Asp-Tyr-Ser-Lys-

Tyr-Leu-Asp-Ser-Lys-Lys-Ala-Gln-Glu-Phe-Val-Gln-

Trp-Leu-Leu-Asn-(Aib)-Gly-Arg-Asn-Arg-Asn-Asn-Ile-

Ala.

In one embodiment, the NH$_2$ group of Ala$_{37}$ is PEGylated. In one embodiment, the NH$_2$ group of Ala$_{37}$ is optionally PEGylated through a linker.

In one embodiment, the GLP-1 and/or Glucagon receptor agonist comprises the amino acid sequence:

(SEQ ID NO: 6)
His-(D-Ser)-Gln-Gly-Thr-Phe-Thr-Ser-Asp-(1-Nal)-

Ser-Lys-Tyr-Leu-Asp-Glu-Lys-Ala-Ala-Gln-Glu-Phe-

Val-Gln-Trp-Leu-Leu-Asn-(Aib)-Ala-Arg-Asn-Arg-Asn-

Asn-Ile-Ala-Xaa$_{38}$-Xaa$_{39}$ wherein
Xaa$_{38}$ is Cys, Cys-PEG, or is absent, and
Xaa$_{39}$ is Cys, Cys-PEG, or is absent,
wherein the C-terminal amino acid is optionally amidated; and
wherein, if both Xaa$_{38}$ and Xaa$_{39}$ are absent, the NH$_2$ group of Ala37 is PEGylated and has an optional linker.

In one embodiment, the GLP-1 and/or Glucagon receptor agonist comprises the amino acid sequence:

(SEQ ID NO: 6)
His-(D-Ser)-Gln-Gly-Thr-Phe-Thr-Ser-Asp-(1-Nal)-

Ser-Lys-Tyr-Leu-Asp-Glu-Lys-Ala-Ala-Gln-Glu-Phe-

Val-Gln-Trp-Leu-Leu-Asn-(Aib)-Ala-Arg-Asn-Arg-Asn-

Asn-Ile-Ala-Xaa$_{38}$-Xaa$_{39}$ wherein
Xaa$_{38}$ is Cys, Cys-PEG, or is absent, and
Xaa$_{39}$ is Cys, Cys-PEG, or is absent,
wherein the C-terminal amino acid is optionally amidated.

In one embodiment, Xaa$_{38}$ is Cys-PEG and Xaa$_{39}$ is absent. In one embodiment, Xaa$_{38}$ is Cys and Xaa$_{39}$ is Cys-PEG. In another embodiment, Xaa$_{38}$ is Cys-PEG and Xaa$_{39}$ is Cys. In one embodiment, Xaa$_{38}$ is Cys-PEG and Xaa$_{39}$ is Cys-PEG. In certain embodiment, both Xaa$_{38}$ and Xaa$_{39}$ are absent and the NH$_2$ group of Ala$_{37}$ is PEGylated. In one embodiment, the NH$_2$ group of Ala$_{37}$ is PEGylated optionally through a linker.

In one embodiment, PEG is a branched, linear, or multi-armed polyethylene glycol polymer. In one embodiment, the PEG molecule in the oxyntomodulin peptide analog has a molecular weight of 20-40 kDa, for example, about 20 kDa, or about 30 kDa, or about 40 kDa.

In one embodiment, the GLP-1 and/or Glucagon receptor agonist comprises the amino acid sequence:

(SEQ ID NO: 7)
His-(D-Ser)-Gln-Gly-Thr-Phe-Thr-Ser-Asp-(1-Nal)-

Ser-Lys-Tyr-Leu-Asp-Glu-Lys-Ala-Ala-Gln-Glu-Phe-

Val-Gln-Trp-Leu-Leu-Asn-(Aib)-Ala-Arg-Asn-Arg-Asn-

Asn-Ile-Ala-Cys-Cys wherein
the Cys residue at position 38 is optionally PEGylated,
the Cys residue at position 39 is optionally PEGylated, and
the carboxyl group of the Cys at position 39 is optionally amidated.

In one embodiment, the GLP-1 and/or Glucagon receptor agonist (e.g., PEGylated oxyntomodulin peptide analog) is PEGylated at the 38 and/or 39 position of SEQ ID NOS: 6 or 7 and wherein the PEG molecule is covalently linked to the thiol group of the Cys residue or is linked directly or via a linking group attached to the PEG molecule. In one embodiment, PEG is a branched, linear, or multi-armed polyethylene glycol polymer. In one embodiment, the PEG molecule in the oxyntomodulin peptide analog has a molecular weight of 20-40 kDa, for example, about 20 kDa, or about 30 kDa, or about 40 kDa.

In one embodiment, the oxyntomodulin peptide analogue of SEQ ID NO: 6 or 7 is PEGylated on either the Cys at position 38 or the Cys at position 39 or both with a 20 kDa PEG molecule covalently linked to the thiol group of the Cys residue at these positions. In one embodiment, the oxyntomodulin peptide analogue is PEGylated on the Cys residues at both position 38 and position 39 with a 20 kDa PEG molecule covalently linked to each thiol group of the Cys residues at these positions. In another embodiment, the Cys residue at position 39 may be absent from SEQ ID NO: 6 or 7, leaving a single site for PEGylation at position 38.

In one embodiment, the GLP-1 and/or Glucagon receptor agonist comprises the amino acid sequence:

```
                                        (SEQ ID NO: 8)
His-(D-Ser)-Gln-Gly-Thr-Phe-Thr-Ser-Asp-(1-Nal)-

Ser-Lys-Tyr-Leu-Asp-Glu-Lys-Ala-Ala-Gln-Glu-Phe-

Val-Gln-Trp-Leu-Leu-Asn-(Aib)-Ala-Arg-Asn-Arg-Asn-

Asn-Ile-Ala-Cys (20 kDa PEG)-Cys (20 kDa PEG)
``` wherein the carboxyl group of the Cys at position 39 is optionally amidated.

In one embodiment, the the carboxyl group of the PEGylated Cys at position 39 is amidated.

In one embodiment, the GLP-1 and/or Glucagon receptor agonist comprises the amino acid sequence:

```
                                        (SEQ ID NO: 9)
His-(D-Ser)-Gln-Gly-Thr-Phe-Thr-Ser-Asp-(1-Nal)-

Ser-Lys-Tyr-Leu-Asp-Glu-Lys-Ala-Ala-Gln-Glu-Phe-

Val-Gln-Trp-Leu-Leu-Asn-(Aib)-Ala-Arg-Asn-Arg-Asn-

Asn-Ile-Ala.
```

In one embodiment, the $NH_2$ group of Ala37 is PEGylated. In one embodiment, the $NH_2$ group of Ala37 is PEGylated optionally through a linker.

In one embodiment, the GLP-1 and/or Glucagon receptor agonist (e.g., PEGylated oxyntomodulin peptide analog) as described herein is PEGylated on either the Cys at position 38 or the Cys at position 39 or both with a PEG molecule, e.g., 20 kDa PEG, 30 kDa PEG, or 40 kDa PEG, covalently linked to the thiol group of the Cys residue at these positions. In one embodiment, the oxyntomodulin peptide analogue is PEGylated on the Cys residues at both position 38 and position 39 with a PEG molecule, e.g., 20 kDa PEG, 30 kDa PEG, or 40 kDa PEG, covalently linked to each thiol group of the Cys residues at these positions. In another embodiment, the Cys residue at position 39 may be absent, leaving a single site for PEGylation at position 38.

In one embodiment, the PEG in the GLP-1 and/or Glucagon receptor agonist (e.g., PEGylated oxyntomodulin peptide analog) as described herein can be attached to the oxyntomodulin 38 and/or 39 Cys groups via a linking group known in the art. In one embodiment, the PEG is attached to the oxyntomodulin 38 and/or 39 Cys groups using mPEG-20 kDa maleimide (Formula 1) or an mPEG-20 kDa iodoacetamide (Formula 2) wherein n is 10 to 2500, or n is 350-600, or n is 425-475.

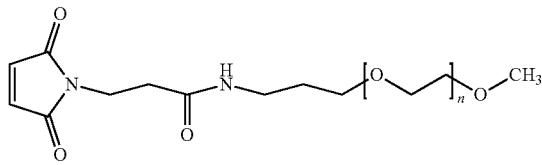

(Formula 1)

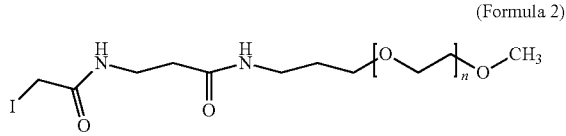

(Formula 2)

Other known linkers or linking groups may also be utilized to covalently bind the OXM or analog thereof to a PEG moiety. Alternatively, an activated PEG molecule can directly react with the OXM analog having at least one reactive cysteine at position 38 and/or 39 to form a PEGylated OXM analog utilized as the active pharmaceutical ingredient (API) in the stable, liquid formulation of the present invention.

In one embodiment, the PEG is attached to the oxyntomodulin 38 and 39 Cys groups using both mPEG-20 kDa iodoacetamide and wherein the carboxyl group of the PEGylated Cys at position 39 is amidated.

In one embodiment, the PEG is attached to the oxyntomodulin 38 and 39 Cys groups using either an mPEG-20 kDa maleimide or an mPEG-20 kDa iodoacetamide and wherein the carboxyl group of the PEGylated Cys at position 39 is amidated. For example, the PEG is attached to the oxyntomodulin 38 Cys group using an mPEG-20 kDa maleimide and to the oxyntomodulin 39 Cys group using an mPEG-20 kDa iodoacetamide. In another embodiment, the PEG is attached to the oxyntomodulin 38 Cys group using an mPEG-20 kDa iodoacetamide and to the oxyntomodulin 39 Cys group using an mPEG-20 kDa maleimide.

In one embodiment, the PEG is attached to the oxyntomodulin 38 and 39 Cys groups of SEQ ID NO: 1 using both mPEG-20 kDa maleimide and wherein the carboxyl group of the PEGylated Cys at position 39 is amidated (Formula 3).

(Formula 3)

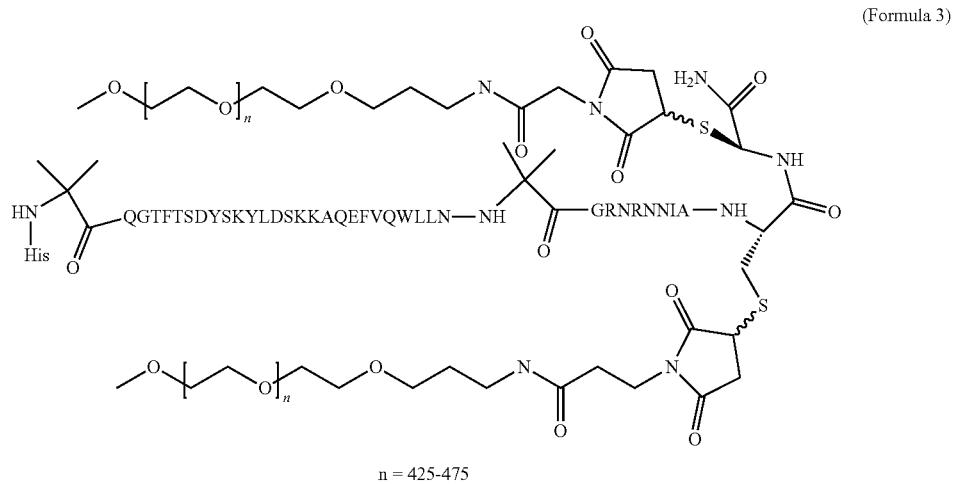

Formula 3 contains the standard letter amino acid code designations with the exception of the specific chemical structures shown embedded in the formula or as otherwise shown (i.e., His). In one embodiment, the compound of Formula 3 is in the form of a pharmaceutically acceptable salt. In one embodiment, the compound of formula 3 is in the form of an acetate salt.

In another embodiment, the PEG is attached to the oxyntomodulin 38 and 39 Cys groups of SEQ ID NO: 6 using both mPEG-20 kDa maleimide and wherein the carboxyl group of the PEGylated Cys at position 39 is amidated (Formula 5).

17:270-280. In particular, substitution at position 2 at the N-terminus with D-Ser or Aib or D-Ala provides DPP-IV resistant analogs while retaining GLP-1R/GcgR dual agonist properties. Aib at position 2 provides enhanced potency and selectivity at the GLP-1 receptor and is therefore preferred (Aib is 2-amino isobutyric acid). Other embodiments include active OXM (HSQGTFTSDYSKYLDSR-RAQDFVQWLMNTKRNRNNIA) (SEQ ID NO: 4) with the Cys residues at position 38 or positions 38 and 39 with further modification(s) to the PEGylated derivatives as described herein.

(Formula 5)

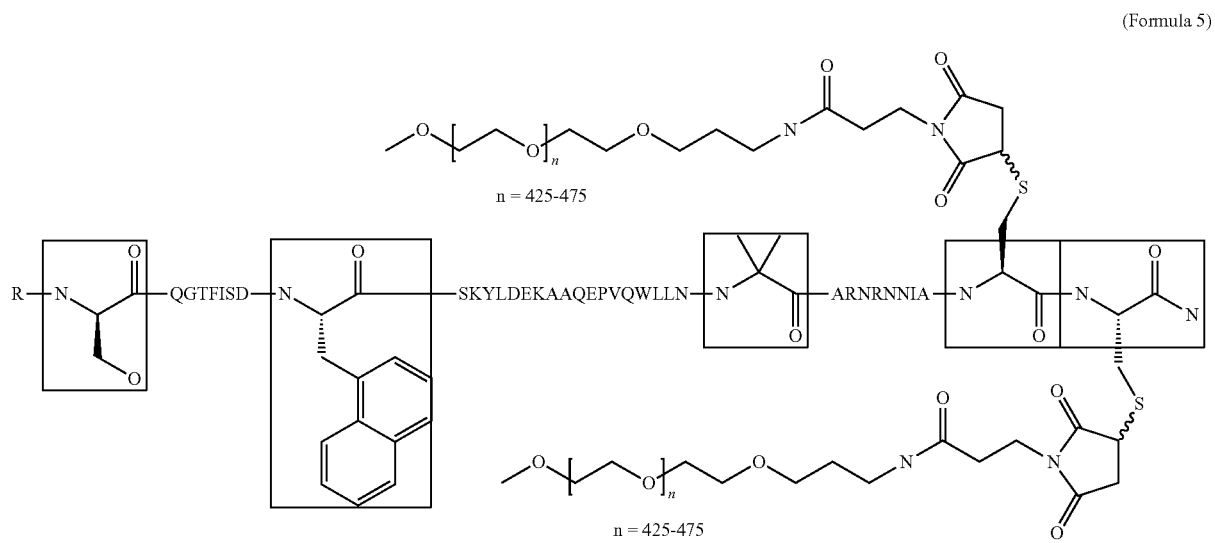

In one embodiment, the compound of Formula 5 is in the form of a pharmaceutically acceptable salt. In other embodiment, the compound of Formula 5 is in the form of an acetate salt.

Other oxyntomodulin variants/analogs and/or activators of both the GLP-1 receptor and glucagon receptor having at least one cysteine residue at position 38 may also be utilized in the present invention. Suitable analogs having dual activity are described in Santoprete et al. *J. Pept. Sci.* 2011;

In one embodiment, the formulation of the invention has a pH value of from about 4.0 to about 7.0. In one embodiment, the pH value is from about 4.5 to about 6.5. In one embodiment, the pH value is from about 4.0 to about 5.5. In one embodiment, the pH is about 4.5.

In one embodiment, for the preparation of the formulation of the invention, a suitable buffer solution, e.g., an acetate buffer solution, is prepared to a pH of approximately 0.5 pH units below the target range, for example, about 4.0 to 7.0, with the desired excipients (i.e., methionine (stabilizer), sorbitol (tonicity adjusting agent)) (Alternatively, the pH is adjusted to the preferred target pH range after the addition of a GLP-1 and/or Glucagon receptor agonist). A GLP-1 and/or Glucagon receptor agonist such as an oxyntomodulin peptide analog as described herein is added to the formulation buffer and then adjusted with a weak acid or base to decrease or increase the pH to within the target range.

The inventors have found that a lower pH within the range of from about 4.0 to about 7.0 actually improves the stability of the liquid formulation with a pH of about 4.5 being preferred. Additionally, the inventors have found that certain excipients routinely used in such parenteral formulations actually destabilize the API (active pharmaceutical ingredient, e.g., the GLP-1 and/or Glucagon receptor agonist as described herein) in preliminary buffer solutions, causing formation of impurities (e.g., cysteine) as determined by HPLC. The inventors have also found that certain reagents such as methionine and/or arginine improves the stability of the liquid formulation.

Unexpectedly, preliminary buffer formulations containing 100 nM sodium chloride and a citrate, histidine or acetate buffer were not as stable with respect to impurity formation when tested in aqueous buffered (citrate, histidine or acetate) solutions without sodium chloride. This discovery resulted in the selection of stable formulations that did not include sodium chloride or included a low concentration (0-50 nM) of such salt. Stable formulations of the GLP-1/glucagon receptor agonists may include sodium chloride provided it does not lead to degradation of the API. The preferred formulation is sodium chloride free or substantially free of sodium chloride or other tonicity adjusting agent that leads to degradation of the API in buffered aqueous solutions such as citrate, histidine or acetate buffer solutions. The percentage of impurities by HPLC analysis is preferably less than 6.0 percent by area. This impurity profile is also dependent, to some degree, upon pH of the solution. Higher pH ranges of between 5.3 to 6.6 led to a higher percentage of total impurities (6.1-7.3 or 7.0-9.3 for samples stored at room temperature for 6 days versus samples stored at 40 degrees Centigrade for 6 days) in sodium chloride containing samples.

A less stabilizing amount of tonicity agent such as sodium chloride is defined as ≥about 10-100 mM sodium chloride. This concentration can vary depending upon the particular excipients in the formulation and the pH of the solution. A destabilizing amount of cysteine is defined as ≥25 mM cysteine.

Thus, in another embodiment, the formulation of the invention is substantially free of a destabilizing substance. In one embodiment, the destabilizing substance is cysteine. In one embodiment, the amount of cysteine is less than 25 mM. In one embodiment, the amount of cysteine is less than 10 mM. In one embodiment, the formulation is substantially free of sodium chloride. In one embodiment, the amount of sodium chloride is less than 100 mM. In one embodiment, the amount of sodium chloride is less than 25 mM.

The term "substantially free" as used herein shall be understood to mean relatively little to no amount of any substance in an aqueous buffered formulation of the invention which leads to degradation of the active pharmaceutical ingredient to a percentage of greater than about five percent (5%) based upon high performance liquid chromatography ("HPLC") measured at standard testing conditions.

The present invention further encompasses the formulations with additional pharmaceutically acceptable ("Generally recognized as safe reagents "GRAS") excipients such as surfactants or tonicity agents or other pharmaceutically acceptable additives. These can include, for example, methionine, arginine, sorbitol, sucrose, non-ionic surfactants (Poloxamers and polysorbates) or similar excipients. In one embodiment, the formulation is 70 mg/mL PEGylated oxyntomodulin peptide of Formula 3 (OPK88003) in a 10 mM acetate buffer solution, pH 4.5 with methionine (30-35 mM) and sorbitol to adjust tonicity.

The present invention provides a stable GLP-1 and/or Glucagon receptor agonist liquid formulation comprising a GLP-1 and/or Glucagon receptor agonist (e.g., PEGylated oxyntomodulin peptide analog), or a pharmaceutically acceptable salt thereof, and an aqueous buffer solution, wherein said formulation is substantially free of destabilizing substance and having a pH range of from about 3.5 to about 8.0.

wherein said GLP-1 and/or Glucagon receptor agonist comprises any one of SEQ ID NOS: 1-9 or an active fragment thereof, or is represented by a structure of Formula 3, Formula 4, or Formula 5, wherein Formula 3 is represented by the following structure

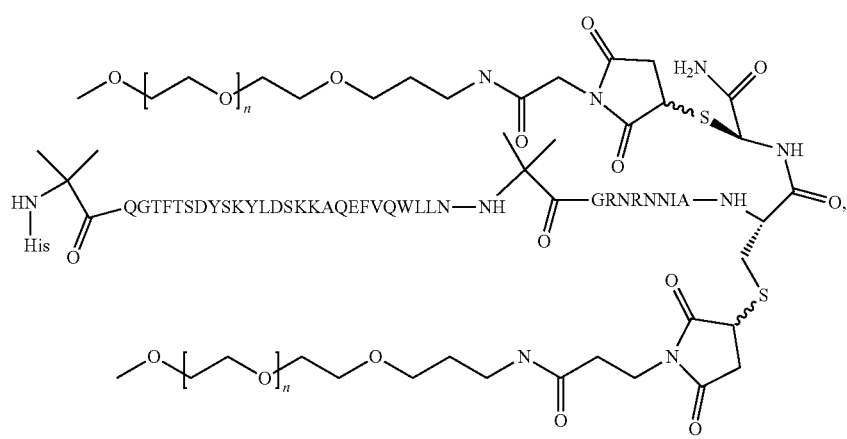

(Formula 3)

n = 425-475 wherein Formula 4 is represented by the following structure

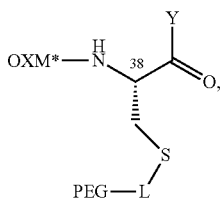

Formula 4 wherein
L is a linking group,
OXM* is native OXM, an OXM peptide analog, or an active fragment thereof,
PEG is a branched or linear polyethylene glycol polymer,
Y is —OH, OR, NR$_2$, or an amino acid, wherein said amino acid is optionally substituted with an L-PEG, and wherein said amino acid is optionally amidated,
R is H or a C$_1$-C$_4$alkyl group,
and wherein Formula 5 is represented by the following structure and less than about 5% of any single individual impurity measured by size exclusion chromatography.

In one embodiment, the formulation of the invention is substantially free of a destabilizing substance. In one embodiment, the destabilizing substance is cysteine. In one embodiment, the amount of cysteine is less than 25 mM. In one embodiment, the amount of cysteine is less than 10 mM. In one embodiment, the formulation is substantially free of sodium chloride. In one embodiment, the amount of sodium chloride is less than 100 mM. In one embodiment, the amount of sodium chloride is less than 25 mM.

In one embodiment, the formulation of the invention comprises a tonicity agent. In one embodiment, the tonicity agent comprises sorbitol. Other tonicity agents can include sucrose, mannitol or other tonicity modifying agents.

In one embodiment, the formulation of the invention further comprises one or more preservatives of from about 0.001% (w/v) to about 1% (w/v) based on the total volume of the liquid formulation. In one embodiment, the preservative is from about 0.001% (w/v) to about 0.5% (w/v), or from about 0.001% (w/v) to about 0.1% (w/v), or from about 0.001% (w/v) to about 0.05% (w/v), or from about 0.001% (w/v) to about 0.01% (w/v). In one embodiment, the preservative is m-cresol, phenol, and/or benzyl alcohol. In certain embodiment, the preservative is m-cresol. In another embodiment, the preservative is phenol or benzyl alcohol.

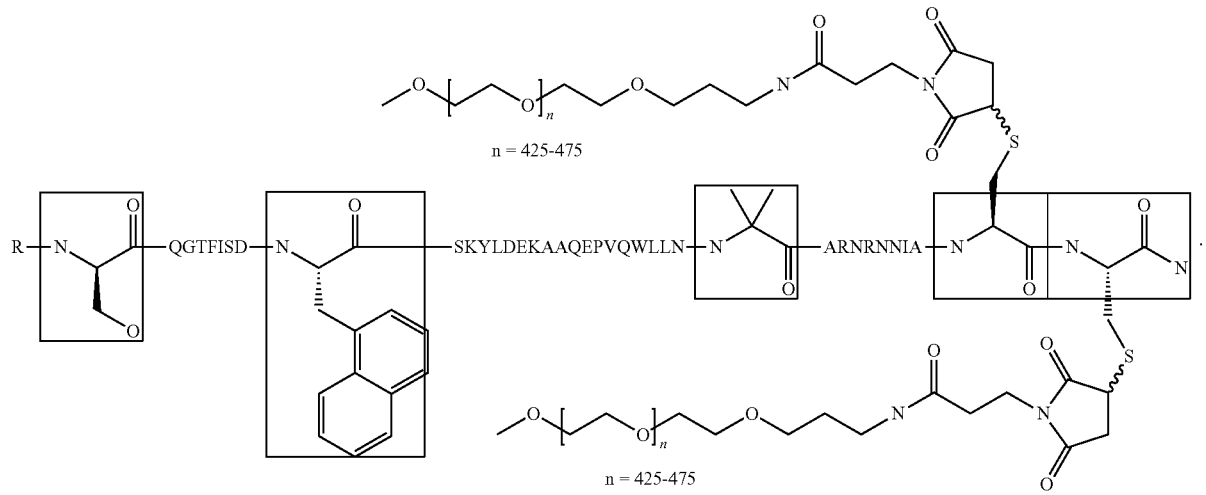

(Formula 5)

In one embodiment, the PEGylated oxyntomodulin peptide analog is represented by a structure of Formula 3, Formula 4, or Formula 5. In another embodiment, the PEGylated oxyntomodulin peptide analog is represented by a structure of Formula 3.

In one embodiment, Y in Formula 4 is cysteine substituted with a L-PEG group and wherein the linking group L is attached to the cysteine through the S atom on the cysteine.

In one embodiment, the GLP-1 and/or Glucagon receptor agonist is in the form of a pharmaceutically acceptable salt. In one embodiment, the GLP-1 and/or Glucagon receptor agonist is in the form of an acetate salt.

In one embodiment, the formulation of the invention contains about 10.0% or less of total impurities and less than about 5% of any single individual impurity measured by RP-HPLC. In one embodiment, the formulation of the invention contains about 10.0% or less of total impurities In one embodiment, in the formulation of the invention, the GLP-1 and/or Glucagon receptor agonist (e.g., PEGylated oxyntomodulin peptide analog), or a pharmaceutically acceptable salt thereof, is present in a suitable vial at a concentration range of from about 5 mg/mL to about 150 mg/mL. In one embodiment, in the formulation of the invention, the GLP-1 and/or Glucagon receptor agonist, or a pharmaceutically acceptable salt thereof, is present in a suitable vial at a concentration range of from about 20 mg/mL to about 150 mg/mL. In one embodiment, in the formulation of the invention, the GLP-1 and/or Glucagon receptor agonist, or a pharmaceutically acceptable salt thereof, is present in a suitable vial at a concentration range of from about 50 mg/mL to about 120 mg/mL. In one embodiment, in the formulation of the invention, the GLP-1 and/or Glucagon receptor agonist, or a pharmaceutically acceptable salt thereof, is present in a suitable vial at a concentration of about 70 mg/mL. In one embodiment, the suitable vial is a single use vial.

In one embodiment, the buffer solution in the formulation of the invention is selected from the group consisting of an acetate buffer solution, a citrate buffer solution, and a histidine buffer solution. In certain embodiment, the buffer solution is an acetate buffer solution. In one embodiment, the buffer solution is a citrate buffer solution. In one embodiment, the buffer solution is a histidine buffer solution.

In one embodiment, the pH range in the formulation of the invention is from about 4.0 to about 7.0, or from about 4.0 to about 6.5, or from about 4.0 to about 6.0, or from about 4.0 to about 5.5, or from about 4.0 to about 5.0, or from about 4.5 to about 6.5 or from about 4.5 to about 6.0, or from about 4.5 to about 5.5. In another embodiment, the pH value of the formulation of the invention is about 4.5.

In one embodiment, the formulation comprises 70 mg/mL of a PEGylated oxyntomodulin peptide analog of Formula 3 in a 10 mM acetate buffer solution, wherein the formulation has a pH value of about 4.5.

In one embodiment, the formulation of the invention further comprises one or more additional pharmaceutically acceptable excipients as known in the art. In one embodiment, the additional pharmaceutically acceptable excipient is methionine, a derivative of methionine, arginine, or a derivative of arginine.

In one embodiment, the formulation of the invention has an osmolality of no more than 500 mOsm/kg. In one embodiment, the formulation of the invention has a viscosity of from about 10 to about 60 cP. In one embodiment, the formulation of the invention has a syringeability of Break Loose Force of less than 10 N and Glide Force of less than 30 N. In one embodiment, the formulation of the invention causes no or little injection site reaction, e.g., irritation.

In one embodiment, the formulation of the invention is stable for at least 5 times of freeze/thaw cycles. In another embodiment the formulation of the invention is stable at least for 48 hours at 30° C./65% RH and for 12 months at 5° C.

The present invention further provides a pharmaceutical composition comprising a GLP-1 and/or Glucagon receptor agonist as described herein, or a pharmaceutically acceptable salt thereof, and a pharmaceutically acceptable excipient selected from the group consisting of methionine, sorbitol, and a buffer solution. In one embodiment, GLP-1 and/or Glucagon receptor agonist is a PEGylated oxyntomodulin peptide analog.

In one embodiment, the present invention provides a pharmaceutical composition comprising a PEGylated oxyntomodulin peptide analog selected from the group consisting of a PEGylated oxyntomodulin peptide analog of Formula 3, Formula 4, and Formula 5 or a PEGylated oxyntomodulin peptide analog comprising any one of SEQ ID NOS: 1-9 or an active fragment thereof, or a pharmaceutically acceptable salt thereof, and a pharmaceutically acceptable excipient selected from the group consisting of methionine, sorbitol, and a buffer solution.

The present invention further provides a stable liquid formulation comprising a compound of formula 3 in an aqueous buffer solution substantially free of sodium chloride, wherein the formulation has a pH range of from about 4.0 to about 7.0. The formulation optionally comprises additional excipients selected from organic bases, tonicity agents and other excipients which do not destabilize or negatively affect the formulation. In addition to, or as a substitute for methionine, arginine may also be used as a stabilizing amino acid. In one embodiment, the stable liquid formulation of the invention has a pH range of from about 4.0 to about 5.0. In another embodiment, the stable liquid formulation of the invention has a pH value of about 4.5.

In one embodiment, the stable liquid formulation of the invention is administered to the patient from suitable containers (vials, pre-filled syringes, cartridges etc.) and at suitable dosages ranging from 20 mg to 80 mg twice a week or once a week or at longer dosage intervals. Autoinjectors are also contemplated. The dosage amounts may change depending upon the weight of the patient and the nature and severity of the disease condition or state and dose may be titrated from lower initial dose to higher dose. The single dose vials generally contain a solution having 70 mg/mL of a GLP-1 and/or glucagon receptor agonist (e.g., PEGylated oxyntomodulin peptide analog). Different volumes administered at this concentration determine the actual amount of a GLP-1 and/or Glucagon receptor agonist delivered to the patient. Multidose containers having the liquid formulation of the invention are also contemplated.

The present invention further provides the use of a stable liquid formulation of the invention for treatment of diabetes and/or obesity or metabolic disorders in a patient in need thereof. The present invention provides a stable GLP-1 and/or Glucagon receptor agonist liquid formulation that efficaciously lowers HbA1c in patients having type 2 diabetes.

The present invention encompasses use of a stable GLP-1 and/or Glucagon receptor agonist liquid formulation that efficaciously lowers HbA1c in patients having type 2 diabetes, and further lowers body weight and/or changes fasting plasma glucose (FPG).

The present invention further provides a method of treating type 2 diabetes, obesity or any associated medical disorder, disease or condition treated or treatable by a GLP-1 and/or glucagon receptor agonist in a patient in need thereof by administering to the patient a pharmaceutically effective amount of a GLP-1 and/or Glucagon receptor agonist liquid formulation of the invention. The diseases and conditions include but are not limited to patients having glucose related metabolic diseases or disorders or obesity related diseases and disorders. Diseases such as fatty liver disease or cardiovascular diseases and disorders may be mitigated or positively affected by the treatment regimens contemplated hereunder. In one embodiment, the disease or condition includes, but is not limited to fatty liver disease or cardiovascular disease. In certain embodiment, the fatty liver disease is non-alcohol fatty liver disease. In one embodiment, the liquid dosage form is administered twice a week or once a week or at longer dosage intervals. In one embodiment, the liquid dosage form is administered once a week.

In another aspect, the present invention provides a method of treating a patient having type 2 diabetes, comprising administering to the patient a pharmaceutically effective amount of a liquid dosage form of a GLP-1 and/or Glucagon receptor agonist formulation of the invention. In one embodiment, the liquid dosage form is administered twice a week or once a week or at longer dosage intervals. In one embodiment, the liquid dosage form is administered once a week. In one embodiment, in the method of the invention, the buffer solution of the formulation is an acetate buffer solution. In one embodiment, the solution further comprises methionine. In one embodiment, the GLP-1 and/or Glucagon receptor agonist is a PEGylated oxyntomodulin peptide analog. In one embodiment, the GLP-1 and/or Glucagon receptor agonist is represented by a compound of Formula 3. In another embodiment, the GLP-1 and/or Glucagon receptor agonist is represented by a compound of Formula 5. In one embodiment, the GLP-1 and/or Glucagon receptor agonist is in the form of an acetate salt.

In one embodiment, in the method of the invention, the GLP-1 and/or Glucagon receptor agonist is in a suitable container or delivery device at a concentration range of from about 5 mg/mL to about 150 mg/mL. In one embodiment, the concentration is from about 20 mg/mL to about 150 mg/mL. In one embodiment, the concentration is from about 20 to about 120 mg/mL. In another embodiment, the concentration is from about 20 mg/mL to about 100 mg/mL. In one embodiment, the concentration is from about 30 mg/mL to about 100 mg/mL. In one embodiment, the concentration is from about 40 mg/mL to about 100 mg/mL. In another embodiment, the concentration is from about 40 mg/mL to about 80 mg/mL.

In one embodiment, the liquid dosage form for the method of the invention is substantially free of sodium chloride. In one embodiment, the liquid dosage form for the method of the invention is substantially free of cysteine. In one embodiment, the pH of the liquid dosage is between about 4.5 and about 6.5. In one embodiment, the dosage administered to the patient ranges from 20 to 150 mgs/week, or from 20 to 125 mgs/week, or from 20 to 100 mgs/week, or from 20 to 75 mgs/week, or from 20 to 50 mgs/week, or from 40 to 150 mgs/week, or from 50 to 150 mgs/week, or from 75 to 150 mgs/week, or from 100 to 150 mgs/week. In another embodiment, the dosage administered to the patient ranges from 0.5 to 1.5 mgs/kg/week, or from 0.5 to 1.0 mgs/kg/week, or from 1.0 to 1.5 mgs/kg/week.

In yet another aspect, the present invention provides a method of lowering HbA1c in a patient in need thereof comprising administering to the patient a pharmaceutically effective amount of a liquid dosage form of a GLP-1 and/or Glucagon receptor agonist formulation of the invention. In one embodiment, the liquid dosage form is administered twice a week or once a week or at longer dosage intervals. In one embodiment, the liquid dosage form is administered once a week. In one embodiment, the GLP-1 and/or Glucagon receptor agonist is represented by the compound of Formula 3. In one embodiment, the concentration of the GLP-1 and/or Glucagon receptor agonist in a suitable container is about 70 mg/mL. In one embodiment, the suitable container is a single use vial.

In one embodiment, the HbA1c levels in the patient are lowered after 4, 8, 12, 22, 24, 30, or 34 weeks. In another embodiment, the HbA1c levels in the patient are lowered by between approximately 0.5% to 3% compared to a baseline level. In another embodiment, the HbA1c levels in the patient are lowered by between approximately 1.3% compared to a baseline level. In another embodiment, the mean absolute reduction in HbA1c levels in the patient is between approximately 0.01% to 0.50%. In another embodiment, the mean absolute reduction in HbA1c levels in the patient is approximately 0.09%.

In yet another aspect, the present invention provides a method of lowering weight in a patient in need thereof comprising administering to the patient a pharmaceutically effective amount of a GLP-1 and/or Glucagon receptor agonist formulation of the invention. In one embodiment, the GLP-1 and/or Glucagon receptor agonist is represented by a compound of Formula 3. In one embodiment, the formulation is administered twice a week or once a week or at longer dosage intervals. In one embodiment, the formulation is administered once a week.

In one embodiment, the patient's body weight is lowered after 4, 8, 12, 22, 24, 30, or 34 weeks. In another embodiment, the patient's body weight is lowered by between approximately 1.8 kg to 8.8 kg compared to a baseline level. In another embodiment, the patient's body weight is lowered by approximately 4.4 kg compared to a baseline level. In another embodiment, the patient's body weight is reduced by approximately between 2% to 10% compared to a baseline level. In another embodiment, the patient's body weight is reduced by approximately between 5% compared to a baseline level.

In yet another aspect, the present invention provides a method of lowering blood triglyceride in a patient in need thereof comprising administering to the patient a pharmaceutically effective amount of a GLP-1 and/or Glucagon receptor agonist formulation of the invention. In one embodiment, the GLP-1 and/or Glucagon receptor agonist is represented by a compound of Formula 3. In one embodiment, the formulation is administered twice a week or once a week or at longer dosage intervals. In one embodiment, the formulation is administered once a week.

In one embodiment, the patient's blood triglyceride is lowered after 4, 8, 12, 22, 24, 30, or 34 weeks. In another embodiment, the patient's blood triglyceride is lowered by between approximately 30 mg/dL to 40 mg/dL compared to a baseline level. In another embodiment, the patient's blood triglyceride is lowered by approximately 31.2 mg/dL compared to a baseline level.

The present invention further provides a method of treating a type 2 diabetic patient comprising administering to the patient a pharmaceutically effective amount of a GLP-1 and/or Glucagon receptor agonist formulation of the invention by once-a-week subcutaneous administration wherein the effective weekly dose per patient of the GLP-1 and/or Glucagon receptor agonist ranges from about 10 to about 150 mgs/week. In one embodiment, the GLP-1 and/or Glucagon receptor agonist is represented by a compound of Formula 3. In one embodiment, the formulation is administered from a pre-filled syringe, a cartridge, pen, autoinjector or vial. In another embodiment, the pre-filled syringe, cartridge, autoinjector, pen or vial contains a solution having 70 mg/mL of the GLP-1 and/or Glucagon receptor agonist.

In another aspect, the present invention provides a pre-filled syringe having a stable GLP-1 and/or Glucagon receptor agonist formulation of the invention. In one embodiment, the GLP-1 and/or Glucagon receptor agonist in the pre-filled syringe of the invention is represented by a compound of Formula 3. In one embodiment, the pre-filled syringe of the invention has a solution with a pH range of from about 3.5 to about 8.0, or from about 4.0 to about 7.0. In one embodiment, the formulation comprises an acetate buffer solution. In one embodiment, the pre-filled syringe comprises a pharmaceutically acceptable excipient. In one embodiment, the pharmaceutically acceptable excipient comprises methionine. In one embodiment, the formulation in the pre-filled syringe is substantially free of sodium chloride. In one embodiment, the liquid dosage form for the method of the invention is substantially free of cysteine. In one embodiment, the amount of sodium chloride is less than 100 mM. In one embodiment, the amount of cysteine is less than 25 mM.

The present invention further provides a multidose container comprising a stable liquid formulation of the invention.

In another aspect, the present invention provides a method of treating a patient having a disease or condition selected from the group consisting of obesity, metabolic disease, type 1 or 2 diabetes, and any other condition selected from improper glucose metabolism, impaired glucose tolerance, and impaired fasting glucose, comprising administering to the patient a pharmaceutically effective amount of a liquid dosage form of a GLP-1 and/or Glucagon receptor agonist formulation of the invention. In one embodiment, the formulation is administered twice a week or once a week or at longer dosage intervals. In another embodiment, the formulation is administered once a week.

The present invention further provides a method of treating a patient having a disease or condition selected from the group consisting of obesity, metabolic disease, type 1 or 2 diabetes, and any other condition selected from improper glucose metabolism, impaired glucose tolerance, and impaired fasting glucose, comprising administering to the patient a pharmaceutically effective amount of a GLP-1 and/or Glucagon receptor agonist liquid formulation of the invention by subcutaneous administration wherein the effective dose per patient of the GLP-1 and/or Glucagon receptor agonist ranges from about 10 to about 150 mgs/week. In one embodiment, the GLP-1 and/or Glucagon receptor agonist is represented by a compound of Formula 3.

The GLP-1 and/or glucagon receptor agonist as described herein and the formulation comprising the same are useful for treating type 2 diabetes, obesity, or any associated medical disorder, disease or condition. the diseases and conditions include but are not limited to patients having glucose related metabolic diseases or disorders or obesity related diseases and disorders. Diseases such as fatty liver disease or cardiovascular diseases and disorders may be mitigated or positively affected by the treatment regimens contemplated hereunder.

The present invention further provides a method of treating, suppressing, inhibiting, or reducing the incidence of type 2 diabetes, obesity or obesity associated metabolic disorder, weight loss, glucose intolerance, hyperinsulinemia, insulin resistance, high blood pressure, fatty liver disease (e.g., non-alcoholic steatohepatitis, or NASH), diabetic nephropathy, diabetic neuropathy, diabetic retinopathy, cardiovascular disease, atherosclerosis, cerebrovascular conditions, Alzheimer's disease, and/or stroke, comprising administering to a patient in need thereof a GLP-1 and/or glucagon receptor agonist the formulation of the invention, or a GLP-1 and/or glucagon receptor agonist or its pharmaceutically acceptable salt as described herein.

In one embodiment, this invention provides a method of treating type 2 diabetes, comprising administering to a subject in need thereof a GLP-1 and/or glucagon receptor agonist formulation of the invention or the GLP-1 and/or glucagon receptor agonist or its pharmaceutically acceptable salt as described herein.

In one embodiment, the present invention provides a method of treating, suppressing, inhibiting, or reducing the incidence of obesity and/or an obesity-associated metabolic disorder, for example hypertension, diabetes mellitus, increased blood pressure, stroke, or heart disease, comprising administering to a patient in need thereof a GLP-1 and/or glucagon receptor agonist formulation of the invention or the GLP-1 and/or glucagon receptor agonist or its pharmaceutically acceptable salt as described herein. In one embodiment, the obesity-associated metabolic disorder is hypertension. In another embodiment, the disorder is type 2 diabetes mellitus. In another embodiment, the disorder is increased blood pressure. In another embodiment, the disorder is stroke. In another embodiment, the disorder is heart disease.

In another embodiment, this invention relates to a method of promoting, increasing or facilitating weight loss in a subject, comprising administering to a patient in need thereof a GLP-1 and/or glucagon receptor agonist formulation of the invention or the GLP-1 and/or glucagon receptor agonist or its pharmaceutically acceptable salt as described herein.

Type 2 diabetes is characterized by insulin resistance and at some stage in pathogenesis of the disease, a relative deficiency of insulin secretion. Most individuals with type 2 diabetes exhibit intra abdominal (visceral) obesity, fatty liver, which is closely related to the presence of insulin resistance. The patient's liver becomes insulin resistant and glycogen breakdown is uncontrolled and the result is increased and unphysiological glucose delivery to the bloodstream. The liver generated cholesterol and VLDL particles are also uncontrolled. In addition, hypertension, dyslipidemia (high triglyceride and low HDL-cholesterol levels; postprandial hyperlipemia), and elevated PAI-1 levels often are present in these individuals. This clustering of abnormalities is referred to as the "insulin resistance syndrome", or the "metabolic syndrome" or obesity related disorders. Because of these abnormalities, patients with type 2 diabetes are at increased risk of developing macrovascular complications such as myocardial infarction and stroke.

It is another aspect of the invention, the GLP-1 and/or glucagon receptor agonist formulation of the invention or the GLP-1 and/or glucagon receptor agonist or its pharmaceutically acceptable salt as described herein is useful for treating, suppressing, or inhibiting a disease or condition associated with type 2 diabetes or a disease or condition associated with type 2 diabetes. In one embodiment, this invention provides a method of treating, suppressing, or inhibiting fatty liver conditions, comprising administering to a subject in need thereof a GLP-1 and/or glucagon receptor agonist formulation of the invention or the GLP-1 and/or glucagon receptor agonist or its pharmaceutically acceptable salt as described herein. In one embodiment, the fatty liver disease is non-alcoholic steatohepatitis (NASH).

In one embodiment, this invention provides a method of treating glucose intolerance, comprising administering to a subject in need thereof a GLP-1 and/or glucagon receptor agonist formulation of the invention or the GLP-1 and/or glucagon receptor agonist or its pharmaceutically acceptable salt as described herein. Glucose intolerance is a pre-diabetic state in which the blood glucose is higher than normal but not high enough to warrant the diagnosis of diabetes.

In one embodiment, this invention provides a method for treating, suppressing, or inhibiting hyperinsulinemia, comprising administering to a subject in need thereof a GLP-1 and/or glucagon receptor agonist formulation of the invention or the GLP-1 and/or glucagon receptor agonist or its pharmaceutically acceptable salt as described herein. Hyperinsulinemia is a sign of an underlying problem that is causing the pancreas to secrete excessive amounts of insulin. The most common cause of hyperinsulinemia is insulin resistance, a condition in which your body is resistant to the effects of insulin and the pancreas tries to compensate by making more insulin. hyperinsulinemia is associated with type 2 diabetes.

In one embodiment, this invention provides a method of treating atherosclerosis and its associated diseases, such as, for example, cardiovascular disorders, cerebrovascular disorders, peripheral vascular disorders, or intestinal vascular disorders in a subject, comprising administering to a subject in need thereof a GLP-1 and/or glucagon receptor agonist formulation of the invention or the GLP-1 and/or glucagon receptor agonist or its pharmaceutically acceptable salt as described herein. Atherosclerosis refers to a slow, complex disease that may begin with damage to the innermost layer of the artery. The causes of damage to the arterial wall may include: a) elevated levels of cholesterol in the blood; b) high blood pressure; c) tobacco smoke; or d) diabetes. Similarly, in another embodiment, the methods of this invention may be useful in treating subjects with a family history of premature cardiovascular disease who have an increased risk of atherosclerosis.

In one embodiment, this invention provides a method of treating Alzheimer's disease, comprising administering to a subject in need thereof a GLP-1 and/or glucagon receptor agonist formulation of the invention or the GLP-1 and/or glucagon receptor agonist or its pharmaceutically acceptable salt as described herein. Alzheimer's disease (AD) is characterized by cognitive insufficiencies and behavioral changes that impact memory and learning abilities, daily functioning, and quality of life. Hyperinsulinemia and insulin resistance, known as pathophysiological features of the T2DM, have also been demonstrated to have significant impact on cognitive impairment. It is believed that GLP-1 affects neurological and cognitive functions, as well as its regulatory effect on glucose metabolism.

In one embodiment, this invention provides a method of treating diabetic nephropathy. Diabetic nephropathy is a complication of diabetes that evolves early, typically before clinical diagnosis of diabetes is made. The earliest clinical evidence of nephropathy is the appearance of low but abnormal levels (>30 mg/day or 20 g/min) of albumin in the urine (microalbuminuria), followed by albuminuria (>300 mg/24 h or 200 g/min) that develops over a period of 10-15 years. In patients with type 1 diabetes, diabetic hypertension typically becomes manifest early on, by the time that patients develop microalbuminuria. Once overt nephropathy occurs, the glomerular filtration rate (GFR) falls over the course of time, which may be several years, resulting in end stage renal disease (ESRD) in diabetic individuals.

In one embodiment, this invention provides a method of treating diabetic neuropathy. Diabetic neuropathy is a family of nerve disorders caused by diabetes. Diabetic neuropathies cause numbness and sometimes pain and weakness in the hands, arms, feet, and legs. Diabetic neuropathies are classified as peripheral, autonomic, proximal, and focal. Peripheral neuropathy causes pain or loss of feeling in the toes, feet, legs, hands, and arms. Autonomic neuropathy causes changes in digestion, bowel and bladder function, sexual response, and perspiration and can also affect the nerves that serve the heart and control blood pressure. Proximal neuropathy causes pain in the thighs, hips, or buttocks and leads to weakness in the legs. Focal neuropathy results in the sudden weakness of one nerve, or a group of nerves, causing muscle weakness or pain. Any nerve in the body may be affected.

In one embodiment, this invention provides a method of treating diabetic retinopathy. The effect of diabetes on the eye is called diabetic retinopathy. Patients with diabetes are more likely to develop eye problems such as cataracts and glaucoma. The affect of diabetic retinopathy on vision varies widely, depending on the stage of the disease. Some common symptoms of diabetic retinopathy are blurred vision (this is often linked to blood sugar levels), floaters and flashes and sudden loss of vision.

The present invention further provides combination treatments that include a formulation of the invention, or a GLP-1 and/or glucagon receptor agonist or its pharmaceutically acceptable salt as described herein, and other drugs for the indications as described herein. The patients in the method of the present invention may have other diseases and/or conditions. The GLP-1 and/or glucagon receptor agonist formulation of the invention, or a GLP-1 and/or glucagon receptor agonist or its pharmaceutically acceptable salt as described herein, can be administered in combination with one or more additional agents (e.g., therapeutic agents) used for the treatment of the diseases or conditions that are the same as or different from that in the method of the invention. The GLP-1 and/or glucagon receptor agonist formulation of the invention, or a GLP-1 and/or glucagon receptor agonist or its pharmaceutically acceptable salt as described herein, can be administered simultaneously with, subsequently to, or prior to administration of the additional agent/agents in the method of the invention.

Obese patients and/or diabetic patients may have other diseases and conditions. In one embodiment, patients may have chronic kidney disease and are on kidney medications. In one embodiment, patients may be on diuretics. In one embodiment, patients may be hypertensive and on high blood pressure medications. In one embodiment, patients may be on diabetes medications that are not contraindicated. In one embodiment, patients may have cardiovascular conditions on heart medications. In one embodiment, patients may be vitamin D insufficient and on vitamin D analogs or supplements.

It is another aspect of the invention that a GLP-1 and/or glucagon receptor agonist formulation of the invention, or a GLP-1 and/or glucagon receptor agonist or its pharmaceutically acceptable salt as described herein, can be administered with another therapeutic agent or agents in the method of the invention.

In one embodiment, the GLP-1 and/or glucagon receptor agonist formulation of the invention, or a GLP-1 and/or glucagon receptor agonist or its pharmaceutically acceptable salt as described herein, is administered in combination with an agent treating chronic kidney disease. In one embodiment, the agent treating the chronic kidney disease is a selective androgen receptor modulator (SARM). In one embodiment, the selective androgen receptor modulator is RAYALDEE (25(OH)D3) (for treating secondary hyperparathyroidism (SHPT) in stage 3, 4 chronic kidney disease (CKD) patients and others).

In one embodiment, the agent treating the chronic kidney disease is erythropoietin or an analog thereof (e.g., darbepoetin (also known as Aranesp®)). In one embodiment, the agent is a steroid. In one embodiment, the agent is a diuretic, which includes, but is not limited to, organomercurial, ethacrynic acid, furosemide, bumetanide, piretanide, muzolimine, chlorothiazide and thiazide, phthalimidine, chlorthalidone, quinazolinone, quinethazone, xipamide, xanthine, aminophylline, carbonic anhydrase inhibitor, acetazolamide mannitol, potassium-sparing compound, aldosterone antagonist, pteridines, pyrazine, carboxamide-triamterene, and/or amiloride.

In one embodiment, the GLP-1 and/or glucagon receptor agonist formulation of the invention, or a GLP-1 and/or glucagon receptor agonist or its pharmaceutically acceptable salt as described herein, is administered in combination with an agent treating cardiovascular conditions. In one embodiment, the agent treating the cardiovascular conditions is treating a congestive heart failure. The agent treating congestive heart failure may be an angiotensin converting enzyme (ACE) inhibitor such as benazepril, captopril, lisinopril, moexipril, perindopril, quinapril, ramipril, or enalaprilat. In one embodiment, the agent treating congestive heart failure is a beta-blocker such as acebutolol, atenolol, betaxolol hydrochloride, bisoprolol fumarate, carteolol hydrochloride, hydrochloride, esmolol hydrochloride, labetalol hydrochloride, levobunolol, metipranolol, nadolol, oxprenolol hydrochloride, pindolol, propranolol hydrochloride, sotalol hydrochloride, or timolol maleate. In one embodiment, the agent treating congestive heart failure is digoxin.

In one embodiment, the agent treating the cardiovascular conditions is an anti-arrhythmic agent. The anti-arrhythmic agent may be a sodium channel blocker, beta-adrenergic blocker, calcium channel blocker, or an agent that prolongs repolarization. Sodium channel blockers include, but are not limited to, quinidine, procainamide, disopyramide, lidocaine, tocainide, mexiletine, encainide, or flecainide. In one embodiment, beta-adrenergic blockers include, but are not limited to, propranolol, acebutolol, esmolol, or sotalol. The agents that prolong repolarization include, but are not limited to, sotalol or amiodarone. Calcium channel blockers include, but are not limited to, verapamil, diltiazem, nifedipine, or mebefradil. In one embodiment, the anti-arrhythmic agent is adenosine or digoxin.

In one embodiment, the agent treating the cardiovascular conditions may be a vasoactive agent or an inotrope. Vasoactive agents or inotropes include, but are not limited to, digoxin, dopamine, dobutamine, hydralazine, prazosin, carvedilol, nitroprusside, nitroglycerin, captopril, lisinopril, nifedipine, amlodipine, diltiazem, hydrochlorothiazide, furosemide, spironolactone, AT-1 receptor antagonists (e.g., losartan, irbesartan, valsartan), ET receptor antagonists, dual ET/AII antagonist, neutral endopeptidase (NEP) inhibitors, vasopepsidase inhibitors (dual NEP-ACE inhibitors) (e.g., omapatrilat and gemopatrilat), or nitrates.

In one embodiment, the agent treating the cardiovascular conditions is an anticoagulant agent, for example, coumarin derivative (e.g., warfarin) or an unfractionated heparin or low molecular weight heparin. In one embodiment, the agent treating the cardiovascular condition is a fibrinolytic agent such as streptokinase, urokinase, alteplase, anistreplase, prourokinase, reteplase, tenecteplase, lanoteplase, staphylokinase, vampire bat saliva, or alfimeprase. In one embodiment, the agent treating the cardiovascular condition is a hypercholesterolemic agent such as niacin-lovastatin, colestipol HCl, fluvastatin sodium, atorvastatin calcium, simvastatin, gemfibrozil, lovastatin, pravastatin sodium, cholestyramine, cholestyramine light, fenofibrate, colesevelam HCl, or ezetimibe.

In one embodiment, the GLP-1 and/or glucagon receptor agonist formulation of the invention, or a GLP-1 and/or glucagon receptor agonist or its pharmaceutically acceptable salt as described herein, is administered in combination with a diuretic. The diuretic includes, but is not limited to, organomercurial, ethacrynic acid, furosemide, bumetanide, piretanide, muzolimine, chlorothiazide and thiazide, phthalimidine, chlorthalidone, clorexolone, quinazolinone, quinethazone, metolazone ilenzenesulphonamide, mefruside, chlorobenzamide, clopamidesalicylamide, xipamide, xanthine, aminophylline, carbonic anhydrase inhibitor, acetazolamide mannitol, potassium-sparing compound, aldosterone antagonist, spironolactone and canrenoate, pteridines, pyrazine, carboxamide-triamterene, or amiloride.

In one embodiment, the GLP-1 and/or glucagon receptor agonist formulation of the invention, or a GLP-1 and/or glucagon receptor agonist or its pharmaceutically acceptable salt as described herein, is administered in combination with an antidiabetic agent. In one embodiment, the antidiabetic agent is a sulfonylurea. Sulfonylureas include, but are not limited to, tolbutamide, acetohexamide, tolazamide, chlorpropamide, glipizide, glyburide, glimepiride, or gliclazide. In one embodiment, the antidiabetic agent is a meglitinide, for example, prandin or nateglinide. In one embodiment, the antidiabetic agent is a biguanide, for example, metformin. In one embodiment, the antidiabetic agent is a thiazolidinedione, for example, rosiglitazone, pioglitazone, or troglitazone. In one embodiment, the antidiabetic agent is an alpha glucosidase inhibitor, such as miglitol and acarbose. In one embodiment, the antidiabetic agent is PPARα/γ ligand, dipeptidylpeptidase 4 (DPP-4) inhibitor, SGLT (sodium-dependent glucose transporter 1) inhibitor, glucagon modulators, glucocorticoid receptor (GR) antagonists, glucokinase activators (GK), glycogen phosphorylase inhibitors (GP), incretins (GLP-1 and GIP) or mimetics, triacylglyercol lipases inhibitors, insulin-like growth factor 1 (IGF-1) or analogs, insulin receptor (IR) modulators, PTP-1B phosphatase (or PTPN1) inhibitors, and/or modulators glycogen synthase kinase-3 (GSK3beta).

In one embodiment, the antidiabetic agent is insulin, for example, rapid-acting insulin, short-acting insulin, and/or intermediate-acting insulin. In one embodiment, the insulin is long-acting insulin. In one embodiment, the antidiabetic agents are inhibitors of fatty acid binding protein (aP2), glucagon-like peptide-1 (GLP-1), and dipeptidyl peptidase IV (DPP4) inhibitors.

In one embodiment, the GLP-1 and/or glucagon receptor agonist formulation of the invention, or a GLP-1 and/or glucagon receptor agonist or its pharmaceutically acceptable salt as described herein, is administered in combination with one or more agents treating a metabolic disease, disorder or condition, which in some embodiments refers to metabolic syndrome. In one embodiment, such agents include, but are not limited to, pancreatic lipase inhibitors, such as for example, orlistat or cetilistat, insulin-sensitizers such as biguanides (metformin) or PPAR agonists, dual-acting PPAR agonists (muraglitazar, tesaglitazar, naveglitazar), PPAR-delta agonists, DPP-IV inhibitors (vildagliptin, sitagliptin), alpha glucosidase inhibitors (acarbose), glucagon-like peptide-1 analogues (exenatide, liraglutide), amylin analogues (pramlintide), statins (atorvastatin, simvastatin, rosuvastatin, pravastatin, fluvastatin, lovastatin, pitavastatin), cholesterol absorption inhibitors (ezetimibe), ACE inhibitors (ramipril, captopril, lisinopril), AT-II receptor antagonists (valsartan, telmisartan), cannabinoid receptor antagonists (rimonabant), cholesteryl ester transfer protein, or combinations thereof.

In one embodiment, the GLP-1 and/or glucagon receptor agonist formulation of the invention, or a GLP-1 and/or glucagon receptor agonist or its pharmaceutically acceptable salt as described herein, is administered in combination with an anti-hypertensive agent. An anti-hypertensive agent is any agent which lowers blood pressure, including, not limited to, calcium channel blockers, angiotensin converting enzyme inhibitors (ACE inhibitors), angiotensin II receptor antagonists (A-II antagonists), diuretics, beta-adrenergic receptor blockers (0-blockers), vasodilators and alpha-adrenergic receptor blockers (α-blockers). For example, calcium channel blockers may include amlodipine, bepridil, clentiazem, diltiazem, fendiline, gallopamil, mibefradil, prenylamine, semotiadil, terodiline, verapamil, aranidipine, barnidipine, benidipine, cilnidipine, efonidipine, elgodipine, felodipine, and/or isradipine.

In one embodiment, angiotensin Converting Enzyme Inhibitors (ACE-Inhibitors) may include, but are not limited to, alacepril, benazepril, captopril, lisinopril, quinapril, temocapril, and/or trandolapril. Angiotensin-II receptor antagonists (A-II antagonists) include, but are not limited to, candesartan, eprosartan, irbesartan, losartan, and/or valsartan. β-Blockers may include, but are not limited to, alprenolol, bufuralol, epanolol, indenolol, nebivalol, practolol, sulfinalol, tilisolol, timolol, toliprolol, and/or xibenolol. α-Blockers may include, but are not limited to, amosulalol, arotinolol, dapiprazole, fenspiride, indoramin, labetolol, prazosin, tamsulosin, tolazoline, and/or yohimbine.

In one embodiment, the GLP-1 and/or glucagon receptor agonist formulation of the invention, or a GLP-1 and/or glucagon receptor agonist or its pharmaceutically acceptable salt as described herein, is administered in with an agent treating a metabolic disease. In some embodiments, agents treating a metabolic disease include, but are not limited to, a vitamin, coenzyme Q10, glucosidase alfa, sodium bicarbonate, bisphosphonate, biotin, allopurinol, levodopa, diazepam, phenobarbital, haloperidol, folic acid, antioxidants, activators of cation channels, haptoglobin, and/or carnitine.

In one embodiment, the agent treating a metabolic disease is a pancreatic lipase inhibitor such as orlistat or cetilistat, insulin-sensitizers such as biguanide, PPAR agonist, dual-acting PPAR agonist such as muraglitazar, tesaglitazar, or naveglitazar, PPAR-delta agonist, DPP-IV inhibitor such as vildagliptin or sitagliptin, alpha glucosidase inhibitor such as acarbose, glucagon-like peptide-1 analogue such as exenatide or liraglutide, amylin analogue such as pramlintide, statin such as atorvastatin, simvastatin, rosuvastatin, pravastatin, fluvastatin, lovastatin, or pitavastatin, cholesterol absorption inhibitor such as ezetimibe, ACE inhibitor such as ramipril, captopril, or lisinopril, AT-II receptor antagonist such as valsartan or telmisartan, cannabinoid receptor antagonist such as rimonabant, or beta-3 adrenergic agonist.

In one embodiment, the GLP-1 and/or glucagon receptor agonist formulation of the invention, or a GLP-1 and/or glucagon receptor agonist or its pharmaceutically acceptable salt as described herein, is administered with a vitamin. In some embodiments, vitamins include, but are not limited to, vitamin D, vitamin E, vitamin K, vitamin B, vitamin C, or a combination thereof.

As used herein, in some embodiments, the term "administered in combination with" and "administered with" are used interchangeably.

In one embodiment, the present invention provides a method of administrating the stable liquid formulation of the invention. The method of the invention comprises a first administration period at a first once-weekly (QW) dose of a GLP-1 and/or Glucagon receptor agonist (e.g., a PEGylated oxyntomodulin peptide analog), followed by a second administration period at a second once-weekly (QW) dose, prior to administration of the pharmaceutically effective amount of a once-weekly (QW) stable liquid dosage formulation, wherein the second QW dose is greater than the first QW dose. In one embodiment, the first QW dose is about 1-20 mg QW. In one embodiment, the second QW dose is about 10-50 mg QW. In one embodiment, the first QW dose at the first administration period is about 20 mg QW, followed by a second administration period providing a second QW dose of 40 mg QW. In one embodiment, the first administration period is from 2 weeks to 6 weeks, or from 2 weeks to 5 weeks, or from 3 weeks to 5 weeks. In other embodiment, the first administration period is 4 weeks. In one embodiment, the second administration period is from 2 weeks to 6 weeks, or from 2 weeks to 5 weeks, or from 3 weeks to 5 weeks. In other embodiment, the second administration period is 4 weeks.

The formulation of the present invention is substantially free of any impurities. In one embodiment, the formulation of the present invention has about 10% or less of total impurities, or about 8.0% or less of total impurities, or about 7.0% or less of total impurities, or about 6.0% or less of total impurities, or about 5.0% or less of total impurities, or about 4.0% or less of total impurities, about 3% or less of total impurities, about 2% or less of total impurities, or about 1% or less of total impurities. In one embodiment, the formulation of the present invention has about 5.0% or less of any one impurity, about 4.0% or less of any one impurity, about 3.5% or less of any one impurity, about 3.0% or less of any one impurity, about 2.5% or less of any one impurity, about 2.0% or less of any one impurity, about 1.5% or less of any one impurity, about 1.0% or less of any one impurity, about 0.5% or less of any one impurity, about 0.25% or less of any one impurity, or about 0.1% or less of any one impurity.

In one embodiment, the formulation of the invention is an OPK-88003 Injection that is supplied as a 1 mL (extractable volume) sterile solution packaged in a 2 mL clear flint glass vial. The drug product (Formula 3) is a clear, colorless solution containing 70 mg/mL of OPK-88003 (label claim) and the inactive ingredients L-methionine, sorbitol and sodium acetate trihydrate at a pH of approximately 4.5. The complete list of ingredients and quantitative formulation is shown below.

| Ingredient | Function | Quantity (mg/mL) |
|---|---|---|
| Formula 3[a] | Active Ingredient | 70 |
| L-Methionine | Antioxidant | 4.48 |
| Sorbitol | Tonicity agent | 38.26 |
| Sodium acetate trihydrate | Buffer | 1.36 |
| Sodium hydroxide solution 1N[b] | pH adjustment | qs[c] |
| Hydrochloric acid solution 1N[b] | pH adjustment | qs[c] |
| Water for injection | Solvent | qs to 1 mL |

[a]If necessary, the amount of Formula 3 is adjusted to take into account the Assay "as is".
[b]Sodium hydroxide solution 1N and hydrochloric acid solution 1N are manufactured from USP-NF quality Water for Injection and reagents.
[c]Quantity sufficient to adjust pH.

The present invention further encompasses a stable liquid formulation comprising a compound of Formula 3, Formula 4, or Formula 5, or a compound comprising any one of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, and SEQ ID NO: 9 or an active fragment thereof, wherein the formulation has a pH range of from about 3.5 to about 8.0 or from about 4.0 to about 7.0. In one embodiment, the formulation is substantially free of sodium chloride. In one embodiment, the formulation of the invention is substantially free of cysteine. The formulation optionally comprises additional excipients selected from organic bases, tonicity agents and other excipients which do not destabilize or negatively affect the formulation. In broad terms, the composition or claimed invention may encompass OXM, any OXM analog as described herein or in the literature and in the patent literature and related or similar GLP-1/glucagon receptor agonists. For example, such patent publications or patents are inclusive of US20150290324; US20110034374, US20150182593, US20150024066, US20150072924, US20150148289, US20090298757, US20140349922; US20150299282; U.S. Pat. Nos. 8,415,926; 8,415,296, 8,367,607, US20110152182; US20140128318, US20170183383; US20140249299; U.S. Pat. No. 8,263,084, US20130281374, US20160317623, U.S. Pat. No. 8,729,017, WO/2016045400, WO2008076933, US20130059780, US20170226175, US20170349642, US20100121032, US20110136737, US2013137631, U.S. Pat. No. 9,663,565, US20150111246, U.S. Pat. Nos. 9,301, 938, 9,758,562, US20170128589, US20170088598, US20130085104, US20120183617, US20140142023, all of which are hereby incorporated by reference.

The term OXM, "oxyntomodulin," "oxyntomodulin analog," "oxyntomodulin peptide analog," or "oxyntomodulin derivative" includes native oxyntomodulin and any derivative of such peptide that is prepared or contains a substitution, addition, deletion or post-translational modification (methylation, acylation, ubiquitination, intramolecular covalent bond) in the amino acid sequence of oxyntomodulin (HSQGTGTSDYSKYLDSRRAQDFVQWLMNKRNRNNIA) (SEQ ID NO: 4), all of which retain the properties of and/or have improved properties at either or both of the GLP-1 and glucagon receptors. Such compounds may include those having SEQ ID NOS: 10-42 (corresponding to sequences 4 to 36 from US20170128589) and with at least one optional cysteine residue at positions 38 and/or 39. Amino acids and/or atypical amino acids are available from commercial sources such as Sigma-Aldrich and the like. Further, such compounds may include derivatives of oxyntomodulin (OXM) peptide or variants of the peptide obtained through modifications to any amino acids of the oxyntomodulin (OXM) peptide as well as any side chains or terminals of the amino acids with functional groups or polymers, incorporation of natural or unnatural amino acids and/or their derivatives within the peptide, and/or crosslinking with other peptides.

The present invention further encompasses use of a stable liquid formulation of the invention, for example, a formulation having a compound of formula 3, to treat diabetes and/or obesity and/or excess weight in patients in need of treatment thereof. The present invention comprises a stable PEGylated oxyntomodulin analog liquid formulation that efficaciously lowers HbA1c in patients having type 2 diabetes, obesity or any associated medical disorder, disease or condition treated or treatable by a GLP-1 and/or glucagon receptor agonist.

The present invention encompasses use of a stable PEGylated oxyntomodulin analog liquid formulation of the invention that efficaciously lowers HbA1c in patients having type 2 diabetes, obesity or any associated medical disorder, disease or condition treated or treatable by a GLP-1 and/or glucagon receptor agonist and further lowers body weight and/or changes fasting plasma glucose (FPG).

The present invention encompasses a method of treating type 2 diabetes, obesity or any associated medical disorder, disease or condition treated or treatable by a GLP-1 and/or glucagon receptor agonist in patients in need of treatment thereof comprising administering a stable liquid formulation of the invention, e.g., a formulation having a PEGylated oxyntomodulin analog of formula 3, to the patient.

The term "PEGylation" as used herein refers to the attachment of one or more poly(ethylene glycol) (PEG) molecules, as described herein, to an OXM analog as described herein. The PEG group can be covalently linked to the OXM molecule directly or through a linking group, whereas "PEGylated" refers to an OXM analog having a PEG substituent attached thereto.

PEGylation of oxyntomodulin (OXM) peptide analogs can occur through reaction with available amino or sulfhydryl groups, which are predominantly on the OXM component with a PEG having reactive functional groups, including, but not limited to, azide, carbonate, ester, aldehyde, acrylate, carboxyl, carbodiimide, carbonylimidazole, dichlorotriazine, epoxy, isocyanate, isothiocyanate, maleimide, nitrophenyl carbonate, orthopyridyl disulfide, pyridinyloxycarbonyl, succinimidyl carbonate, succinimidyl glutarate, succinimidyl methyl butanoate, succinimidyl succinate, succinic acid, sulfhydryl, tresylate, vinyl sulfone, and the like.

The term "PEG" or the "PEG" for the PEGylation refers to any polyethylene glycol molecule, with any size or modification of the polyethylene glycol molecule. The PEG may have a linear, branched, or multi-armed structure and may be in mono-, bi-, or poly-functional form. The PEG can be substituted or unsubstituted so long as at least one reactive site is available for substitution or reaction. The PEG can have an average molecular weight of from 200 to 100,000. The PEG as used herein is commercially available (NOP Corporation, Kawasaki-Shi, Kanagawa, Japan) or can be prepared by polymerization of ethylene glycol according to methods known to those of ordinary skill in the art.

For example, PEG can be a linear polymer with terminal hydroxyl groups of the formula HO—$CH_2CH_2$—($CH_2CH_2O)_n$—$CH_2CH_2$—OH, wherein n is from about 5 to about 4,000. In one embodiment, n is from about 5 to about 2,500, or from about 8 to about 2,500, or from about 30 to about 2,000, or from about 35 to about 2,000, or from about 35 to about 1,500, or from about 35 to about 1,000, or from about 35 to about 750. The terminal hydrogen may be substituted with a capping group such as an alkyl moiety, e.g., a methyl group, or it may be a terminal hydroxyl group which is attached to a linker moiety which can react with oxyntomodulin via a covalent linkage. Thus, the PEG can attach either directly or indirectly to an oxyntomodulin peptide analog. For example, the linker moiety may be an amide, carbamate, or urea linkage to an amine group (including but not limited to, the epsilon amine of lysine or the N-terminus) of the oxyntomodulin peptide analog. Alternatively, the linker moiety may be a maleimide linkage to a thiol group (including but not limited to, the thiol group of cysteine). In one embodiment, the PEG molecules are mPEG-20 kDa maleimide which react with at least one cysteine on the oxyntomodulin analog to form the PEGylated OXM peptide analog for the liquid formulation of the invention.

In one embodiment, as described in U.S. Pat. No. 5,900,461, which is hereby incorporated by reference, a linear PEG with active hydroxyls at each end can be activated at one end or both ends with vinyl sulfone (—$SO_2$—CH═$CH_2$) or its precursor or derivatives (e.g., —$SO_2$—$CH_2$—$CH_2$—X where X is a halogen) of similar reactivity to become bifunctional. PEG vinyl sulfone is stable and isolatable and highly selective for coupling with thiol moieties on molecules to form thiol-selective, hydrolytically stable linkages.

The PEG can be a branched or "multi-armed." For example, as described in U.S. Pat. No. 5,932,462, which is hereby incorporated by reference, a branched or multi-armed polymer may have the following structure

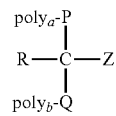

wherein

Poly$_a$ and Poly$_b$ each represent a HO—$CH_2CH_2$—($CH_2CH_2O)_n$—$CH_2CH_2$— moiety as described above, and at least one of Poly$_a$ and Poly$_b$ is capped with an essentially nonreactive end group, for example, a $CH_3O$—$CH_2CH_2$—($CH_2CH_2O)_n$—

CH$_2$CH$_2$— moiety ("mPEG-"); C represents carbon; P and Q represent linkage fragments that may be the same or different and that join polymer arms Poly$_a$ and Poly$_b$, respectively, to C by hydrolytically stable linkages in the linkage fragments; R can be H or a substantially nonreactive moiety, e.g., alkyl; and the moiety —Z can be a moiety having a single site reactive toward nucleophilic moieties, or that can be converted to sites reactive toward nucleophilic moieties, and the reaction product of a nucleophilic moiety and moieties having a single site reactive toward nucleophilic moieties. Such branched or multi-armed PEG may have the following structures:

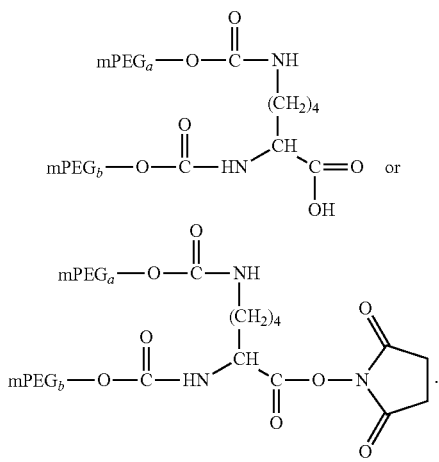

As described in U.S. Pat. No. 7,851,491, which is hereby incorporated by reference, a multi-armed PEG may have the following structure;

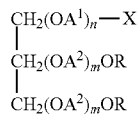

wherein R is a hydrocarbon group having 1 to 24 carbon atoms, OA$^1$ and OA$^2$ are each an oxyethylene group, n represents 0 to 1000, m represents 10 to 1000, and X represents a functional group, for example, halogen atom selected from Cl, Br and I, which is capable of chemically reacting with an oxyntomodulin (OXM) peptide analog.

In one embodiment, the branched polyethylene glycols can be represented in general form as R[-PEG(linear)-OH]$_m$ in which R represents the core moiety, such as glycerol or pentaerythritol, and m represents the number of arms, as described in U.S. Pat. No. 6,436,386, which is hereby incorporated by reference.

In one embodiment, the PEG may have the structure: T-L-POLY$_a$-R(-POLY$_b$-X)$_q$, wherein POLY$_a$ and POLY$_b$ are —O—(CH$_2$CH$_2$O)$_n$—CH$_2$CH$_2$—O—, and R is a central core molecule, such as an amino acid or a polyol (e.g., trimethylolpropane, di-trimethylolpropane, glycerol, pentaerythritol, sorbitol, lysine, and di-lysine); L is a linker, T is a bisphosphonate, and Q is an integer from 2 to about 300; and X can be protected or unprotected chemically reactive group.

In one embodiment, bifunctional PEG derivatives may have the structure of Y-PEG-X, in which the first functional group X and the second functional group Y are reactive moieties that are capable of reacting with other molecules to which the PEG derivatives are desired to be conjugated to, e.g., oxyntomodulin or its analogs, as described in U.S. Pat. No. 6,448,369, which is hereby incorporated by reference. Examples of the functional groups X and Y include, but are not limited to, mesylate; tosylate; tresylate; —O—(CH$_2$)$_n$—CO$_2$H where N=1-6; —O—(CH$_2$)$_n$—CO$_2$R$^3$ where n=1-6 and R$^3$ is an alkyl group; —NHR$^4$ where R$^4$ is H or alkyl or an amine protecting group such as t-Boc and Fmoc; —O—(CH$_2$)$_n$—CH(ZR$^5$)$_2$ where n is a number of 1-6, Z is O or S, R$^5$ is H or an alkyl group; —O—(CH$_2$)$_n$—CHO; and O$_2$CCH$_2$CH$_2$CO$_2$R$^6$, where R$^6$ is H or NHS which represents N-succinimidyl.

In one embodiment, the PEG may contain a polymer derivative comprising a water-soluble and non-peptidic polymer backbone having at least one terminus bonded to the structure: —W-T, wherein W is a hydrolytically unstable ester linkage selected from the group consisting of —O$_2$C—(CH$_2$)$_n$—O—, —O—(CH$_2$)$_n$—CO$_2$—(CH$_2$)$_m$—, —O—(CH$_2$)$_n$—CO$_2$—(CH$_2$)$_m$—O—, —(CH$_2$)$_n$—OPO$_3$—(CH$_2$)$_m$—, and —O—(CH$_2$)$_n$—CO$_2$—(CHR)$_m$—, wherein each R is H or alkyl, provided at least one R is alkyl, n is from about 1 to about 5, and m is about 1 to about 5, and T is a reactive group, e.g., —COOH, —CO$_2$-succinimidyl, —CO$_2$-sulfosuccinimidyl, —CO$_2$-p-nitrophenyl, and pyridyldisulfide. Such PEG can be found in U.S. Pat. No. 6,515,100, which is hereby incorporated by reference. Examples of such PEGs may include, are not limited to, CH$_3$—O-PEG-O—(CH$_2$)$_n$—CO$_2$—(CH$_2$)$_m$—COOH.
HOOC—(CH2)$_m$-O$_2$C—(CH$_2$)$_n$—O-PEG-O—(CH$_2$)$_n$—CO$_2$—(CH$_2$)$_m$—COOH.
NHS—O$_2$C—(CH2)$_m$-O$_2$C—(CH$_2$)$_n$—O-PEG-O—(CH$_2$)$_n$—CO$_2$—(CH$_2$)$_m$—CO$_2$—NHS (NHS is succinimidyl).

In one embodiment, a PEG containing an aldehyde functional group (PEG-aldehyde) reacts spontaneously with the amine and thiol functional groups of cysteine residue at an oxyntomodulin peptide analog, as described in U.S. Patent Publication No. 2010/0016550 A1, which is hereby incorporated by reference. The newly generated functional group between PEG and the oxyntomodulin peptide analog is a 1,3-thiazolidine. Such PEG may provide site-specific pegylation of the oxyntomodulin peptide analog.

In one embodiment, the PEG used in the present invention can have different molecular weights (e.g., 2-40 kDa), have linear, branched, and/or multi-arm structures, and contain one or more than one functional group. When PEG containing two functional groups is used, the final product will be OXM dimer and the linker in between is the PEG. PEG with multiple functional groups will generate multimer of pegylated OXM.

In one embodiment, the terms "PEGylated oxyntomodulin peptide analog," "PEGylated oxyntomodulin compound," "PEGylated oxyntomodulin," and "PEGylated oxyntomodulin analog" are used herein interchangeably. In one embodiment, the oxyntomodulin peptide analog refers to a PEGylated oxyntomodulin peptide analog.

In one embodiment, the PEGylated oxyntomodulin peptide analog is OPK-88003 (Formula 3). In one embodiment, the PEGylated oxyntomodulin peptide analog is Formula 4. In one embodiment, the PEGylated oxyntomodulin peptide analog is Formula 5.

The oxyntomodulin peptide analog used in the formulations herein can be made as described in U.S. Pat. No.

8,367,607 or U.S. Pat. No. 8,415,296 which is hereby incorporated by reference in its entirety. Further, a compound of the invention can be prepared as described in Example 1 and FIG. 1. In general terms, Fmoc-Rink Amide MBHA resin is deprotected (piperdine/DMF) followed by coupling of the first amino acid (Fmoc-Cys(Trt)-OH to the resin in the appropriate solvent. The deprotection step is repeated and the polypeptide analog of choice is prepared using the selected protected amino acids. Cleavage from the resin and deprotection leads to the target polypeptide. In a preferred embodiment, the amide is formed at the amino acid C terminal cleaved from the resin.

The peptide analogs according to SEQ ID NOS: 1-9 and formulas 3, 4, and 5 are generated by solid phase peptide synthesis on a Protein Technologies Inc. Symphony or Applied Biosystems 433A automated peptide synthesizer. Synthesis is performed on Fmoc-Rink amide polystyrene resin (Rapp Polymere Tubigen, Germany) with substitution approximately 0.7 mmol/g. The synthesis performed using the Fmoc main-chain protecting group strategy. Amino acid side chain derivatives used were: Arg (Pbf), Asn (Trt), Asp (OtBu), Cys(Trt), Gln(Trt), Glu(OtBu), His(Trt), Lys(boc), Ser(OtBu), Thr(OtBu), Trp (Boc), and Tyr(OtBu). Coupling is performed with about 10 equivalents of amino acid activated with didsopropylcarbodiimide (DIC) and hydroxybenzotriazole (HObt) (1:1:1 molar ratio) in dimethylformamide (DMF) or N-methylpyrrolidinone (NMP). Coupling is carried out for 45 to 90 minutes at room temperature.

Concomitant cleavage from the resin and side chain protecting group removal are carried out in a solution containing trifluoroacetic acid (TFA): triisopropylsilane: 3,6-dioxa-1,8-octane-dithiol:methanol:anisole 90:4:2:2:2 (v/v) for 1.5 to 2 hours at room temperature. The solution is filtered and concentrated to less than 2 mL, and peptides are precipitated with cold diethyl ether, redissolved in 30-40 mL of 10% acetonitrile and purified on a $C_{18}$ reversed phase high performance liquid chromatography column at a flow rate of 12-15 mL/min.

Samples are eluted with a two-stage linear AB gradient of 0 to 25% B over 20 minutes followed by 25 to 75% B over 100 minutes where A=0.05% TFA/water and B=0.05% TFA/acetonitrile. Product generally elutes at 30-35% acetonitrile. Peptide purity and molecular weight is confirmed on an Agilent 1100 Series liquid chromatography-mass spectrometer with a single quadrupole MS detector. The peptide analog is purified to >95% purity. Salts may be formed from the cleaved polypeptide with carboxylic acid salts (e.g. trifluoro acetate salts) preferred. The resultant TFA salt is then used in the final PEGylation step(s). Cation scavengers are utilized to prevent alkylation of the amide which is derived from the cleaved resin.

PEGylation of the peptide obtained is then performed. Typically, a lyophilized peptide analog or salt thereof of the appropriate sequence such as SEQ ID NOS: 1-9 and formulas 3, 4, and 5 or as otherwise shown herein or in U.S. Pat. No. 8,367,607 or U.S. Pat. No. 8,415,296 is weighed out depending upon the amount of material needed. A small scale synthesis can start with, for example, 30-50 mgs. A 2.5 fold molar equivalent of mPEG of the desired molecular weight and chemical structure (e.g. mPEG-20 kDa maleimide) $(CH_3O(CH_2CH_2)_n—(CH_2)_3NHCO(CH_2)_2$-maleimide) is weighed out and combined with the peptide of SEQ ID NO: 1 or 2. The reactants are dissolved in a 50/50 (v/v) water/acetonitrile mixture to a peptide concentration of approximately 20 mg/mL. The peptide analog solution is diluted two-fold with 100 mM ammonium acetate, 10 mM ethylenediaminetetracetic acid (EDTA), pH7. The resultant mixture is monitored by analytical reversed phase HPLC and the reaction is complete after roughly two hours. The PEGylated compounds are then diluted and purified as described above (ion exchange, reverse phase HPLC) for the peptide to form a purified form having formula 3 or the target PEGylated derivative. In a preferred embodiment, the purified form is in the form of a salt such as an acetate salt. The purified compound may be in crystalline or amorphous form. The reactions are essentially scaled up to obtain a sufficient amount needed for clinical or commercial use.

Thus, the present invention provides a process of preparing a pharmaceutically acceptable salt of a PEGylated oxyntomodulin peptide analog. In another embodiment, the present invention provides a process of preparing a PEGylated oxyntomodulin peptide analog.

For example, the present invention provides a process of preparing an acetate salt of a PEGylated oxyntomodulin peptide analog, comprising (a) dissolving an oxyntomodulin (OXM) peptide analog in a buffer solution to form an OXM peptide analog solution, wherein the buffer solution has a pH value of from about 6.6 to about 7.0;

(b) adding the OXM peptide analog solution to a stirred solution of PEG to produce a reaction mixture containing a crude PEGylated oxyntomodulin peptide analog product, wherein the solution of PEG is formed by dissolving PEG in the same buffered solution as the one to dissolve the OXM peptide analog of step (a);

(c) adjusting the reaction mixture to a pH of from about 3.95 to about 4.05 with acetic acid; and (d) purifying the crude PEGylated oxyntomodulin peptide analog product on a HPLC column with a gradient of acetonitrile and dilute aqueous acetic acid, followed by concentration and lyophilization to provide the acetate salt of the PEGylated oxyntomodulin peptide analog.

In one embodiment, the HPLC column of step (d) is a reverse-phase HPLC column. In one embodiment, the process of the invention further comprises a step of purifying the crude PEGylated oxyntomodulin peptide analog product on a cation exchange HPLC column prior to step (d). In one embodiment, the PEGylated oxyntomodulin peptide analog product prepared by the process of the invention is a compound of Formula 3, 4, or 5. In other embodiment, the PEGylated oxyntomodulin peptide analog product is a compound of Formula 3.

In one embodiment, the buffer solution in the process of the invention is a solution of acetonitrile and ammonium acetate buffer. In one embodiment, the PEG in the process of the invention has a molecular weight as described herein. In one embodiment, the PEG in the process of the invention has a molecular weight of about 20 kDa, or about 30 kDa, or about 40 kDa. In one embodiment, the PEG contains a linker. In one embodiment, the linker is a maleimide linker. In certain embodiment, the PEG is a compound of Formula 1.

In another aspect, the present invention further provides a pharmaceutically acceptable salt of a PEGylated oxyntomodulin peptide analog as described herein, for example, the PEGylated oxyntomodulin peptide analog that comprises any one of SEQ ID NOS: 1-9 or an active fragment thereof, or the PEGylated oxyntomodulin peptide analog that is represented by Formula 3, Formula 4, or Formula 5.

A pharmaceutically acceptable salt of a PEGylated oxyntomodulin peptide analog as described herein can be formed by reacting an acid with a basic group of a PEGylated oxyntomodulin peptide analog, such as an amino functional group, or reacting a base with an acidic group of the PEGylated oxyntomodulin peptide analog, such as a carboxylic acid functional group. In one embodiment, the pharmaceutically acceptable salt of the PEGylated oxyntomodulin peptide analog is an acid addition salt of an amino functional group in a PEGylated oxyntomodulin peptide analog, for example, the amino group of lysine or other amino acid.

Suitable pharmaceutically acceptable salts of an amino group of a PEGylated oxyntomodulin peptide analog as described herein may be prepared from an inorganic acid or from an organic acid. Examples of inorganic salts of amines include, but are not limited to, bisulfates, borates, bromides, chlorides, hemisulfates, hydrobromates, hydrochlorates, 2-hydroxyethylsulfonates (hydroxyethanesulfonates), iodates, iodides, isothionates, nitrates, persulfates, phosphate, sulfates, sulfamates, sulfanilates, sulfonic acids (alkylsulfonates, arylsulfonates, halogen substituted alkylsulfonates, halogen substituted arylsulfonates), sulfonates and thiocyanates.

In one embodiment, examples of organic salts of amines include, but are not limited to, aliphatic, cycloaliphatic, aromatic, araliphatic, heterocyclic, carboxylic and sulfonic classes of organic acids, examples of which are acetates, arginines, aspartates, ascorbates, adipates, anthranilates, algenates, alkane carboxylates, substituted alkane carboxylates, alginates, benzenesulfonates, benzoates, bisulfates, butyrates, bicarbonates, bitartrates, carboxylates, citrates, camphorates, camphorsulfonates, cyclohexylsulfamates, cyclopentanepropionates, calcium edetates, camsylates, carbonates, clavulanates, cinnamates, dicarboxylates, digluconates, dodecylsulfonates, dihydrochlorides, decanoates, enanthuates, ethanesulfonates, edetates, edisylates, estolates, esylates, fumarates, formates, fluorides, galacturonates, gluconates, glutamates, glycolates, glucorates, glucoheptanoates, glycerophosphates, gluceptates, glycollylarsanilates, glutarates, glutamates, heptanoates, hexanoates, hydroxymaleates, hydroxycarboxlic acids, hexylresorcinates, hydroxybenzoates, hydroxynaphthoates, hydrofluorates, lactates, lactobionates, laurates, malates, maleates, methylenebis(beta-oxynaphthoate), malonates, mandelates, mesylates, methane sulfonates, methylbromides, methylnitrates, methylsulfonates, monopotassium maleates, mucates, monocarboxylates, nitrates, naphthalenesulfonates, 2-naphthalenesulfonates, nicotinates, napsylates, N-methylglucamines, oxalates, octanoates, oleates, pamoates, phenylacetates, picrates, phenylbenzoates, pivalates, propionates, phthalates, pectinates, phenylpropionates, palmitates, pantothenates, polygalacturates, pyruvates, quinates, salicylates, succinates, stearates, sulfanilates, subacetates, tartarates, theophyllineacetates, p-toluenesulfonates (tosylates), trifluoroacetates, terephthalates, tannates, teoclates, trihaloacetates, triethiodide, tricarboxylates, undecanoates and valerates.

In one embodiment, inorganic acids include, but are not limited to, hydrogen bisulfide, hydrochloric acid, hydrobromic acid, hydroiodic acid, sulfuric acid and phosphoric acid, and organic acids include, but are not limited to, paratoluenesulfonic acid, salicylic acid, tartaric acid, bitartaric acid, ascorbic acid, maleic acid, fumaric acid, gluconic acid, glucuronic acid, formic acid, glutamic acid, methanesulfonic acid, ethanesulfonic acid, benzenesulfonic acid, lactic acid, oxalic acid, para-bromophenylsulfonic acid, carbonic acid, succinic acid, citric acid, benzoic acid and acetic acid, as well as related inorganic and organic acids. Such pharmaceutically acceptable salts thus include sulfate, pyrosulfate, bisulfate, sulfite, bisulfite, phosphate, monohydrogenphosphate, dihydrogenphosphate, metaphosphate, pyrophosphate, chloride, bromide, iodide, acetate, propionate, decanoate, caprylate, formate, isobutyrate, caprate, heptanoate, propiolate, oxalate, malonate, succinate, suberate, sebacate, fumarate, maleate, butyne-1,4-dioate, hexyne-1,6-dioate, benzoate, chlorobenzoate, methylbenzoate, hydroxybenzoate, methoxybenzoate, phthalate, terephthalate, sulfonate, xylene sulfonate, phenylacetate, phenylpropionate, phenylbutyrate, citrate, lactate, O-hydroxybutyrate, glycolate, maleate, tartrate, methanesulfonate, propanesulfonate, naphthalene-1-sulfonate, naphthalene-2-sulfonate, mandelate and other salts.

In one embodiment, examples of inorganic salts of carboxylic acids or phenols may be selected from ammonium, alkali metals including lithium, sodium, potassium and cesium; alkaline earth metals including calcium, magnesium, and aluminium; zinc, barium, cholines, quaternary ammoniums.

In another embodiment, examples of organic salts of carboxylic acids or phenols may be selected from arginine, organic amines including aliphatic organic amines, alicyclic organic amines, aromatic organic amines, benzathines, t-butylamines, benethamines (N-benzylphenethylamine), dicyclohexylamines, dimethylamines, diethanolamines, ethanolamines, ethylenediamines, hydrabamines, imidazoles, lysines, methylamines, meglamines, N-methyl-D-0 glucamines, N,N'-dibenzylethylenediamines, nicotinamides, ornithines, pyridines, picolies, piperazines, procaine, tris (hydroxymethyl)methylamines, triethylamines, triethanolamines, trimethylamines, tromethamines and ureas.

The bases commonly employed to form a pharmaceutically acceptable salt of a GLP-1 and/or Glucagon receptor agonist (e.g., a PEGylated oxyntomodulin peptide analog) as described herein include, but are not limited to, hydroxides of alkali metals, including sodium, potassium, and lithium; hydroxides of alkaline earth metals such as calcium and magnesium; hydroxides of other metals, such as aluminum and zinc; ammonia, organic amines such as unsubstituted or hydroxyl-substituted mono-, di-, or tri-alkylamines, dicyclohexylamine; tributyl amine; pyridine; N-methyl, N-ethylamine; diethylamine; triethylamine; mono-, bis-, or tris-(2-OH—(C1-C6)-alkylamine), such as N,N-dimethyl-N-(2-hydroxyethyl)amine or tri-(2-hydroxyethyl)amine; N-methyl-D-glucamine; morpholine; thiomorpholine; piperidine; pyrrolidine; and amino acids such as arginine, lysine, and the like.

In one embodiment, the salts may be formed by conventional means, such as by reacting the free base or free acid form of the product with one or more equivalents of the appropriate acid or base in a solvent or medium in which the salt is insoluble or in a solvent such as water, which is removed in vacuo or by freeze drying or by exchanging the ions of an existing salt for another ion or suitable ion-exchange resin. In one embodiment, the pharmaceutically acceptable salt is prepared by the processes as described herein.

The present invention further provides a pharmaceutically acceptable salt of a GLP-1 and/or Glucagon receptor agonist (e.g., a PEGylated oxyntomodulin peptide analog), wherein said GLP-1 and/or Glucagon receptor agonist comprises any one of SEQ ID NOS: 1-9 or an active fragment thereof, or is represented by Formula 3, Formula 4, or Formula 5. In one embodiment, said GLP-1 and/or Glucagon receptor agonist is represented by a compound of Formula 3. In one embodiment, the pharmaceutically acceptable salt of the invention is a hydrochloric acid salt, a hydrobromic acid salt, an ascorbic acid salt, a maleic acid salt, or an acetic acid salt.

In one embodiment, the salt is an acetic acid salt. In one embodiment, the salt is a hydrochloride salt.

In one aspect, the present invention provides a hydrochloride salt or an acetate salt of a GLP-1 and/or Glucagon receptor agonist (e.g., a PEGylated oxyntomodulin peptide analog) in crystalline or amorphous form, wherein said GLP-1 and/or Glucagon receptor agonist comprises any one of SEQ ID NOS: 1-9 or an active fragment thereof, or is represented by Formula 3, Formula 4, or Formula 5. In one embodiment, the GLP-1 and/or Glucagon receptor agonist is represented by a compound of Formula 3. In one embodiment, the acetate salt is in a crystalline or amorphous form.

Thus, in another aspect, the present invention provides an acetate salt of a a GLP-1 and/or Glucagon receptor agonist (e.g., a PEGylated oxyntomodulin peptide analog) as described herein. For example, the present invention provides an acetate salt of a compound of formula 3. In one embodiment, the present invention provides an acetate salt of a compound of formula 4. In another embodiment, the present invention provides an acetate salt of a compound of formula 5. In one embodiment, the acetate salt of the compound of the invention is in crystalline or amorphous form. In one embodiment, the acetate salt of the compound of the invention is in amorphous form.

Further, the present invention provides a hydrochloride salt of a compound of the invention. For example, the present invention provides a hydrochloride salt of a compound of formula 3. In one embodiment, the present invention provides a hydrochloride salt of a compound of formula 4. In another embodiment, the present invention provides a hydrochloride salt of a compound of formula 5. In one embodiment, the hydrochloride salt of the compound of the invention is in crystalline or amorphous form. In one embodiment, the hydrochloride salt of the compound of the invention is in amorphous form.

In another aspect, the present invention provides a GLP-1 and/or Glucagon receptor agonist formulation comprising an acetate salt of a GLP-1 and/or Glucagon receptor agonist (e.g., a PEGylated oxyntomodulin peptide analog) and a pharmaceutically acceptable excipient, wherein said GLP-1 and/or Glucagon receptor agonist comprises any one of SEQ ID NOS: 1-9 or an active fragment thereof, or is represented by Formula 3, Formula 4, or Formula 5. In one embodiment, the GLP-1 and/or Glucagon receptor agonist is represented by a compound of Formula 3. In one embodiment, the GLP-1 and/or Glucagon receptor agonist is an acetate salt of a compound of Formula 3. In one embodiment, the invention provides a GLP-1 and/or Glucagon receptor agonist formulation comprising an acetate salt of a GLP-1 and/or Glucagon receptor agonist of the invention and an aqueous buffer solution, wherein the formulation has a pH range of from about 3.5 to about 8.0 and one or more additional pharmaceutically acceptable excipients.

As described in U.S. Pat. Nos. 8,367,607 and 8,415,296, which are incorporated by reference, the GLP-1 and/or glucagon receptor agonist such as PEGylated oxyntomodulin analogs as described herein are useful in the treatment of type 2 diabetes, type 1 diabetes, obesity or any associated medical disorder, disease or condition treated or treatable by a GLP-1 and/or glucagon receptor agonist. The formulations of the invention comprising the GLP-1 and/or Glucagon receptor agonist (e.g., a PEGylated oxyntomodulin peptide analog) are capable of causing a reduction in food intake in patients in need of treatment thereof and thus is useful in the treatment of weight gain and/or obesity and/or the treatment of metabolic disorders. The formulations of the invention result in improved glucose tolerance and lipid profiles in patients with type 2 diabetes and/or related metabolic diseases or conditions, and/or obesity or any associated medical disorder, disease or condition treated or treatable by a GLP-1 and/or glucagon receptor agonist.

In addition to diabetes and obesity patients, patients with impaired glucose tolerance or impaired fasting glucose, patients with body weight of about 25% or more above normal body weight for the subject's height and build, patients that have gestational diabetes, patients with metabolic disorders may also be treated with the improved stable formulation of the invention. Other diseases treatable by the claimed formulation include Maturity Onset Diabetes of the Young (MODY); latent autoimmune diabetes, gestational diabetes, metabolic syndrome X, dyslipidemia, hyperglycemia, hyperinsulinemia, hypertriglyceridemia and insulin resistance. The formulations of the invention may also be useful in the treatment of glucocorticoid excess, growth hormone excess, pheochromocytoma and drug-induced diabetes.

The formulations of the present invention can be administered parenterally. This includes systemic administration by intramuscular, intravenous, subcutaneous, intradermal or interperitoneal means. As described herein, the active pharmaceutical moiety in the form of the PEGylated analog is administered to a subject in need of treatment thereof. Such subjects include mammals such as humans and animals (farm animals, companion animals etc.).

In one embodiment, the present invention provides a method of administering a GLP-1 and/or glucagon receptor agonist formulation of the invention or the GLP-1 and/or glucagon receptor agonist or its pharmaceutically acceptable salt as described herein. In one embodiment, the method comprises administering a stable liquid formulation of the invention to a patient through a slow dose-titration schedule. For example, the method comprises a first once-weekly (QW) administration period at a first QW dose that is followed by a second once-weekly (QW) administration period providing a dose escalation of the compound of the invention, and the second QW dose is greater than the first QW dose. In one embodiment, the second QW dose is at least 0.25-2.0 (e.g., 0.25, 0.5, 0.75, 1.0, 1.25, 1.50, 1.75, or 2.0) times greater than the first QW dose. In one embodiment, the second QW dose is at least 0.5 time greater than the first QW dose. In one embodiment, the second QW dose is at least 0.75 time greater than the first QW dose. In one embodiment, the second QW dose is at least 1.0 times greater than the first QW dose. In one embodiment, the second QW dose is at least 1.25 times greater than the first QW dose. In one embodiment, the second QW dose is at least 1.5 times greater than the first QW dose. In one embodiment, the second QW dose is at least 1.75 times greater than the first QW dose.

In one embodiment, the method further comprises at least one more (e.g., a third) administration period providing a dose escalation of the compound of the invention to a higher QW dose relative to the second QW dose. For example, the method further comprises at least one more administration period, subsequent to the second administration period, providing a QW dose at least about 0.25-2.0 (e.g., 0.25, 0.5, 0.75, 1.0, 1.25, 1.50, 1.75, or 2.0) times greater than the second QW dose. In one embodiment, the method further comprises at least one more administration period, subsequent to the second administration period, providing a QW dose at least 0.25 time greater than the second QW dose. In one embodiment, the method further comprises at least one more administration period, subsequent to the second administration period, providing a QW dose at least 0.5 time greater than the second QW dose. In one embodiment, the method further comprises at least one more administration period, subsequent to the second administration period, providing a QW dose at least 0.75 time greater than the second QW dose. In one embodiment, the method further comprises at least one more administration period, subsequent to the second administration period, providing a QW dose at least 1 time greater than the second QW dose. In one embodiment, the method further comprises at least one more administration period, subsequent to the second administration period, providing a QW dose at least 1.25 times greater than the second QW dose. In one embodiment, the method further comprises at least one more administration period, subsequent to the second administration period, providing a QW dose at least 1.5 time greater than the second QW dose.

Administration of a first QW dose is continuous over the first administration period of at least about 2 weeks, at least about 3 weeks, at least about 4 weeks, at least about 5 weeks, at least about 6 weeks. Administration of a second QW dose is continuous over the second administration period of at least about 2 weeks, at least about 3 weeks, at least about 4 weeks, at least about 5 weeks, at least about 6 weeks. In one embodiment, the second QW dose is greater than the first QW dose. When the method further comprises at least one more (e.g., a third) administration period providing a dose escalation of the compound of the invention to a higher QW dose relative to the second QW dose, the additional (e.g., the third) administration period is continuous for at least about 2 weeks, at least about 3 weeks, at least about 4 weeks, at least about 5 weeks, at least about 6 weeks.

Once the subject has completed an initial titration period with a first, low weekly dose, the dose is escalated to a maintenance dose. In one embodiment, once the patient has completed an initial titration period with a first, low once-weekly (QW) dose, the dose is escalated to a second (higher than the first) once-weekly dose, optionally a third (higher than the second) once-weekly dose, until the dose is escalated to a further higher once-weekly maintenance dose. A skilled artisan would be able to determine suitable doses (with regards to safety and efficacy) for a first, or a second, or optionally a third once-weekly dose, and subsequent once-weekly maintenance doses. Dose escalation allows a subject to receive a therapeutic benefit while being gradually exposed to the treatment. Such an administration schedule improves patient's tolerance during treatment and reduces the incidence of side effects.

Generally, dose escalation is from a low dose of the drug, for example, about 1-30 (e.g., 1, 2, 3, 5, 10, 12, 15, 20, 25, or 30) mg QW to a high dose of greater than the low dose to at least about 15-50 (e.g., 15, 20, 25, 30, 35, 40, 45, or 50) mg QW, further to at least about 40-80 (e.g., 40, 45, 50, 55, 60, 65, 70, 75, or 80) mg QW. In one embodiment, a first QW dose, for example, is from about 1 mg QW to about 20 mg QW, followed by dose escalation to a second QW dose of from about 10 mg QW to about 50 mg QW, and followed by a third QW dose (or the maintenance dose) of from about 40 mg QW to about 80 mg QW. In one embodiment, the subject receives a 20 mg QW dose for 4 weeks, followed by 4 weeks of a 40 mg QW dose, and followed by a maintenance dose of 70 mg QW. In one embodiment, the subject receives a 20 mg QW dose for 4 weeks, followed by 4 weeks of a 40 mg QW dose, and followed by a maintenance dose of 80 mg QW.

In one embodiment, the first QW dose is from about 1 mg QW to about 20 mg QW, e.g., from about 3 mg QW to about 20 mg QW, from about 5 mg QW to about 20 mg QW, from about 8 mg QW to about 20 mg QW, from about 10 mg QW to about 20 mg QW, or from about 15 mg QW to about 20 mg QW. In one embodiment, the second mg QW dose is from about 10 mg QW to about 50 mg QW, from about 15 mg QW to about 50 mg QW, from about 20 mg QW to about 50 mg QW, from about 25 mg QW to about 50 mg QW, from about 30 mg QW to about 50 mg QW, from about 35 mg QW to about 50 mg QW, or from about 40 mg QW to about 50 mg QW. In one embodiment, the third mg QW dose is from about 40 mg QW to about 100 mg QW, from about 45 mg QW to about 100 mg QW, from about 50 mg QW to about 100 mg QW, from about 55 mg QW to about 100 mg QW, from about 60 mg QW to about 100 mg QW, from about 65 mg QW to about 100 mg QW, from about 70 mg QW to about 100 mg QW, from about 75 mg QW to about 100 mg QW, from about 80 mg QW to about 100 mg QW, from about 85 mg QW to about 100 mg QW, or from about 90 mg QW to about 100 mg QW. In one embodiment, the third mg QW does is the maintenance mg QW dose.

In one embodiment, exemplary dose escalations for a GLP-1 and/or glucagon receptor agonist or a formulation comprising the same include, but are not limited to, administration of about 10 mg QW followed by about 20 mg QW; or administration of about 10 mg QW followed by about 30 mg QW, or administration of about 10 mg QW followed by about 40 mg QW, or administration of about 10 mg QW followed by about 50 mg QW, or administration of about 10 mg QW followed by about 60 mg QW, or administration of about 10 mg QW followed by about 70 mg QW, or administration of about 10 mg QW followed by about 80 mg QW, administration of about 15 mg QW followed by about 20 mg QW, or administration of about 15 mg QW followed by about 30 mg QW, or administration of about 15 mg QW followed by about 40 mg QW, or administration of about 15 mg QW followed by about 50 mg QW, or administration of about 15 mg QW followed by about 60 mg QW, or administration of about 15 mg QW followed by about 70 mg QW, or administration of about 15 mg QW followed by about 80 mg QW, or administration of about 20 mg QW followed by about 30 mg QW, or administration of about 20 mg QW followed by about 40 mg QW, or administration of about 20 mg QW followed by about 50 mg QW, or administration of about 20 mg QW followed by about 60 mg QW, or administration of about 20 mg QW followed by about 70 mg QW, or administration of about 20 mg QW followed by about 80 mg QW, or administration of about 40 mg QW followed by about 50 mg QW, or administration of about 40 mg QW followed by about 60 mg QW, or administration of about 40 mg QW followed by about 70 mg QW, about 40 mg QW followed by about 80 mg QW, or administration of about 50 mg QW followed by about 60 mg QW, or administration of about 50 mg QW followed by about 70 mg QW, or administration of about 50 mg QW followed by about 80 mg QW; or administration of about 60 mg QW followed by about 70 mg QW, or administration of about 60 mg QW followed by about 80 mg QW.

Alternatively, the GLP-1 and/or glucagon receptor agonist formulation of the invention or the GLP-1 and/or glucagon receptor agonist or its pharmaceutically acceptable salt as described herein may be administered twice a week, or once for every two days, or every day, instead of or in place of the once-weekly (QW) dose administration as described above. In one embodiment, the GLP-1 and/or glucagon receptor agonist formulation of the invention or the GLP-1 and/or glucagon receptor agonist or its pharmaceutically acceptable salt as described herein may be administered once a week, once every two weeks, or at longer dosage intervals.

In another aspect, the present invention provides an oxyntomodulin peptide analog and formulations comprising the oxyntomodulin peptide analog and uses thereof in treating diabetes and/or obesity. U.S. Pat. Nos. 8,367,607 and 8,415,296, hereby incorporated by reference, claim and disclose multiple oxyntomodulin analog PEGylated derivatives utilized herein and disclose the syntheses thereof.

One efficacious dosing regimen for delivery of these molecules to patients is a once-a-week (QD) dosing schedule. The preferred delivery route is by subcutaneous administration using a liquid formulation. In addition to being efficacious, the particular molecules described herein in a liquid formulation need to be sterile as well as chemically and physically stable for both quality/safety/delivery purposes and for shelf-life purposes. The parameters used to assess chemical and physical stability include, but are not limited to, appearance (color, clarity etc.), pH, purity, impurities, assay, monomer purity, % aggregates, particulate matter, subvisible particulates, peptide mapping, potency (in vitro activity), osmolality and viscosity. Various stress conditions were applied to attempted liquid formulations of OXM to determine a formulation that would offer optimal physical and chemical stability.

The inventors have found that while typical isotonic solutions containing sodium chloride are generally suitable for delivering drugs in liquid or parenteral formulations, the presence of sodium chloride in solutions containing the PEGylated oxyntomodulin analogs unexpectedly cause instability issues. Further, the addition of the PEGylated oxyntomodulin compounds or analogs described herein surprisingly cause a rise in pH beyond the preferred range. The inventors therefore have discovered liquid formulations according to the present invention that meet the requisite physical and chemical stability criteria. The inventors have, by discovering the stable liquid formulation herein, avoids the need to use solid dispersions of drug (i.e., lyophilized or otherwise) which need to be reconstituted with water or saline solution prior to administration to the patient. In addition, the formulation is stable as a refrigerated liquid and does not require freezing to maintain stability, allowing for storage in a pre-filled syringe or cartridge rather than a vial, and making it easier for at home use by patients. The patient or medical professional can thus "directly administer" the dosage form from a pre-filled syringe, cartridge or filled vial without taking the additional step of reconstituting a powder formulation and/or such individual could not use a pre-filled syringe (or pre-filled vial) absent of having such a stable liquid formulation.

The present invention addresses the need therefore to efficiently deliver a formulation (e.g., a once-a-week formulation) in suitable dosages to patients in need of treatment thereof and is directed to effectively lowering each criteria for determining diabetes type 2 or obesity or any associated medical disorder, disease or condition treated or treatable by a GLP-1 and/or glucagon receptor agonist including lowering FPG to below 126 mg/dL and/or lowering 2-h PG to less than 200 mg/dL and lowering A1C to less than 6.5% (48 mmol/mol) and lowering PG to less than 200 mg/dL.

EXAMPLES

Example 1: Preparation of Acetate Salt of Compounds of the Invention

The compounds of the present invention are prepared by Solid Phase Peptide Synthesis (SPPS) and chromatographic purification.

Solid Phase Peptide Synthesis (SPPS)

The Solid Phase Peptide Synthesis (SPPS) of the compounds is performed according to standard procedures and protocols well developed and used routinely world wide. The SPPS is the sequential synthesis of a peptide chain anchored on a solid support by repetition of a cycle encompassing the following steps: removal of the N-terminus Fmoc protecting group of the peptide res in (or resin for the first deprotection), wash, coupling of the next activated amino acid, capping by acetylation, and wash. This cycle is repeated until the sequence of the desired peptide is synthesized as described below.

For the synthesis of the compounds of the invention, the α-amino group of each amino acid was protected with the base-sensitive 9-fluorenylmethyloxycarbonyl (Fmoc) group, while side chain functional groups were protected with acid-labile groups. All used amino acids derivatives were commercially available (FIG. 1).

For example, for the compound of Formula 3, the trifluoroacetate key intermediate was assembled on a Fmoc-Rink amide resin. The Fmoc group of the rink amide resin was removed with piperidine in DMF. After washing with DMF and IPA, a small sample of the resin was removed and subjected to the ninhydrin/Kaiser or chloranil in-process control test. It is a color test measuring residual resin-bound amine groups. The test should be positive to confirm the presence of the free amine group.

Couplings of the Fmoc protected amino acids were performed in DMF with variable amino acid equivalents using DIC/HOBt or HBTu/DIPEA/HOBt for activation.

At the coupling stage, if he ninhydrin test is found to be negative or slightly positive, indicating a low amount of unreacted amine, the peptide-resin is acetylated using acetic anhydride and DIPEA in DMF. If the test indicates incomplete coupling (positive response), prolonged or re-coupling of the Fmoc-amino acid is performed.

At the Fmoc cleavage stage, the N-terminal Fmoc-group was cleaved with piperidine in DMF. The solution was filtered, and the peptide resin washed with DMF followed by ethyl ether and dried under vacuum to constant weight.

Cleavage of Peptide from Resin and De-Protection: The crude peptide was cleaved from the resin by treatment of the protected peptide resin with TFA in the presence of cation scavengers (TIPS, DTE and $H_2O$). This resulted in the concomitant cleavage of the peptide from the resin as well as the removal of the side chain protecting groups from the peptide. The solvents were removed in a concentration step and after precipitation in ethyl ether the residue was dried to give the crude, deprotected peptide.

Purification of Key Intermediate

The crude peptide solution was purified by preparative HPLC using reversed phase silica washed with methanol and pre-equilibrated with dilute aqueous TFA. The peptide adsorbed was eluted from the column by applying a gradient of acetonitrile in dilute aqueous TFA (ambient temperature).

The combined pure fractions obtained were reapplied to the same column, after an intermediate washing and pre-equilibrated with dilute aqueous TFA. The peptide adsorbed was eluted from the column by applying a gradient of acetonitrile in 0.1M Sodium Perchlorate (pH adjusted to 3.1) and acetonitrile.

The combined pure fractions obtained were purified one final time using the same column and prewashing/equilibration sequence as described before. The peptide was eluted using a gradient consisting of aqueous TFA and acetonitrile. Fractions were pooled and isolated by lyophilization.

Lyophilization of Key Intermediate: The pools of lyophilized product from the purification step were reconstituted in dilute aqueous TFA containing 5% acetonitrile, lyophilized to the final formula 3 Trifluoroacetate key intermediate.

Pegylation: The Formula 3 Trifluoroacetate key intermediate was dissolved in a solution of acetonitrile and ammonium acetate buffer in which the pH had been adjusted to approximately 6.6 to 7.0 using ammonium hydroxide or acetic acid, as appropriate. The solution was added to a flask containing a stirred solution of PEG (~20 kDa) Maleimide linker dissolved in the same buffered solution used to dissolve the peptide. The progress of the reaction was monitored by HPLC. Upon completion, the reaction mixture was then diluted with purified water, pH adjusted to between 3.95 and 4.05 with acetic acid and carried on to the purification stage.

Purification and Conversion to Formula 3 Drug Substance to Acetate Salt

Ion Exchange Purification of Crude Formula 3 drug substance: The crude drug substance was diluted with purified water and applied to a cation exchange HPLC column. The drug substance was eluted using a gradient of acetonitrile and dilute aqueous $NH_4OAc$.

Desalting and Acetate salt conversion of Formula 3 drug substance: The combined fractions obtained from Ion Exchange Purification of the above was diluted with purified water and applied to a preparative reverse-phase HPLC column. The drug substance was eluted using a gradient of acetonitrile and dilute aqueous acetic acid. Fractions were pooled for concentration and lyophilization.

Lyophilization of Drug Substance Formula 3 Acetate: The lyophilized drug substance was reconstituted in a dilute aqueous solution of acetonitrile and acetic acid, filtered and finally lyophilized.

Example 2: Characterization of Compound of Formula 3

Analytical Procedures
Mass Spectrometry by MS
Mass spectra of Formula 3 were obtained using ESI ion trap mass spectrometer.
Intact Masses by LC/MS with Post-Column Neutralization
Formula 3 intact masses were determined by LC-MS analysis with post-column neutralization by diethylmethylamine (DEMA). When the PEGylated molecule is eluted from RP-HPLC separation in a water/acetonitrile/TFA system, the stream is mixed with DEMA solution before it goes into a Water SYNAPT G2-S Q-TOF mass spectrometer.

Thermolytic Peptide Mapping with LC/MS
Formula 3 was directly treated with a thermolysin solution at 37° C. for 1 hour after diluted to 1 mg/mL in 20 mM tris-HCl buffer, pH8. The digest solution was directly analyzed using a Waters Acquity UPLC system coupled to a Waters SYNAPT G2-S mass spectrometer. Mass spectrometry by MS/MS The amino acid sequence of Formula 3 was investigated by performing MS/MS analyses using both CID and ECD. The MS/MS spectrum was compared to the expected fragment ions for the drug substance. The expected, multiply charged b and y fragment ions were calculated using a computer program developed by Croker et. al. (*Journal of Biomolecular Techniques*, 2000, 11 (3), 135-141). The fragment ions were assigned on the spectrum.

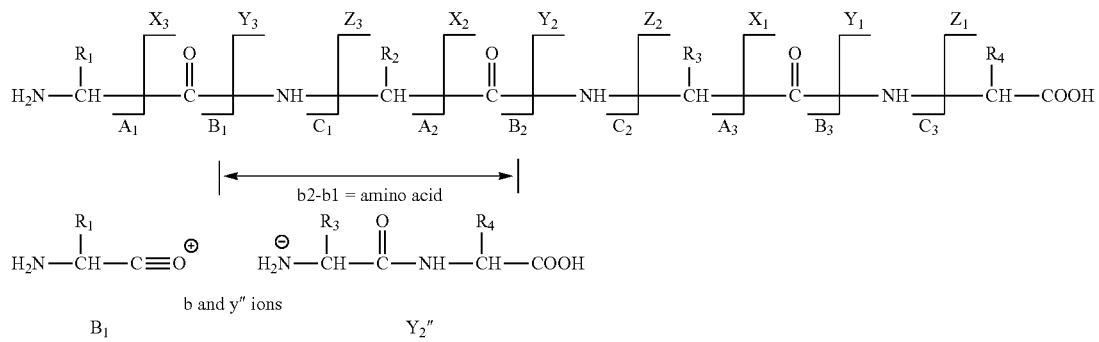

There are three different types of bonds that can fragment along the amino acid backbone: the NH—CH, CH—CO, and CO—NH bonds. Each bond breakage gives rise to two species, one neutral and the other one charged, and only the charged species are monitored by the mass spectrometer. The charge can stay on either of the two fragments depending on the chemistry and relative proton affinity of the two species. Hence there are six possible fragment ions for each amino acid residue and these are labelled as in the diagram above, with the a, b, and c" ions having the charge retained on the N-terminal fragment, and the x, y", and z ions having the charge retained on the C-terminal fragment. For CID technique, the most common cleavage sites are at the CO—NH bonds which give rise to the b and/or the y" ions, which, since they are the strongest ions, are the ones most often used in sequence analysis of peptides. The mass difference between two adjacent b ions, or y" ions, is indicative of a particular amino acid residue. The larger b and y" fragments are often found as multiply charged ions. For ECD technique, the most common cleavage sites are at the NH—CH bonds which give rise to the c and/or the z ions but the principle to get amino acid sequence is similar.

Amino Acid Analysis by AAA
This procedure determines the amino acid composition by hydrolysis (modification of USP <1052>) of the peptide followed by ion-exchange separation of the resulting free amino acids and quantitation by post-column derivatization with ninhydrin. The ion-exchange system is calibrated prior to analysis using a certified mixture of amino acids. The results are expressed as relative amino acid ratios, which are expected to conform with amino acid composition of the molecule; and as peptide content (quantity), which is calculated by taking the ratio of the averaged amino acid recovery to the total amount of sample. The peptide content is then used to calculate quantity.

Chiral Amino Acid Analysis by GC-MS

Hydrolysis and Derivatization

The peptide was hydrolyzed in 6 N DCl in D2O (compensates for any racemization which may occur during hydrolysis). After removal of excess reagent with a stream of nitrogen, the dried sample was esterified with DCl in methanol. After cooling, the vial was opened, and the excess reagent removed under a nitrogen stream with slight heating. The residue was dissolved in trifluoroacetic anhydride or pentafluoropropionic anhydride, and the vial was tightly closed and heated. After cooling to ambient temperature, the excess reagent was removed by a stream of nitrogen. The residue was dissolved in toluene and subjected to analysis by GC-MS.

Gas Chromatography

The N(O, S)-fluoroacetyl amino acid esters were separated on a deactivated glass capillary coated with Chirasil-Val. The carrier gas was hydrogen. The peaks were identified by retention time and mass spectrum.

Acetate and Trifluoroacetate Determination by RP-HPLC

This procedure is a gradient reversed-phased HPLC method with UV detection at 210 nm designed to determine the acetate and trifluoroacetate content. This method determines acetate and trifluoroacetate content as a weight percent.

GLP-1 Activity

The GLP-1 activity of Formula 3 is assessed using a cell-based reporter gene assay. This assay utilizes HEK293 cells stably transfected with GLP-1 receptor and cAMP response element (CRE) responsive luciferase gene. In this assay, Formula 3 binds to the GLP-1 receptor on the cell surface, which activates cAMP. As a result of this activation, CREB (cAMP Response Element Binding Protein) is phosphorylated and binds CRE in the nucleus, which induces the transcription of luciferase. The luminescence from the luciferase reaction is measured and quantitated, which results in a dose dependent activation curve for GLP-1.

Glucagon Activity

The glucagon activity of Formula 3 is assessed using a cell-based reporter gene assay. This assay utilizes an HEK293 cell line (separate from the HEK293 with GLP-1 receptor), which has been engineered to stably express the glucagon receptor and a cAMP responsive element (CRE) responsive luciferase gene. In this assay, Formula 3 binds and activates the glucagon receptor, which activates cAMP. As a result of this activation, CREB (cAMP Response Element Binding Protein) is phosphorylated and binds CRE in the nucleus, which induces the transcription of luciferase. The luminescence from the luciferase reaction is measured and quantitated, which results in a dose dependent activation curve for glucagon.

Elucidation of Structure and Other Characteristics

Evidence of Chemical Structure

Structure elucidation studies were performed on both the peptide intermediate and Formula 3. Table 1A and Table 1B list the studies conducted. All analyses confirm the chemical structure of the peptide intermediate and Formula 3.

Amino acid sequence and amino acid chirality of peptide intermediate were confirmed by ES-MS, CID- and ECD-MS/MS, amino acid analysis (AAA) and chiral amino acid analysis. Mass ions obtained by ESI-MS for the peptide intermediate were consistent with the predicted ones. Data from tandem MS/MS matched the expected amino acid sequence. AAA yielded an amino acid composition that was consistent with the theoretical composition except Trp and Cys, which were almost completely destroyed during the acidic hydrolysis. The chirality of amino acid of the peptide intermediate is pure (>99%) by chiral amino acid analysis.

Amino acid sequence of Formula 3 was confirmed by amino acid analysis (AAA), N-terminal sequencing, LC/MS peptide mapping and intact LC/MS. The amino acid composition from AAA was consistent with the theoretical composition except Trp and Cys, which were almost completely destroyed during the acidic hydrolysis. The 30 cycles of N-terminal sequencing were consistent with the expected sequence of Formula 3. Peptides identified by LC/MS peptide mapping accounted for 35 of total 39 amino acid residues. DePEGylated C-terminal Ile-Ala-Cys-Cys peptide of Formula 3 was not detected by LC/MS peptide mapping, indicating that free peptide intermediate did not exist in Formula 3. No significant peptide isomers were detected from peptide mapping demonstrating that PEGylation reaction and storage did not change the amino acid chirality of the peptide. In addition, LC/MS peptide mapping detected very low levels of degradation, including Trp29 oxidation and Asp deamidation. Part of the degradation was likely generated during sample preparation.

The results obtained from MALDI-TOF MS and LC/MS with post-column neutralization of diethylmethylamine for Formula 3 were consistent with Formula 3 peptide backbone and mPEG structure as well as mPEG size.

TABLE 1A

Testing Performed on Peptide Intermediate

| Test | Analytical technique |
| --- | --- |
| Molecular mass | ESI-MS |
| Sequence of amino acids | CID-and ECD-MS/MS |
| Identity and ratios of individual amino acids | Amino acid analysis (AAA) |
| Identity and chirality of individual amino acids | Chiral amino acid analysis |

TABLE 1B

Testing Performed on Formula 3 Drug Substance

| Test | Analytical technique |
| --- | --- |
| Molecular mass | MALDI-TOF MS, LC/ESI-MS |
| N-Terminal Sequence | N-Terminal sequencing |
| Sequence of amino acids | LC/MS Peptide mapping |
| Identity and ratios of individual amino acids | Amino acid analysis (AAA) |
| Identity and chirality of individual amino acids | Chiral amino acid analysis |
| Identity and amount of the counter-ion | HPLC |

Molecular Mass Determined by MS

Peptide Intermediate

Electrospray ionization mass spectrometry (ESI MS) was used to determine the mass of the peptide. The deconvoluted mass obtained from each of the multiple charged ions confirms the correct monoisotopic mass of the peptide intermediate.

TABLE 1C

Confirmation of the Molecular Mass by MS

| Mass ion | Theoretical mass (Da) | Observed Mass (Da) | Deconvoluted Mass (Da) |
|---|---|---|---|
| $[M + 3H]^{3+}$ | 1502.07 | 1502.07 | 4503.21 |
| $[M + 4H]^{4+}$ | 1126.8 | 1126.81 | 4503.24 |
| $[M + 5H]^{5+}$ | 901.64 | 901.65 | 4503.25 |
| $[M + 6H]^{6+}$ | 751.53 | 751.54 | 4503.24 |

Drug Substance

Matrix assisted laser desorption ionization-time of flight (MALDI-TOF) was used to obtain the molecular mass of the Formula 3 drug substance. A sample from Formula 3 as prepared in Example 1 was analyzed.

The sample gave a positive ion MALDI-TOF mass spectrum with a broad singly-charged pseudo-molecular ion cluster observed centered approximately at m/z 48300.

Figure 2:
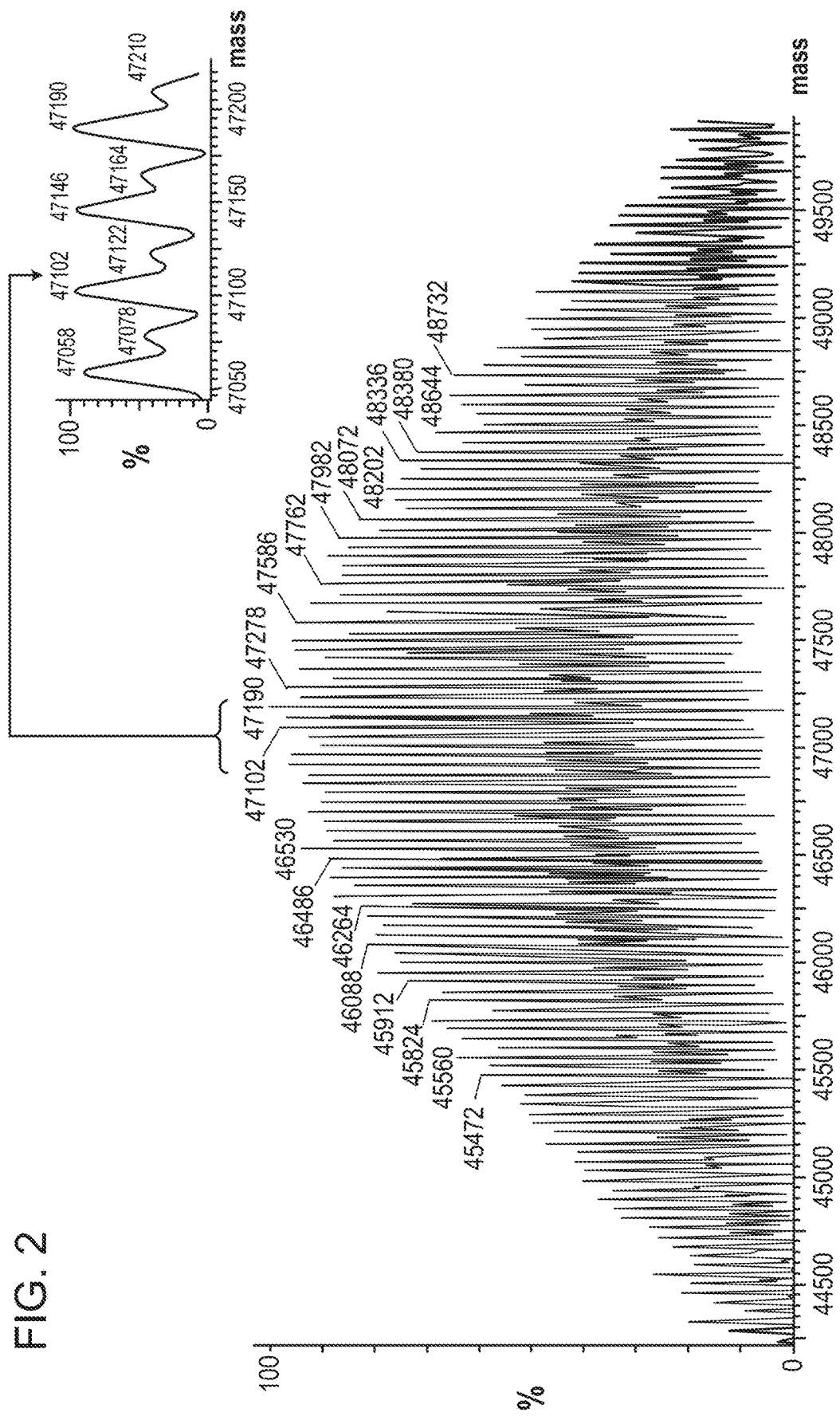
FIG. 2 depicts the deconvoluted mass spectrum of Formula 3 obtained by LC/MS analysis with post-column neutralization by DEMA.

LC/ESI-MS with post-column neutralization by diethylmethylamine (DEMA) was used to obtain the accurate molecular mass of the reference standard of Formula 3. The deconvoluted mass spectrum of Formula 3 is shown in FIG. 2. Two series of masses were identified, and each series contained more than a hundred masses with 44-Da mass difference (=one oxyethylene) between adjacent two masses. The major series of masses are consistent with the expected Formula 3 structure. For example, one of major masses at 47102 Da is consistent with the peptide intermediate 1-39 linked to two mPEG chains with 956 oxyethylene units (expected mass: 47101 Da). The data confirmed the structure of Formula 3 drug substance. Besides the major series, minor series of masses (most likely correspond to Formula 3 with one open maleimide ring, see the inserted picture in FIG. 2) were 18-Da higher than the major series of masses.

N-Terminal Sequencing

Formula 3 Reference Standard

The N-terminal amino acid sequence of Formula 3 reference standard was determined by 30 cycles of N-terminal amino acid sequencing (Edman degradation).

The observed sequence was consistent with residues 1-30 of the expected N-terminal sequence of Formula 3 His-Aib-Gln-Gly-Thr-Phe-Thr-Ser-Asp-Tyr-Ser-Lys-Tyr-Leu-Asp-Ser-Lys-Lys-Ala-Gln-Glu-Phe-Val-Gln-Trp-Leu-Leu-Asn-Aib-Gly.

Sequence of Amino Acids by MS/MS

Peptide Intermediate

The amino acid sequence of the peptide intermediate was investigated by performing MS/MS analyses using collision-induced dissociation (CID) and electron capture dissociation (ECD). With these techniques, the intact sample molecule was deliberately fragmented with the intention of obtaining structural information from the product ion spectrum created by the process. Results of the CID-MS/MS analysis and the ECD-MS/MS analysis of the +5 charged state of the peptide intermediate ($[M+5H]^{5+}$ m/z 902.0) are summarized in FIG. 3 and FIG. 4. The fragmentation and sequence analysis by MS/MS confirmed the primary sequence of the molecule.

Sequence of Amino Acids by LC/MS Peptide Mapping

Drug Substance

Formula 3 drug substance sequence of amino acids was confirmed by LC/MS peptide mapping.

Figure 5:
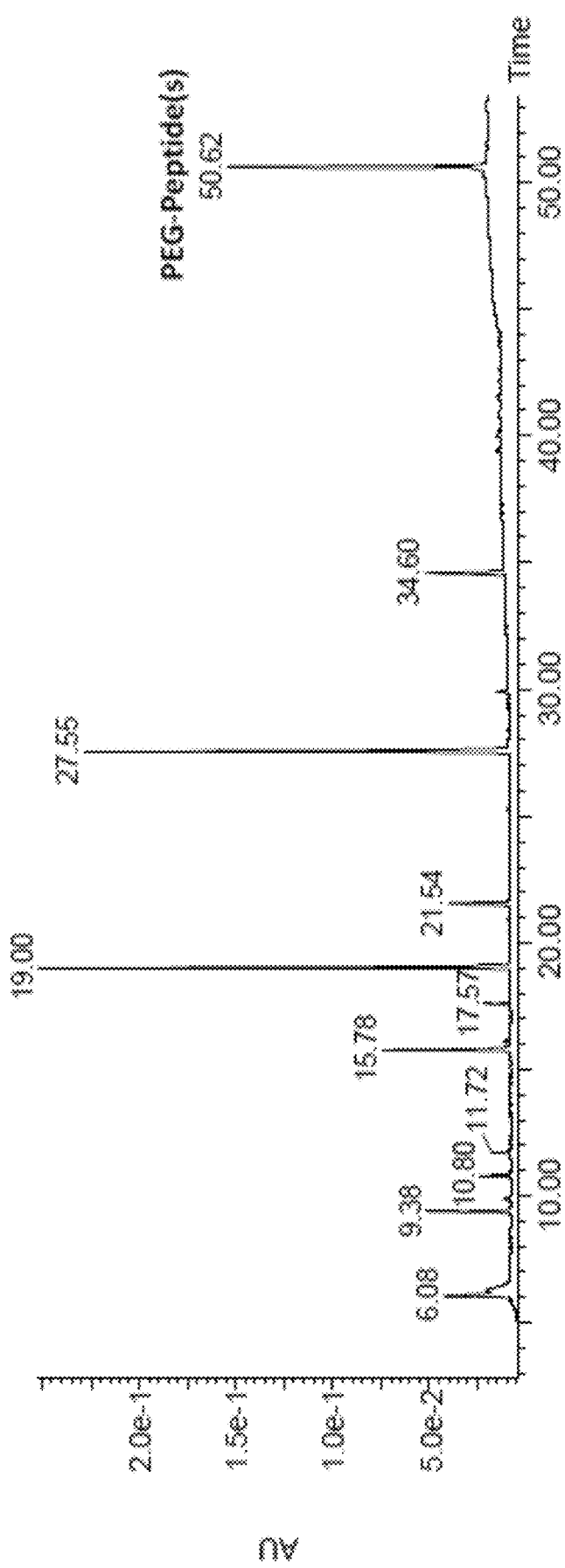
FIG. 5 depicts the LC-UV chromatogram from the LC/MS analysis of the thermolytic digest of Formula 3.

In order to recover as many as possible peptide sequence (i.e. digested peptide fragments), the Formula 3 reference standard was subjected to LC/MS analysis, followed with thermolytic digestion. UV chromatogram of LC/MS analysis for the thermolytic digest of Formula 3 is shown in FIG. 5 and the results obtained are shown in Table 1D.

As shown in Table 1D, 35 of 39 amino acid residues of Formula 3 peptide backbone were identified by thermolytic peptide mapping with LC/MS. The PEGylated peptide fragment Formula 3 36-39, eluted at 50.62 min, was not identified by accurate mass in this analysis since this analysis did not include post-column neutralization. However, the C-terminal PEGylated peptide IACC can be inferred from the mass spectrometry data. It is expected that the broad peak at ~50 minutes contained this PEGylated peptide. The combined mass spectra from this peak showed a series of mass species separated by 44 Da, which is indicative of PEG-containing species. Besides the expected thermolytic peptides, a few very minor modified peptides were also identified. They are oxidized Formula 3 peptide 22-25 (Trp25 oxidation) and deamidated Formula 3 26-35. Formula 3 22-25 only contains one potential oxidized site, Trp25, but Formula 3 26-35 contains 4 Asn residues, and specific deamidation site has not been identified. Part of the degradations might be generated during the thermolytic digest. No significant peptide isomer was identified, indicating that Formula 3 did not contain significant amino acid racemization, i.e. pure amino acid chirality.

TABLE 1D

Data Summary Obtained by LC/MS Peptide Mapping of Formula 3

| UV Ret Time (min) | Mass Found | Mass Expected | Error (ppm) | Peptide Seq No | Peptide Sequence | Modification |
|---|---|---|---|---|---|---|
| 6.08 | 526.2488 | 526.2500 | -2.3 | 1-5 | HUQGT | No |
| 19.00 | 1009.439 | 1009.439 | -0.3 | 6-13 | FTSDYSKY | No |
| 9.38 | 917.4810 | 917.4819 | -1.0 | 14-21 | LDSKKAQE | No |
| 17.57 | 1064.548 | 1064.5500 | -1.9 | 14-22 | LDSKKAQEF | No |
| 27.55 | 578.2853 | 578.2853 | 0.0 | 22-25 | FVQW | No |
| 23.72 | 610.2728 | 610.2751 | -3.8 | 22-25 + 2[O] | FVQW | Trp Oxidation |

TABLE 1D-continued

Data Summary Obtained by LC/MS Peptide Mapping of Formula 3

| UV Ret Time (min) | Mass Found | Mass Expected | Error (ppm) | Peptide Seq No | Peptide Sequence | Modification |
|---|---|---|---|---|---|---|
| 34.60 | 691.3672 | 691.3694 | -3.2 | 22-26 | FVQWL | No |
| 21.54 | 431.2164 | 431.2169 | -1.2 | 23-25 | VQW | No |
| 29.91 | 544.3007 | 544.301 | -0.6 | 23-26 | VQWL | No |
| 15.78 | 1154.626 | 1154.627 | -0.9 | 26-35 | LLNUGRNRNN | No |
| 16.13 | 1155.609 | 1155.611 | -1.7 | 26-35 + (NH— >O) | LLNUGRNRNN | Asn Deamidation |
| 10.89 | 1041.54 | 1041.543 | -2.4 | 27-35 | LNUGRNRNN | No |

Identity and Ratio of Individual Amino Acids by AAA Peptide Intermediate and Formula 3 Drug Substance To ensure the identity and the correct ratio of the constituent amino acids, amino acid analysis was performed on the peptide intermediate, as well as the drug substance to show consistency of results (See Table 1E). This method involves hydrolyzing the peptide in strong acid, separating the amino acids on an ion-exchange column, and, finally, detecting the eluents after ninhydrin derivatization.

The results from the amino acid analysis confirm the identity and theoretical relative abundance of amino acids in the peptide intermediate and Formula 3 drug substance. With the exception of Trp and Cys, which give characteristically low recoveries for amino acid analysis, the amino acid recoveries show good correlation with the theoretical relative occurrence.

TABLE 1E

Results of Amino Acid Analysis

| Amino Acid | Theoretical Relative Occurrence | Peptide Intermediate | Formula 3 drug substance |
|---|---|---|---|
| | | Observed Relative Occurrence | |
| Asx | 6 | 6.1 | 6.0 |
| Thr | 2 | 1.8 | 1.9 |
| Ser | 3 | 2.7 | 2.8 |
| Glx | 4 | 3.9 | 3.5 |
| Gly | 2 | 1.9 | 1.9 |
| Ala | 2 | 1.9 | 1.9 |
| Val | 1 | 1.0 | 1.0 |
| Ile | 1 | 1.0 | 1.1 |
| Leu | 3 | 3.0 | 3.1 |
| Tyr | 2 | 2.1 | 2.2 |
| Phe | 2 | 2.1 | 2.0 |
| His | 1 | 0.9 | 1.0 |
| Lys | 3 | 3.1 | 3.2 |
| Trp | 1 | Present | 0.3 |
| Arg | 2 | 2.0 | 2.1 |
| Aib | 2 | 2.1 | 2.2 |

Identity and Chirality of Individual Amino Acids by GC-MS Peptide Intermediate and Drug Substance The peptide portion of the molecule consists of natural amino acids with the exception of two 2-aminoisobutyric acid moieties present in the molecule. This amino acid and the two glycines present in the molecule represent the only achiral amino acids. Chiral amino acid analysis of the peptide intermediate and Formula 3 drug substance was performed to investigate the chiral identity of each constituent amino acid residue. The peptide is hydrolyzed in deuterated solvents ($DCl/D_2O$), suitably derivatized, and analyzed using gas chromatography-mass spectrometry (GC-MS) to determine each amino acid enantiomer. The results, summarized in Table 1F, confirmed the chirality expected for each amino acid in the drug substance.

TABLE 1F

Results of Chiral Amino Acid Analysis (Calculated L-AA Values)

| Amino acid | Peptide Intermediate | Formula 3 drug substance |
|---|---|---|
| | Content of L-amino acid (%) | |
| Asx | 99.82 | >99.90 |
| Thr[1] | >99.70 | >99.70 |
| Ser | >99.90 | 99.89 |
| Glx | >99.90 | >99.90 |
| Ala | 99.87 | 99.70 |
| Val | 99.85 | >99.90 |
| Ile[2] | >99.70 | >99.70 |
| Leu | 99.80 | >99.90 |
| Tyr | >99.90 | 99.90 |
| Phe | 99.78 | 99.86 |
| His | 98.98 | 99.51 |
| Lys | 99.90 | >99.90 |
| Trp | 99.36 | >99.90 |
| Arg | 99.88 | >99.90 |
| Cys | NA[3] | 99.21 |

[1]Three other isomers are possible; less than 0.1% of each of these was detected.
[2]Three other isomers are possible; less than 0.1% of each of these was detected, except for D-alloisoleucine, which was quantified at 0.11%
[3]The Cys residues could not be cleaved from the linker under the hydrolytic conditions used.

Identity and Amount of Counter Ion by RP-HPLC

Drug Substance

To complete the structure elucidation of Formula 3 drug substance, the acetate content was measured by RP-HPLC to ensure the identity and amount of the counter ion.

The presence of acetate (measured indirectly as acetic acid) was confirmed. The acetate content was determined to be less than 0.6% (wt/wt), which is consistent with the predicted 3 equivalents of acetate based on the excess of three basic residues in the peptide.

Physico-Chemical Properties
Physical Form
Peptide Intermediate and Formula 3 Drug Substance To ensure the appearance of the peptide intermediate and the Formula 3 drug substance, visual examination was performed. The results indicated that the appearance of both the peptide intermediate and the drug substance was a white to off-white powder. Both peptide intermediate and Formula 3 are lyophilized material and no crystalline or polymorphic form is formed.

Biological Activity

Oxyntomodulin (OXM) is a peptide hormone that is released along with GLP-1 from the L-cells of the small intestine in proportion to nutrient ingestion. Distinct receptors for OXM have not been identified. OXM can bind and activate both GLP-1 receptor (GLP1R) and glucagon receptor (GcgR) in vitro. Mechanisms of GLP1R agonists in glucose lowering and weight reduction are well validated. It was reported that glucagon could reduce food intake and increase energy expenditure in the Wistar rats. In contrast, an anti-glucagon antibody was shown to increase meal size and duration in a fasting and re-feeding experiment. In a 7-day human study, glucagon was demonstrated to reduce food intake. Furthermore, glucagon was demonstrated to increase FGF21 and decrease PCSK9 expression. Therefore, a combination of GLP1R and GcgR agonism may provide a potential for superior weight reduction and lipid profile improvement as long as GLP1R activity is sufficient to improve glycemic control.

The biological activity (potencies) of the Formula 3 reference standard and Formula 3 as prepared in Example 1 were evaluated relative to each other with two cell based assays (GLP-1 and Glucagon). The results were within the bioassay method variability and indicate no difference in the potency between the reference standards. Therefore, they are each assigned the same value of 100%.

Impurity Profiles for Clinical and Toxicology Batches

RP-HPLC chromatograms showing the individual impurity profile comparison results for clinical and toxicology batches have been summarized in Table 1G. The impurity profiles of clinical batches are comparable to the toxicology batches (PG1101 and PG1201).

the mono-PEGylated form (i.e., mPEG-Peptide-Peptide-mPEG) may occur due to intermolecular cross-linking of cysteine residues and have been preliminarily identified as high molecular weight polymers (may be on the right of the API on chromatogram). Potential inorganic impurities, inorganic salts used mainly during purification, are expected to be completely removed in the purification steps. The acids (acetic and trifluoroacetic acid) used, which may form salts of the peptide, are included in the analysis of the drug substance. No metallic catalytic reagents are used in the manufacturing process. Only insignificant amounts of metal ions may remain as stainless-steel chromatography columns are used. Mono-PEGylation may also result.

Thus, the limit for total impurities/degradants in the drug product is 10% and single largest impurity is 5%. Thus, the formulations of the invention stay within the limits when samples are stored for 2 years at 5±3° C.

Example 3: Preparation of Formulations of the Invention

The formulations of the invention were initially prepared in an aqueous solution having about 50 to 85 mg/mL of the active ingredient, formula 3. The preferred concentration of the active ingredient PEGylated oxyntomodulin of formula 3 is about 70 mg/mL. Various compositions comprising the active ingredient and buffers selected from acetate, citrate and histidine were prepared at various pH levels between 4.0 to 7.0. Solutions of the PEGylated oxyntomodulin analog (formula 3) were stored for six days at three storage conditions: 5±3° C., 25±2° C. and 40±2° C., and then were analyzed by DLS and RP-HPLC for particle size analysis and purity/impurities respectively. It was discovered after addition of the PEGylated oxyntomodulin active ingredient at 70 mg/mL in all formulation buffers prepared (acetate, citrate and histidine) that the buffer pH increased to above the target due to the addition of the PEGylated oxyntomodulin. Accordingly, two additional formulations were prepared where pH was adjusted with weak acid to the target value. These samples were stored at 5±3° were also tested for purity/impurities by RP-HPLC. The compositions of the present invention had no significant changes in pH values

TABLE 1G

Individual Impurity Profile Comparison for Toxicology and Clinical Batches

| Observed Impurity (RRt) | Individual RP-HPLC Area % for Impurities .0.15% in Clinical and Toxicology Batches | | | | | | |
|---|---|---|---|---|---|---|---|
| | PG1101 | PG1201 | PG1301 | PG1302 | PG1401 | PG1601 | PG1701 |
| 0.95-0.96 | 0.56 | 0.91 | 0.67 | 0.90 | 0.78 | 0.44 | 0.30 |
| 0.98 | 0.56 | 0.37 | 0.15 | ND | 0.44 | 0.49 | 0.32 |
| 1.02-1.03 | 1.51 | 1.22 | 1.18 | 1.34 | 1.28 | 1.35 | 1.5 |

ND: not detected
RRt: relative retention time

Due to the method of purification (gradient chromatography), as described in the process of Example 1, it is highly unlikely that organic impurities are present. Only organic impurities with properties very similar to peptides could be expected not to be removed by these chromatographic steps. The presence of any mono-PEGylated impurities is expected to be low since the progress of the reaction is monitored by HPLC and any such impurities would be removed during purification. Mono-PEGylated impurities are readily detectable by RP-HPLC eluting at approximately RRt 0.95/0.96 (Table 1G) and can also be degradation products. Dimers of for any of the samples between the initially measured pH and for pH measured after 6 days storage at 5±3° C.

Particle distribution in the solutions was also tested by DLS and showed multimodal size distribution with high polydispersity and with low concentration of particles. The invention thus comprises PEGylated oxyntomodulin formulations having such characteristics.

The formulations of the invention were also tested for related impurities by RP-HPLC and soluble aggregates by SEC-HPLC under various conditions. The most stable conditions in terms of the least increase in impurities was at a pH range of about 4.5 to about 5.9 and/or with solutions lacking sodium chloride at the tested concentration of 100 mM. Acetate buffer with pH 4.5 was selected as offering the most stability for a liquid formulation containing PEGylated oxyntomodulin peptide and analogs thereof.

Example 4: Pre-Formulation Development

Various formulations of OPK-88003 liquid drug product have been evaluated in order to develop a stable liquid formulation suitable for use in a pre-filled syringe format for Phase 3, and eventual commercial administration in combination with an autoinjector. Formulation development was performed in three phases:
Phase 1: Pre-Formulation development to narrow down selection of 1) pH, 2) Buffer, 3) Surfactants and 4) Excipients;
Phase 2: DOE study to evaluate stability of selected combinations utilizing statistical design;
Phase 3: Long-term stability of selected lead formulations.

Summary of Phase 1 Pre-Formulation Activities

Pre-formulation development included assessment of stability as a function of pH, buffer type, and addition of various excipients and the effect of surfactants. Stability analytical testing included RP-HPLC and SEC-HPLC, particulates by DLS, HIAC and MFI, as well as pH, osmolarity, viscosity, etc.

Initial Screening: OPK-88003 (Formula 3) stability studies assessed relative pH and buffer types (acetate, citrate and histidine). Samples were tested for peptide impurities by RP-HPLC and the presence of soluble aggregates measured by DLS. Based on initial screening data:
pH 4.5-5.0 was identified as optimal pH range, and
Acetate or citrate were identified as suitable buffers in this range.

Excipient Screening: Various excipients were evaluated or experimentally assessed in acetate buffer (pH 4.5 and 5.0) or citrate buffer (pH 5.5): methionine, arginine, cysteine, glycine, sodium chloride, mannitol, sorbitol and sucrose. Improvements in formulations containing methionine and arginine were noted and were selected for further assessment in DOE testing. Sorbitol and sucrose appeared inert and either would be suitable as a tonicity modifier. Sorbitol was selected for DOE testing due to less possible effects on viscosity.

Surfactant Screening: The effect of various surfactants on particle and aggregate formulation was assessed in a surfactant screening study. The effect of following surfactants: Polysorbate 20, Polysorbate 80, and Poloxmer 188 were evaluated in samples subjected to agitation and successive freeze/thaw cycles. Samples were analyzed by SEC-HPLC, DLS, MFI & HIAC for soluble and insoluble aggregates. No chemical degradation or aggregation was observed in samples containing any of the surfactants relative to the control samples, therefore it was decided to exclude any surfactant from the formulation for further testing.

Results of Phase 2, OPK-88003 Formulation Development DOE Study and Rationale for Selection of Lead Formulation A design of experiments (DOE) study was planned and executed. 39 formulations were placed on accelerated stability (40° C. for 4 weeks) and analyzed by RP-HPLC, SEC-HPLC. Results of DOE testing and statistical modelling as well as rationale for selection of lead formulations for further stability testing in prefilled syringes is outlined below.

Buffer Selection: During pre-formulation studies, the acetate buffered solutions were identified as similar to citrate buffered solutions when tested in the low pH range. Since acetate is a better buffer in the pH 4.5-5.0 range, acetate buffer was selected for the DOE study and lead formulation. Additionally, lower viscosities were observed in samples prepared in acetate buffer, however this needs to be confirmed.

pH Selection: pH 4.5-4.9 was identified as the optimal pH range during pre-formulation studies for OPK-88003 stability and this range was selected for testing in the DOE studies. Modeling of DOE study results demonstrated there was statistically significant stability improvement in total aggregates and/or impurities by SEC-HPLC or RP-HPLC. Since statistical improvements were consistently observed in samples at lower pH it is recommended to select the lowest pH tested for the preferred formulations.

Methionine: During modeling of DOE study results, the level of methionine was identified as having a statistically significant effect on levels of impurities by SEC (total aggregates) and RP-HPLC (total back-peak impurities) following accelerated stability. Specifically, methionine appears to function as a protective agent against dePEGylation based off DOE stability results. Statistical modelling of DOE results indicate ~30 mM potency is an optimal methionine concentration.

Arginine: Although arginine does seem to improve stability in certain situations (i.e., in presence of low levels of methionine), differences were not deemed statistically significant. There may be some improvement in samples containing arginine under certain conditions, but not in our optimal pH range. In addition, as a tonicity modifier, sorbitol will be less costly at commercial scale than arginine as a drug product excipient.

Sorbitol: Sorbitol was selected as the tonicity modifying agent as it is more inert and less expensive relative to an amino acid such as arginine. Maximum potency of sorbitol on FDA's inactive ingredient database for subcutaneous injection is 4.7% and 4.0% is required to achieve target osmolarity in the preferred formulation, which is within this range.

Osmolarity: An osmolality of about 300 mOsm/kg is recommended to maintain isotonicity. Since osmolality can be adjusted with sorbitol while staying within the approved drug precedent for sorbitol potency, we will target 300 mOsm/kg.

TABLE 2A

Summary of Formulation of Invention

| Parameter | Selection (Formulation 1) | Precedent (approved drugs) | | |
|---|---|---|---|---|
| Buffer | Acetate 10 mM | Sodium acetate: 0.35% potency[1] | | |
| pH | 4.5 or 4.7 | Cimzia (PEGylated): | pH 4.7 | 1.0 mL dose volume |
| | | Neulasta (PEGylated): | pH 4.0 | 0.6 mL dose volume |

TABLE 2A-continued

Summary of Formulation of Invention

| Parameter | Selection (Formulation 1) | Precedent (approved drugs) | | |
|---|---|---|---|---|
| | | Neupogen: | pH 4.0 | 0.6-1.0 mL dose volume |
| | | Imitrex: | pH 4.2-5.3 | 0.5 mL dose volume |
| | | Lantus (insulin analog): | pH 4.0 | 1.0 mL dose volume |
| | | Glucagon: | pH 2.0-2.8 | 1.0 mL dose |
| Methionine | 30 mM (0.45%) | 0.3% potency[1] | | |
| Sorbitol | 230 mM (4.0%) | 4.7% potency[1] | | |
| Osmolarity | 300 mOsm/kg | Recommended as isotonic | | |

[1] FDA Inactive ingredient database

Extrapolated Stability: By extrapolation off of preliminary accelerated stability data from DOE testing, the liquid formulation should be stable (<5% degradation of API) for 2 years when stored at 2-8° C.

Formulations: The preferred formulations are listed in Table 2B

Formulation 2: Identical formulation to Formulation 1 but pH 4.7.

Formulation 3: Substitute sorbitol (230 mM) for arginine (100 mM) in formulation 1. Resulting osmolarity will be slightly lower (290 mOsm/kg). This formulation demonstrates if there are any long term stability improvements with the presence of arginine in the formulation.

TABLE 2B

Formulations of Invention

| Parameter | Formulation 1 | Formulation 2 | Formulation 3 |
|---|---|---|---|
| Buffer | Acetate | Acetate | Acetate |
| pH | 4.5 | 4.7 | 4.5 |
| Methionine | 30 mM | 30 mM | 30 mM |
| Arginine | — | — | 100 mM |
| Sorbitol | 230 mM | 230 mM | — |
| Osmolarity | 300 mOsm/kg | 300 mOsm/kg | 290 mOsm/kg |

Example 5: Physical and Chemical Stability of PEGylated OXM Peptide Analog

A panel of analytical techniques was used to evaluate the physical and chemical stability of OPK-88003 peptide (Formula 3) including: appearance, pH, SEC-HPLC, RP-HPLC, DLS, HIAC, MFI, osmolality, and viscosity. Based on the obtained results, the following formulation conditions are optimal for OPK-88003 (Formula 3) at 70 mg/mL:10 mM acetate buffer with 30-35 mM Methionine, pH 4.5. No effect on OPK-88003 stability was observed in presence of sorbitol and, therefore, it is recommended to be used as a tonicity agent.

The pre-formulation development studies were performed to establish a formulation composition that would provide physical and chemical stability, is non-irritating, does not adsorb to glass, and has suitable viscosity for use in a pre-filled syringe or autoinjector to the OPK-88003 PEGylated Oxyntomodulin Analog having formula 3. The concentration of OPK-88003 peptide was 70 mg/mL in all tested formulations.

Abbreviations and Definitions

| Abbreviation/Term | Definition |
|---|---|
| B | Buffer |
| DLS | Dynamic Light Scattering |
| DOE | Design of Experiments |
| F | Formulation |
| F/T | Freeze-Thaw |
| HPLC | High Performance Liquid Chromatography |
| MFI | Micro-Flow Imaging |
| PDI | Polydispersity Index |
| PS-20 | Polysorbate 20 |
| PS-80 | Polysorbate 80 |
| P/N | Part Number |
| PVDF | Polyvinylidene Fluoride |
| RH | Relative Humidity |
| RP | Reverse Phase |
| SEC | Size Exclusion Chromatography |
| TFA | Trifluoroacetic acid |

Materials and Equipment

Materials

OPK-88003 PEGylated Oxyntomodulin Analog.
0.45 m Millex-HV PVDF filters, Millipore, P/N SLGV013SL
3 mL Norm-Ject silicone oil-free syringes, Fisher P/N 14-817-27
10 mL Norm-Ject silicone oil-free syringes, Fisher P/N 14-817-30
Acetic Acid, Glacial, Fisher, P/N A491-212
Citric Acid, anhydrous, J. T. Baker, P/N 0127-05
Filter, 0.2 m PES membrane, Thermo Scientific, P/N 597-4520
L-Histidine, Sigma, P/N H6034-100G
Hydrochloric Acid, 6 N solution, J. T. Baker, P/N 5619-02
L-Arginine Hydrochloride, J. T. Baker, P/N 2067-06
L-Cysteine Hydrochloride, Thermo Scientific, P/N 44889
L-Methionine, Sigma, P/N M9625-100G
Malvern Zetasizer Nano ZS
Poloxamer 188, Spectrum Chemical, P/N P1169
PS-20, Sigma, P/N P7949-100ML
PS-80, J. T. Baker, P/N 4500-04
Sodium Acetate, anhydrous, Sigma, P/N S1429-1KG
Sodium Chloride, Fisher, P/N S271-500
Sodium Chloride, J. T. Baker, P/N 3627-05
Sodium Hydroxide, 6 N solution, J. T. Baker, P/N 5672-02
Sorbitol, Sigma, P/N 85529-1KG
Sucrose, J. T. Baker, P/N 4005-05

Trisodium Citrate, Dihydrate, Sigma, P/N S1804-500G

Equipment

Agilent 1100 or 1200 HPLC System

Brookfield DV-III Ultra Programmable Rheometer

ProteinSimple Micro-Flow Imaging Microscope, DPA 5200 with Bot1

Environmental Specialist ES 2000 Reach-In Chambers

Liquid Particle Counter, HIAC Model 9703

Malvern Zetasizer Nano ZS

Mettler Toledo SevenMulti pH Meter

Vapro Vapor Pressure Osmometer, Model 5600

Methods pH pH was tested according to GTM-0015, "Determination of pH," using a calibrated SevenMulti pH Meter.

Appearance

Appearance testing was performed according to GTM-0033, "Appearance by Visual Evaluation".

Dynamic Light Scattering

Dynamic light scattering was performed using at least 80 µL of undiluted sample in an optical-quality plastic cuvette. Five consecutive measurements were acquired for each sample at 25° C. with at least 3 minutes of equilibration at the beginning of each scan. The Protein Analysis algorithm (Malvern Zetasizer software) was used as a model for data processing. The Z-average hydrodynamic diameter was calculated from a cumulants analysis and the Stokes-Einstein equation, using the viscosity of water (0.8872 mPa-s) at 25° C. The polydispersity index was obtained from the same cumulants analysis. Modality of fit is evaluated based on plots of size distribution versus intensity and modality can be described as monomodal (i.e. one peak) or multimodal (i.e. two or more peaks).

HIAC

Concentration of particles was measured by Liquid Particle Counting System, HIAC model 9703/9703+, following the testing parameters outlined in USP <788>, testing for Particulate Matter in Injections. Injections of 0.2 mL using a 1 mL syringe with a small sample size probe were made. The number of particles (2-25 m size) was reported as a value per 1 mL of protein solution (cumulative counts/mL).

Reverse Phase Chromatography

Reverse Phase chromatography was utilized to measure purity and related substances of OPK-88003 according to method PRD-P80101-LNCM. This procedure is a gradient reversed-phased HPLC method with UV detection at 214 nm designed to determine the identity, quantity and related substances of OPK-88003 in the drug product. It uses a Zorbax 300 Å SB-C18 column. The mobile phase consists of 0.1% volume/volume trifluoroacetic acid in water (mobile phase A) and 0.1% volume/volume triluoroacetic acid in acetonitrile (mobile phase B). This method determines identity by retention time match of the main peak or co-elution with the reference standard, quantity by comparative determination of OPK-88003 main peak area relative to a reference standard, and purity and impurities/related substances as a total area percent. The procedure is stability indicating as judged by its ability to resolve known impurities from OPK-88003 and demonstrated by the analysis of stressed samples.

Size-Exclusion Chromatography

Monomer Purity and Related Substances were measured by SEC (method PRD-P80102-LNCM).

This procedure is a size-exclusion HPLC method with UV detection at 214 nm designed to determine the monomer purity and related substances of OPK-88003 in the drug product. It uses a Sepax Zenix SEC-300 column The mobile phase consists of 60 mM potassium phosphate, 250 mM sodium chloride, 20% ACN at pH7.0. This method determines monomer purity and impurities/related substances as a total area percent. The procedure is stability indicating as judged by its ability to resolve known impurities from OPK-88003 and demonstrated by the analysis of stressed samples.

MFI

Micro-Flow Imaging experiments were performed using an MFI 5200 with Automated Pipet System to characterize the size, concentration, and morphology of particles present in OPK-88003 samples. Samples were prepared in a laminar flow hood, with triple-rinsed barrier pipet tips to minimize contamination. The analyses were performed with single measurements using 700 or 1000 µL of neat sample, depending on the amount of sample available. The operations and respective liquids used for MFI testing are listed in Table 3A below:

TABLE 3A

| Step # | Operation | Liquid | Well | Volume (mL) | Flow rate (mL/min) |
|---|---|---|---|---|---|
| 1 | Flushing | 1x PBS | 6:A1 | 0.9 | 6 |
| 2 | Flushing | 1x PBS | 6:A1 | 0.9 | 6 |
| 3 | Flushing | 5% PCC | 4:A1 | 0.9 | 0.5 |
| 4 | Flushing | 5% PCC | 4:A1 | 0.9 | 6 |
| 5 | Flushing | 1x PBS | 6:A1 | 0.9 | 6 |
| 6 | Flushing | 1x PBS | 6:A1 | 0.9 | 6 |
| 7 | Dry System | — | — | — | — |
| 8 | Flushing | 1x PBS | 6:A1 | 0.9 | 6 |
| 9 | Optimize Illumination | 1x PBS | 6:A1 | 0.22 | — |
| 10 | Baseline | 1x PBS | 6:A1 | 0.9 | — |
| 11 | Stirring (3 cycles, speed 2) | Sample 1 | 5:A1 | 0.7 | — |
| 12 | Flushing | 1X PBS | 6:A1 | 0.9 | 6 |
| 13 | Optimize Illumination | Sample 1 | 5:A1 | 0.22 | — |
| 14 | Analysis | Sample 1 | 5:A1 | 0.7 | — |

The analysis operation parameters used in the method (step #14) are as shown in Table 3B:

TABLE 3B

| Method Parameter | Setting |
|---|---|
| Sample volume in well (mL) | 1.0 |
| Total volume available (mL) | 0.7 |
| Purge volume (mL) | 0.1 |
| Analyzed Volume (mL) | 0.51 |
| Edge Particle rejection | Yes |
| Equivalent Circular Diameter (µm) | 1-100 |

Cumulative counts per mL for ≥2 µm, ≥5 µm, ≥10 µm and ≥25 µm sized particles were processed from the raw data collected for 1-100 µm sized particles. Additionally, ≥5 µm sized particles with an aspect ratio (AR) of 0.85 were processed using morphological categorization parameters within the MFI software (MVAS). These morphologically categorized data represent highly circular particles, which are considered to be non-proteinaceous, typically either air bubbles or silicone oil droplets. Proteinaceous particles are typically non-circular, amorphous and thus have low aspect ratios according to the MFI software. These morphologically categorized circular and non-circular data groups are used to determine the circular fraction. The calculated circular fraction is determined by the following equation:

$$\text{Circular fraction} = \frac{\text{Cumulative counts/mL} \geq 5\ \mu m,\ AR \geq 0.85}{\text{Cumative counts/mL} \geq 5\ \mu m}$$

The calculated circular fraction thus provides a ratio of the non-proteinaceous particles to proteinaceous particles found in each test sample. A low circular fraction value indicates that the test article is comprised of mostly non-circular, likely proteinaceous particles.

were analyzed in triplicate using 10 μL of sample for each measurement and the average value was reported.

Viscosity

The viscosity of the OPK-88003 sample was measured by Brookfield DV-III Ultra Programmable Rheometer following method GTM-0614. Prior to sample measurements, viscometer performance was verified using a certified viscosity standard. Following the standard measurement, 600 μL of OPK-88003 sample was loaded into the viscometer. The viscosity measurements were performed at multiple percentage torque values to evaluate Newtonian or non-Newtonian properties.

A summary of formulations used for buffer and pH screening, F14/F15 Additional study, excipient screening, and surfactant screening studies is provided in Table 4.

TABLE 4

Summary of Formulations used for Buffer and pH Screening, F14/F15 Additional Study, Excipient Screening, and Surfactant Screening Studies

| Formulation Code | Formulation Composition | Study |
|---|---|---|
| F1 | 70 mg/mL API, 10 mM Acetate, pH 4.0 (measured pH was 4.9) | Buffer and |
| F2 | 70 mg/mL API, 10 mM Acetate, pH 4.5 (measured pH was 5.2) | pH |
| F3 | 70 mg/mL API, 10 mM Acetate, pH 5.0 (measured pH was 5.9) | Screening |
| F4 | 70 mg/mL API, 10 mM Citrate, pH 5.0 (measured pH was 5.8) | Study |
| F5 | 70 mg/mL API, 10 mM Citrate, pH 5.5 (measured pH was 6.3) | |
| F6 | 70 mg/mL API, 10 mM Citrate, pH 6.0 (measured pH was 6.9) | |
| F7 | 70 mg/mL API, 10 mM Histidine, pH 6.0 (measured pH was 6.2) | |
| F8 | 70 mg/mL API, 10 mM Histidine, pH 6.5 (measured pH was 6.7) | |
| F9 | 70 mg/mL API, 10 mM Acetate, 100 mM NaCl, pH 4.5 (measured pH was 5.3) | |
| F10 | 70 mg/mL API, 10 mM Citrate, 100 mM NaCl, pH 5.5 (measured pH was 6.6) | |
| F11 | 70 mg/mL API, 10 mM Histidine, 100 mM NaCl, pH 6.5 (measured pH was 6.6) | |
| F12 | 70 mg/mL API, 10 mM Acetate, pH 4.7 | |
| F13 | 70 mg/mL API, 10 mM Acetate, pH 4.5 | |
| F14 | 70 mg/mL API, 10 mM Acetate, 100 mM NaCl, pH 4.7 | |
| F15 | 70 mg/mL API, 10 mM Citrate, 20 mg/mL Mannitol, 5 mg/mL Sucrose, pH 5.5 | |
| F16 | 70 mg/mL API, 10 mM Acetate, pH 4.5 | Excipient |
| F17 | 70 mg/mL API, 10 mM Acetate, 150 mM Arginine, pH 4.5 | Screening |
| F18 | 70 mg/mL API, 10 mM Acetate, 250 mM Methionine, pH 4.5 | Study[1] |
| F19 | 70 mg/mL API, 10 mM Acetate, 250 mM Sorbitol, pH 4.5 | |
| F20 | 70 mg/mL API, 10 mM Acetate, 250 mM sucrose, pH 4.5 | |
| F21 | 70 mg/mL API, 10 mM Acetate, pH 5.0 | |
| F22 | 70 mg/mL API, 10 mM Acetate, 150 mM Arginine, pH 5.0 | |
| F23 | 70 mg/mL API, 10 mM Acetate, 250 mM Methionine, pH 5.0 | |
| F24 | 70 mg/mL API, 10 mM Acetate, 250 mM Sorbitol, pH 5.0 | |
| F25 | 70 mg/mL API, 10 mM Acetate, 250 mM sucrose, pH 5.0 | |
| F26 | 70 mg/mL API, 10 mM Citrate, pH 5.5 | |
| F27 | 70 mg/mL API, 10 mM Citrate, 150 mM Arginine, pH 5.5 | |
| F28 | 70 mg/mL API, 10 mM Citrate, 250 mM Methionine, pH 5.5 | |
| F29 | 70 mg/mL API, 10 mM Citrate, 250 mM Sorbitol, pH 5.5 | |
| F30 | 70 mg/mL API, 10 mM Citrate, 250 mM sucrose, pH 5.5 | |
| F31 | 70 mg/mL API, 10 mM Acetate, 0.1% PS-80, pH 5.0 | Surfactant |
| F32 | 70 mg/mL API, 10 mM Acetate, 0.1% PS-20, pH 5.0 | Screening |
| F33 | 70 mg/mL API, 10 mM Acetate, 0.1% Poloxamer 188, pH 5.0 | Study |
| F34 | 70 mg/mL API, 10 mM Citrate, 0.1% PS-80, pH 5.5 | |
| F35 | 70 mg/mL API, 10 mM Citrate, 0.1% PS-20, pH 5.5 | |
| F36 | 70 mg/mL API, 10 mM Citrate, 0.1% Poloxamer 188, pH 5.5 | |
| F37 | 70 mg/mL API, 10 mM Acetate, 250 mM Sorbitol, 0.1% PS-80, pH 5.0 | |

[1]F21, F24 and F26 were used in the surfactant screening study also.

Osmolality

The osmolality of the OPK-88003 formulations was measured by Vapro Vapor Pressure Osmometer carried out according to a dew point temperature depression method (GTM-0614). Note that due to the higher viscosity of samples, osmolality was measured by dew point temperature depression method rather than freezing point depression method. The osmometer was calibrated using a series of standard solutions prior to sample measurements. Samples Example 5A: Buffer and pH Screening Study Thirteen buffer types (F1-F13) were evaluated to assess the effect of pH over the range of approximately 4.0 to 6.5 and buffer type (acetate, citrate, and histidine were compared) on the chemical stability of OPK-88003 (Formula 3) (Table 5). Also, the effect of 100 mM NaCl was evaluated in formulations F9, F1, and F11. In addition, formulations F14 and F15 were prepared and tested as a part of the pH and buffer type preformulation development study (Table 5).

TABLE 5

| Formulation Code | Formulation Composition |
|---|---|
| F1 | 70 mg/mL API, 10 mM acetate, pH 4.0 (measured pH was 4.9) |
| F2 | 70 mg/mL API, 10 mM acetate, pH 4.5 (measured pH was 5.2) |
| F3 | 70 mg/mL API, 10 mM acetate, pH 5.0 (measured pH was 5.9) |
| F4 | 70 mg/mL API, 10 mM citrate, pH 5.0 (measured pH was 5.8) |
| F5 | 70 mg/mL API, 10 mM citrate, pH 5.5 (measured pH was 6.3) |
| F6 | 70 mg/mL API, 10 mM citrate, pH 6.0 (measured pH was 6.9) |
| F7 | 70 mg/mL API, 10 mM histidine, pH 6.0 (measured pH was 6.2) |
| F8 | 70 mg/mL API, 10 mM histidine, pH 6.5 (measured pH was 6.7) |
| F9 | 70 mg/mL API, 10 mM acetate, 100 mM NaCl, pH 4.5 (measured pH was 5.3) |
| F10 | 70 mg/mL API, 10 mM citrate, 100 mM NaCl, pH 5.5 (measured pH was 6.6) |
| F11 | 70 mg/mL API, 10 mM histidine, 100 mM NaCl, pH 6.5 (measured pH was 6.6) |
| F12 | 70 mg/mL API, 10 mM acetate, pH 4.7 |
| F13 | 70 mg/mL API, 10 mM acetate, pH 4.5 |
| F14 | 70 mg/mL API, 10 mM acetate, 100 mM NaCl, pH 4.7 |
| F15 | 70 mg/mL API, 10 mM citrate, 20 mg/mL mannitol, 5 mg/mL sucrose, pH 5.5 |

After formulation solution preparations were made, the initial pH was determined. It was observed after preparation that OPK-88003 API dissolved at the concentration of 70 mg/mL in the formulation buffers increased the solution pH. The effect was especially pronounced for formulations with acetate and citrate buffers where pH was increased by ~0.7-0.9 unit, compared to target pH (Table 6). Therefore, two additional formulations were prepared (F12 and F13) where pH was adjusted with acetic acid to the target value. Based on the increased pH effect observed, all subsequent formulations were prepared by dissolving OPK-88003 (Formula 3) API in formulation buffer at pH of 0.5-unit lower than the target pH. The pH was also adjusted to the target pH with appropriate base or acid if the measured pH was outside the target value.

Two aliquots of each prepared formulation (F1 to F13) were stored, prior to testing, for 6 days at the following conditions: 5±3° C., 25±2° C., and 40±2° C. After incubation, the pH was measured from one 5±3° C. aliquot of each formulation. One aliquot each from the 25±2° C. and 40±2° C. conditions was analyzed by DLS and RP-HPLC. In addition, formulations F12 and F13 stored at 5±3° C. were tested by RP-HPLC.

There were no significant changes in pH values for any of the samples between the initially measured pH and for sample pH measured after 6 days storage at 5±3° C. (Table 6).

TABLE 6

Summary of pH Results Obtained in Buffer and pH and Excipient Screening Studies

| Formulation Code | Target pH | Measured pH (Initial) | Measured pH (Day 6 at 5° C.) |
|---|---|---|---|
| F1 | 4.0 | 4.90 | 4.88 |
| F2 | 4.5 | 5.23 | 5.23 |
| F3 | 5.0 | 5.89 | 5.91 |
| F4 | 5.0 | 5.77 | 5.78 |
| F5 | 5.5 | 6.31 | 6.30 |
| F6 | 6.0 | 6.88 | 6.89 |
| F7 | 6.0 | 6.21 | 6.23 |
| F8 | 6.5 | 6.72 | 6.76 |
| F9 | 4.5 | 5.32 | 5.33 |
| F10 | 5.5 | 6.62 | 6.63 |
| F11 | 6.5 | 6.61 | 6.62 |
| F12 | 4.7 | 4.70 | 4.76 |
| F13 | 4.5 | 4.52 | 4.46 |

| Formulation Code | Target pH | pH (Initial) | Measured pH (Day 23)[1] |
|---|---|---|---|
| F14 | 4.7 | 4.74 | 4.81 |
| F15 | 5.5 | 5.52 | 5.55 |

| Formulation Code | Target pH | pH (Initial) | Measured pH (2 Weeks, 5° C.) |
|---|---|---|---|
| F16 | 4.5 | 4.57 | 4.22 |
| F17 | 4.5 | 4.47 | 4.42 |
| F18 | 4.5 | 4.45 | 4.41 |
| F19 | 4.5 | 4.50 | 4.56 |
| F20 | 4.5 | 4.49 | 4.44 |
| F21 | 5.0 | 5.06 | 5.01 |
| F22 | 5.0 | 5.02 | 4.94 |
| F23 | 5.0 | 5.06 | 5.04 |
| F24 | 5.0 | 5.05 | 4.94 |
| F25 | 5.0 | 4.97 | 4.93 |
| F26 | 5.5 | 5.56 | 5.54 |
| F27 | 5.5 | 5.42 | 5.39 |
| F28 | 5.5 | 5.52 | 5.47 |
| F29 | 5.5 | 5.46 | 5.37 |
| F30 | 5.5 | 5.48 | 5.40 |

[1]Samples were tested after 6 days storage at −75 ± 10° C. and 17 days at 5 ± 3° C.

The particle distribution of OPK-88003 solutions was investigated by DLS. In DLS testing, formulations were compared with respect to Z-average diameter and PDI. The DLS results indicated multimodal size distribution with high polydispersity for all tested OPK-88003 samples (Table 7).

TABLE 7

Summary of DLS results obtained in Buffer and pH Study

| Formulation Code | Condition | Peak 1 Size (nm) | Peak 1 Width (nm) | Z-Average (d · nm) | PDI | Modality |
|---|---|---|---|---|---|---|
| F1 | 25° C. | 5.0 | 0.6 | 61.71 | 0.50 | Multimodal |
| F2 | 25° C. | 5.2 | 0.6 | 42.69 | 0.41 | Multimodal |
| F3 | 25° C. | 5.4 | 0.7 | 48.65 | 0.43 | Multimodal |
| F4 | 25° C. | 5.6 | 0.8 | 48.57 | 0.33 | Multimodal |
| F5 | 25° C. | 5.8 | 0.7 | 86.73 | 0.44 | Multimodal |
| F6 | 25° C. | 5.8 | 0.8 | 93.94 | 0.40 | Multimodal |
| F7 | 25° C. | 5.5 | 0.7 | 109.50 | 0.52 | Multimodal |
| F8 | 25° C. | 5.3 | 0.7 | 43.14 | 0.38 | Multimodal |
| F9 | 25° C. | 5.7 | 0.8 | 18.58 | 0.25 | Multimodal |
| F10 | 25° C. | 5.9 | 0.9 | 29.52 | 0.28 | Multimodal |
| F11 | 25° C. | 6.0 | 0.6 | 77.55 | 0.43 | Multimodal |
| F12 | 25° C. | 5.0 | 0.4 | 99.73 | 0.64 | Multimodal |
| F13 | 25° C. | 4.9 | 0.7 | 28.82 | 0.43 | Multimodal |
| F1 | 40° C. | 5.1 | 0.4 | 52.81 | 0.51 | Multimodal |
| F2 | 40° C. | 5.3 | 0.4 | 55.45 | 0.44 | Multimodal |
| F3 | 40° C. | 5.4 | 0.4 | 43.73 | 0.42 | Multimodal |
| F4 | 40° C. | 5.5 | 0.7 | 22.85 | 0.28 | Multimodal |
| F5 | 40° C. | 5.6 | 0.5 | 32.90 | 0.30 | Multimodal |
| F6 | 40° C. | 5.7 | 0.6 | 55.88 | 0.37 | Multimodal |
| F7 | 40° C. | 5.4 | 0.5 | 26.67 | 0.35 | Multimodal |
| F8 | 40° C. | 5.4 | 0.6 | 42.96 | 0.37 | Multimodal |
| F9 | 40° C. | 5.9 | 0.5 | 50.95 | 0.37 | Multimodal |
| F10 | 40° C. | 5.9 | 0.6 | 50.68 | 0.36 | Multimodal |
| F11 | 40° C. | 5.7 | 0.6 | 42.13 | 0.35 | Multimodal |
| F12 | 40° C. | 4.9 | 0.6 | 41.19 | 0.42 | Multimodal |
| F13 | 40° C. | 5.0 | 0.5 | 44.13 | 0.47 | Multimodal |

No correlation in PDI between the tested concentrations was observed. A high attenuator index for all tested samples showed low intensity of scattered light suggesting low concentration of particles in the tested samples.

Samples were tested by RP-HPLC after incubation at 5±3° C. (F12 and F13 samples only), 25±2° C., and 40±2° C. for 6 days and the results are summarized in Table 8.

TABLE 8

RP-HPLC Results for Buffer and pH Study

| Formulation Code | Condition | % Front Peak Impurities | % Main Peak | % Back Peak Impurities | % Total Impurities |
|---|---|---|---|---|---|
| F1 | 25° C. | 2.6 | 94.1 | 3.3 | 5.9 |
| F2 | 25° C. | 2.6 | 94.2 | 3.2 | 5.8 |
| F3 | 25° C. | 2.6 | 94.1 | 3.2 | 5.9 |
| F4 | 25° C. | 2.8 | 94.1 | 3.1 | 5.9 |
| F5 | 25° C. | 3.0 | 93.6 | 3.4 | 6.4 |
| F6 | 25° C. | 3.4 | 92.9 | 3.6 | 7.1 |
| F7 | 25° C. | 3.0 | 93.6 | 3.4 | 6.4 |
| F8 | 25° C. | 3.0 | 93.4 | 3.6 | 6.6 |
| F9 | 25° C. | 2.8 | 93.9 | 3.3 | 6.1 |
| F10 | 25° C. | 3.3 | 93.2 | 3.5 | 6.8 |
| F11 | 25° C. | 3.6 | 92.7 | 3.7 | 7.3 |
| F1 | 40° C. | 2.7 | 93.8 | 3.4 | 6.2 |
| F2 | 40° C. | 2.9 | 93.7 | 3.4 | 6.3 |
| F3 | 40° C. | 3.1 | 93.3 | 3.6 | 6.7 |
| F4 | 40° C. | 3.0 | 93.6 | 3.4 | 6.4 |
| F5 | 40° C. | 3.7 | 92.3 | 4.0 | 7.7 |
| F6 | 40° C. | 4.6 | 90.9 | 4.5 | 9.1 |
| F7 | 40° C. | 4.1 | 92.3 | 3.7 | 7.7 |
| F8 | 40° C. | 4.3 | 92.0 | 3.7 | 8.0 |
| F9 | 40° C. | 3.4 | 93.0 | 3.6 | 7.0 |
| F10 | 40° C. | 4.0 | 92.1 | 3.9 | 7.9 |
| F11 | 40° C. | 4.9 | 90.7 | 4.4 | 9.3 |
| F12 | 5° C. | 2.2 | 94.2 | 3.6 | 5.8 |
| F13 | 5° C. | 2.2 | 94.4 | 3.4 | 5.6 |
| F12 | 25° C. | 2.3 | 94.1 | 3.6 | 5.9 |
| F13 | 25° C. | 2.3 | 94.2 | 3.5 | 5.8 |
| F12 | 40° C. | 2.5 | 93.5 | 4.0 | 6.5 |
| F13 | 40° C. | 2.7 | 93.3 | 4.0 | 6.7 |

A slight but progressive trend of increased impurities was observed as sample pH increased. The accumulation of impurities was observed for samples stored at both 25±2° C. and 40±2° C. temperatures. No significant differences in impurities concentration were observed between different buffer types with similar pH. The presence of NaCl increased the level of impurities in all tested formulations compared to those without NaCl, thus, showing negative effects on OPK-88003 stability. No significant differences in impurities concentration were observed between formulation F12 and F13 stored at 5±3° C. Based on the RP-HPLC results the optimum stability for OPK-88003 was observed in the pH range of ≅4.5-5.9.

An additional study was performed for two formulations (F14 and F15) in Buffer and pH Screening. Initial control (stored at −75±10° C. for 2 weeks), 5±3° C. control (2 weeks), freeze-thaw (3 cycles) and 40±2° C. (2 weeks with 1 freeze-thaw before testing) samples were tested using the following methods: pH, RP-HPLC, DLS, HIAC, and MFI.

The pH was measured in control samples (F14 and F15) stored at −75° C. for 6 days and at 5±3° C. for 17 days. There were no significant changes in pH values observed between initial and aged samples for both formulations (Table 6).

The results for samples tested by RP-HPLC for the conditions and time points described above are summarized in Table 9 below. The most significant changes in concentration total impurities were observed for samples stored at 40±2° C. compared to the −75° C.±10° C. and 5±3° C. controls and freeze-thaw stress samples. The accumulation of total impurities in samples stored at 40° C.±2° C. was slightly higher in formulation F14. This result is in good agreement with the results obtained for formulations F9, F10, and F11 (all containing 100 mM NaCl) in which elevated levels of total impurities were observed.

The particle distribution in formulations F14 and F15 was investigated by DLS. Similarly, to results obtained for formulations F1-F13, the low intensity of detected scattered light suggested low concentration of particles in the tested samples. The DLS results indicated multimodal size distribution with high polydispersity for all tested OPK-88003 samples (Table 10).

The number and size of sub-visible particles were measured by HIAC and MFI. No significant differences in particle counts were observed for F14 and F15 formulations stored at −75° C.±10° C. and 5±3° C. control samples (Table 11).

A slight increase in particle count was observed for both formulations subjected to freeze-thaw stress. The highest particle count increase was observed for samples stored at 40±2° C. and for formulation F15 the increase was observed at all particle sizes. In contrast to HIAC no clear trends for increased particles were observed by MFI for both F14 and F15 formulations (Table 12). Based on the RP-HPLC results the buffers with pH range of 4.5-5.9, but especially around pH 4.5, exhibited the most positive effect on OPK-88003 stability. The presence of NaCl in tested formulations increased the accumulation of total impurities and, therefore, was not tested any further in the preformulation development studies.

TABLE 9

RP-HPLC Results for F14 and F15 (Additional Study)

| Formulation Code | Time Point/Condition | % Front Peak Impurities | % Main Peak | % Back Peak Impurities | % Total Impurities |
|---|---|---|---|---|---|
| F14 | T = 0 | 2.7 | 94.0 | 3.3 | 6.0 |
|  | 3X F/T | 2.7 | 94.1 | 3.3 | 5.9 |
|  | 2 week/5° C. | 2.5 | 94.1 | 3.4 | 5.9 |
|  | 2 week/40° C. | 3.5 | 91.9 | 4.6 | 8.1 |
| F15 | T = 0 | 2.7 | 94.1 | 3.2 | 5.9 |
|  | 3X F/T | 2.3 | 94.6 | 3.1 | 5.4 |
|  | 2 week/5° C. | 2.4 | 94.3 | 3.2 | 5.7 |
|  | 2 week/40° C. | 3.5 | 92.5 | 4.1 | 7.5 |

TABLE 10

Summary of DLS Results obtained in F14 and F15 Study (Additional Study)

| | | Results | | | | |
|---|---|---|---|---|---|---|
| Formulation Code | Condition | Peak 1 Size (nm) | Peak 1 Width (nm) | Z-Average (d · nm) | PDI | Modality |
| F14 | Control | 5.8 | 0.8 | 40.1 | 0.33 | Multimodal |
|  | 5° C., 2 weeks | 5.8 | 0.8 | 81.7 | 0.41 | Multimodal |
|  | F/T, 3 cycles | 5.7 | 0.7 | 36.8 | 0.32 | Multimodal |
|  | 40° C., 2 weeks | 5.7 | 0.6 | 102.7 | 0.59 | Multimodal |
| F15 | Control | 6.1 | 0.8 | 124.4 | 0.57 | Multimodal |
|  | 5° C., 2 weeks | 6.0 | 1.0 | 108.9 | 0.49 | Multimodal |
|  | F/T, 3 cycles | 6.1 | 0.9 | 189.7 | 0.59 | Multimodal |
|  | 40° C., 2 weeks | 5.9 | 0.9 | 72.6 | 0.50 | Multimodal |

TABLE 11

HIAC Results for F14, F15 and F39 Formulations

| Formulation Code | Time Point/ Condition | Results (Counts/mL) | | | | |
|---|---|---|---|---|---|---|
| | | ≥2 μm | ≥5 μm | ≥10 μm | ≥25 μm | 2-10 μm |
| F14 | −75° C. | 418 | 48 | 10 | 0 | 417 |
| | 3× F/T | 610 | 88 | 23 | 0 | 588 |
| | 40° C. | 1258 | 138 | 10 | 0 | 1248 |
| | 5° C. | 740 | 80 | 10 | 0 | 730 |
| F15 | −75° C. | 468 | 48 | 8 | 3 | 460 |
| | 3× F/T | 585 | 90 | 13 | 0 | 573 |
| | 40° C. | 1013 | 153 | 23 | 15 | 990 |
| | 5° C. | 470 | 65 | 13 | 0 | 458 |
| F39 | Initial | 368 | 50 | 3 | 0 | 365 |
| | 4 Week/25 ± 2° C. | 1583 | 258 | 63 | 21 | 1520 |

TABLE 12

MFI Results for F14, F15 and F39 Formulations

| Formulation Code | Time Point/ Condition | Results (Counts/mL) | | | | | |
|---|---|---|---|---|---|---|---|
| | | ≥2 μm | ≥5 μm | ≥10 μm | ≥25 μm | AR ≥ 0.85, ≥5 μm | Circular Fraction |
| F14 | −75° C. | 713 | 202 | 74 | 8 | 29 | 0.15 |
| | 3× F/T | 3268 | 423 | 75 | 8 | 146 | 0.34 |
| | 40° C. | 4998 | 743 | 110 | 16 | 239 | 0.32 |
| | 5° C. | 5524 | 957 | 164 | 14 | 219 | 0.23 |
| F15 | −75° C. | 1338 | 103 | 18 | 3 | 40 | 0.39 |
| | 3× F/T | 3188 | 343 | 61 | 16 | 228 | 0.67 |
| | 40° C. | 7704 | 1442 | 442 | 93 | 390 | 0.27 |
| | 5° C. | 5400 | 1663 | 625 | 120 | 125 | 0.08 |
| F39 | T = 0 | 2099 | 471 | 121 | 19 | 34 | 0.07 |
| | 4 week/ 25 ± 2° C. | 3403 | 569 | 191 | 34 | 90 | 0.16 |

The above results demonstrate the that the preferred pH range is between 4.5 and 5.9 with most preferred around 4.5 and that the presence of sodium chloride has a negative effect in terms of the accumulation of total impurities.

Example 5B: Excipients Screening Study

Based on the results of the Buffer and pH Screening Study 15 formulations (F16-F30) were evaluated to assess the effect of four different excipients (arginine, methionine, sorbitol or sucrose) in two buffers (acetate and citrate) on the stability of OPK-88003 (Table 13).

TABLE 13

| Formulation | Composition |
|---|---|
| F16 | 70 mg/mL API, 10 mM acetate, pH 4.5 |
| F17 | 70 mg/mL API, 10 mM acetate, 150 mM arginine, pH 4.5 |
| F18 | 70 mg/mL API, 10 mM acetate, 250 mM methionine, pH 4.5 |
| F19 | 70 mg/mL API, 10 mM acetate, 250 mM sorbitol, pH 4.5 |
| F20 | 70 mg/mL API, 10 mM acetate, 250 mM sucrose, pH 4.5 |
| F21 | 70 mg/mL API, 10 mM acetate, pH 5.0 |
| F22 | 70 mg/mL API, 10 mM acetate, 150 mM arginine, pH 5.0 |
| F23 | 70 mg/mL API, 10 mM acetate, 250 mM methionine, pH 5.0 |
| F24 | 70 mg/mL API, 10 mM acetate, 250 mM sorbitol, pH 5.0 |
| F25 | 70 mg/mL API, 10 mM acetate, 250 mM sucrose, pH 5.0 |
| F26 | 70 mg/mL API, 10 mM citrate, pH 5.5 |
| F27 | 70 mg/mL API, 10 mM citrate, 150 mM arginine, pH 5.5 |
| F28 | 70 mg/mL API, 10 mM citrate, 250 mM methionine, pH 5.5 |
| F29 | 70 mg/mL API, 10 mM citrate, 250 mM sorbitol, pH 5.5 |
| F30 | 70 mg/mL API, 10 mM citrate, 250 mM sucrose, pH 5.5 |

All four excipients were tested in acetate buffer at pH 4.5 and 5.0 and citrate buffer at pH 5.5. Three formulations (F16, F21, and F26) without excipient were tested as controls. All formulations prepared according to protocol TD06315 were divided into 3 aliquots and incubated at the following temperatures: 5±3° C., 40±2° C., 50° C. After incubation for 2 weeks, the pH was measured from the 5±3° C. aliquot of each formulation. Samples stored at 5±3° C., 40±2° C. and 50° C. were tested by RP-HPLC and DLS. Viscosity was only performed for 5±3° C. samples that contained sorbitol or sucrose (F19, F20, F24, F25, F29 and F30).

There were no significant changes in pH observed between initial samples and stored at 5±3° C. for 2 weeks. The only exception was formulation F16 that changed from pH 4.57 to pH 4.22 (about 0.4 units) (Table 6). A similar formulation (F1) with measured pH 4.90 and stored 5±3° C. for 6 days, and all other excipient screening formulations did not show similar changes and, therefore, the observed difference is due to the method variability rather than real changes in the pH.

The stability of OPK-88003 was determined by RP-HPLC chromatography. Samples were tested for the conditions and time point described above and the results are summarized in Table 14. The lowest accumulation of OPK-88003 impurities was observed in acetate buffer containing methionine or arginine at pH 4.5 and subjected to 40±2° C. and at pH 4.5 and 5.0 subjected to 50° C., compared to corresponding control formulations stored at the same temperatures. A slight beneficial effect of the presence of methionine on OPK-88003 stability was also observed in all formulations stored at 5±3° C. The presence of sorbitol or sucrose did not exhibit clear protective effect on OPK-88003 stability in any of tested formulations subjected to 40±2° C. and 50° C. A slight difference in the accumulation of OPK-88003 degradants was observed in relation to pH or buffer type. In general, the concentration of total impurities in acetate buffers at pH 4.5 and 5.0 and subjected to 40±2° C. was lower compared to citrate buffers at pH 5.5 This trend, however, was not observed for samples stored at 50° C.

The particle distribution was investigated by DLS. Similarly, to results obtained in Buffer and pH Screening Study, the low intensity of detected scattered light suggests low concentration of particles in the tested samples. The DLS results indicated multimodal size distribution with high polydispersity for all tested OPK-88003 samples (Table 15).

The viscosity measurements were collected at a constant temperature of 22° C. at variable shear rates then averaged) (Table 16). A comparable viscosity (range 20.1-22.6 cP) was measured for acetate buffers containing sorbitol or sucrose (F19, F20, F24 and F25) at pH 4.5 and 5.0. A significantly higher viscosity was observed for citrate buffer containing sorbitol or sucrose (F29 and F30) at pH 5.5, of 30.9 and 29.1 cP, respectively. This shows that viscosity in the tested formulations is pH or, more probable, buffer type dependent. Tables 14-16 shows the results of the studies of various excipients on the formulations and, based upon this data, methionine was chosen as the preferred excipient along with sorbitol and with the preferred buffer an acetate buffer with a pH at around 4.5.

TABLE 14

RP-HPLC Results for Excipient Screening Study

| Formulation Code | Condition | % Front Peak Impurities | % Main Peak | % Back Peak Impurities | % Total Impurities |
|---|---|---|---|---|---|
| F16 | 5° C. | 2.0 | 94.8 | 3.2 | 5.2 |
| F17 | 5° C. | 2.1 | 94.8 | 3.1 | 5.2 |
| F18 | 5° C. | 1.9 | 95.1 | 2.9 | 4.9 |
| F19 | 5° C. | 2.6 | 94.1 | 3.3 | 5.9 |
| F20 | 5° C. | 2.5 | 94.1 | 3.3 | 5.9 |
| F21 | 5° C. | 2.4 | 94.2 | 3.4 | 5.8 |
| F22 | 5° C. | 2.5 | 94.3 | 3.2 | 5.7 |
| F23 | 5° C. | 2.2 | 94.6 | 3.1 | 5.4 |
| F24 | 5° C. | 2.4 | 94.3 | 3.3 | 5.7 |
| F25 | 5° C. | 2.3 | 94.5 | 3.2 | 5.5 |
| F26 | 5° C. | 2.4 | 94.2 | 3.4 | 5.8 |
| F27 | 5° C. | 2.4 | 94.4 | 3.2 | 5.6 |
| F28 | 5° C. | 2.2 | 94.5 | 3.3 | 5.5 |
| F29 | 5° C. | 2.4 | 94.4 | 3.2 | 5.6 |
| F30 | 5° C. | 2.6 | 94.1 | 3.4 | 5.9 |
| F16 | 40° C. | 3.3 | 93.0 | 3.7 | 7.0 |
| F17 | 40° C. | 3.2 | 93.5 | 3.4 | 6.5 |
| F18 | 40° C. | 2.7 | 94.1 | 3.2 | 5.9 |
| F19 | 40° C. | 3.0 | 92.9 | 4.1 | 7.1 |
| F20 | 40° C. | 3.2 | 92.9 | 4.0 | 7.1 |
| F21 | 40° C. | 2.7 | 93.3 | 4.0 | 6.7 |
| F22 | 40° C. | 3.0 | 93.6 | 3.5 | 6.4 |
| F23 | 40° C. | 3.1 | 93.3 | 3.6 | 6.7 |
| F24 | 40° C. | 3.0 | 92.9 | 4.1 | 7.1 |
| F25 | 40° C. | 2.9 | 93.1 | 4.0 | 6.9 |
| F26 | 40° C. | 3.5 | 92.5 | 4.1 | 7.5 |
| F27 | 40° C. | 3.6 | 92.7 | 3.6 | 7.3 |
| F28 | 40° C. | 3.6 | 92.6 | 3.8 | 7.4 |
| F29 | 40° C. | 2.9 | 93.0 | 4.1 | 7.0 |
| F30 | 40° C. | 3.1 | 92.8 | 4.1 | 7.2 |
| F16 | 50° C. | 6.5 | 88.5 | 5.1 | 11.6 |
| F17 | 50° C. | 5.8 | 89.6 | 4.6 | 10.4 |
| F18 | 50° C. | 4.8 | 91.4 | 3.8 | 8.6 |
| F19 | 50° C. | 5.8 | 88.0 | 6.2 | 12.0 |
| F20 | 50° C. | 6.5 | 87.7 | 5.8 | 12.3 |
| F21 | 50° C. | 5.7 | 87.9 | 6.5 | 12.1 |
| F22 | 50° C. | 5.7 | 89.0 | 5.2 | 11.0 |
| F23 | 50° C. | 6.5 | 88.9 | 4.5 | 11.1 |
| F24 | 50° C. | 5.5 | 87.8 | 6.7 | 12.2 |
| F25 | 50° C. | 5.0 | 88.7 | 6.2 | 11.3 |
| F26 | 50° C. | 4.7 | 88.9 | 6.4 | 11.1 |
| F27 | 50° C. | 6.1 | 89.0 | 4.8 | 11.0 |
| F28 | 50° C. | 6.4 | 88.5 | 5.1 | 11.5 |
| F29 | 50° C. | 4.6 | 89.0 | 6.4 | 11.0 |
| F30 | 50° C. | 4.7 | 88.9 | 6.3 | 11.1 |

TABLE 15

Summary of DLS Results obtained in Excipient Screening Study

| Formulation Code | Condition | Peak 1 Size (nm) | Peak 1 Width (nm) | Z-Average (d · nm) | PDI | Modality |
|---|---|---|---|---|---|---|
| F16 | 5 ± 3° C. | 5.0 | 0.6 | 61.76 | 0.51 | Multimodal |
| F17 | 5 ± 3° C. | 6.0 | 0.8 | 35.64 | 0.33 | Multimodal |
| F18 | 5 ± 3° C. | 5.9 | 0.9 | 84.35 | 0.64 | Multimodal |
| F19 | 5 ± 3° C. | 6.2 | 0.8 | 45.60 | 0.48 | Multimodal |
| F20 | 5 ± 3° C. | 6.8 | 1.0 | 57.36 | 0.48 | Multimodal |
| F21 | 5 ± 3° C. | 5.6 | 0.4 | 179.60 | 0.70 | Multimodal |
| F22 | 5 ± 3° C. | 6.1 | 0.8 | 300.30 | 0.53 | Multimodal |
| F23 | 5 ± 3° C. | 6.1 | 0.8 | 60.09 | 0.51 | Multimodal |
| F24 | 5 ± 3° C. | 6.3 | 0.9 | 47.39 | 0.44 | Multimodal |
| F25 | 5 ± 3° C. | 7.1 | 1.1 | 58.77 | 0.46 | Multimodal |
| F26 | 5 ± 3° C. | 5.7 | 0.7 | 55.98 | 0.36 | Multimodal |
| F27 | 5 ± 3° C. | 6.2 | 1.3 | 18.36 | 0.26 | Multimodal |
| F28 | 5 ± 3° C. | 6.5 | 1.1 | 31.52 | 0.29 | Multimodal |
| F29 | 5 ± 3° C. | 6.6 | 0.9 | 43.84 | 0.30 | Multimodal |
| F30 | 5 ± 3° C. | 7.6 | 1.1 | 48.64 | 0.33 | Multimodal |
| F16 | 40 ± 2° C. | 5.1 | 0.4 | 49.06 | 0.47 | Multimodal |
| F17 | 40 ± 2° C. | 5.9 | 0.9 | 35.58 | 0.36 | Multimodal |
| F18 | 40 ± 2° C. | 1738.0 | 191.9 | 836.00 | 0.98 | Multimodal |
| F19 | 40 ± 2° C. | 6.3 | 0.8 | 150.40 | 0.70 | Multimodal |
| F20 | 40 ± 2° C. | 6.9 | 0.8 | 308.70 | 0.74 | Multimodal |
| F21 | 40 ± 2° C. | 5.6 | 0.4 | 147.10 | 0.68 | Multimodal |
| F22 | 40 ± 2° C. | 6.3 | 0.6 | 102.10 | 0.56 | Multimodal |
| F23 | 40 ± 2° C. | 5.9 | 0.8 | 62.63 | 0.53 | Multimodal |
| F24 | 40 ± 2° C. | 6.1 | 0.9 | 50.93 | 0.47 | Multimodal |
| F25 | 40 ± 2° C. | 7.2 | 1.0 | 81.18 | 0.51 | Multimodal |
| F26 | 40 ± 2° C. | 5.8 | 0.4 | 84.92 | 0.45 | Multimodal |
| F27 | 40 ± 2° C. | 6.9 | 0.7 | 214.10 | 0.61 | Multimodal |
| F28 | 40 ± 2° C. | 6.4 | 1.0 | 77.74 | 0.49 | Multimodal |
| F29 | 40 ± 2° C. | 6.5 | 1.0 | 63.84 | 0.38 | Multimodal |
| F30 | 40 ± 2° C. | 7.5 | 1.2 | 55.70 | 0.34 | Multimodal |
| F16 | 50° C. | 4.9 | 0.7 | 34.17 | 0.40 | Multimodal |
| F17 | 50° C. | 5.8 | 0.7 | 59.79 | 0.42 | Multimodal |
| F18 | 50° C. | 5.4 | 0.2 | 617.80 | 0.97 | Multimodal |
| F19 | 50° C. | 6.0 | 0.7 | 75.99 | 0.52 | Multimodal |
| F20 | 50° C. | 6.6 | 1.0 | 67.19 | 0.53 | Multimodal |
| F21 | 50° C. | 5.0 | 0.7 | 45.05 | 0.42 | Multimodal |
| F22 | 50° C. | 6.1 | 0.6 | 115.00 | 0.57 | Multimodal |
| F23 | 50° C. | 5.8 | 0.8 | 158.70 | 0.56 | Multimodal |
| F24 | 50° C. | 2379.0 | 372.9 | 1211.00 | 1.00 | Multimodal |
| F25 | 50° C. | 6.9 | 1.2 | 74.15 | 0.52 | Multimodal |
| F26 | 50° C. | 5.3 | 0.8 | 39.03 | 0.32 | Multimodal |
| F27 | 50° C. | 6.0 | 1.1 | 35.68 | 0.33 | Multimodal |
| F28 | 50° C. | 6.4 | 0.9 | 112.40 | 0.54 | Multimodal |
| F29 | 50° C. | 6.5 | 0.9 | 93.28 | 0.43 | Multimodal |
| F30 | 50° C. | 7.8 | 1.0 | 134.20 | 0.52 | Multimodal |

TABLE 16

Viscosity Results for Excipient Screening Study and F39 Formulation

| Formulation Code | RPM | Shear Rate ($s^{-1}$) | Torque (%) | Viscosity (cP) | Shear Stress ($s^{-1}$) | Viscosity Average (cP) |
|---|---|---|---|---|---|---|
| F19 | 5 | 37.5 | 34.6 | 21.2 | 8.0 | 21.4 |
|  | 10 | 75.0 | 69.6 | 21.3 | 16.0 |  |
|  | 12 | 90.0 | 84.1 | 21.5 | 19.3 |  |
|  | 14 | 105.0 | 98.0 | 21.5 | 22.5 |  |
| F20 | 5 | 37.5 | 32.8 | 20.0 | 7.5 | 20.1 |
|  | 10 | 75.0 | 65.5 | 20.0 | 15.0 |  |
|  | 12 | 90.0 | 78.5 | 20.1 | 18.0 |  |
|  | 14 | 105.0 | 92.0 | 20.1 | 21.1 |  |
| F24 | 5 | 37.5 | 35.6 | 21.8 | 8.2 | 21.8 |
|  | 10 | 75.0 | 71.0 | 21.8 | 16.3 |  |
|  | 12 | 90.0 | 85.2 | 21.8 | 19.6 |  |
|  | 14 | 105.0 | 99.5 | 21.8 | 22.9 |  |
| F25 | 5 | 37.5 | 36.7 | 22.5 | 8.4 | 22.6 |
|  | 10 | 75.0 | 73.5 | 22.6 | 16.9 |  |
|  | 12 | 90.0 | 88.3 | 22.6 | 20.3 |  |
|  | 13 | 97.5 | 96.7 | 22.8 | 22.2 |  |
| F29 | 4 | 30.0 | 40.3 | 30.9 | 9.3 | 30.9 |
|  | 5 | 37.5 | 51.5 | 31.3 | 11.7 |  |
|  | 7 | 52.5 | 71.2 | 30.9 | 16.1 |  |
|  | 9 | 67.5 | 89.9 | 30.5 | 20.7 |  |
| F30 | 4 | 30.0 | 37.6 | 28.8 | 8.6 | 29.1 |
|  | 5 | 37.5 | 48.8 | 30.3 | 11.4 |  |
|  | 7 | 52.5 | 65.4 | 28.6 | 15.0 |  |
|  | 9 | 67.5 | 83.9 | 28.6 | 19.3 |  |
| $F_{DOE}39$ | 5 | 37.5 | 30.9 | 18.9 | 7.1 | 18.8 |
|  | 10 | 75.0 | 61.3 | 18.8 | 14.1 |  |
|  | 12 | 90.0 | 73.5 | 18.7 | 16.9 |  |
|  | 14 | 105.0 | 85.7 | 18.8 | 19.7 |  |

Example 5C: Surfactant Screening Study

The protective effect of non-ionic surfactants on OPK-88003 stability was evaluated for PS-20, PS-80, and Poloxamer 188 in temperature stress, freeze-thaw, and agitation studies. Two buffers, acetate at pH 5.0 and citrate at pH 5.5 with 0.1% of each surfactant were tested. Two corresponding buffers without surfactant (F21 and F26) were used as controls. In addition, two formulations (F24 and F37) were prepared to evaluate the effect of 0.1% PS-80 on OPK-88003 stability in acetate buffer at pH 5.0 containing 250 mM sorbitol. A total of ten formulations (F21-F37) were screened in surfactant screening study (Table 17).

TABLE 17

| Formulation Code | Formulation Composition |
|---|---|
| F21 | 70 mg/mL API, 10 mM Acetate, pH 5.0 |
| F24 | 70 mg/mL API, 10 mM Acetate, 250 mM Sorbitol, pH 5.0 |
| F26 | 70 mg/mL API, 10 mM Citrate, pH 5.5 |
| F31 | 70 mg/mL API, 10 mM Acetate, 0.1% PS-80, pH 5.0 |
| F32 | 70 mg/mL API, 10 mM Acetate, 0.1% PS-20, pH 5.0 |
| F33 | 70 mg/mL API, 10 mM Acetate, 0.1% Poloxamer 188, pH 5.0 |
| F34 | 70 mg/mL API, 10 mM Citrate, 0.1% PS-80, pH 5.5 |
| F35 | 70 mg/mL API, 10 mM Citrate, 0.1% PS-20, pH 5.5 |
| F36 | 70 mg/mL API, 10 mM Citrate, 0.1% Poloxamer 188, pH 5.5 |
| F37 | 70 mg/mL API, 10 mM Acetate, 250 mM Sorbitol, 0.1% PS-80, pH 5.0 |

The samples were prepared (F21, F24, F26, and F31-F37) by mixing the various excipients. In the temperature stress study, samples were stored at 50° C. for one week. Corresponding controls were stored at 5±3° C. for the same period. In the agitation study, samples were agitated for ≈50 hours (50 rpm, at room temperature). Corresponding controls with no agitation were stored proximate at room temperature. In the freeze-thaw study, samples were subjected to three fast freeze-thaw cycles. Vials were frozen for at least overnight at 75±10° C. The samples were thawed by placing vials on the lab bench at room temperature for at least two hours. Vials were refrozen and the freezing procedure was repeated for a total of three times. The stressed and control samples were analyzed by visual inspection (appearance), SEC-HPLC, and DLS methods. RP-HPLC analysis was performed only for samples stored at 50° C.

In performed studies, all stressed samples remained unchanged in terms of color, clarity, and particle content in comparison to the control samples.

No significant changes in % total impurities were detected by SEC-HPLC for the freeze-thaw and agitated samples compared to the corresponding controls for both acetate and citrate buffers. Similarly, no beneficial effect of any of the tested surfactants on OPK-88003 stability was observed for stressed samples compared to the corresponding controls without surfactant. Percent areas of the total impurities were nearly identical for all tested samples (Tables 18 and 19).

In the DLS study a low intensity of scattered light was detected for all tested samples, which suggests low concentration of particles. The DLS results indicated multimodal size distribution with high polydispersity for all tested OPK-88003 samples (Table 20).

The RP-HPLC results obtained for samples stored at 50° C. are summarized in Table 21. No beneficial effect of any of the tested surfactants was observed for stressed samples compared to the corresponding controls without surfactant (i.e., F21, F24, F26), for both, acetate and citrate buffers. The determined % total impurities were comparable for all tested samples (7.2 to 8.2%).

In conclusion, no beneficial effect of any of the tested surfactants on OPK-88003 stability was observed in performed temperature stress, freeze-thaw, and agitation studies.

TABLE 18

SEC Results for Surfactant Screening Study-Temperature Stress

| Formulation Code | Condition | % Aggregate 2 | % Aggregate 1 | % Aggregate Impurities | % Main Peak | % Post-monomer Impurities | % Total Impurities | % Impurity Increase compared to control |
|---|---|---|---|---|---|---|---|---|
| F21 | 5° C. Control | 2.5 | 1.9 | 4.4 | 93.9 | 1.7 | 6.1 | N/A |
| F24 | 5° C. Control | 2.5 | 1.9 | 4.4 | 93.9 | 1.7 | 6.1 | N/A |
| F26 | 5° C. Control | 2.5 | 1.9 | 4.4 | 94.4 | 1.2 | 5.6 | N/A |
| F31 | 5° C. Control | 2.5 | 1.9 | 4.3 | 94.3 | 1.4 | 5.7 | N/A |
| F32 | 5° C. Control | 2.5 | 1.9 | 4.4 | 94.2 | 1.4 | 5.8 | N/A |
| F33 | 5° C. Control | 2.5 | 1.9 | 4.4 | 94.2 | 1.4 | 5.8 | N/A |
| F34 | 5° C. Control | 2.5 | 1.9 | 4.3 | 94.4 | 1.3 | 5.6 | N/A |
| F35 | 5° C. Control | 2.5 | 1.9 | 4.4 | 94.3 | 1.3 | 5.7 | N/A |
| F36 | 5° C. Control | 2.5 | 1.9 | 4.4 | 94.2 | 1.4 | 5.8 | N/A |
| F37 | 5° C. Control | 2.5 | 1.9 | 4.4 | 94.2 | 1.4 | 5.8 | N/A |
| F21 | F/T 3 Cycles | 2.4 | 1.9 | 4.4 | 94.1 | 1.5 | 5.9 | −0.2 |
| F24 | F/T 3 Cycles | 2.5 | 1.9 | 4.4 | 94.0 | 1.6 | 6.1 | −0.1 |
| F26 | F/T 3 Cycles | 2.4 | 1.9 | 4.4 | 94.2 | 1.4 | 5.8 | 0.2 |
| F31 | F/T 3 Cycles | 2.4 | 1.9 | 4.3 | 94.1 | 1.6 | 5.9 | 0.2 |
| F32 | F/T 3 Cycles | 2.5 | 1.9 | 4.4 | 94.2 | 1.5 | 5.8 | 0.1 |
| F33 | F/T 3 Cycles | 2.5 | 1.9 | 4.4 | 94.2 | 1.5 | 5.8 | 0.0 |
| F34 | F/T 3 Cycles | 2.5 | 1.9 | 4.3 | 94.3 | 1.4 | 5.7 | 0.1 |
| F35 | F/T 3 Cycles | 2.5 | 1.9 | 4.4 | 94.2 | 1.4 | 5.8 | 0.1 |
| F36 | F/T 3 Cycles | 2.5 | 1.9 | 4.3 | 94.3 | 1.4 | 5.7 | −0.1 |
| F37 | F/T 3 Cycles | 2.5 | 1.9 | 4.4 | 94.0 | 1.6 | 6.0 | 0.2 |
| F21 | 50° C. | 2.5 | 2.9 | 5.4 | 92.6 | 2.0 | 7.4 | 1.3 |
| F24 | 50° C. | 2.5 | 2.9 | 5.3 | 92.6 | 2.1 | 7.4 | 1.3 |
| F26 | 50° C. | 2.5 | 2.9 | 5.4 | 92.5 | 2.1 | 7.5 | 2.0 |
| F31 | 50° C. | 2.6 | 3.1 | 5.7 | 92.4 | 1.9 | 7.6 | 1.9 |
| F32 | 50° C. | 2.5 | 2.9 | 5.5 | 92.5 | 2.1 | 7.5 | 1.8 |
| F33 | 50° C. | 2.5 | 2.8 | 5.3 | 92.7 | 2.0 | 7.3 | 1.5 |

TABLE 18-continued

SEC Results for Surfactant Screening Study-Temperature Stress

| Formulation Code | Condition | % Aggregate 2 | % Aggregate 1 | % Aggregate Impurities | % Main Peak | % Post-monomer Impurities | % Total Impurities | % Impurity Increase compared to control |
|---|---|---|---|---|---|---|---|---|
| F34 | 50° C. | 2.5 | 2.9 | 5.5 | 92.5 | 2.0 | 7.5 | 1.8 |
| F35 | 50° C. | 2.5 | 2.9 | 5.4 | 92.4 | 2.3 | 7.6 | 2.0 |
| F36 | 50° C. | 2.5 | 2.8 | 5.3 | 92.6 | 2.1 | 7.4 | 1.6 |
| F37 | 50° C. | 2.7 | 3.0 | 5.7 | 92.2 | 2.2 | 7.8 | 2.0 |

TABLE 19

SEC Results for Surfactant Screening Study-Agitation

| Formulation Code | Condition | % Aggregate 2 | % Aggregate 1 | % Aggregate Impurities | % Main Peak | % Post-monomer Impurities | % Total Impurities | % Impurity Increase due to Agitation |
|---|---|---|---|---|---|---|---|---|
| F21 | Ag. Control | 2.5 | 1.9 | 4.4 | 94.2 | 1.4 | 5.8 | N/A |
| F24 | Ag. Control | 2.5 | 1.9 | 4.4 | 94.1 | 1.5 | 5.9 | N/A |
| F26 | Ag. Control | 2.5 | 1.9 | 4.4 | 94.4 | 1.2 | 5.6 | N/A |
| F31 | Ag. Control | 2.5 | 1.9 | 4.4 | 94.4 | 1.2 | 5.6 | N/A |
| F32 | Ag. Control | 2.5 | 1.9 | 4.4 | 94.1 | 1.5 | 5.9 | N/A |
| F33 | Ag. Control | 2.5 | 1.9 | 4.4 | 94.2 | 1.4 | 5.8 | N/A |
| F34 | Ag. Control | 2.5 | 1.8 | 4.4 | 94.4 | 1.3 | 5.6 | N/A |
| F35 | Ag. Control | 2.5 | 1.9 | 4.4 | 94.3 | 1.3 | 5.7 | N/A |
| F36 | Ag. Control | 2.5 | 1.9 | 4.4 | 94.3 | 1.3 | 5.7 | N/A |
| F37 | Ag. Control | 2.5 | 1.9 | 4.4 | 94.2 | 1.4 | 5.8 | N/A |
| F21 | Agitation 50 h | 2.5 | 1.9 | 4.4 | 94.1 | 1.5 | 5.9 | 0.1 |
| F24 | Agitation 50 h | 2.5 | 1.9 | 4.4 | 94.1 | 1.5 | 5.9 | 0.0 |
| F26 | Agitation 50 h | 2.5 | 1.9 | 4.4 | 94.3 | 1.4 | 5.7 | 0.2 |
| F31 | Agitation 50 h | 2.5 | 1.9 | 4.4 | 94.1 | 1.5 | 5.9 | 0.3 |
| F32 | Agitation 50 h | 2.4 | 1.9 | 4.4 | 94.0 | 1.6 | 6.0 | 0.0 |
| F33 | Agitation 50 h | 2.4 | 1.9 | 4.4 | 94.2 | 1.4 | 5.8 | 0.0 |
| F34 | Agitation 50 h | 2.5 | 1.9 | 4.4 | 94.4 | 1.3 | 5.6 | 0.0 |
| F35 | Agitation 50 h | 2.5 | 1.9 | 4.4 | 94.2 | 1.5 | 5.8 | 0.1 |
| F36 | Agitation 50 h | 2.5 | 1.9 | 4.4 | 94.3 | 1.3 | 5.7 | 0.0 |
| F37[1] | Agitation 50 h | 2.5 | 1.9 | 4.4 | 94.1 | 1.5 | 5.9 | 0.1 |

[1]Only one replicate result reported due to elevated baseline of one preparation result.

TABLE 20

DLS Results for Surfactant Screening Study

| Formulation Code | Condition | Peak 1 Size (nm) | Peak 1 Width (nm) | Z-Average (nm) | PDI | Modality |
|---|---|---|---|---|---|---|
| F21 | 5° C. Control | 5.5 | 0.5 | 113.80 | 0.60 | Multimodal |
| F24 | 5° C. Control | 6.3 | 0.9 | 91.28 | 0.49 | Multimodal |
| F26 | 5° C. Control | 5.6 | 0.5 | 47.08 | 0.32 | Multimodal |
| F31 | 5° C. Control | 5.3 | 0.5 | 41.96 | 0.34 | Multimodal |
| F32 | 5° C. Control | 5.8 | 0.5 | 56.26 | 0.31 | Multimodal |
| F33 | 5° C. Control | 5.4 | 0.4 | 86.31 | 0.55 | Multimodal |
| F34 | 5° C. Control | 5.9 | 0.5 | 70.28 | 0.32 | Multimodal |
| F35 | 5° C. Control | 5.4 | 0.7 | 47.99 | 0.23 | Multimodal |
| F36 | 5° C. Control | 5.6 | 0.5 | 79.70 | 0.32 | Multimodal |
| F37 | 5° C. Control | 6.2 | 1.0 | 15.90 | 0.30 | Multimodal |
| F21 | F/T 3 cycles | 5.1 | 0.4 | 50.56 | 0.40 | Multimodal |
| F24 | F/T 3 cycles | 6.2 | 1.0 | 39.74 | 0.37 | Multimodal |
| F26 | F/T 3 cycles | 5.4 | 0.7 | 17.88 | 0.21 | Multimodal |
| F31 | F/T 3 cycles | 5.0 | 0.6 | 9.87 | 0.30 | Multimodal |
| F32 | F/T 3 cycles | 5.0 | 0.4 | 239.90 | 0.41 | Multimodal |
| F33 | F/T 3 cycles | 5.3 | 0.4 | 73.78 | 0.47 | Multimodal |
| F34 | F/T 3 cycles | 6.4 | 0.6 | 53.62 | 0.32 | Multimodal |
| F35 | F/T 3 cycles | 5.4 | 0.7 | 97.21 | 0.22 | Multimodal |
| F36 | F/T 3 cycles | 5.6 | 0.6 | 37.28 | 0.27 | Multimodal |
| F37 | F/T 3 cycles | 6.4 | 0.8 | 66.70 | 0.35 | Multimodal |
| F21 | Agitation | 5.0 | 0.7 | 78.79 | 0.50 | Multimodal |
| F24 | Agitation | 6.3 | 0.8 | 73.58 | 0.52 | Multimodal |
| F26 | Agitation | 5.7 | 0.6 | 95.71 | 0.41 | Multimodal |
| F31 | Agitation | 5.2 | 0.4 | 149.80 | 0.36 | Multimodal |
| F32 | Agitation | 5.1 | 0.8 | 23.57 | 0.19 | Multimodal |
| F33 | Agitation | 5.1 | 0.6 | 117.10 | 0.53 | Multimodal |
| F34 | Agitation | 5.5 | 0.7 | 8.27 | 0.30 | Multimodal |
| F35 | Agitation | 5.9 | 0.7 | 37.77 | 0.16 | Multimodal |
| F36 | Agitation | 5.7 | 0.6 | 102.80 | 0.43 | Multimodal |
| F37 | Agitation | 6.8 | 0.7 | 119.20 | 0.46 | Multimodal |
| F21 | Agitation 50 h | 5.2 | 0.4 | 356.20 | 0.75 | Multimodal |
| F24 | Agitation 50 h | 6.3 | 0.9 | 58.54 | 0.40 | Multimodal |
| F26 | Agitation 50 h | 5.5 | 1.0 | 12.69 | 0.18 | Multimodal |
| F31 | Agitation 50 h | 5.1 | 0.8 | 11.98 | 0.29 | Multimodal |
| F32 | Agitation 50 h | 5.4 | 1.0 | 28.11 | 0.19 | Multimodal |
| F33 | Agitation 50 h | 5.1 | 0.7 | 30.29 | 0.30 | Multimodal |
| F34 | Agitation 50 h | 5.6 | 0.9 | 7.72 | 0.37 | Multimodal |
| F35 | Agitation 50 h | 5.6 | 1.1 | 5.85 | 0.23 | Multimodal |
| F36 | Agitation 50 h | 6.4 | 0.5 | 66.39 | 0.34 | Multimodal |
| F37 | Agitation 50 h | 6.3 | 1.0 | 11.52 | 0.30 | Multimodal |
| F21 | 50° C. | 5.1 | 0.4 | 81.43 | 0.49 | Multimodal |
| F24 | 50° C. | 6.2 | 0.8 | 101.90 | 0.66 | Multimodal |
| F26 | 50° C. | 5.2 | 0.6 | 21.85 | 0.24 | Multimodal |
| F31 | 50° C. | 5.6 | 0.5 | 34.28 | 0.32 | Multimodal |
| F32 | 50° C. | 6.6 | 0.6 | 45.67 | 0.24 | Multimodal |
| F33 | 50° C. | 5.1 | 0.4 | 78.75 | 0.46 | Multimodal |

TABLE 20-continued

DLS Results for Surfactant Screening Study

| Formulation Code | Condition | Peak 1 Size (nm) | Peak 1 Width (nm) | Z-Average (nm) | PDI | Modality |
|---|---|---|---|---|---|---|
| F34 | 50° C. | 5.7 | 0.5 | 48.95 | 0.28 | Multimodal |
| F35 | 50° C. | 5.9 | 1.3 | 17.93 | 0.20 | Multimodal |
| F36 | 50° C. | 5.3 | 0.9 | 10.73 | 0.17 | Multimodal |
| F37 | 50° C. | 6.3 | 1.1 | 9.78 | 0.35 | Multimodal |

TABLE 21

RP-HPLC Results for Surfactant Screening Study

| Formulation Code | Condition | % Front Peak Impurities | % Main Peak | % Back Peak Impurities | % Total Impurities |
|---|---|---|---|---|---|
| F21 | 50° C. | 3.5 | 92.2 | 4.3 | 7.8 |
| F24 | 50° C. | 3.3 | 92.5 | 4.2 | 7.5 |
| F26 | 50° C. | 3.5 | 92.1 | 4.5 | 7.9 |
| F31 | 50° C. | 3.5 | 92.0 | 4.5 | 8.0 |
| F32 | 50° C. | 3.3 | 92.5 | 4.3 | 7.5 |
| F33 | 50° C. | 3.1 | 92.8 | 4.1 | 7.2 |
| F34 | 50° C. | 3.8 | 91.8 | 4.4 | 8.2 |
| F35 | 50° C. | 3.5 | 92.2 | 4.3 | 7.8 |
| F36 | 50° C. | 3.4 | 92.4 | 4.2 | 7.6 |
| F37 | 50° C. | 3.4 | 92.1 | 4.5 | 7.9 |

Example 5D: Design of Experiment Study and Additional Formulations Testing

Based upon the results obtained from buffer and pH, excipients, and surfactant screening studies, design components were selected to be evaluated in a DOE study. The design components included pH, methionine, arginine and sorbitol were evaluated in acetate buffer with OPK-88003 concentration of 70 mg/mL. A total of 36 formulations ($F_{DOE}1$-$F_{DOE}36$) were evaluated (Table 22). In addition, three formulations ($F_{DOE}37$, $F_{DOE}38$ and $F_{DOE}39$) were prepared to evaluate the effect of cysteine, 20 mM concentration acetate buffer and different concentrations of methionine and arginine than those selected for the DOE study. The results obtained for these formulations were not included for the statistical analysis. The designed center point formulation ($F_{DOE}20$: 70 mg/mL OPK-88003, 25 mM methionine, 65 mM arginine, 95 mM sorbitol, pH 4.7) was prepared and tested in triplicate.

TABLE 22

Summary of Formulations used for Design of Experiment Studies

| Formulation Code | API Conc. (mg/mL) | Methionine (mM) | Arginine (mM) | Sorbitol (mM) | pH |
|---|---|---|---|---|---|
| $F_{DOE}1$ | 70 | 0 | 0 | 250 | 4.5 |
| $F_{DOE}2$ | 70 | 0 | 65 | 120 | 4.5 |
| $F_{DOE}3$ | 70 | 0 | 125 | 0 | 4.5 |
| $F_{DOE}4$ | 70 | 12.5 | 0 | 237.5 | 4.5 |
| $F_{DOE}5$ | 70 | 12.5 | 65 | 107.5 | 4.5 |
| $F_{DOE}6$ | 70 | 12.5 | 125 | 0 | 4.5 |
| $F_{DOE}7$ | 70 | 25 | 0 | 225 | 4.5 |
| $F_{DOE}8$ | 70 | 25 | 65 | 95 | 4.5 |
| $F_{DOE}9$ | 70 | 25 | 125 | 0 | 4.5 |
| $F_{DOE}10$ | 70 | 50 | 0 | 200 | 4.5 |
| $F_{DOE}11$ | 70 | 50 | 65 | 70 | 4.5 |
| $F_{DOE}12$ | 70 | 50 | 125 | 0 | 4.5 |
| $F_{DOE}13$ | 70 | 0 | 0 | 250 | 4.7 |
| $F_{DOE}14$ | 70 | 0 | 65 | 120 | 4.7 |
| $F_{DOE}15$ | 70 | 0 | 125 | 0 | 4.7 |
| $F_{DOE}16$ | 70 | 12.5 | 0 | 237.5 | 4.7 |
| $F_{DOE}17$ | 70 | 12.5 | 65 | 107.5 | 4.7 |
| $F_{DOE}18$ | 70 | 12.5 | 125 | 0 | 4.7 |
| $F_{DOE}19$ | 70 | 25 | 0 | 225 | 4.7 |
| $F_{DOE}20$ [1] | 70 | 25 | 65 | 95 | 4.7 |
| $F_{DOE}21$ | 70 | 25 | 125 | 0 | 4.7 |
| $F_{DOE}22$ | 70 | 50 | 0 | 200 | 4.7 |
| $F_{DOE}23$ | 70 | 50 | 65 | 70 | 4.7 |
| $F_{DOE}24$ | 70 | 50 | 125 | 0 | 4.7 |
| $F_{DOE}25$ | 70 | 0 | 0 | 250 | 4.9 |
| $F_{DOE}26$ | 70 | 0 | 65 | 120 | 4.9 |
| $F_{DOE}27$ | 70 | 0 | 125 | 0 | 4.9 |
| $F_{DOE}28$ | 70 | 12.5 | 0 | 237.5 | 4.9 |
| $F_{DOE}29$ | 70 | 12.5 | 65 | 107.5 | 4.9 |
| $F_{DOE}30$ | 70 | 12.5 | 125 | 0 | 4.9 |
| $F_{DOE}31$ | 70 | 25 | 0 | 225 | 4.9 |
| $F_{DOE}32$ | 70 | 25 | 65 | 95 | 4.9 |
| $F_{DOE}33$ | 70 | 25 | 125 | 0 | 4.9 |
| $F_{DOE}34$ | 70 | 50 | 0 | 200 | 4.9 |
| $F_{DOE}35$ | 70 | 50 | 65 | 70 | 4.9 |
| $F_{DOE}36$ | 70 | 50 | 125 | 0 | 4.9 |
| $F_{DOE}37$ [2] | 70 | 25 | 75 | 75 | 4.7 |
| $F_{DOE}38$ [3] | 70 | 0 | 0 | 225 | 4.7 |
| $F_{DOE}39$ | 70 | 30 | 100 | 0 | 4.7 |

[1] Center point prepared in triplicate
[2] Formulated with 20 mM Acetate buffer
[3] Formulated with 25 mM Cysteine The DOE samples were placed under non-stressed (5±3° C.) and stressed (40±2° C./75%±5 RH) conditions for four weeks prior to analysis. Statistical optimizations were performed that resulted in the selection of candidate formulations for OPK-88003 product. In addition to the DOE formulations, three additional formulations ($F_{DOE}37$, $F_{DOE}38$, and $F_{DOE}39$) were prepared and tested concurrently with the DOE samples. The results obtained for these formulations were not included for statistical analysis.

All initial sample aliquots were tested by pH, RP-HPLC, and SE-HPLC. Aliquots of each formulation were incubated for 4 weeks at 5±3° C. and 40±2° C. and then tested by pH, RP-HPLC, and SE-HPLC methods. Osmolality was measured for the initial $F_{DOE}20$ (center point) samples only (Table 26). In addition, for formulation F39 the viscosity was measured at the initial time point) and HIAC) and MFI analyses were performed at the initial time point and after sample storage at 25±2° C. for 4 weeks There were no significant changes in pH values observed for the DOE formulation samples (including F37 and F38 samples) after storage at 5±3° C. and 40±2° C. for 4 weeks when compared to the initial samples (Table 23). There were no significant changes in pH values observed for the F39 sample after storage at 5±3° C., 25±2° C. and 40±2° C. for 4 weeks when compared to the initial sample (Table 23). The highest difference of 0.15 unit was observed between initial F38 samples when stored at 5±3° C. for 4 weeks.

Figure 6:
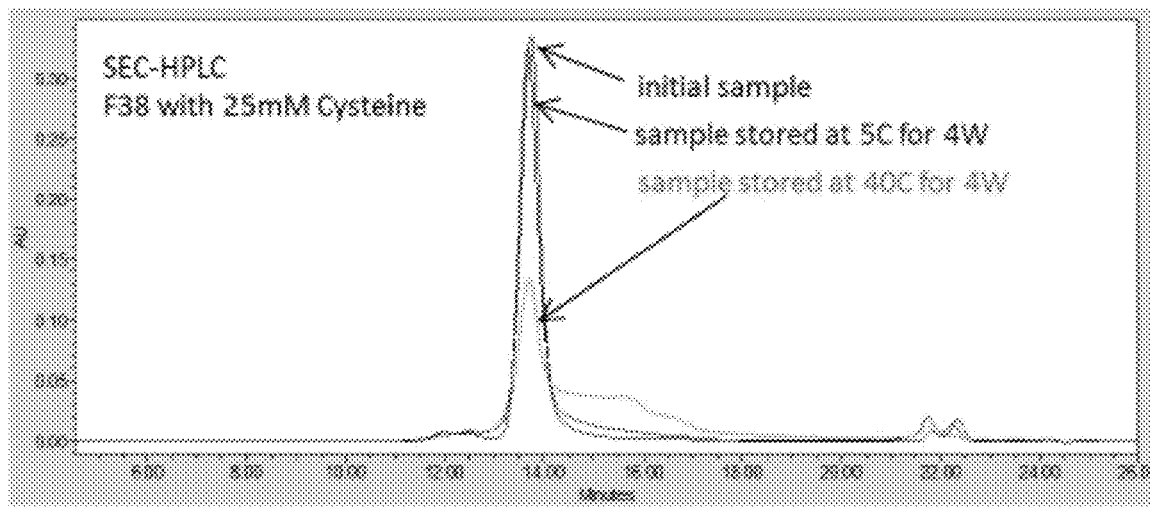
FIG. 6 depicts SEC-HPLC results obtained for F38 sample (formulated with 25 mM cysteine) stored at 5±3° C. for 4 weeks and at 40±2° C. for weeks.

The impact of temperature stress on OPK-88003 stability in $F_{DOE}37$, $F_{DOE}38$ and $F_{DOE}39$ samples was evaluated by SEC analysis. The results for the initial and 4 week time points are summarized in Table 24A and Table 24B. No significant change in the amount of % total impurities was observed between $F_{DOE}37$, $F_{DOE}38$ and $F_{DOE}39$ samples analyzed at the initial time point and after storage at 5±3° C. and 25±2° C. ($F_{DOE}39$) for 4 weeks. A slight increase in the % total impurities (1.2-1.3%) was observed for $F_{DOE}37$ and $F_{DOE}39$ samples stored at 40±2° C. for 4 weeks compared to the initial time point. The F38 sample (formulated with 25 mM cysteine) stored at 40±2° C. was significantly impacted with the increase in % total impurity by 47.7% compared to the initial time point (FIG. 6).

The RP-HPLC results obtained for $F_{DOE}37$, $F_{DOE}38$ and $F_{DOE}39$ samples correspond with SEC data. The results for the initial and 4 week time points are summarized in Table 25A and Table 25B. No significant change in the amount of % total impurities was observed between $F_{DOE}37$ and $F_{DOE}39$ samples analyzed at the initial time point and after storage at 5±3° C. for 4 weeks. Noticeable differences in the % total impurities were observed between $F_{DOE}37$ and $F_{DOE}39$ samples analyzed at the initial time point and after storage at 25±2° C. ($F_{DOE}39$) and 40±2° C. for 4 weeks. A substantial increase in the % total impurities (by 8.5%) was observed for F38 sample stored at 5±3° C. for 4 weeks.

Figure 7:
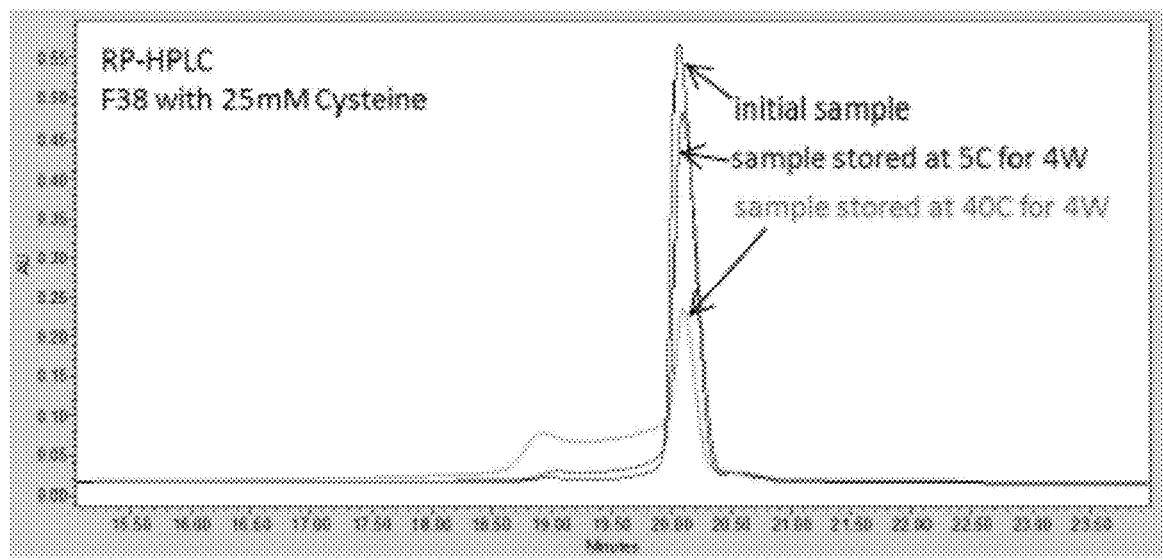
FIG. 7 depicts RP-HPLC results obtained for F38 sample stored at 5±3° C. for 4 weeks and at 40±2° C. for weeks.

Sample F38 stored at 40±2° C. for 4 weeks was highly degraded with % total impurities higher by 51.7% compared to the initial time point. The overlaid chromatograms for F38 sample (formulated with 25 mM cysteine) are shown in FIG. 7.

For the center point samples ($F_{DOE}20$) an average osmolality value for three measurements was 290 mOsm/kg) (Table 26).

The HIAC results for $F_{DOE}39$ showed an increase at all particle sizes for sample stored at 25±2° C. when compared to the initial time point sample (Table 11).

The MFI results for $F_{DOE}39$ showed a slight increase at all particle sizes for sample stored at 25±2° C. when compared to the initial time point sample (Table 12).

The viscosity measured for $F_{DOE}39$ was 18.8 cP and was comparable to values obtained for other formulations with acetate buffer (Table 16).

TABLE 23 pH Results for DOE Study

| Formulation Code | Composition | Theoretical Buffer pH | pH (Initial) | pH (4 weeks at 5° C.) | pH (4 weeks at 40° C.) | pH (4 weeks at 25° C.) |
|---|---|---|---|---|---|---|
| $F_{DOE}1$ | 70 mg/mL API, 250 mM Sorbitol, pH 4.5 | 4.50 | 4.42 | 4.44 | 4.44 | NA |
| $F_{DOE}2$ | 70 mg/mL API, 65 mM Arginine, 120 mM Sorbitol, pH 4.5 | 4.50 | 4.57 | 4.45 | 4.46 | |
| $F_{DOE}3$ | 70 mg/mL API, 125 mM Arginine, pH 4.5 | 4.50 | 4.54 | 4.48 | 4.48 | |
| $F_{DOE}4$ | 70 mg/mL API, 12.5 mM Methionine, 237.5 mM Sorbitol, pH 4.5 | 4.50 | 4.54 | 4.47 | 4.47 | |
| $F_{DOE}5$ | 70 mg/mL API, 12.5 mM Methionine, 65 mM Arginine, 107.5 mM Sorbitol, pH 4.5 | 4.50 | 4.48 | 4.46 | 4.46 | |
| $F_{DOE}6$ | 70 mg/mL API, 12.5 mM Methionine, 125 mM Arginine, pH 4.5 | 4.50 | 4.47 | 4.48 | 4.49 | |
| $F_{DOE}7$ | 70 mg/mL API, 25 mM Methionine, 225 mM Sorbitol, pH 4.5 | 4.50 | 4.45 | 4.46 | 4.47 | |
| $F_{DOE}8$ | 70 mg/mL API, 25 mM Methionine, 65 mM Arginine, 95 mM Sorbitol, pH 4.5 | 4.50 | 4.46 | 4.47 | 4.49 | |
| $F_{DOE}9$ | 70 mg/mL API, 25 mM Methionine, 125 mM Arginine, pH 4.5 | 4.50 | 4.43 | 4.46 | 4.47 | |
| $F_{DOE}10$ | 70 mg/mL API, 50 mM Methionine, 200 mM Sorbitol, pH 4.5 | 4.50 | 4.49 | 4.52 | 4.50 | |
| $F_{DOE}11$ | 70 mg/mL API, 50 mM Methionine, 65 mM Arginine, 70 mM Sorbitol, pH 4.5 | 4.50 | 4.46 | 4.48 | 4.47 | |
| $F_{DOE}12$ | 70 mg/mL API, 50 mM Methionine, 125 mM Arginine, pH 4.5 | 4.50 | 4.50 | 4.48 | 4.49 | |
| $F_{DOE}13$ | 70 mg/mL API, 250 mM Sorbitol, pH 4.7 | 4.70 | 4.75 | 4.75 | 4.73 | |
| $F_{DOE}14$ | 70 mg/mL API, 65 mM Arginine, 120 mM Sorbitol, pH 4.7 | 4.70 | 4.72 | 4.70 | 4.69 | |
| $F_{DOE}15$ | 70 mg/mL API, 125 mM Arginine, pH 4.7 | 4.70 | 4.68 | 4.69 | 4.68 | |
| $F_{DOE}16$ | 70 mg/mL API, 12.5 mM Methionine, 237.5 mM Sorbitol, pH 4.7 | 4.70 | 4.73 | 4.76 | 4.73 | |
| $F_{DOE}17$ | 70 mg/mL API, 12.5 mM Methionine, 65 mM Arginine, 107.5 mM Sorbitol, pH 4.7 | 4.70 | 4.73 | 4.73 | 4.73 | |

TABLE 23-continued pH Results for DOE Study

| Formulation Code | Composition | Theoretical Buffer pH | pH (Initial) | pH (4 weeks at 5° C.) | pH (4 weeks at 40° C.) | pH (4 weeks at 25° C.) |
|---|---|---|---|---|---|---|
| $F_{DOE}18$ | 70 mg/mL API, 12.5 mM Methionine, 125 mM Arginine, pH 4.7 | 4.70 | 4.70 | 4.72 | 4.71 | |
| $F_{DOE}19$ | 70 mg/mL API, 25 mM Methionine, 225 mM Sorbitol, pH 4.7 | 4.70 | 4.73 | 4.74 | 4.74 | |
| $F_{DOE}20$ Prep 1 | 70 mg/mL API, 25 mM Methionine, 65 mM Arginine, 95 mM Sorbitol, pH 4.7 | 4.70 | 4.71 | 4.67 | 4.69 | |
| $F_{DOE}20$ Prep 2 | 70 mg/mL API, 25 mM Methionine, 65 mM Arginine, 95 mM Sorbitol, pH 4.7 | 4.70 | 4.72 | 4.70 | 4.72 | |
| $F_{DOE}20$ Prep 3 | 70 mg/mL API, 25 mM Methionine, 65 mM Arginine, 95 mM Sorbitol, pH 4.7 | 4.70 | 4.71 | 4.72 | 4.71 | |
| $F_{DOE}21$ | 70 mg/mL API, 25 mM Methionine, 125 mM Arginine, pH 4.7 | 4.70 | 4.69 | 4.70 | 4.70 | |
| $F_{DOE}22$ | 70 mg/mL API, 50 mM Methionine, 200 mM Sorbitol, pH 4.7 | 4.70 | 4.74 | 4.76 | 4.70 | |
| $F_{DOE}23$ | 70 mg/mL API, 50 mM Methionine, 65 mM Arginine, 70 mM Sorbitol, pH 4.7 | 4.70 | 4.70 | 4.70 | 4.69 | |
| $F_{DOE}24$ | 70 mg/mL API, 50 mM Methionine, 125 mM Arginine, pH 4.7 | 4.70 | 4.69 | 4.69 | 4.69 | |
| $F_{DOE}25$ | 70 mg/mL API, 250 mM Sorbitol, pH 4.9 | 4.90 | 4.92 | 4.90 | 4.90 | |
| $F_{DOE}26$ | 70 mg/mL API, 65 mM Arginine, 120 mM Sorbitol, pH 4.9 | 4.90 | 4.88 | 4.89 | 4.86 | |
| $F_{DOE}27$ | 70 mg/mL API, 125 mM Arginine, pH 4.9 | 4.90 | 4.88 | 4.89 | 4.87 | |
| $F_{DOE}28$ | 70 mg/mL API, 12.5 mM Methionine, 237.5 mM Sorbitol, pH 4.9 | 4.90 | 4.93 | 4.96 | 4.91 | |
| $F_{DOE}29$ | 70 mg/mL API, 12.5 mM Methionine, 65 mM Arginine, 107.5 mM Sorbitol, pH 4.9 | 4.90 | 4.90 | 4.90 | 4.86 | |
| $F_{DOE}30$ | 70 mg/mL API, 12.5 mM Methionine, 125 mM Arginine, pH 4.9 | 4.90 | 4.86 | 4.88 | 4.88 | |
| $F_{DOE}31$ | 70 mg/mL API, 25 mM Methionine, 225 mM Sorbitol, pH 4.9 | 4.90 | 4.94 | 4.95 | 4.91 | |
| $F_{DOE}32$ | 70 mg/mL API, 25 mM Methionine, 65 mM Arginine, 95 mM Sorbitol, pH 4.9 | 4.90 | 4.89 | 4.90 | 4.87 | |
| $F_{DOE}33$ | 70 mg/mL API, 25 mM Methionine, 125 mM Arginine, pH 4.9 | 4.90 | 4.89 | 4.89 | 4.87 | |
| $F_{DOE}34$ | 70 mg/mL API, 50 mM Methionine, 200 mM Sorbitol, pH 4.9 | 4.90 | 4.94 | 4.96 | 4.94 | |
| $F_{DOE}35$ | 70 mg/mL API, 50 mM Methionine, 65 mM Arginine, 70 mM Sorbitol, pH 4.9 | 4.90 | 4.90 | 4.92 | 4.90 | |
| $F_{DOE}36$ | 70 mg/mL API, 50 mM Methionine, 125 mM Arginine, pH 4.9 | 4.90 | 4.87 | 4.86 | 4.86 | |
| $F_{DOE}37$ | 70 mg/mL API, 25 mM Methionine, 75 mM Arginine, 75 mM Sorbitol, pH 4.7 | 4.70 | 4.75 | 4.77 | 4.75 | |

TABLE 23-continued pH Results for DOE Study

| Formulation Code | Composition | Theoretical Buffer pH | pH (Initial) | pH (4 weeks at 5° C.) | pH (4 weeks at 40° C.) | pH (4 weeks at 25° C.) |
|---|---|---|---|---|---|---|
| $F_{DOE}38$ | 70 mg/mL API, 25 mM Cys, 225 mM Sorbitol, pH 4.7 | 4.70 | 4.72 | 4.87 | 4.68 | |
| $F_{DOE}39$ | 70 mg/mL API, 30 mM Methionine, 100 mM Arginine, pH 4.7 | 4.70 | 4.73 | 4.73 | 4.72 | 4.74 |

TABLE 24A

SEC-HPLC Results for DOE Study-Initial Time Point

| Formulation Code | % Aggregate 2 | % Aggregate 1 | % Aggregate Impurities | % Main Peak | % Post-monomer Impurities | % Total Impurities |
|---|---|---|---|---|---|---|
| $F_{DOE}1$ | 2.5 | 1.9 | 4.4 | 94.4 | 1.2 | 5.6 |
| $F_{DOE}2$ | 2.5 | 1.8 | 4.3 | 94.4 | 1.3 | 5.6 |
| $F_{DOE}3$ | 2.5 | 1.8 | 4.3 | 94.4 | 1.3 | 5.6 |
| $F_{DOE}4$ | 2.5 | 1.8 | 4.3 | 94.5 | 1.2 | 5.5 |
| $F_{DOE}5$ | 2.4 | 1.8 | 4.3 | 94.5 | 1.3 | 5.5 |
| $F_{DOE}6$ | 2.5 | 1.8 | 4.3 | 94.4 | 1.3 | 5.6 |
| $F_{DOE}7$ | 2.5 | 1.8 | 4.3 | 94.5 | 1.2 | 5.5 |
| $F_{DOE}8$ | 2.5 | 1.8 | 4.3 | 94.6 | 1.2 | 5.4 |
| $F_{DOE}9$ | 2.4 | 1.8 | 4.2 | 94.5 | 1.2 | 5.5 |
| $F_{DOE}10$ | 2.5 | 1.8 | 4.2 | 94.7 | 1.1 | 5.3 |
| $F_{DOE}11$ | 2.4 | 1.8 | 4.2 | 94.6 | 1.2 | 5.4 |
| $F_{DOE}12$ | 2.4 | 1.8 | 4.2 | 94.6 | 1.2 | 5.4 |
| $F_{DOE}13$ | 2.5 | 1.9 | 4.4 | 94.4 | 1.1 | 5.6 |
| $F_{DOE}14$ | 2.4 | 1.8 | 4.2 | 94.7 | 1.1 | 5.3 |
| $F_{DOE}15$ | 2.5 | 1.8 | 4.3 | 94.6 | 1.2 | 5.4 |
| $F_{DOE}16$ | 2.5 | 1.8 | 4.3 | 94.4 | 1.3 | 5.6 |
| $F_{DOE}17$ | 2.4 | 1.8 | 4.3 | 94.6 | 1.2 | 5.4 |
| $F_{DOE}18$ | 2.4 | 1.9 | 4.3 | 94.5 | 1.2 | 5.5 |
| $F_{DOE}19$ | 2.4 | 1.8 | 4.3 | 94.6 | 1.1 | 5.4 |
| $F_{DOE}20$ Prep 1 | 2.4 | 1.8 | 4.3 | 94.6 | 1.2 | 5.4 |
| $F_{DOE}20$ Prep 2 | 2.5 | 1.8 | 4.3 | 94.6 | 1.1 | 5.4 |
| $F_{DOE}20$ Prep 3 | 2.5 | 1.8 | 4.3 | 94.6 | 1.1 | 5.4 |
| $F_{DOE}21$ | 2.4 | 1.8 | 4.2 | 94.6 | 1.2 | 5.4 |
| $F_{DOE}22$ | 2.4 | 1.8 | 4.2 | 94.8 | 1.1 | 5.2 |
| $F_{DOE}23$ | 2.4 | 1.8 | 4.2 | 94.6 | 1.2 | 5.4 |
| $F_{DOE}24$ | 2.4 | 1.8 | 4.2 | 94.6 | 1.2 | 5.4 |
| $F_{DOE}25$ | 2.5 | 1.9 | 4.4 | 94.3 | 1.3 | 5.7 |
| $F_{DOE}26$ | 2.5 | 1.8 | 4.3 | 94.5 | 1.2 | 5.5 |
| $F_{DOE}27$ | 2.5 | 1.8 | 4.3 | 94.5 | 1.2 | 5.5 |
| $F_{DOE}28$ | 2.4 | 1.7 | 4.1 | 94.9 | 0.9 | 5.1 |
| $F_{DOE}29$ | 2.4 | 1.8 | 4.3 | 94.5 | 1.2 | 5.5 |
| $F_{DOE}30$ | 2.4 | 1.8 | 4.2 | 94.5 | 1.3 | 5.5 |
| $F_{DOE}31$ | 2.4 | 1.8 | 4.3 | 94.6 | 1.1 | 5.4 |
| $F_{DOE}32$ | 2.4 | 1.8 | 4.3 | 94.6 | 1.2 | 5.4 |
| $F_{DOE}33$ | 2.4 | 1.8 | 4.2 | 94.6 | 1.2 | 5.4 |
| $F_{DOE}34$ | 2.4 | 1.8 | 4.2 | 94.7 | 1.1 | 5.3 |
| $F_{DOE}35$ | 2.4 | 1.8 | 4.2 | 94.7 | 1.1 | 5.3 |
| $F_{DOE}36$ | 2.4 | 1.8 | 4.2 | 94.6 | 1.2 | 5.4 |
| $F_{DOE}37$ | 2.4 | 1.8 | 4.2 | 94.5 | 1.3 | 5.5 |
| $F_{DOE}38$ | 2.3 | 1.8 | 4.1 | 93.9 | 2.0 | 6.1 |
| $F_{DOE}39$ | 2.4 | 1.8 | 4.2 | 94.5 | 1.2 | 5.5 |

TABLE 24B

SEC-HPLC Results for DOE Study-4 Week Time Point

| Formulation Code | Condition | % Aggregate 2 | % Aggregate 1 | % Aggregate Impurities | % Main Peak | % Post-monomer Impurities | % Total Impurities |
|---|---|---|---|---|---|---|---|
| $F_{DOE}1$ | 5° C. | 2.5 | 1.7 | 4.2 | 95.0 | 0.8 | 5.0 |
| | 40° C. | 2.5 | 2.9 | 5.4 | 92.3 | 2.2 | 7.7 |
| $F_{DOE}2$ | 5° C. | 2.5 | 1.7 | 4.2 | 95.0 | 0.8 | 5.0 |
| | 40° C. | 2.5 | 2.5 | 4.9 | 93.4 | 1.6 | 6.6 |
| $F_{DOE}3$ | 5° C. | 2.4 | 1.7 | 4.1 | 95.2 | 0.7 | 4.8 |
| | 40° C. | 2.5 | 2.5 | 5.0 | 93.4 | 1.6 | 6.6 |
| $F_{DOE}4$ | 5° C. | 2.4 | 1.6 | 4.0 | 95.1 | 0.9 | 4.9 |
| | 40° C. | 2.4 | 2.4 | 4.8 | 93.2 | 2.0 | 6.8 |
| $F_{DOE}5$ | 5° C. | 2.4 | 1.7 | 4.1 | 95.2 | 0.8 | 4.8 |
| | 40° C. | 2.4 | 2.4 | 4.7 | 93.6 | 1.7 | 6.4 |
| $F_{DOE}6$ | 5° C. | 2.4 | 1.7 | 4.1 | 95.1 | 0.8 | 4.9 |
| | 40° C. | 2.3 | 2.3 | 4.7 | 93.6 | 1.8 | 6.4 |
| $F_{DOE}7$ | 5° C. | 2.4 | 1.6 | 4.1 | 95.0 | 0.9 | 5.0 |
| | 40° C. | 2.3 | 2.3 | 4.6 | 93.5 | 1.9 | 6.5 |
| $F_{DOE}8$ | 5° C. | 2.4 | 1.6 | 4.1 | 95.1 | 0.8 | 4.9 |
| | 40° C. | 2.3 | 2.3 | 4.7 | 93.6 | 1.7 | 6.4 |
| $F_{DOE}9$ | 5° C. | 2.4 | 1.6 | 4.0 | 95.1 | 0.9 | 4.9 |
| | 40° C. | 2.3 | 2.3 | 4.6 | 93.6 | 1.8 | 6.4 |
| $F_{DOE}10$ | 5° C. | 2.4 | 1.6 | 4.0 | 95.1 | 0.9 | 4.9 |
| | 40° C. | 2.3 | 2.2 | 4.5 | 93.7 | 1.8 | 6.3 |
| $F_{DOE}11$ | 5° C. | 2.4 | 1.6 | 4.0 | 95.1 | 0.9 | 4.9 |
| | 40° C. | 2.3 | 2.3 | 4.6 | 93.6 | 1.8 | 6.4 |
| $F_{DOE}12$ | 5° C. | 2.4 | 1.6 | 4.0 | 95.1 | 0.9 | 4.9 |
| | 40° C. | 2.3 | 2.3 | 4.6 | 93.7 | 1.8 | 6.3 |
| $F_{DOE}13$ | 5° C. | 2.5 | 1.7 | 4.2 | 94.5 | 1.3 | 5.5 |
| | 40° C. | 2.6 | 2.9 | 5.5 | 92.3 | 2.2 | 7.7 |
| $F_{DOE}14$ | 5° C. | 2.4 | 1.7 | 4.1 | 95.0 | 0.8 | 5.0 |
| | 40° C. | 2.5 | 2.6 | 5.2 | 93.2 | 1.6 | 6.8 |
| $F_{DOE}15$ | 5° C. | 2.5 | 1.7 | 4.1 | 95.0 | 0.9 | 5.0 |
| | 40° C. | 2.6 | 2.6 | 5.1 | 93.2 | 1.6 | 6.8 |
| $F_{DOE}16$ | 5° C. | 2.5 | 1.6 | 4.1 | 94.8 | 1.1 | 5.2 |
| | 40° C. | 2.4 | 2.5 | 4.9 | 93.3 | 1.9 | 6.7 |
| $F_{DOE}17$ | 5° C. | 2.4 | 1.6 | 4.1 | 95.0 | 0.9 | 5.0 |
| | 40° C. | 2.4 | 2.5 | 4.9 | 93.3 | 1.8 | 6.7 |
| $F_{DOE}18$ | 5° C. | 2.4 | 1.6 | 4.1 | 95.1 | 0.9 | 4.9 |
| | 40° C. | 2.4 | 2.4 | 4.8 | 93.3 | 1.9 | 6.7 |
| $F_{DOE}19$ | 5° C. | 2.4 | 1.6 | 4.1 | 95.0 | 1.0 | 5.0 |
| | 40° C. | 2.4 | 2.4 | 4.8 | 93.3 | 1.9 | 6.7 |
| $F_{DOE}20$ Prep 1 | 5° C. | 2.4 | 1.6 | 4.1 | 95.0 | 0.9 | 5.0 |
| | 40° C. | 2.5 | 2.5 | 5.0 | 93.2 | 1.8 | 6.8 |
| $F_{DOE}20$ Prep 2 | 5° C. | 2.4 | 1.6 | 4.1 | 95.0 | 1.0 | 5.0 |
| | 40° C. | 2.3 | 2.4 | 4.8 | 93.4 | 1.8 | 6.6 |
| $F_{DOE}20$ Prep 3 | 5° C. | 2.5 | 1.6 | 4.1 | 95.0 | 1.0 | 5.0 |
| | 40° C. | 2.3 | 2.5 | 4.8 | 93.4 | 1.8 | 6.6 |
| $F_{DOE}21$ | 5° C. | 2.4 | 1.6 | 4.0 | 95.0 | 1.0 | 5.0 |
| | 40° C. | 2.4 | 2.4 | 4.7 | 93.4 | 1.9 | 6.6 |
| $F_{DOE}22$ | 5° C. | 2.4 | 1.6 | 4.0 | 95.0 | 1.0 | 5.0 |
| | 40° C. | 2.3 | 2.3 | 4.6 | 93.6 | 1.8 | 6.4 |
| $F_{DOE}23$ | 5° C. | 2.4 | 1.6 | 4.0 | 95.1 | 0.9 | 4.9 |
| | 40° C. | 2.4 | 2.4 | 4.7 | 93.4 | 1.8 | 6.6 |
| $F_{DOE}24$ | 5° C. | 2.4 | 1.6 | 4.0 | 95.0 | 0.9 | 5.0 |
| | 40° C. | 2.3 | 2.3 | 4.7 | 93.5 | 1.9 | 6.5 |
| $F_{DOE}25$ | 5° C. | 2.5 | 1.7 | 4.3 | 94.4 | 1.4 | 5.6 |
| | 40° C. | 2.7 | 2.9 | 5.6 | 92.4 | 2.0 | 7.6 |

TABLE 24B-continued

SEC-HPLC Results for DOE Study-4 Week Time Point

| Formulation Code | Condition | % Aggregate 2 | % Aggregate 1 | % Aggregate Impurities | % Main Peak | % Post-monomer Impurities | % Total Impurities |
|---|---|---|---|---|---|---|---|
| $F_{DOE}26$ | 5° C. | 2.5 | 1.6 | 4.1 | 94.9 | 1.0 | 5.1 |
| | 40° C. | 2.5 | 2.7 | 5.2 | 93.2 | 1.6 | 6.8 |
| $F_{DOE}27$ | 5° C. | 2.5 | 1.6 | 4.1 | 94.9 | 0.9 | 5.1 |
| | 40° C. | 2.5 | 2.6 | 5.2 | 93.1 | 1.7 | 6.9 |
| $F_{DOE}28$ | 5° C. | 2.5 | 1.7 | 4.1 | 94.7 | 1.2 | 5.3 |
| | 40° C. | 2.4 | 2.5 | 4.9 | 93.1 | 2.0 | 6.9 |
| $F_{DOE}29$ | 5° C. | 2.5 | 1.7 | 4.1 | 94.9 | 1.0 | 5.1 |
| | 40° C. | 2.4 | 2.5 | 4.9 | 93.2 | 1.9 | 6.8 |
| $F_{DOE}30$ | 5° C. | 2.5 | 1.7 | 4.1 | 94.9 | 1.0 | 5.1 |
| | 40° C. | 2.4 | 2.5 | 4.9 | 93.2 | 1.9 | 6.8 |
| $F_{DOE}31$ | 5° C. | 2.5 | 1.7 | 4.1 | 94.9 | 1.0 | 5.1 |
| | 40° C. | 2.4 | 2.5 | 4.9 | 93.1 | 2.0 | 6.9 |
| $F_{DOE}32$ | 5° C. | 2.4 | 1.7 | 4.1 | 95.0 | 0.9 | 5.0 |
| | 40° C. | 2.4 | 2.5 | 4.9 | 93.2 | 1.9 | 6.8 |
| $F_{DOE}33$ | 5° C. | 2.4 | 1.6 | 4.1 | 94.9 | 1.0 | 5.1 |
| | 40° C. | 2.4 | 2.4 | 4.8 | 93.2 | 2.0 | 6.8 |
| $F_{DOE}34$ | 5° C. | 2.4 | 1.6 | 4.1 | 94.8 | 1.1 | 5.2 |
| | 40° C. | 2.4 | 2.4 | 4.8 | 93.2 | 2.0 | 6.8 |
| $F_{DOE}35$ | 5° C. | 2.4 | 1.7 | 4.1 | 94.9 | 1.0 | 5.1 |
| | 40° C. | 2.3 | 2.5 | 4.8 | 93.2 | 2.0 | 6.8 |
| $F_{DOE}36$ | 5° C. | 2.4 | 1.6 | 4.1 | 94.9 | 1.0 | 5.1 |
| | 40° C. | 2.3 | 2.4 | 4.7 | 93.2 | 2.0 | 6.8 |
| $F_{DOE}37$ | 5° C. | 2.4 | 1.7 | 4.1 | 94.9 | 1.0 | 5.1 |
| | 40° C. | 2.4 | 2.4 | 4.8 | 93.2 | 2.0 | 6.8 |
| $F_{DOE}38$ | 5° C. | 2.0 | 1.6 | 3.6 | 94.0 | 2.4 | 6.0 |
| | 40° C. | 1.2 | 2.5 | 3.7 | 46.2 | 50.1 | 53.8 |
| $F_{DOE}39$ | 5° C. | 2.4 | 1.6 | 4.1 | 94.9 | 1.0 | 5.1 |
| | 25 ± 2° C. | 2.4 | 1.7 | 4.1 | 94.6 | 1.3 | 5.4 |
| | 40° C. | 2.3 | 2.4 | 4.8 | 93.4 | 1.9 | 6.6 |

TABLE 25A

RP-HPLC Results for DOE Study - Initial Time Point

| Formulation Code | % Front Peak Impurities | % Main Peak | % Back Peak Impurities | % Total Impurities |
|---|---|---|---|---|
| $F_{DOE}1$ | 2.1 | 94.9 | 3 | 5.1 |
| $F_{DOE}2$ | 1.9 | 95.2 | 2.9 | 4.8 |
| $F_{DOE}3$ | 2.1 | 95 | 2.9 | 5 |
| $F_{DOE}4$ | 1.9 | 95.2 | 2.9 | 4.8 |
| $F_{DOE}5$ | 2 | 95.1 | 2.9 | 4.9 |
| $F_{DOE}6$ | 2.1 | 95 | 2.9 | 5 |
| $F_{DOE}7$ | 1.9 | 95.2 | 3 | 4.8 |
| $F_{DOE}8$ | 2 | 95 | 3 | 5 |
| $F_{DOE}9$ | 2 | 95.1 | 2.9 | 4.9 |
| $F_{DOE}10$ | 1.9 | 95.2 | 2.9 | 4.8 |
| $F_{DOE}11$ | 1.9 | 95.1 | 3 | 4.9 |
| $F_{DOE}12$ | 2.1 | 95 | 3 | 5 |
| $F_{DOE}13$ | 2.1 | 94.8 | 3.1 | 5.2 |
| $F_{DOE}14$ | 2.2 | 94.9 | 3 | 5.1 |
| $F_{DOE}15$ | 2.1 | 95 | 3 | 5 |
| $F_{DOE}16$ | 2.1 | 94.9 | 3 | 5.1 |
| $F_{DOE}17$ | 2.1 | 94.9 | 3 | 5.1 |
| $F_{DOE}18$ | 2 | 95.1 | 2.9 | 4.9 |
| $F_{DOE}19$ | 2.1 | 94.9 | 3 | 5.1 |
| $F_{DOE}20$ Prep 1 | 2.2 | 94.8 | 3 | 5.2 |
| $F_{DOE}20$ Prep 2 | 2.1 | 94.9 | 3 | 5.1 |
| $F_{DOE}20$ Prep 3 | 2.1 | 94.9 | 3 | 5.1 |
| $F_{DOE}21$ | 2.1 | 95 | 2.9 | 5 |
| $F_{DOE}22$ | 2.2 | 94.9 | 2.9 | 5.1 |
| $F_{DOE}23$ | 2.1 | 94.9 | 3 | 5.1 |
| $F_{DOE}24$ | 2.1 | 94.9 | 3 | 5.1 |
| $F_{DOE}25$ | 2.2 | 94.7 | 3.1 | 5.3 |
| $F_{DOE}26$ | 2 | 95.1 | 2.9 | 4.9 |
| $F_{DOE}27$ | 2.2 | 94.8 | 3 | 5.2 |
| $F_{DOE}28$ | 2 | 95 | 3 | 5 |
| $F_{DOE}29$ | 2.1 | 95 | 2.9 | 5 |
| $F_{DOE}30$ | 2.1 | 94.9 | 3 | 5.1 |
| $F_{DOE}31$ | 2 | 95 | 3 | 5 |
| $F_{DOE}32$ | 1.9 | 95.1 | 3 | 4.9 |
| $F_{DOE}33$ | 2 | 95 | 3 | 5 |
| $F_{DOE}34$ | 2.2 | 94.9 | 2.9 | 5.1 |
| $F_{DOE}35$ | 2 | 95.1 | 2.9 | 4.9 |
| $F_{DOE}36$ | 2.1 | 94.9 | 3 | 5.1 |
| $F_{DOE}37$ | 2.1 | 95 | 2.9 | 5 |
| $F_{DOE}38$ | 3.5 | 93.6 | 2.9 | 6.4 |
| $F_{DOE}39$ | 2 | 95.1 | 2.9 | 4.9 |

TABLE 25B

RP-HPLC Results for DOE Study - 4 Week Time Point

| Formulation Code | Condition | % Front Peak Impurities | % Main Peak | % Back Peak Impurities | % Total Impurities |
|---|---|---|---|---|---|
| $F_{DOE}1$ | 5° C. | 2.4 | 94.4 | 3.3 | 5.6 |
| | 40° C. | 3.7 | 91.8 | 4.5 | 8.2 |
| $F_{DOE}2$ | 5° C. | 2.4 | 94.4 | 3.2 | 5.6 |
| | 40° C. | 3.6 | 92.5 | 3.8 | 7.5 |
| $F_{DOE}3$ | 5° C. | 2.4 | 94.5 | 3.1 | 5.5 |
| | 40° C. | 3.7 | 92.4 | 3.9 | 7.6 |
| $F_{DOE}4$ | 5° C. | 1.9 | 95 | 3.1 | 5 |
| | 40° C. | 3.3 | 92.9 | 3.8 | 7.1 |
| $F_{DOE}5$ | 5° C. | 2.2 | 94.7 | 3.1 | 5.3 |
| | 40° C. | 3.3 | 93 | 3.6 | 7 |
| $F_{DOE}6$ | 5° C. | 2.1 | 94.8 | 3.1 | 5.2 |
| | 40° C. | 3.5 | 92.8 | 3.7 | 7.2 |
| $F_{DOE}7$ | 5° C. | 1.9 | 94.9 | 3.1 | 5.1 |
| | 40° C. | 3.2 | 93.2 | 3.6 | 6.8 |
| $F_{DOE}8$ | 5° C. | 2.2 | 94.7 | 3.1 | 5.3 |
| | 40° C. | 3.5 | 92.8 | 3.7 | 7.2 |
| $F_{DOE}9$ | 5° C. | 2.2 | 94.7 | 3.1 | 5.3 |
| | 40° C. | 3.6 | 92.9 | 3.6 | 7.1 |
| $F_{DOE}10$ | 5° C. | 2 | 94.9 | 3 | 5.1 |
| | 40° C. | 3.5 | 93 | 3.5 | 7 |
| $F_{DOE}11$ | 5° C. | 2.1 | 94.9 | 3.1 | 5.1 |
| | 40° C. | 3.3 | 93.2 | 3.5 | 6.8 |
| $F_{DOE}12$ | 5° C. | 2.4 | 94.5 | 3.1 | 5.5 |
| | 40° C. | 3.4 | 93.1 | 3.5 | 6.9 |
| $F_{DOE}13$ | 5° C. | 2.3 | 94.4 | 3.3 | 5.6 |
| | 40° C. | 3.7 | 91.7 | 4.6 | 8.3 |
| $F_{DOE}14$ | 5° C. | 2.3 | 94.6 | 3.1 | 5.4 |
| | 40° C. | 3.5 | 92.4 | 4.1 | 7.6 |
| $F_{DOE}15$ | 5° C. | 2.3 | 94.6 | 3.2 | 5.4 |
| | 40° C. | 4.1 | 91.8 | 4.1 | 8.2 |
| $F_{DOE}16$ | 5° C. | 2 | 94.9 | 3.1 | 5.1 |
| | 40° C. | 2.5 | 94.3 | 3.2 | 5.7 |
| $F_{DOE}17$ | 5° C. | 2.5 | 94.4 | 3.2 | 5.6 |
| | 40° C. | 3.4 | 92.6 | 4 | 7.4 |
| $F_{DOE}18$ | 5° C. | 2.4 | 94.5 | 3.1 | 5.5 |
| | 40° C. | 3.6 | 92.6 | 3.9 | 7.5 |
| $F_{DOE}19$ | 5° C. | 2.1 | 94.7 | 3.1 | 5.3 |
| | 40° C. | 3.3 | 92.9 | 3.8 | 7.1 |
| $F_{DOE}20$ Prep 1 | 5° C. | 2.1 | 94.7 | 3.1 | 5.3 |
| | 40° C. | 3.3 | 92.8 | 3.9 | 7.2 |
| $F_{DOE}20$ Prep 2 | 5° C. | 2.2 | 94.7 | 3.1 | 5.3 |
| | 40° C. | N/A | N/A | N/A | N/A |
| $F_{DOE}20$ Prep 3 | 5° C. | 2.2 | 94.7 | 3.1 | 5.3 |
| | 40° C. | 3.2 | 92.9 | 3.9 | 7.1 |
| $F_{DOE}21$ | 5° C. | 2.5 | 94.4 | 3.1 | 5.6 |
| | 40° C. | 3.8 | 92.4 | 3.8 | 7.6 |
| $F_{DOE}22$ | 5° C. | 2.6 | 94.3 | 3.1 | 5.7 |
| | 40° C. | 3.3 | 93 | 3.7 | 7 |
| $F_{DOE}23$ | 5° C. | 2.7 | 94.2 | 3.1 | 5.8 |
| | 40° C. | 3.4 | 92.8 | 3.9 | 7.2 |
| $F_{DOE}24$ | 5° C. | 2.1 | 94.8 | 3.1 | 5.2 |
| | 40° C. | 3.5 | 92.8 | 3.7 | 7.2 |

TABLE 25B-continued

RP-HPLC Results for DOE Study - 4 Week Time Point

| Formulation Code | Condition | % Front Peak Impurities | % Main Peak | % Back Peak Impurities | % Total Impurities |
|---|---|---|---|---|---|
| $F_{DOE}25$ | 5° C. | 2.5 | 94.3 | 3.2 | 5.7 |
| | 40° C. | 3.6 | 91.6 | 4.7 | 8.4 |
| $F_{DOE}26$ | 5° C. | 2.4 | 94.5 | 3.1 | 5.5 |
| | 40° C. | 3.6 | 92.1 | 4.3 | 7.9 |
| $F_{DOE}27$ | 5° C. | 2.3 | 94.5 | 3.2 | 5.5 |
| | 40° C. | 4.2 | 91.5 | 4.2 | 8.5 |
| $F_{DOE}28$ | 5° C. | 2.4 | 94.4 | 3.2 | 5.6 |
| | 40° C. | 3.3 | 92.6 | 4.1 | 7.4 |
| $F_{DOE}29$ | 5° C. | 2.4 | 94.5 | 3.1 | 5.5 |
| | 40° C. | 3.6 | 92.3 | 4 | 7.7 |
| $F_{DOE}30$ | 5° C. | 2.3 | 94.6 | 3.1 | 5.4 |
| | 40° C. | 3.5 | 92.5 | 4 | 7.5 |
| $F_{DOE}31$ | 5° C. | 2.5 | 94.4 | 3.1 | 5.6 |
| | 40° C. | 3.3 | 92.6 | 4.1 | 7.4 |
| $F_{DOE}32$ | 5° C. | 2.3 | 94.5 | 3.2 | 5.5 |
| | 40° C. | 3.6 | 92.4 | 4 | 7.6 |
| $F_{DOE}33$ | 5° C. | 2.5 | 94.4 | 3.1 | 5.6 |
| | 40° C. | 3.5 | 92.6 | 3.9 | 7.4 |
| $F_{DOE}34$ | 5° C. | 2.4 | 94.5 | 3.1 | 5.5 |
| | 40° C. | 3.5 | 92.6 | 3.9 | 7.4 |
| $F_{DOE}35$ | 5° C. | 2.4 | 94.4 | 3.1 | 5.6 |
| | 40° C. | 3.7 | 92.3 | 4 | 7.7 |
| $F_{DOE}36$ | 5° C. | 2.3 | 94.6 | 3.1 | 5.4 |
| | 40° C. | 3.5 | 92.7 | 3.8 | 7.3 |
| $F_{DOE}37$ | 5° C. | 2.3 | 94.6 | 3.1 | 5.4 |
| | 40° C. | 3.4 | 92.7 | 3.9 | 7.3 |
| $F_{DOE}38$ | 5° C. | 12.3 | 85.1 | 2.6 | 14.9 |
| | 40° C. | 56 | 41.9 | 2.1 | 58.1 |
| $F_{DOE}39$ | 5° C. | 2.5 | 94.4 | 3.1 | 5.6 |
| | 25 ± 2° C. | 2.9 | 93.9 | 3.2 | 6.1 |
| | 40° C. | 3.4 | 92.7 | 3.9 | 7.3 |

TABLE 26

Osmolality Results for DOE Center Point Samples

| Formulation | Composition | Osmolality (mOsm/kg) | Av Osmolality (mOsm/kg) |
|---|---|---|---|
| $F_{DOE}20$ prep 1 | 70 mg/mL API, 25 mM Methionine, 65 mM Arginine, 95 mM Sorbitol, pH 4.7 | 290 | 290 |
| $F_{DOE}20$ prep 2 | | 290 | |
| $F_{DOE}20$ prep 3 | | 290 | |

TABLE 27

Factors and Responses Used in DOE Study-40° C., 4 Week Time Point

| Formulation Code | Factor 1 A: pH | Factor 2 B: Methionine mM | Factor 3 C: Arginine mM | Factor 4 D: Sorbitol mM | Response 1 (RP-HPLC) % Back Peak Impurities | Response 1 (SEC) Aggregates % |
|---|---|---|---|---|---|---|
| $F_{DOE}1$ | 4.44 | 0 | 0 | 250 | 1.278 | 1.215 |
| $F_{DOE}2$ | 4.46 | 0 | 65 | 120 | 0.605 | 0.767 |
| $F_{DOE}3$ | 4.48 | 0 | 125 | 0 | 0.757 | 0.922 |
| $F_{DOE}4$ | 4.47 | 12.5 | 0 | 237.5 | 0.676 | 0.758 |
| $F_{DOE}5$ | 4.46 | 12.5 | 65 | 107.5 | 0.516 | 0.657 |
| $F_{DOE}6$ | 4.49 | 12.5 | 125 | 0 | 0.614 | 0.590 |
| $F_{DOE}7$ | 4.47 | 25 | 0 | 225 | 0.476 | 0.519 |
| $F_{DOE}8$ | 4.49 | 25 | 65 | 95 | 0.577 | 0.588 |
| $F_{DOE}9$ | 4.47 | 25 | 125 | 0 | 0.488 | 0.579 |
| $F_{DOE}10$ | 4.50 | 50 | 0 | 200 | 0.465 | 0.504 |
| $F_{DOE}11$ | 4.47 | 50 | 65 | 70 | 0.422 | 0.618 |
| $F_{DOE}12$ | 4.49 | 50 | 125 | 0 | 0.458 | 0.555 |
| $F_{DOE}13$ | 4.73 | 0 | 0 | 250 | 1.260 | 1.235 |
| $F_{DOE}14$ | 4.69 | 0 | 65 | 120 | 1.014 | 1.046 |
| $F_{DOE}15$ | 4.68 | 0 | 125 | 0 | 0.914 | 1.025 |
| $F_{DOE}16$ | 4.73 | 12.5 | 0 | 237.5 | 0.053 | 0.737 |
| $F_{DOE}17$ | 4.73 | 12.5 | 65 | 107.5 | 0.819 | 0.796 |
| $F_{DOE}18$ | 4.71 | 12.5 | 125 | 0 | 0.781 | 0.705 |
| $F_{DOE}19$ | 4.74 | 25 | 0 | 225 | 0.703 | 0.717 |
| $F_{DOE}20$-1 | 4.69 | 25 | 65 | 95 | 0.791 | 0.914 |
| $F_{DOE}20$-2 | 4.72 | 25 | 65 | 95 | NA[1] | 0.718 |
| $F_{DOE}20$-3 | 4.71 | 25 | 65 | 95 | 0.777 | 0.707 |
| $F_{DOE}21$ | 4.70 | 25 | 125 | 0 | 0.727 | 0.702 |
| $F_{DOE}22$ | 4.70 | 50 | 0 | 200 | 0.652 | 0.616 |
| $F_{DOE}23$ | 4.69 | 50 | 65 | 70 | 0.761 | 0.699 |
| $F_{DOE}24$ | 4.69 | 50 | 125 | 0 | 0.545 | 0.619 |
| $F_{DOE}25$ | 4.90 | 0 | 0 | 250 | 1.509 | 1.304 |
| $F_{DOE}26$ | 4.86 | 0 | 65 | 120 | 1.172 | 1.104 |
| $F_{DOE}27$ | 4.87 | 0 | 125 | 0 | 1.048 | 1.045 |
| $F_{DOE}28$ | 4.91 | 12.5 | 0 | 237.5 | 0.937 | 0.808 |
| $F_{DOE}29$ | 4.86 | 12.5 | 65 | 107.5 | 0.885 | 0.768 |
| $F_{DOE}30$ | 4.88 | 12.5 | 125 | 0 | 0.911 | 0.747 |
| $F_{DOE}31$ | 4.91 | 25 | 0 | 225 | 0.953 | 0.772 |
| $F_{DOE}32$ | 4.87 | 25 | 65 | 95 | 0.878 | 0.853 |
| $F_{DOE}33$ | 4.87 | 25 | 125 | 0 | 0.766 | 0.717 |
| $F_{DOE}34$ | 4.94 | 50 | 0 | 200 | 0.821 | 0.745 |
| $F_{DOE}35$ | 4.90 | 50 | 65 | 70 | 0.844 | 0.734 |
| $F_{DOE}36$ | 4.86 | 50 | 125 | 0 | 0.692 | 0.665 |

[1]Sample was excluded from the DOE analysis due to unacceptable chromatogram profile The DOE results obtained for SEC (Table 24B) and RP-HPLC (Table 25B) for four-week samples were statistically analyzed to design an optimized formulation for OPK-88003. The experimental design was generated using Stat-Ease, Inc. Design-Expert© Version 9.0.1. Significance of the responses was evaluated using ANOVA technique at the 95% confidence interval (p values lower than 0.05 indicated statistically significant correlation). The responses that met this significance threshold, as shown in Table 27, were analyzed by the software in reduced quadratic model (design model) (Table 28).

TABLE 28

ANOVA for Response Surface
Reduced Quadratic Model (Analysis of Variance)

| Source | Sum of Squares | df | Mean Square | F value | p-value (prob > F) |
|---|---|---|---|---|---|
| Block | 3.124E−005 | 1 | 3.124E−005 | | |
| Model | 1.68 | 9 | 0.19 | 4.72 | 0.0009 |
| A-pH | 0.67 | 1 | 0.67 | 16.90 | 0.0003 |
| B-Met | 0.76 | 1 | 0.76 | 19.16 | 0.0002 |
| C-Arg | 0.012 | 1 | 0.012 | 0.29 | 0.5930 |
| AB | 2.803E−004 | 1 | 2.803E−004 | 7.083E−003 | 0.9336 |
| AC | 4.635E−003 | 1 | 4.653E−003 | 0.12 | 0.7349 |
| BC | 0.037 | 1 | 0.037 | 0.95 | 0.3398 |
| $A^2$ | 0.033 | 1 | 0.033 | 0.83 | 0.3717 |
| $B^2$ | 0.29 | 1 | 0.29 | 7.27 | 0.0121 |
| $C^2$ | 2.329E−003 | 1 | 2.329E−003 | 0.059 | 0.8102 |
| Residual | 1.03 | 26 | 0.040 | | |
| Cor total | 2.71 | 36 | | | |

The model F-value of 4.72 implies the model is significant. There is only a 0.09% chance that an F-value this large could occur due to noise.

The DOE calculations were carried out using four factors: pH, methionine concentration, arginine concentration, and sorbitol concentration and two responses: accumulation of % back main peak impurities (RP-HPLC), accumulation of % total aggregate impurities (SE-HPLC). The calculations were carried out with pH values obtained for samples stored at 40±2° C. for 4 weeks.

Figure 8:
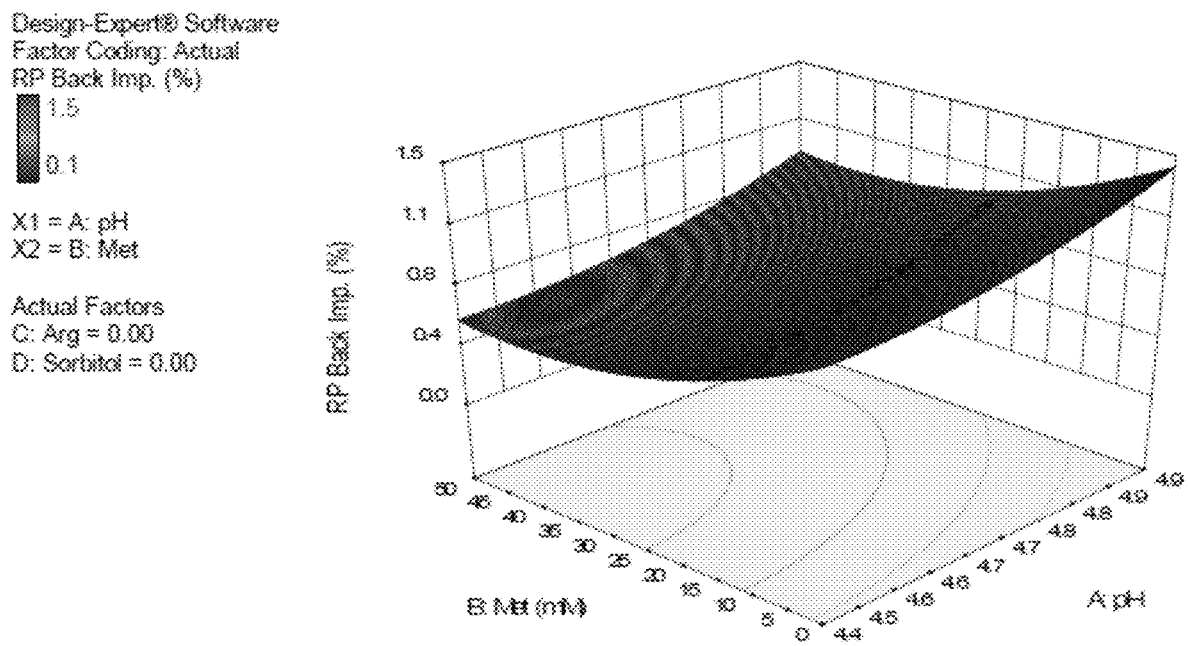
FIG. 8 depicts a 3D surface plot for % back main peak impurities at different methionine concentration and pH; with 0 mM Arginine and 0 mM Sorbitol.
Figure 9:
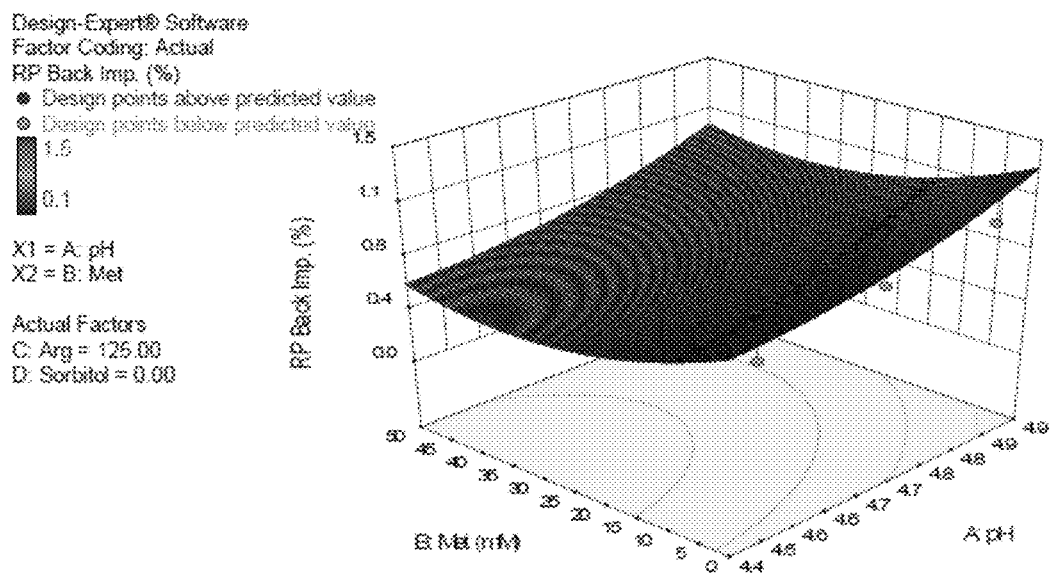
FIG. 9 depicts a 3D surface plot for % back main peak impurities at different methionine concentration and pH; with 125 mM Arginine and 0 mM Sorbitol.
Figure 10:
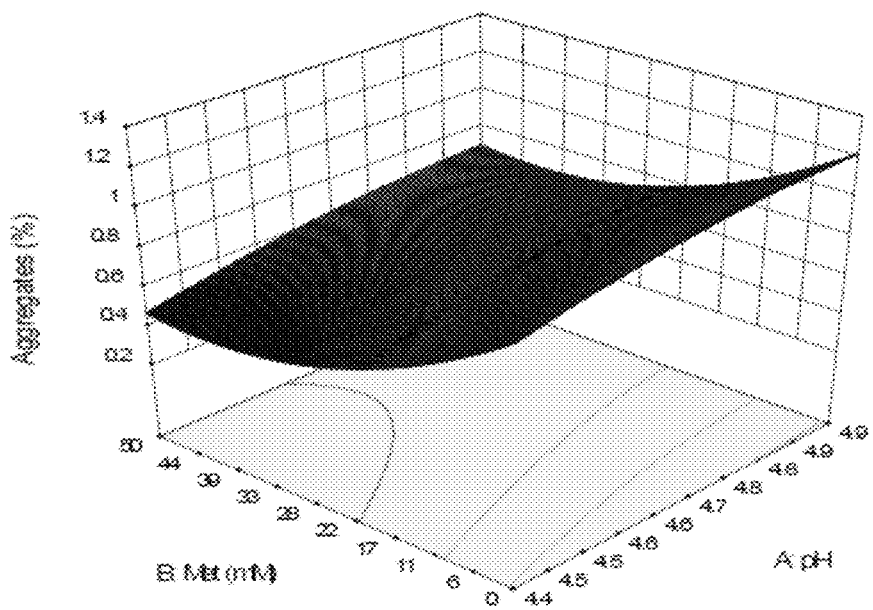
FIG. 10 depicts a 3D surface plot for % total Aggregate impurities at different methionine concentration and pH; with 0 mM Arginine and 0 mM Sorbitol.
Figure 11:
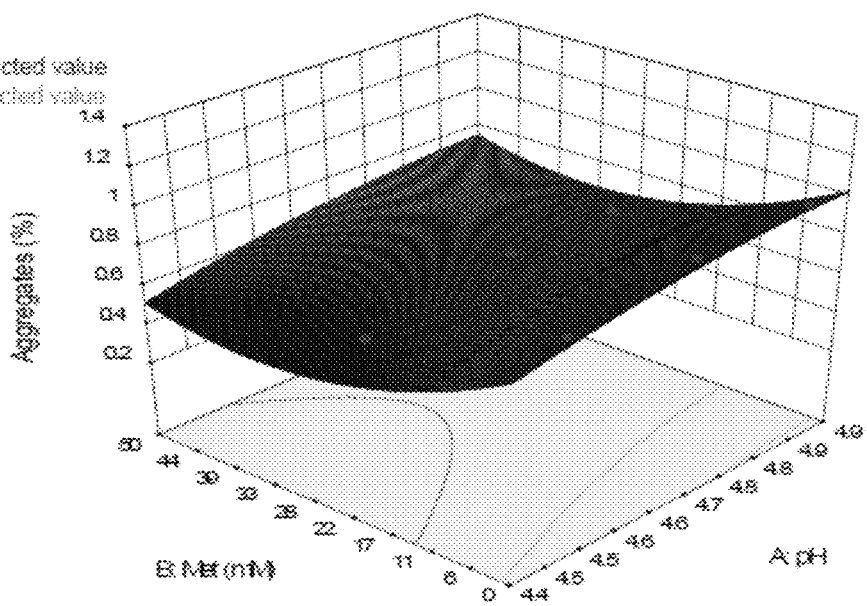
FIG. 11 depicts a 3D surface plot for % total aggregate impurities at different methionine concentration and pH; with 125 mM Arginine and 0 mM Sorbitol.

The DOE models generated for accumulation of % back main peak impurities (differences between % back main peak impurities obtained for samples stored at 5±3° C. and 40±2° C. for 4 weeks), detected in RP-HPLC analysis showed a progressive, increasing trend in impurities as a function of pH (FIG. 8 and FIG. 9). The lowest accumulation of % back main peak impurities was determined at pH 4.5. Also, the accumulation of % back main peak impurities was dependent of methionine concentration with the lowest determined at ±30-35 mM. The presence of arginine and sorbitol did not exhibit a significant effect on % back impurities in tested formulations. Similar results were obtained for accumulation of % total aggregate impurities (differences between % total aggregate impurities obtained for samples stored at 5±3° C. and 40±2° C. for 4 weeks), detected by SEC analysis. The DOE models showed a progressive, increasing trend in impurities as a function of pH with the lowest accumulation of % total aggregate impurities at pH 4.5 and methionine concentration of ~30-35 mM (FIG. 10 and FIG. 11). The presence of arginine and sorbitol did not exhibit a significant effect on % total aggregate impurities in the tested formulations.

The results from the DOE showed the highest stability of OPK-88003 in formulation with pH 4.5 and containing ~30-35 mM methionine.

An optimal liquid formulation in which OPK-88003 was soluble and physical and chemical degradation was minimized was achieved. Several buffer types, pH conditions, excipients, and presence/absence of surfactant were evaluated as a part of these studies for formulation screening and accelerated stability studies. Various biophysical and analytical tools were then used to detect and identify chemical and physical alterations of the API under stressed conditions. The following formulation conditions are recommended for the most preferred formulation of OPK-88003 at a concentration of 70 mg/mL: 10 mM acetate buffer with 30-35 mM methionine, pH 4.5. No effect on OPK-88003 stability was observed in the presence of sorbitol and, therefore, it is recommended to use sorbitol as an isotonicity agent. Other tonicity agents may also be used provided they do not negatively effect the stability of the formulation.

Example 6: Once-Weekly Subcutaneous Dosage Study

OPK-88003 was tested in a phase 1 and 2 trials on 402 subjects having T2DM with a once-weekly (QW) subcutaneous (SC) dosage. Single and multiple ascending doses up to 60 mg QW were tested in a two-part, phase 1 double-blind, randomized, placebo-controlled, clinical pharmacology trial. Doses ranging from 10 mg to 50 mg per week were tested in a 24-week double-blind (for the first 12 weeks), randomized, placebo- and active comparator (2 mg exenatide ER)-controlled phase 2 trial. Supratherapeutic multiple SC doses of 40 mg once daily for seven days and titrated doses of 15 to 60 mg over six days were also tested in a double blind, placebo controlled clinical pharmacology study.

Clinical data from the phase 1 trial indicated that QW SC administration of OPK-88003 produced an improvement in HbA1c and fasting glucose and resulted in progressive decrease in body weight. Changes from baseline in body weight after 5 weeks of dosing in T2DM and obese non-diabetic patients ranged from −1.55 kg to −2.23 kg, compared with the −0.81 kg in the placebo group for dose levels between 25 mg to 60 mg. Glucose tolerance and fasting plasma glucose (FPG) were significantly improved in subjects with T2DM.

In the phase 2 trial administration of OPK-88003 at 10, 15, 30 and 50 mg doses QW for six months in subjects with T2DM resulted in dose-dependent effects on blood glucose and body weight reduction. Statistically significant reduction in mean HbA1c (up to 1.43%) was observed for all doses at 12 and 24 weeks. OPK-88003 significantly decreased HbA1c levels versus placebo and was non-inferior to 2 mg exenatide ER at the 30 mg and 50 mg doses (p=0.994 and 0.628, respectively). Greater reductions in FBG with OPK-88003 resulted in similar 7-point self-monitored blood glucose (SMBG) profile values compared to treatment with exenatide ER and lower values compared to placebo. The composition of the drug product used in this study was Formula 3 (now called OPK-88003) as a lyophilized formulation in a glass vial and which, in addition to active ingredients, contained sodium citrate dihydrate (buffer), citric acid (buffer), sucrose (stabilizer), and mannitol (bulking agent) and, eventually, sterile water prior to injection. The vials contained 25 mg of Formula 3 at a pH of about 5.5. The vials are provided with a solid lyophilized formulation which are reconstituted for injection with 1.1 mL sterile water for injection.

OPK-88003 also produced a dose-dependent weight loss of up to 3.3 kg by week 24. In comparison to placebo and exenatide ER, OPK-88003 50 mg resulted in statistically significant percent change in body weight from baseline at 12 (p<0.001 and p=0.011, respectively) and 24 (p=0.007 and p=0.05, respectively) weeks. At least twice as many OPK-88003-50 mg (35.5%) subjects lost ≥5% of their body weight compared to placebo (11.8%) (p=0.004) and exenatide ER (18.3%) (p=0.025) by week 24.

Example 7: Dose Escalation Study

A randomized, double blind, dose escalation, placebo controlled study was conducted in around 110 subjects having type 2 diabetes controlled with diet and exercise alone or with a stable dose of metformin. The study was aimed at treating type 2 diabetes and obesity. The dose escalation regime was designed to improve glucose control and increase weight loss. The study had have four phases consisting of a screening/baseline phase (up to two weeks prior to first dose); a 30-week treatment period consisting of a dose escalation phase (8 weeks) and a target dose phase (22 weeks), and a follow-up period (4 weeks). Subjects were randomly assigned to OPK-88003 (Formula 3 in buffered solution) or placebo administered QW (1× per week). The study evaluated the effects of a dose escalation regimen of OPK88003 on HbA1c, weight loss, and safety over 30 weeks in adult type 2 diabetes patients with inadequate glucose control with metformin and/or diet and exercise.

Dose Escalation Phase 2 Study

OPK-88003 or placebo were supplied for once-weekly SC injection. OPK-88003 or placebo was initially administered for 4 weeks at 20 mg QW followed by 4 weeks at 40 mg QW. Once eight weeks of dose escalation are complete, subjects received a target dose of 70 mg QW for 22 weeks. The control group received matched placebo SC injections QW for 30 weeks.

A total of 113 subjects were randomized at a ratio of 1.75:1 to OPK-88003 and placebo.

The primary efficacy outcome of HbA1c change from baseline to the 30-week endpoint was performed on the mITT analysis set. The primary efficacy outcome was analyzed using linear constructs from an analysis of covariance (ANCOVA) model with treatment arm and BMI strata as factors and the baseline HbA1c value as a covariate. An additional supportive analysis of the primary efficacy outcome was a mixed-model repeated-measures (MMRM). The factors in the model are BMI strata, treatment group, baseline value, visit, and the treatment group by visit interactions. Additional covariates may be added. The mean percent weight change from baseline at the 30 week endpoint was analyzed using similar dose response models as the primary analysis. A logistic regression analysis was performed for the percent of subjects with 5% or greater body weight loss with treatment and HbA1c and BMI strata as fixed effects, and baseline weight as a covariate. Comparisons between treatment groups for the number and percent of subjects achieving HbA1c less than or equal to 6.5% were performed for responses after 30 weeks treatment with LOCF based on a logistic regression model with a factor for treatment group with BMI strata and baseline HbA1c as a covariate.

The list of abbreviations and definitions of terms used herein is inclusive of:
ANCOVA analysis of covariance
AUC area under the curve
BIW twice weekly
BMI body mass index
Cmax maximum concentration
CNS central nervous system
CV cardiovascular
FGF-21 fibroblast growth factor 21
FPG fasting plasma glucose
GI gastrointestinal
HR heart rate
HbA1c glycosylated hemoglobin
HDL-C high density lipoprotein cholesterol
LDL-C low density lipoprotein cholesterol
LOCF last observation carried forward
LSM least squares mean
MMRM mixed model repeated measures
NOAEL no observed adverse effect level
PD pharmacodynamics(s)
PK pharmacokinetic(s)
QTc heart rate corrected QT interval
QW once-weekly
SC subcutaneous
SD standard deviation
T2DM type 2 diabetes mellitus
ULN upper limit of normal The primary objective of the study is to evaluate the effect of dose escalation of QW SC OPK-88003 vs placebo injections on HbA1c absolute change from baseline to after 30 weeks treatment in subjects with type 2 diabetes mellitus (T2DM) inadequately controlled with diet and exercise alone, or treated with a stable dose of metformin. Patients included in the Study have T2DM for at least 6 months based on the disease diagnostic criteria in the American Diabetes Association 2. Classification and diagnosis of diabetes: Standards of Medical Care in Diabetes-2018 guidelines (Diabetes Care 2018: 41 (Suppl 1):S13-S27.

Secondary endpoints include: mean percent body weight change from baseline after the full treatment period (30 weeks); percent of subject with 5% or greater body weight loss after 30 weeks treatment; change of FPG from baseline to after 30 weeks treatment; and the number and percentage of subjects achieving HbA1c less than or equal to 6.5% (note that a 7.6% HbA1c is 60 mmol/mol and a 7.2% HbA1c is 55 mmol/mol).

Other objectives include: change from baseline to after 30 weeks treatment in HDL-C, total cholesterol, trigylcerides, and LDL-C; fasting FGF-21, adiponectin, beta-hydroxybutyrate, glucogon and insulin levels; incidence and rate of GI and CV events; immunogenicity of OPK-88003 and to assess PK of OPK-88003; as well as PD endpoints that are inclusive of, but not limited to, efficacy (glucose, HbA1c, weight), tolerability (e.g. nausea and vomiting), safety (e.g., QTc, HR) and biomarkers (e.g. insulin, glucagon).

Patients included in the Study were males or females 18 to 80 years of age and had an HbA1c value at screening of greater than or equal to 7.0% and less than or equal to 10.5% and a BMI of greater than or equal to 27 and less than or equal to 45 kg/m$^2$ at screening. An adequate dose as described herein in the stable formulation directly administered to the T2DM patient in need of treatment thereof lowers HbA1c by an amount that is less than the patients pre-regimen (baseline) state.

The drug product/formulation is a sterile solution (1 mL extractable volume in a 2 mL glass vial) for injection. The vial contains 70 mg/mL of OPK-88003 and inactive ingredients selected from L-methionine (antioxidant), sorbitol (tonicity agent) and sodium acetate trihydrate (buffer) at a pH of about 4.5. The pH is adjusted with acid or base. In one embodiment, the formulation comprises:

| | |
|---|---|
| OPK-88003 | 70 mg/mL |
| L-methionine | 4.48 mg/mL |
| Sorbitol | 38.26 mg/mL |
| Sodium acetate trihydrate | 1.36 mg/mL |
| Water | qs to 1 mL |

The placebo product composition is identical to the OPK-88003 drug product, without the OPK-88003 active ingredient.

Previous Study Results

Equivalent effects on HbA1c and greater weight loss effects were observed for OPK-88003 compared to exenatide ER in the previous phase 2 trial study. These findings are consistent with the hypothesis that the additional glucagon activity associated with OPK-88003 provides equivalent glycemic control and superior weight loss compared to GLP-1 modulation alone. Since it has been demonstrated that additional weight loss can be obtained by increasing the dose of GLP-1 agonists (Davies et al, *JAMA*, 2015, 314:687-699) increasing the dose of OPK-88003 will demonstrate additional weight loss benefits. The previous phase 2 trial study investigated the dose-response relationship of OPK-88003 versus placebo and positive control exenatide ER, and established that QW injections over 24 weeks could reduce HbA1c by up to 1.43% and weight by up to 3.3 kg. The severity of the OPK-88003 AE profile observed so far, including the 50 mg QW dose tested in the phase 2 trial, does not outweigh the anticipated favorable benefits on glucose and body weight. Thus, the benefit risk balance of OPK-88003 supports additional clinical testing of OPK-88003 at doses higher than 50 mg QW.

There was also a dose-dependent increase in GI side effects with higher OPK-88003 doses in prior human studies, however, these effects were transient in nature. In efforts to optimize OPK-88003 for glucose control and body weight reduction, dose escalation could be key for reducing GI side effects through gradual up-titration of doses to target dose levels. Other GLP-1 agonists, such as liraglutide QD (once daily) and semaglutide QW, show that when slow dose escalation is implemented, higher doses are achieved and the rates of patients reporting GI disorders can be significantly reduced. In the multiple ascending dose portion of the phase 1 trial in diabetics DPO-101, GI tolerability of OPK-88003 was improved with the use of a titration regimen for 60 mg QW. Thus, it is reasonable to anticipate that a slower dose-escalation regimen will exhibit improved tolerability to nausea and vomiting at dose levels higher than the 50 mg dose administered in the previous phase 2 trial study. As such, for this trial, a slow dose-titration schedule over 8 weeks will be employed to help mitigate the gastrointestinal AEs.

Dose Selection

This study includes OPK-88003 target dose of 70 mg administered weekly. Based on data from subjects with T2DM in the previous phase 2 study, the 70 mg QW dose is anticipated to produce maximal reduction in fasting glucose and HbA1c and yield a greater weight loss than the 50 mg QW dose from the dose-range finding phase 2 trial. The 70 mg QW dose level will be administered using a fixed dose escalation schedule over 8 weeks. Plasma levels of OPK-88003 reach steady state over 5 weeks with the accumulation ratio for $C_{max}$ and area under the curve (AUC) up to 2.6-fold. Thus, it is reasonable to apply slow dose titration with dose escalation every 4 weeks. For the first 4 weeks of dose escalation subjects received 20 mg followed by 4 weeks of 40 mg administered QW.

Safety and tolerability from the previous phase 2 trial support evaluation of the dose levels planned for the 8-week dose escalation period.

A population PK model with a first order absorption and first order elimination, along with inter-individual variability for all PK parameters was used to simulate the proposed 70 mg QW dose. This dose is 33% higher (for $C_{max}$ and AUC) when compared to the 50 mg dose that had acceptable safety and tolerability over 24 weeks. Simulated PK exposures derived from the previous phase 2 trial study modeling in conjunction with the phase 1 clinical pharmacology trial study with supratherapeutic exposures and nonclinical safety margins support a multiple dose of 70 mg, administered QW, in the targeted population.

Supratherapeutic exposures in the clinical pharmacology trial study persisted for approximately three weeks after the last dose due to the long terminal half-life of OPK-88003. The once-a-day dosing regimen resulted in high rates of moderately severe nausea and vomiting that required concomitant medication, however most events resolved within a week after the last dose. The intensity and/or duration of these events is expected to be reduced by a slow dose titration in the current study. In previous OPK-88003 trials, there were no safety concerns reported based on clinical laboratory evaluations and ECGs and no severe or serious AEs (SAEs) at supratherapeutic exposures.

The safety data from the human studies confirm dose-related, monitorable AEs related to GI tolerability. Most of the events were single episodes, mild in severity, transient, and selflimited. These events occurred most commonly after the first dose and the incidence then declined to near control levels by the fourth dose, consistent with a GLP-1R agonist effect.

Further, studies of molecules with similar mechanism demonstrate improved tolerability with slow dose titration and longer duration of dosing and have not demonstrated new, unexpected toxicities with longer duration of dosing.

The toxicology program for OPK-88003 provided continuous plasma exposure in rats and monkeys with a BIW dosing schedule and supports the proposed dosing regimen. The safety margins for the 70 mg dose based on the exposures (AUC) derived from population PK modeling in humans and the NOAELs for organ toxicity as determined in rats (3 mg/kg) and monkeys (1.5 mg/kg) after chronic dosing correspond to exposure multiples of 0.7-fold and 10-fold, respectively. Taking into consideration clinical efficacy and tolerability, QW doses of 70 mg are expected to be tolerated with slow dose-escalation and produce glycemic control and weight loss benefits. The data from this trial together with the data from the previous phase 2 trial will enable robust benefit-risk characterizations in T2DM and will form the basis to assess the effect of dose escalation on OPK-88003 efficacy, safety and tolerability, and support the selection of dose(s) and dose regimen to be included in phase 3 trials.

Study Design

The subjects followed a fixed dose escalation that includes a dose escalation over 8 weeks. The target dose of 70 mg QW was reached after receiving 20 mg for 4 weeks followed by 4 weeks of 40 mg QW. The study duration for individual subjects was up to 36 weeks. Blinding will be maintained throughout the study.

This study is designed to establish the effect of a dose-escalation regimen on safety, tolerability and efficacy of 70 mg QW OPK-88003 in subjects with T2DM, relative to placebo. The study duration, target population and efficacy endpoints are typical of phase 2 trials and are consistent with FDA guidance. A four-week follow-up after the treatment period will ensure an adequate time to assess reversibility of any clinical or laboratory abnormalities. Subjects who develop ADA at follow-up will have one additional follow-up assessment approximately four months post last dose. This clinical study enrolled subjects with inadequate glycemic control based on HbA1c values ranging from 7.0% to 10.5%, inclusive. Similar ranges of screening HbA1c have been used in numerous studies of T2DM treatments. Subjects treated with diet and exercise alone or in combination with stable metformin monotherapy (≥1000 mg/day), were enrolled. Subjects on a second oral antihyperglycemic medication (OAM) may be also be eligible if the second OAM was discontinued 3 months or more prior to visit 1. Stable metformin treatment for at least 3 months is required to minimize baseline glucose drift prior to study entry.

The study duration for individual subjects was up to 36 weeks and consisted of four phases: screening (up to 2 weeks prior to first dose), dose escalation (8 weeks), target dose/maintenance (22 weeks) and follow-up (4 weeks).

Results

The data was analyzed for the modified intent to treat patient population (mITT; 108 of 113 patients) using the mixed model repeated measures (MMRM). The mITT population includes all patients that received at least one dose of drug and had one post baseline evaluation.

Topline analysis of results of the study demonstrated that OPK88003 met the primary objective with a statistically significant lowering of hemoglobin A1c (HbA1c) after 30 weeks of treatment versus placebo as well as an important secondary endpoint, statistically significant weight loss versus placebo.

OPK88003 showed a strong, clinically meaningful reduction in HbA1c at 30 weeks (−1.30% versus placebo, −0.09% mean absolute reduction, p<0.0001). Additionally, 50% of OPK88003 treated patients achieved HbA1c ≤6.5% versus 13.8% of placebo treated subjects (p=0.0008).

Tables 29 to 33 show analysis of HbA1c change from baseline to weeks 4, 8, 12, 22, and 30/LOCFh in the MMRM mITT population. Table 34 shows the analysis of HbA1c change from baseline to week 30/LOCFall in the ANCOVA mITT population.

Patients treated with OPK88003 achieved a significant weight loss at 30 weeks (−4.4 kg compared to placebo, −1.8 kg, p=0.01). Approximately 38% of treated patients achieved a 5% or greater body weight loss compared to 13% of placebo treated patients (p=0.008).

Table 35 shows the analysis of weight change from baseline to week 30 in the MMRM mITT population. Table 36 shows the analysis of subjects achieving >=5% weight loss in the mITT population.

OPK88003 treated patients showed significant blood triglyceride decreases from baseline. The decrease in triglycerides in the OPK88003 treatment group was −31.2 mg/dL (p=0.005) compared to −11.6 mg/dL for placebo (p=0.44). OPK88003 treatment showed a safety and tolerability profile expected for the GLP-1 receptor agonist class. The most frequent adverse events were nausea, vomiting and diarrhea. These were mostly mild and occurred predominantly during the titration period and resolved over time. No serious adverse events were observed.

Table 37 shows the analysis of triglycerides change from baseline to week 30 in MMRM mITT population.

TABLE 29

Analysis of HbA1c Change from Baseline to Week 4: MMRM mITT Population

| Parameter (Unit) Category | Statistic | OPK-88003 (N = 69) | Placebo (N = 39) |
|---|---|---|---|
| Hemoglobin A1C (%) | | | |
| Number of Subjects [1] | n | 69 | 39 |
| Baseline [2] | Mean (SD) | 8.05 (0.834) | 7.97 (0.906) |
| Week 4 | Mean (SD) | 7.39 (0.768) | 7.88 (1.080) |
| --- Change from Baseline to Week 4 [3] --- | | | |
| | LS Mean (SE) | −0.67 (0.063) | −0.10 (0.078) |
| | 95% Confidence Interval | (−0.79, −0.54) | (−0.26, 0.05) |
| | p-value | <0.0001 | 0.1907 |
| --- Comparison Between Treatments (OPK-88003 - Placebo) [3] --- | | | |
| | LS Mean (SE) | −0.57 (0.091) | |
| | 95% Confidence Interval | (−0.75, −0.39) | |
| | p-value | <0.0001 | |
| | Shapiro-Wilk Normality Test of Residuals p-value | | 0.2192 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for BMI stratification group (<30 kg/m$^2$, >=30 kg/m$^2$), treatment group, baseline value, visit, and the treatment group by visit interactions. An unstructured covariance matrix is used.
[4] Week 30/LOCFh: If the Week 30 measurement is missing, the last observation carried forward is applied to impute the missing Week 30 value only for subjects that have early termed due to hyperglycemia. Otherwise, no imputation is made.

TABLE 30

Analysis of HbA1c Change from Baseline to Week 8: MMRM mITT Population

| Parameter (Unit) Category | Statistic | OPK-88003 (N = 69) | Placebo (N = 39) |
|---|---|---|---|
| Hemoglobin A1C (%) | | | |
| Number of Subjects [1] | n | 62 | 33 |
| Baseline [2] | Mean (SD) | 8.07 (0.861) | 7.89 (0.753) |
| Week 8 | Mean (SD) | 6.99 (0.760) | 7.76 (0.976) |
| Change from Baseline to Week 8 [3] | | | |
| | LS Mean (SE) | −1.10 (0.092) | −0.08 (0.120) |
| | 95% Confidence Interval | (−1.28, −0.92) | (−0.31, 0.16) |
| | p-value | <0.0001 | 0.5275 |
| Comparison Between Treatments (OPK-88003 - Placebo) [3] | | | |
| | LS Mean (SE) | −1.02 (0.145) | |
| | 95% Confidence Interval | (−1.31, −0.74) | |
| | p-value | <0.0001 | |
| | Shapiro-Wilk Normality Test of Residuals p-value | | 0.4504 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for BMI stratification group (<30 kg/m$^2$, >=30 kg/m$^2$), treatment group, baseline value, visit, and the treatment group by visit interactions. An unstructured covariance matrix is used.
[4] Week 30/LOCFh: If the Week 30 measurement is missing, the last observation carried forward is applied to impute the missing Week 30 value only for subjects that have early termed due to hyperglycemia. Otherwise, no imputation is made.

TABLE 31

Analysis of HbA1c Change from Baseline to Week 12: MMRM mITT Population

| Parameter (Unit) Category | Statistic | OPK-88003 (N = 69) | Placebo (N = 39) | |
|---|---|---|---|---|
| Hemoglobin A1C (%) | | | | |
| Number of Subjects [1] | n | 60 | 30 | |
| Baseline [2] | Mean (SD) | 8.01 (0.795) | 7.78 (0.657) | |
| Week 12 | Mean (SD) | 6.66 (0.680) | 7.48 (0.867) | |
| Change from Baseline to Week 12 [3] | | | | |
| | LS Mean (SE) | −1.38 (0.105) | −0.20 (0.138) | |
| | 95% Confidence Interval | (−1.58, −1.17) | (−0.48, 0.07) | |
| | p-value | <0.0001 | 0.1430 | |
| Comparison Between Treatments (OPK-88003 - Placebo) [3] | | | | |
| | LS Mean (SE) | −1.17 (0.168) | | |
| | 95% Confidence Interval | (−1.51, −0.84) | | |
| | p-value | <0.0001 | | |
| | Shapiro-Wilk Normality Test of Residuals p-value | | | 0.1846 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for BMI stratification group (<30 kg/m², >=30 kg/m²), treatment group, baseline value, visit, and the treatment group by visit interactions. An unstructured covariance matrix is used.
[4] Week 30/LOCFh: If the Week 30 measurement is missing, the last observation carried forward is applied to impute the missing Week 30 value only for subjects that have early termed due to hyperglycemia. Otherwise, no imputation is made.

TABLE 32

Analysis of HbA1c Change from Baseline to Week 22: MMRM mITT Population

| Parameter (Unit) Category | Statistic | OPK-88003 (N = 69) | Placebo (N = 39) | |
|---|---|---|---|---|
| Hemoglobin A1C (%) | | | | |
| Number of Subjects [1] | n | 54 | 25 | |
| Baseline [2] | Mean (SD) | 8.07 (0.814) | 7.78 (0.697) | |
| Week 22 | Mean (SD) | 6.64 (0.832) | 7.17 (0.753) | |
| Change from Baseline to Week 22 [3] | | | | |
| | LS Mean (SE) | −1.39 (0.123) | −0.31 (0.164) | |
| | 95% Confidence Interval | (−1.64, −1.15) | (−0.64, 0.01) | |
| | p-value | <0.0001 | 0.0606 | |
| Comparison Between Treatments (OPK-88003 - Placebo) [3] | | | | |
| | LS Mean (SE) | −1.08 (0.201) | | |
| | 95% Confidence Interval | (−1.48, −0.68) | | |
| | p-value | <0.0001 | | |
| | Shapiro-Wilk Normality Test of Residuals p-value | | | 0.0164 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for BMI stratification group (<30 kg/m², >=30 kg/m²), treatment group, baseline value, visit, and the treatment group by visit interactions. An unstructured covariance matrix is used.
[4] Week 30/LOCFh: If the Week 30 measurement is missing, the last observation carried forward is applied to impute the missing Week 30 value only for subjects that have early termed due to hyperglycemia. Otherwise, no imputation is made.

TABLE 33

Analysis of HbA1c Change from Baseline to Week 30/LOCFh: MMRM mITT Population

| Parameter (Unit) Category | Statistic | OPK-88003 (N = 69) | Placebo (N = 39) |
|---|---|---|---|
| Hemoglobin A1C (%) | | | |
| Number of Subjects [1] | n | 50 | 29 |
| Baseline [2] | Mean (SD) | 8.10 (0.836) | 8.01 (0.974) |
| Week 30/LOCFh [4] | Mean (SD) | 6.74 (0.960) | 7.74 (1.365) |
| Change from Baseline to Week 30/LOCFh [3] | | | |
| | LS Mean (SE) | −1.30 (0.137) | −0.09 (0.181) |
| | 95% Confidence Interval | (−1.57, −1.02) | (−0.45, 0.27) |
| | p-value | <0.0001 | 0.6049 |
| Comparison Between Treatments (OPK-88003 - Placebo) [3] | | | |
| | LS Mean (SE) | −1.20 (0.224) | |
| | 95% Confidence Interval | (−1.65, −0.76) | |
| | p-value | <0.0001 | |
| | Shapiro-Wilk Normality Test of Residuals p-value | | 0.0005 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for BMI stratification group (<30 kg/m$^2$, >=30 kg/m$^2$), treatment group, baseline value, visit, and the treatment group by visit interactions. An unstructured covariance matrix is used.
[4] Week 30/LOCFh: If the Week 30 measurement is missing, the last observation carried forward is applied to impute the missing Week 30 value only for subjects that have early termed due to hyperglycemia. Otherwise, no imputation is made.

TABLE 34

Analysis of HbA1c Change from Baseline to Week 30/LOCFall: ANCOVA mITT Population

| Parameter (Unit) Category | Statistic | OPK-88003 (N = 69) | Placebo (N = 39) |
|---|---|---|---|
| Hemoglobin A1C (%) | | | |
| Number of Subjects [1] | n | 69 | 39 |
| Baseline [2] | Mean (SD) | 8.05 (0.834) | 7.97 (0.906) |
| Week 30/LOCFall [3] | Mean (SD) | 6.82 (0.925) | 7.85 (1.240) |
| Change from Baseline to Week 30/LOCFall [4] | | | |
| | LS Mean (SE) | −1.18 (0.131) | −0.11 (0.159) |
| | 95% Confidence Interval | (−1.44, −0.92) | (−0.43, 0.20) |
| | p-value | <0.0001 | 0.4773 |
| Comparison Between Treatments (OPK-88003 - Placebo) [3] | | | |
| | LS Mean (SE) | −1.07 (0.185) | |
| | 95% Confidence Interval | (−1.43, −0.70) | |
| | p-value | <0.0001 | |
| | Shapiro-Wilk Normality Test of Residuals p-value | | 0.0002 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] Week 30/LOCFall: If the Week 30 measurement is missing, the last observation carried forward is applied to impute the missing Week 30 value for all subjects.
[4] The LS Means, SEs, confidence intervals, and p-values come from an ANCOVA model with change from baseline as the dependent variable and treatment and BMI stratification group (<30 kg/m$^2$, >=30 kg/m$^2$) as factors and baseline value as a covariate.

TABLE 35

Analysis of Weight Change from Baseline to Week 30: MMRM mITT Population

| Parameter (Unit) Category | Statistic | OPK-88003 (N = 69) | Placebo (N = 39) |
|---|---|---|---|
| Weight (kg) | | | |
| Number of Subjects [1] | n | 51 | 25 |
| Baseline [2] | Mean (SD) | 97.15 (14.058) | 99.11 (18.507) |
| Week 30 | Mean (SD) | 93.16 (14.514) | 97.14 (19.283) |
| Change from Baseline to Week 30 [3] | | | |
| | LS Mean (SE) | −4.39 (0.633) | −1.76 (0.890) |
| | 95% Confidence Interval | (−5.64, −3.13) | (−3.52, 0.01) |
| | p-value | <0.0001 | 0.0507 |
| Comparison Between Treatments (OPK-88003 − Placebo) [3] | | | |
| | LS Mean (SE) | −2.63 (1.076) | |
| | 95% Confidence Interval | (−4.76, −0.50) | |
| | p-value | 0.0163 | |
| | Shapiro-Wilk Normality Test of Residuals p-value | | 0.1573 |

SD = Standard Deviation.
LS = Least Squares.
SE = Standard Error.
Duplicate weights at each visit are averaged prior to analysis.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for HbA1c stratification group (<8.5%, >=8.5%), BMI stratification group (<30 kg/m$^2$, >=30 kg/m$^2$), treatment group, baseline value, visit, and the treatment group by visit interactions. An unstructured covariance matrix is used. No imputation is performed.

TABLE 36

Analysis of Subjects Achieving >=5% Weight Loss: mITT Population

| Category Statistic | OPK-88003 (N = 69) | Placebo (N = 39) |
|---|---|---|
| Number of Subjects with >=5% Weight Loss at Week 4 | | |
| N' | 69 | 39 |
| n (%) | 2 ( 2.9) | 0 ( 0.0) |
| Number of Subjects with >=5% Weight Loss at Week 8 | | |
| N' | 62 | 33 |
| n (%) | 10 ( 16.1) | 1 ( 3.0) |
| Odds Ratio | 8.408 | |
| 95% Confidence Interval | (0.919, 76.919) | |
| p-value | 0.0594 | |
| Number of Subjects with >=5% Weight Loss at Week 12 | | |
| N' | 60 | 30 |
| n (%) | 21 ( 35.0) | 1 ( 3.3) |
| Odds Ratio | 19.976 | |
| 95% Confidence Interval | (2.439, 163.604) | |
| p-value | 0.0053 | |
| Number of Subjects with >=5% Weight Loss at Week 16 | | |
| N' | 58 | 28 |
| n (%) | 24 ( 41.4) | 2 ( 7.1) |
| Odds Ratio | 10.009 | |
| 95% Confidence Interval | (2.129, 47.056) | |
| p-value | 0.0035 | |
| Number of Subjects with >=5% Weight Loss at Week 22 | | |
| N' | 55 | 25 |
| n (%) | 26 ( 47.3) | 6 ( 24.0) |
| Odds Ratio | 2.910 | |
| 95% Confidence Interval | (0.995, 8.510) | |
| p-value | 0.0511 | |
| Number of Subjects with >=5% Weight Loss at Week 26 | | |
| N' | 54 | 25 |
| n (%) | 24 ( 44.4) | 6 ( 24.0) |
| Odds Ratio | 2.510 | |
| 95% Confidence Interval | (0.856, 7.358) | |
| p-value | 0.0934 | |
| Number of Subjects with >=5% Weight Loss at Week 30 | | |
| N' | 51 | 25 |
| n (%) | 21 ( 41.2) | 5 ( 20.0) |
| Odds Ratio | 3.061 | |
| 95% Confidence Interval | (0.972, 9.646) | |
| p-value | 0.0560 | |
| Number of Subjects with >=5% Weight Loss at Week 30/LOCFall [1] | | |
| N' | 69 | 39 |
| n (%) | 26 ( 37.7) | 5 ( 12.8) |
| Odds Ratio | 4.204 | |
| 95% Confidence Interval | (1.450, 12.189) | |
| p-value | 0.0082 | |

Duplicate weights at each visit are averaged prior to analysis. % = 100 * n/N' where n = number of responders at the specified visit and N' = number of subjects with non-missing value at the specified visit. Odds ratios, confidence intervals, and p-values are from a logistic regression model with treatment group, HbA1c strata, and BMI strata as factors and baseline weight as a covariate. Logistic regression only carried out when there is at least one responder in each group
[1] Week 30/LOCFall: If the Week 30 measurement is missing, the last observation carried forward is applied to impute the missing Week 30 value for all subjects.

TABLE 37

Analysis of Triglycerides Change from Baseline to Week 30: MMRM mITT Population

| Parameter (Unit) Category | Statistic | OPK-88003 (N = 69) | Placebo (N = 39) |
|---|---|---|---|
| Triglycerides (mg/dL) | | | |
| Number of Subjects [1] | n | 50 | 25 |
| Baseline [2] | Mean (SD) | 193.0 (119.52) | 171.9 (134.72) |
| Week 30 | Mean (SD) | 159.2 (101.66) | 168.7 (85.11) |
| Change from Baseline to Week 30 [3] | | | |
| | LS Mean (SE) | −31.2 (11.02) | −11.6 (15.23) |
| | 95% Confidence Interval | (−53.1, −9.4) | (−41.8, 18.7) |
| | p-value | 0.0055 | 0.4499 |
| Comparison Between Treatments (OPK-88003 - Placebo) [3] | | | |
| | LS Mean (SE) | −19.7 (18.03) | |
| | 95% Confidence Interval | (−55.4, 16.1) | |
| | p-value | 0.2774 | |
| | Shapiro-Wilk Normality Test of Residuals p-value | | <0.0001 |

SD = Standard Deviation.
LS = Least Squares.
SE = Standard Error.
[1] Only subjects with non-missing baseline and the specified visit are included.
[2] Baseline is defined as the measurement at Week 0. If missing, the last value prior to first dose is used as baseline.
[3] The LS Means, SEs, confidence intervals, and p-values come from a mixed-model repeated-measures (MMRM) with change from baseline as the dependent variable and factors in the model for HbA 1 c stratification group (<8.5%, >=8.5%), BMI stratification group (<30 kg/m$^2$, >=30 kg/m$^2$), treatment group, baseline value, visit, and the treatment group by visit interactions. An unstructured covariance matrix is used. No imputation is performed.

Example 8: Solubility, Viscosity, Syringeability, Temperature Excursion, and Stability The initial formulation study was performed for OPK-88003 peptide formulated at 60, 70, and 80 mg/mL in 10 mM citrate buffer pH 5.5. The following methods were used for testing the OPK-88003 samples: MFR, HIAC, DLS, Viscosity and Syringeability. Further, a solubility study was performed for OPK-88003 samples formulated at 40, 60, and 80 mg/mL in 10 mM citrate buffer pH 5.5.

Solubility Study: The lyophilized OPK-88003 dry powder was completely soluble at room temperature in acetate buffer at all tested concentrations (40, 60 and 80 mg/mL). The dissolution time was about 1-2 minutes for 40 mg/mL, 2-3 minutes for 60 mg/mL and about 3-4 minutes for 80 mg/mL sample. All solutions were clear and colorless. The solubility of OPK-88003 solutions was evaluated after storage of samples at room temperature, 5° C. and −5° C. for 18 hours. No phase separation or peptide precipitation was observed at all tested conditions.

TABLE 29

Dissolution Time

| Sample | Dissolution Time (minutes) | Phase Separation | Color | Clarity |
|---|---|---|---|---|
| 40 mg/mL, 10 mM citrate buffer, pH 5.5 | 1 to 2 | No phase separation | Colorless | Clear |
| 60 mg/mL, 10 mM citrate buffer, pH 5.5 | 2 to 3 | No phase separation | Colorless | Clear |
| 80 mg/mL, 10 mM citrate buffer, pH 5.5 | 3 to 4 | No phase separation | Colorless | Clear |

TABLE 30

Solubility After Storage at Different Temperatures

| Concentration | Storage Condition | Phase Separation | Color | Clarity |
|---|---|---|---|---|
| 40 mg/mL, 10 mM citrate buffer, pH 5.5 | 18 hrs. at −5° C. | No phase separation | Colorless | Clear |
| | 18 hrs. at 5° C. | No phase separation | Colorless | Clear |
| | 18 hrs. at RT | No phase separation | Colorless | Clear |
| 60 mg/mL, 10 mM citrate buffer, pH 5.5 | 18 hrs. at −5° C. | No phase separation | Colorless | Clear |
| | 18 hrs. at 5° C. | No phase separation | Colorless | Clear |
| | 18 hrs. at RT | No phase separation | Colorless | Clear |
| 80 mg/mL, 10 mM citrate buffer, pH 5.5 | 18 hrs. at −5° C. | No phase separation | Colorless | Clear |
| | 18 hrs. at 5° C. | No phase separation | Colorless | Clear |
| | 18 hrs. at RT | No phase separation | Colorless | Clear |

Viscosity: As expected, the viscosity in the tested formulations increased with increasing the OPK-88003 concentration. For all formulations the viscosity remained unchanged with increasing shear rate displaying Newtonian behavior.

TABLE 31

Viscosity

| Concentration | Temperature (° C.) | RPM | Shear Rate (s$^{-1}$) | Torque (%) | Viscosity (cP) | Shear Stress (s$^{-1}$) | Viscosity Average (cP) |
|---|---|---|---|---|---|---|---|
| 60 mg/mL, 10 mM Citrate buffer, pH 5.5 | 22.04 | 5 | 37.5 | 26.7 | 16.4 | 6.1 | 16.5 |
| | 21.99 | 10 | 75.0 | 53.8 | 16.5 | 12.4 | |
| | 21.99 | 12 | 90.0 | 64.5 | 16.5 | 14.8 | |
| | 22.03 | 15 | 113.0 | 80.9 | 16.6 | 18.6 | |
| | 21.98 | 18 | 135.0 | 97.4 | 16.6 | 22.4 | |
| 70 mg/mL, 10 mM Citrate buffer, pH 5.5 | 22.03 | 5 | 37.5 | 33.9 | 20.8 | 7.8 | 21.1 |
| | 22.01 | 10 | 75.0 | 68.5 | 21.0 | 15.7 | |
| | 22.04 | 12 | 90.0 | 82.4 | 21.0 | 18.9 | |
| | 22.02 | 13 | 97.5 | 90.2 | 21.2 | 20.7 | |
| | 22.04 | 14 | 105.0 | 97.5 | 21.3 | 22.4 | |

TABLE 31-continued

Viscosity

| Concentration | Temperature (° C.) | RPM | Shear Rate (s⁻¹) | Torque (%) | Viscosity (cP) | Shear Stress (s⁻¹) | Viscosity Average (cP) |
|---|---|---|---|---|---|---|---|
| 80 mg/mL, 10 mM Citrate buffer, pH 5.5 | 22.00 | 5 | 37.5 | 43.6 | 26.7 | 10.0 | 26.9 |
| | 21.99 | 7 | 52.5 | 62.0 | 27.1 | 14.3 | |
| | 22.01 | 9 | 67.5 | 79.2 | 26.9 | 18.2 | |
| | 21.99 | 10 | 75.0 | 87.4 | 26.8 | 20.1 | |
| | 22.04 | 11 | 82.5 | 96.9 | 27.0 | 22.3 | |

Syringeability: The break loose force and glide force were measured for three OPK-88003 solutions using six different types of needles. No significant differences in the break loose force were observed between tested OPK-88003 solutions and types of needles. A clear trend for glide force was observed based on the needle type and OPK-88003 concentration.

TABLE 32

Syringeability

| Sample | Needle | BF Max [N] | GF Max [N] |
|---|---|---|---|
| 60 mg/mL, 10 mM Citrate buffer, pH 5.5 | 25G ⅝ TW | 1.72 | 3.44 |
| | 25G ⅝ | 1.24 | 4.06 |
| | 26G ½ | 1.77 | 5.11 |
| | 26G ⅝ | 1.67 | 5.61 |
| | 27G ½ | 1.51 | 10.88 |
| | 30G ½ | 1.77 | 30.43 |
| 70 mg/mL, 10 mM Citrate buffer, pH 5.5 | 25G ⅝ TW | 1.74 | 3.33 |
| | 25G ⅝ | 1.61 | 4.28 |
| | 26G ½ | 1.65 | 4.88 |
| | 26G ⅝ | 1.92 | 5.56 |
| | 27G ½ | 1.47 | 9.55 |
| | 30G ½ | 1.95 | 24.74 |
| 80 mg/mL, 10 mM Citrate buffer, pH 5.5 | 25G ⅝ TW | 1.98 | 5.91 |
| | 25G ⅝ | 1.48 | 6.40 |
| | 26G ½ | 1.59 | 7.44 |
| | 26G ⅝ | 1.67 | 8.85 |
| | 27G ½ | 1.79 | 18.69 |
| | 30G ½ | N/A | N/A |

Syringes: BD, 1 mL

TABLE 33

Temperature Excursion Study (Study Condition: 5 F/T Cycles)

| Attribute | Method | T = 0 Month (Jul. 5, 2017) | 5 FIT Cycles (Jan. 8, 2018) |
|---|---|---|---|
| Physical Appearance | SOP-0363, Ajinomoto Althea | Clear colorless solution | Clear, colorless solution |
| pH | SOP-0187, Ajinomoto Althea | 4.6 | 4.6 |
| Reversed Phase HPLC (RP-HPLC) | cSOP-0735, Ajinomoto Althea | Purity: 95.2% Quantity: 99.8% Total Related Substance: 4.80% Largest Related Substance: 2.06% | Quantity: 96.6% LC Purity: 95.4% RRT 0.95: 0.21% RRT 0.99: 1.21% RRT 1.02: 0.75% RRT 1.03: 1.93% RRT 1.03: 0.45% Total related Substances: 4.6% Largest Related Substance: 1.9% |
| Size Exclusion HPLC | cSOP-0748, Ajinomoto Althea | Monomer: 95.4% Aggregate 1: 1.8% Aggregate 2: 2.4% Post Monomer Peak: 0.5 Total Impurities: 4.7 | Monomer: 95.4% Aggregate 1: 1.9% Aggregate 2: 2.1 % Aggregate 3: 0.3% Post Monomer Peak 2: 0.4% Total Impurities: 4.6% |

TABLE 34

Temperature Excursion Study (Study Condition: 48 hours @ 30° C./65% RH)

| Attribute | Method | T = 0 Month (Jul. 5, 2017) | 48 hours @ 30° C./65% RH (Dec. 11, 2017) |
|---|---|---|---|
| Physical Appearance | SOP-0363, Ajinomoto Althea | Clear colorless solution | Clear, colorless solution |
| pH | SOP-0187, Ajinomoto Althea | 4.6 | 4.6 |
| Reversed Phase HPLC (RP-HPLC) | cSOP-0735, Ajinomoto Althea | Quantity: 99.8% Purity: 95.2% Total Related Substance: 4.80% Largest Related Substance: 2.06% | Quantity: 99 % Purity: 94.2 RRT0.94: 1.76% RRT 0.99: 0.77% RRT 1.03: 1.15% RRT 1.03: 1.59% RRT 1.04: 0.51% Total Related Substances: 5.8 Largest Related Substance: 1.8% |

TABLE 34-continued

Temperature Excursion Study (Study Condition: 48 hours @ 30° C./65% RH)

| Attribute | Method | T = O Month (Jul. 5, 2017) | 48 hours @ 30° C./65% RH (Dec. 11, 2017) |
|---|---|---|---|
| Size Exclusion HPLC | cSOP-0748, Ajinomoto Althea | Monomer: 95.4% Aggregate 1: 1.8% Aggregate 2: 2.4% Post Monomer Peak: 0.5 Total Impurities: 4.7 | Monomer: 95.2% Aggregate 1: 1.9% Aggregate 2: 2.1 % Aggregate 3: 0.3% Post Monomer Peak: 0.6% Total Impurities: 4.8% |

Stability Studies: Additional stability studies were conducted for 70 mg/mL Acetate Buffer with Methionine pH 4.5 at 1 mL long BD Neopak™ Pre-fillable syringe.

TABLE 35

Additional Stability Studies

| Test (Analytical Procedure) | Time = 0 | 1 month @25 ± 2° C./ 60 ± 5% RH | 12 months @ 5 ± 3° C. |
|---|---|---|---|
| Color of Solution (Visual) | Colorless liquid | Colorless liquid | Colorless liquid |
| Appearance/particles (Visual) | Free of visible particulates | Free of visible particulates | Free of visible particulates |
| pH | 4.53 | 4.50 | 4.55 |
| Purity (RP-HPLC) | 95.5% | 95.0% | 94.4% |
| Total Related Substances (RP-HPLC) | 4.5% | 5.0% | 5.6% |
| Individual Related Substances (RP-HPLC) | Front = 1.7% Back = 2.8% | Front = 1.8% Back = 3.1% | Front = 2.3% Back = 3.3% |
| Purity (SEC-HPLC) | 94.8% | 94.9% | 94.6% |
| Total Related Substances (SEC-HPLC) | 5.2% | 5.1% | 5.4% |

Example 9: Evaluation of Local Tolerance of Formulations of the Invention

This study was designed to assess local tolerance following a single subcutaneous dose of OPK-88003 at two different concentrations and in two different vehicle formulations, as well as their respective vehicle controls, when administered to New Zealand white rabbits.

Rabbits were assigned to four treatment groups (two females/group), and each animal received two single subcutaneous injections, one containing vehicle control, and the other containing OPK-88003 test item formulation: Rabbits were subcutaneously injected with 1 mL of either an acetate buffer-based Vehicle Control 1 and 25 or 75 mg/mL of OPK-88003 formulated in the acetate buffer-based vehicle, or a citrate buffer-based Vehicle Control 2 and 25 or 75 mg/mL of OPK-88003 formulated in the citrate buffer based vehicle as outlined below.

Vehicle (Control) 1=10 mM Acetate buffer, 30 mM Methionine, 230 mM Sorbitol, pH 4.5
Vehicle (Control) 2=30 mM Citrate, 20 mg/mL Mannitol, 5 mg/mL sucrose, pH 5.5
Injection site 1 was in a different location than injection site 2
Volume of each was 1 mL Results All animals survived until scheduled euthanasia at the end of the study. Other than the localized injection site reactions mentioned below, no vehicle control or test item formulation-related clinical observations were noted. Individual Draize scoring results are presented in Table 36. A Summary of Mean Draize Edema Scores is presented in Table 37.

Erythema: No animals exhibited erythema at the injection site after administration of either of the two vehicle controls or the test item formulations at 25 or 75 mg/mL during the study.

Edema Associated with Vehicle Controls: Very slight edema (score 1) was observed in one animal (#002) up to 30 minutes post dosing at the injection site of acetate buffer-based vehicle (Vehicle Control 1) administration, and in two animals (#006, #007) (score 1) up to 77 minutes post dosing at the injection site of citrate buffer based vehicle (Vehicle Control 2) administration. Average edema scores at the acetate buffer-based vehicle injection sites were 0.25 and 0 at 15 minutes post dosing and the last scoring time point, respectively (beginning and end of study, respectively). Average edema scores at the citrate buffer-based vehicle injection sites were 0.5 and 0.5 at the beginning and end of study, respectively.

Edema Associated with 25 and 70 mg/mL of OPK-88003: Very slight (score 1) to slight (score 2) edema was seen in all animals at the injection sites of OPK-88003 test item formulation administration, as early as 15 minutes post dosing, and either remained the same or decreased in severity by the end of the study. Animals in Groups 1 and 3 (administered the test item at 25 mg/animal formulated in acetate and citrate buffered-based vehicle, respectively) similarly exhibited average edema scores of 2 and 1.5 at the beginning and end of study, respectively.

Animals in Group 2 (administered the test item at 70 mg/animal formulated in acetate buffered-based vehicle) exhibited an average edema score of 2 and 1 at the beginning and end of study, respectively. Animals in Group 4 (administered the test item at 70 mg/animal formulated in citrate buffer-based vehicle) exhibited an average edema score of 1 and 0.5 at the beginning and end of study, respectively. The slightly greater degree of edema associated with OPK-88003 formulations compared to vehicle control may have been attributed in part to the high viscosity of these solutions (~22 cP), which occurs in the presence of OPK-88003 but not with vehicle controls alone. Edema due to high OPK-88003 formulation viscosity is likely given the absence of any visible inflammation at the injection site at necropsy.

In summary, the degree of localized edema at the injection site was slightly greater with administration of OPK-88003 compared to vehicle controls, regardless of the vehicle used for formulation. Injection site edema associated with 25 mg/mL of OPK-88003 was similar whether formulated in an acetate or citrate buffer-based vehicle. Injection site edema associated with 70 mg/mL of OPK-88003 was slightly greater in the acetate compared to the citrate buffer-based vehicle. However, the degree of injection site edema and any differences observed between treatment groups were minimal, and therefore not considered adverse or significant.

TABLE 36

Individual Draize Scores

| Sequence Group | Animal ID | Time (Relative to Dosing Time) | 1 (Left) Erythema | 1 (Left) Edema | 2 (Right) Erythema | 2 (Right) Edema |
|---|---|---|---|---|---|---|
| Treatment | | Acetate Buffer-Based . . . Vehicle Control | | | OPK-88003 Formulation (25 mg/mL) | |
| 1 | 001 | 15 min | 0 | 0 | 0 | 2 |
|   |     | 30 min | 0 | 0 | 0 | 2 |
|   |     | 60 min | 0 | 0 | 0 | 1 |
|   | 002 | 15 min | 0 | 1 | 0 | 2 |
|   |     | 30 min | 0 | 1 | 0 | 2 |
|   |     | 60 min | 0 | 0 | 0 | 2 |
| Treatment | | Acetate Buffer-Based . . . Vehicle Control | | | OPK-88003 Formulation (75 mg/mL) | |
| 2 | 003 | 15 min | 0 | 0 | 0 | 2 |
|   |     | 30 min | 0 | 0 | 0 | 1 |
|   |     | 60 min | 0 | 0 | 0 | 0 |
|   | 004 | 15 min | 0 | 0 | 0 | 2 |
|   |     | 30 min | 0 | 0 | 0 | 2 |
|   |     | 60 min | 0 | 0 | 0 | 2 |
|   |     | 90 min[1] | 0 | 0 | 0 | 2 |
| Treatment | | Citrate Buffer-Based . . . Vehicle Control | | | OPK-88003 Formulation (25 mg/mL) | |
| 3 | 005 | 15 min | 0 | 0 | 0 | 2 |
|   |     | 30 min | 0 | 0 | 0 | 1 |
|   |     | 60 min | 0 | 0 | 0 | 1 |
|   |     | 80 min[1] | 0 | 0 | 0 | 1 |
|   | 006 | 15 min | 0 | 1 | 0 | 2 |
|   |     | 30 min | 0 | 1 | 0 | 2 |
|   |     | 60 min | 0 | 1 | 0 | 2 |
|   |     | 77 min[1] | 0 | 1 | 0 | 2 |
| Treatment | | Citrate Buffer-Based . . . Vehicle Control | | | OPK-88003 Formulation (75 mg/mL) | |
| 4 | 007 | 15 min | 0 | 1 | 0 | 1 |
|   |     | 30 min | 0 | 0 | 0 | 1 |
|   |     | 60 min | 0 | 1 | 0 | 1 |
|   |     | 69 min[1] | 0 | 1 | 0 | 1 |
|   | 008 | 15 min | 0 | 0 | 0 | 1 |
|   |     | 30 min | 0 | 0 | 0 | 1 |
|   |     | 60 min | 0 | 0 | 0 | 0 |

[1]Draize scoring was performed for animals #004-007 at an additional time point due to the observation of edema at 60 minutes.

TABLE 37

Summary of Mean Draize Edema Scores

| | Vehicle Control 1 (acetate bufferbased) | Vehicle Control 2 (citrate buffer-based) | OPK-88003, 25 mg/mL in Vehicle 1 | OPK-88003, 70 mg/mL in Vehicle 1 | OPK-88003, 25 mg/mL in Vehicle 2 | OPK-88003, 70 mg/mL in Vehicle 2 |
|---|---|---|---|---|---|---|
| Mean t, 15 min[1] | 0.25 | 0.5 | 2 | 2 | 2 | 1 |
| Mean t, last[2] | 0 | 0.5 | 1.5 | 1 | 1.5 | 0.5 |
| N | 4 | 4 | 2 | 2 | 2 | 2 |

[1]Mean Draize score for edema at 15 minutes post dosing
[2]Mean Draize score for edema at the last scoring time point post dosing Gross Pathology: No vehicle control or OPK-88003 test item formulation-related macroscopic observations were noted at the injection sites. Bruising outside of the marked injection site area was observed in the following animals during gross necropsy:

001 (group 1): the left side exhibited bruising outside of the marked injection site area.

006 (group 3): the left side exhibited bruising outside of the marked injection site area.

007 (group 4): the right side exhibited bruising outside of the marked injection site area.

008 (group 4): the left side and right side exhibited bruising outside of the marked injection site area.

However, this bruising was determined to be a result of the subcutaneous injection procedure, and not vehicle control or test item-related.

In conclusion, a single subcutaneous injection of OPK-880033 formulated in either an acetate or citrate buffer-based vehicle at a dose level of 25 or 70 mg/animal was well tolerated in female New Zealand white rabbits and associated with only very slight edema localized to the injection site. Although edema associated with OPK-88003 formulations, likely due to high viscosity, was slightly greater than what was seen with vehicle controls alone, because the edema was not dose-dependent, minimal, and not considered adverse it was concluded that there were no considerable differences in localized injection site edema between the two vehicle controls or dose levels of OPK-88003 formulation.

The inventors found that while typical isotonic solutions containing sodium chloride are generally suitable for delivering drugs in liquid or parenteral formulations, the presence of sodium chloride in solutions containing the PEGylated oxyntomodulin analogs unexpectedly caused instability issues. Further, the addition of the PEGylated oxyntomodulin compounds or analogs described herein surprisingly caused a rise in pH beyond the preferred range. The inventors therefore discovered liquid formulations according to the present invention that meet the requisite physical and chemical stability criteria. The inventors have, by discovering the stable liquid formulation herein, avoided the need to use solid dispersions of drug (i.e., lyophilized or otherwise) which need to be reconstituted with water or saline solution prior to administration to the patient. In addition, the formulation is stable as a refrigerated liquid and does not require freezing to maintain stability, allowing for storage in a pre-filled syringe or cartridge rather than a vial, and making it easier for at home use by patients. The patient or medical professional can thus "directly administer" the dosage form from a pre-filled syringe, cartridge or filled vial without taking the additional step of reconstituting a powder formulation and/or such individual could not use a pre-filled syringe (or pre-filled vial) absent of having such a stable liquid formulation.

The above examples are non-limiting in nature and such formulations can include any PEGylated oxyntomodulin analog and any suitable buffer and/or tonicity agents and/or stabilizing agents provided such liquid formulations made therefrom are substantially free of impurities, amenable to sterile manufacturing, stable and meet the requisite delivery characteristics and physical characteristics including flow, viscosity and suitability for the delivery methods which include pre-filled syringes, autoinjectors etc for single and multiple use.

All of the features described herein (including any accompanying claims, abstract and drawings), and/or all of the steps of any method or process so disclosed, may be combined with any of the above aspects in any combination, except combinations where at least some of such features and/or steps are mutually exclusive. Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A stable GLP-1 and/or Glucagon receptor agonist liquid formulation comprising a pharmaceutically effective amount of a GLP-1 and/or glucagon receptor agonist, or a pharmaceutically acceptable salt thereof, and an aqueous buffer solution, wherein the formulation has a pH value of from about 4 to about 6.5, wherein said GLP-1 and/or Glucagon receptor agonist consists of a compound of formula 3 or 5,

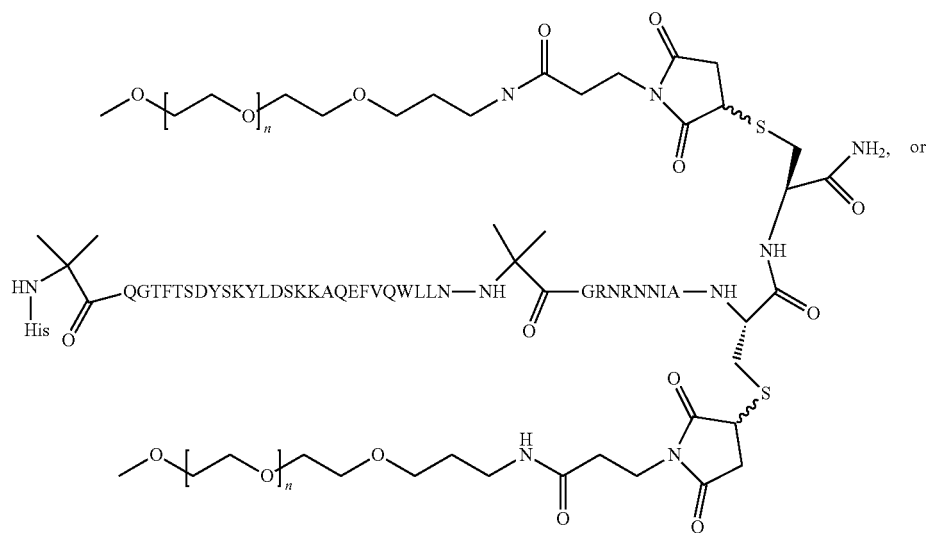

(Formula 3)

n = 425-475

(Formula 5)

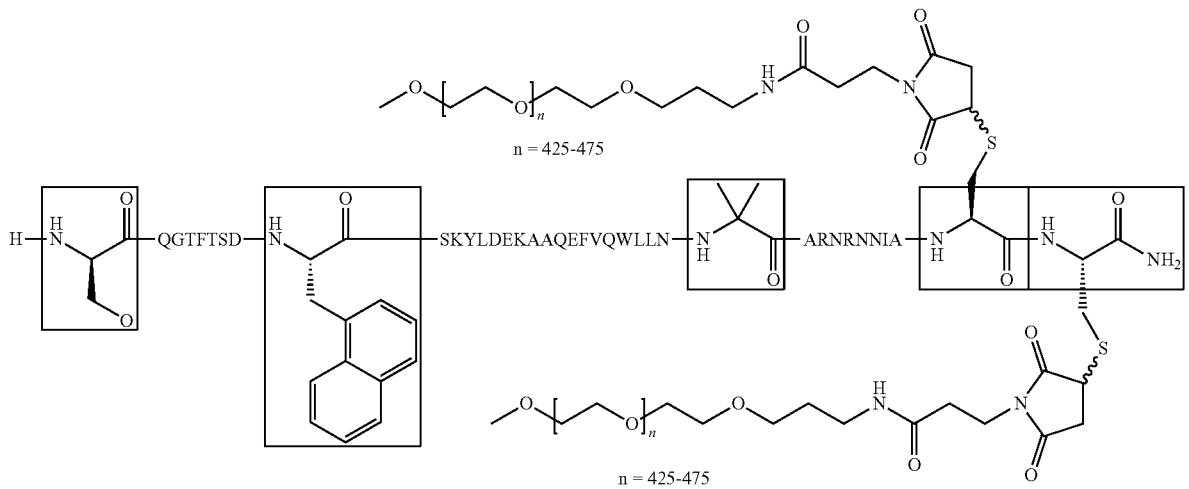

wherein the aqueous buffer is selected from the group consisting of acetate buffer, citrate buffer, and histidine buffer,
wherein the liquid formulation is substantially free of cysteine or sodium chloride, and
wherein the formulation further comprises methionine and optionally comprises sorbitol.

2. The formulation according to claim 1,
  i. further comprising a tonicity agent;
  ii. further comprising a tonicity agent and said tonicity agent comprises sorbitol;
  iii. further comprising one or more preservatives of from about 0.001% (w/v) to about 1% (w/v) based on the total volume of the liquid formulation;
  iv. further comprising one or more preservatives of from about 0.001% (w/v) to about 1% (w/v) based on the total volume of the liquid formulation, wherein said preservative is m-cresol, phenol, and/or benzyl alcohol; or
  v. wherein the buffer solution is an acetate buffer solution.

3. The formulation according to claim 1, wherein the GLP-1 and/or Glucagon receptor agonist, or a pharmaceutically acceptable salt thereof, is present at a concentration range of from about 5 mg/mL to about 150 mg/mL or from about 20 mg/mL to about 150 mg/mL.

4. The formulation according to claim 3, wherein the concentration is about 70 mg/mL.

5. The formulation according to claim 1,
  i. further comprising one or more additional pharmaceutically acceptable excipients;
  ii. wherein said formulation has an osmolality of no more than 500 mOsm/kg;
  iii. wherein said formulation has a viscosity of from about 10 to about 60 cP;
  iv. wherein said formulation has a syringeability of Break Loose Force of less than 10 N and Glide Force of less than 30 N;
  v. wherein said formulation causes no or little injection site reaction;
  vi. wherein said formulation is stable for at least 5 times of freeze/thaw cycles; or
  vii. wherein said formulation is stable at least for 48 hours at 30° C./65% RH and for 12 months at 5° C.

6. A pre-filled syringe having a stable GLP-1 and/or Glucagon receptor agonist formulation of claim 1.

7. A multidose container comprising a stable liquid formulation according to claim 1.

8. The formulation according to claim 1, wherein the formulation is in a single use vial.

9. The formulation according to claim 1, wherein said pharmaceutically acceptable salt is a hydrochloric acid salt, a hydrobromic acid salt, an ascorbic acid salt, a maleic acid salt, or an acetic acid salt.

10. The formulation according to claim 1, wherein the GLP-1 and/or Glucagon receptor agonist is in the form of an acetate salt.

11. The formulation according to claim 1, wherein the GLP-1 and/or Glucagon receptor agonist is in the form of a hydrochloride salt.

12. The formulation according to claim 1, further comprising one or more additional pharmaceutically acceptable excipients selected from the group consisting of methionine, a derivative of methionine, arginine, a derivative of arginine, and combinations thereof.

13. The formulation according to claim 1, wherein the pH value is about 4.5.

14. The formulation according to claim 1, wherein said methionine is present in an amount of about 30 mM to about 35 mM.

15. The formulation according to claim 1, wherein the buffer is an acetate buffer present in an amount of about 10 mM.

16. The formulation according to claim 1, said methionine is present in an amount of about 30 mM to about 35 mM and wherein the buffer is an acetate buffer present in an amount of about 10 mM.

17. The formulation according to claim 1, wherein the formulation comprises a 10 mM acetate buffer solution and the formulation has a pH value of about 4.5.

18. The formulation according to claim 1, wherein the methionine is present in an amount of about 30 mM to about 35 mM, the buffer is an acetate buffer present in an amount of about 10 mM, and the formulation has a pH value of about 4.5.

19. The formulation according to claim 1, wherein the formulation comprises 70 mg/mL of Formula 3 in a 10 mM acetate buffer solution with a pH value of about 4.5.

20. The formulation according to claim 1, wherein the formulation comprises 70 mg/mL of Formula 3, the buffer is an acetate buffer present in an amount of about 10 mM, said methionine is present in an amount of about 30 mM to about 35 mM, and the formulation has a pH value of about 4.5.

\* \* \* \* \*

```
                          SEQUENCE LISTING

<160> NUMBER OF SEQ ID NOS: 42

<210> SEQ ID NO 1
<211> LENGTH: 39
<212> TYPE: PRT
<213> ORGANISM: Artificial Sequence
<220> FEATURE:
<223> OTHER INFORMATION: Oxyntomodulin peptide analog
<220> FEATURE:
<221> NAME/KEY: MISC_FEATURE
<222> LOCATION: (2)..(2)
<223> OTHER INFORMATION: Aib
<220> FEATURE:
<221> NAME/KEY: MISC_FEATURE
<222> LOCATION: (29)..(29)
<223> OTHER INFORMATION: Aib
<220> FEATURE:
<221> NAME/KEY: misc_feature
<222> LOCATION: (38)..(39)
<223> OTHER INFORMATION: Xaa can be any naturally occurring amino acid

<400> SEQUENCE: 1

His Xaa Gln Gly Thr Phe Thr Ser Asp Tyr Ser Lys Tyr Leu Asp Ser
1               5                   10                  15

Lys Lys Ala Gln Glu Phe Val Gln Trp Leu Leu Asn Xaa Gly Arg Asn
            20                  25                  30

Arg Asn Asn Ile Ala Xaa Xaa
        35

<210> SEQ ID NO 2
<211> LENGTH: 39
<212> TYPE: PRT
<213> ORGANISM: Artificial Sequence
<220> FEATURE:
<223> OTHER INFORMATION: Oxyntomodulin peptide analog
<220> FEATURE:
<221> NAME/KEY: MISC_FEATURE
<222> LOCATION: (2)..(2)
<223> OTHER INFORMATION: Aib
<220> FEATURE:
<221> NAME/KEY: MISC_FEATURE
<222> LOCATION: (29)..(29)
<223> OTHER INFORMATION: Aib

<400> SEQUENCE: 2

His Xaa Gln Gly Thr Phe Thr Ser Asp Tyr Ser Lys Tyr Leu Asp Ser
1               5                   10                  15

Lys Lys Ala Gln Glu Phe Val Gln Trp Leu Leu Asn Xaa Gly Arg Asn
            20                  25                  30

Arg Asn Asn Ile Ala Cys Cys
        35

<210> SEQ ID NO 3
```

```
<211> LENGTH: 39
<212> TYPE: PRT
<213> ORGANISM: Artificial Sequence
<220> FEATURE:
<223> OTHER INFORMATION: Oxyntomodulin peptide analogy
<220> FEATURE:
<221> NAME/KEY: MISC_FEATURE
<222> LOCATION: (2)..(2)
<223> OTHER INFORMATION: Aib
<220> FEATURE:
<221> NAME/KEY: MISC_FEATURE
<222> LOCATION: (29)..(29)
<223> OTHER INFORMATION: Aib
<220> FEATURE:
<221> NAME/KEY: MISC_FEATURE
<222> LOCATION: (38)..(38)
<223> OTHER INFORMATION: Cys (20kD PEG)
<220> FEATURE:
<221> NAME/KEY: MISC_FEATURE
<222> LOCATION: (39)..(39)
<223> OTHER INFORMATION: Cys (20kD PEG)

<400> SEQUENCE: 3

His Xaa Gln Gly Thr Phe Thr Ser Asp Tyr Ser Lys Tyr Leu Asp Ser
 1               5                  10                  15

Lys Lys Ala Gln Glu Phe Val Gln Trp Leu Leu Asn Xaa Gly Arg Asn
            20                  25                  30

Arg Asn Asn Ile Ala Xaa Xaa
        35

<210> SEQ ID NO 4
<211> LENGTH: 37
<212> TYPE: PRT
<213> ORGANISM: Artificial Sequence
<220> FEATURE:
<223> OTHER INFORMATION: Active OXM

<400> SEQUENCE: 4

His Ser Gln Gly Thr Phe Thr Ser Asp Tyr Ser Lys Tyr Leu Asp Ser
 1               5                  10                  15

Arg Arg Ala Gln Asp Phe Val Gln Trp Leu Met Asn Thr Lys Arg Asn
            20                  25                  30

Arg Asn Asn Ile Ala
        35

<210> SEQ ID NO 5
<211> LENGTH: 37
<212> TYPE: PRT
<213> ORGANISM: Artificial Sequence
<220> FEATURE:
<223> OTHER INFORMATION: Oxyntomodulin peptide analog
<220> FEATURE:
<221> NAME/KEY: MISC_FEATURE
<222> LOCATION: (2)..(2)
<223> OTHER INFORMATION: Aib
<220> FEATURE:
<221> NAME/KEY: MISC_FEATURE
<222> LOCATION: (29)..(29)
<223> OTHER INFORMATION: Aib

<400> SEQUENCE: 5

His Xaa Gln Gly Thr Phe Thr Ser Asp Tyr Ser Lys Tyr Leu Asp Ser
 1               5                  10                  15

Lys Lys Ala Gln Glu Phe Val Gln Trp Leu Leu Asn Xaa Gly Arg Asn
            20                  25                  30

Arg Asn Asn Ile Ala
        35
```

```
<210> SEQ ID NO 6
<211> LENGTH: 39
<212> TYPE: PRT
<213> ORGANISM: Artificial Sequence
<220> FEATURE:
<223> OTHER INFORMATION: Oxyntomodulin peptide analogy
<220> FEATURE:
<221> NAME/KEY: MISC_FEATURE
<222> LOCATION: (2)..(2)
<223> OTHER INFORMATION: D-Ser
<220> FEATURE:
<221> NAME/KEY: MISC_FEATURE
<222> LOCATION: (10)..(10)
<223> OTHER INFORMATION: 1-Nal
<220> FEATURE:
<221> NAME/KEY: MISC_FEATURE
<222> LOCATION: (29)..(29)
<223> OTHER INFORMATION: Aib
<220> FEATURE:
<221> NAME/KEY: misc_feature
<222> LOCATION: (38)..(39)
<223> OTHER INFORMATION: Xaa can be any naturally occurring amino acid

<400> SEQUENCE: 6

His Xaa Gln Gly Thr Phe Thr Ser Asp Xaa Ser Lys Tyr Leu Asp Glu
1               5                   10                  15

Lys Ala Ala Gln Glu Phe Val Gln Trp Leu Leu Asn Xaa Ala Arg Asn
            20                  25                  30

Arg Asn Asn Ile Ala Xaa Xaa
        35

<210> SEQ ID NO 7
<211> LENGTH: 39
<212> TYPE: PRT
<213> ORGANISM: Artificial Sequence
<220> FEATURE:
<223> OTHER INFORMATION: Oxyntomodulin peptide analog
<220> FEATURE:
<221> NAME/KEY: MISC_FEATURE
<222> LOCATION: (2)..(2)
<223> OTHER INFORMATION: D-Ser
<220> FEATURE:
<221> NAME/KEY: MISC_FEATURE
<222> LOCATION: (10)..(10)
<223> OTHER INFORMATION: 1-Nal
<220> FEATURE:
<221> NAME/KEY: MISC_FEATURE
<222> LOCATION: (29)..(29)
<223> OTHER INFORMATION: Aib

<400> SEQUENCE: 7

His Xaa Gln Gly Thr Phe Thr Ser Asp Xaa Ser Lys Tyr Leu Asp Glu
1               5                   10                  15

Lys Ala Ala Gln Glu Phe Val Gln Trp Leu Leu Asn Xaa Ala Arg Asn
            20                  25                  30

Arg Asn Asn Ile Ala Cys Cys
        35

<210> SEQ ID NO 8
<211> LENGTH: 39
<212> TYPE: PRT
<213> ORGANISM: Artificial Sequence
<220> FEATURE:
<223> OTHER INFORMATION: Oxyntomodulin peptide analog
<220> FEATURE:
<221> NAME/KEY: MISC_FEATURE
<222> LOCATION: (2)..(2)
<223> OTHER INFORMATION: D-Ser
<220> FEATURE:
<221> NAME/KEY: MISC_FEATURE
```

```
<222> LOCATION: (10)..(10)
<223> OTHER INFORMATION: 1-Nal
<220> FEATURE:
<221> NAME/KEY: MISC_FEATURE
<222> LOCATION: (29)..(29)
<223> OTHER INFORMATION: Aib
<220> FEATURE:
<221> NAME/KEY: MISC_FEATURE
<222> LOCATION: (38)..(38)
<223> OTHER INFORMATION: Cys(20 kDa PEG)
<220> FEATURE:
<221> NAME/KEY: MISC_FEATURE
<222> LOCATION: (39)..(39)
<223> OTHER INFORMATION: Cys(20 kDa PEG)

<400> SEQUENCE: 8

His Xaa Gln Gly Thr Phe Thr Ser Asp Xaa Ser Lys Tyr Leu Asp Glu
1               5                   10                  15

Lys Ala Ala Gln Glu Phe Val Gln Trp Leu Leu Asn Xaa Ala Arg Asn
            20                  25                  30

Arg Asn Asn Ile Ala Xaa Xaa
        35

<210> SEQ ID NO 9
<211> LENGTH: 37
<212> TYPE: PRT
<213> ORGANISM: Artificial Sequence
<220> FEATURE:
<223> OTHER INFORMATION: Oxyntomodulin peptide analog
<220> FEATURE:
<221> NAME/KEY: MISC_FEATURE
<222> LOCATION: (2)..(2)
<223> OTHER INFORMATION: D-Ser
<220> FEATURE:
<221> NAME/KEY: MISC_FEATURE
<222> LOCATION: (10)..(10)
<223> OTHER INFORMATION: 1-Nal
<220> FEATURE:
<221> NAME/KEY: MISC_FEATURE
<222> LOCATION: (29)..(29)
<223> OTHER INFORMATION: Aib

<400> SEQUENCE: 9

His Xaa Gln Gly Thr Phe Thr Ser Asp Xaa Ser Lys Tyr Leu Asp Glu
1               5                   10                  15

Lys Ala Ala Gln Glu Phe Val Gln Trp Leu Leu Asn Xaa Ala Arg Asn
            20                  25                  30

Arg Asn Asn Ile Ala
        35

<210> SEQ ID NO 10
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 10

Xaa Ser Gln Gly Thr Phe Thr Ser Asp Tyr Ser Lys Tyr Leu Asp Glu
1               5                   10                  15

Glu Ala Val Arg Leu Phe Ile Glu Trp Leu Met Asn Thr Lys Arg Asn
            20                  25                  30

Arg Asn Asn Ile Ala
        35
```

<210> SEQ ID NO 11
<211> LENGTH: 39
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 11

Xaa Ser Gln Gly Thr Phe Thr Ser Asp Tyr Ser Lys Tyr Leu Asp Glu
1               5                   10                  15

Arg Arg Ala Gln Asp Phe Val Ala Trp Leu Lys Asn Thr Gly Pro Ser
            20                  25                  30

Ser Gly Ala Pro Pro Pro Ser
        35

<210> SEQ ID NO 12
<211> LENGTH: 39
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<223> OTHER INFORMATION: 4-imidazoacetyl
<220> FEATURE:
<221> NAME/KEY: misc_feature
<222> LOCATION: (1)..(1)
<223> OTHER INFORMATION: Xaa can be any naturally occurring amino acid

<400> SEQUENCE: 12

Xaa Gly Gln Gly Thr Phe Thr Ser Asp Tyr Ser Arg Tyr Leu Glu Glu
1               5                   10                  15

Glu Ala Val Arg Leu Phe Ile Glu Trp Leu Lys Asn Gly Gly Pro Ser
            20                  25                  30

Ser Gly Ala Pro Pro Pro Ser
        35

<210> SEQ ID NO 13
<211> LENGTH: 39
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 13

Xaa Gly Gln Gly Thr Phe Thr Ser Asp Tyr Ser Arg Gln Met Glu Glu
1               5                   10                  15

Glu Ala Val Arg Leu Phe Ile Glu Trp Leu Lys Asn Gly Gly Pro Ser
            20                  25                  30

Ser Gly Ala Pro Pro Pro Ser
        35

<210> SEQ ID NO 14
<211> LENGTH: 42
<212> TYPE: PRT
<213> ORGANISM: Artificial Sequence
<220> FEATURE:

<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 14

Xaa Gly Glu Gly Thr Phe Thr Ser Asp Leu Ser Arg Gln Met Glu Glu
1               5                   10                  15

Glu Ala Val Arg Leu Phe Ile Glu Trp Ala Ala His Ser Gln Gly Thr
            20                  25                  30

Phe Thr Ser Asp Tyr Ser Lys Tyr Leu Asp
        35                  40

<210> SEQ ID NO 15
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 15

Xaa Ser Gln Gly Thr Phe Thr Ser Asp Tyr Ser Arg Tyr Leu Asp Glu
1               5                   10                  15

Glu Ala Val Arg Leu Phe Ile Glu Trp Leu Met Asn Thr Lys
            20                  25                  30

<210> SEQ ID NO 16
<211> LENGTH: 29
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 16

Xaa Ser Gln Gly Thr Phe Thr Ser Asp Leu Ser Arg Gln Leu Glu Glu
1               5                   10                  15

Glu Ala Val Arg Leu Phe Ile Glu Trp Leu Met Asn Lys
            20                  25

<210> SEQ ID NO 17
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl
<220> FEATURE:
<221> NAME/KEY: MISC_FEATURE
<222> LOCATION: (20)..(20)
<223> OTHER INFORMATION: alpha-methyl-glutamic acid

<400> SEQUENCE: 17

Xaa Gly Gln Gly Thr Phe Thr Ser Asp Tyr Ser Arg Tyr Leu Asp Glu
1               5                   10                  15

Glu Ala Val Xaa Leu Phe Ile Glu Trp Leu Met Asn Thr Lys Arg Asn

Arg Asn Asn Ile Ala
        35

<210> SEQ ID NO 18
<211> LENGTH: 40
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 18

Xaa Ser Gln Gly Thr Phe Thr Ser Asp Tyr Ser Arg Gln Met Glu Glu
1               5                   10                  15

Glu Ala Val Arg Leu Phe Ile Glu Trp Leu Met Asn Gly Gly Pro Ser
            20                  25                  30

Ser Gly Ala Pro Pro Ser Lys
        35                  40

<210> SEQ ID NO 19
<211> LENGTH: 43
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 19

Xaa Gly Glu Gly Thr Phe Thr Ser Asp Leu Ser Arg Gln Met Glu Glu
1               5                   10                  15

Glu Ala Val Arg Leu Phe Ile Glu Trp Ala Ala His Ser Gln Gly Thr
            20                  25                  30

Phe Thr Ser Asp Tyr Ser Arg Tyr Leu Asp Lys
        35                  40

<210> SEQ ID NO 20
<211> LENGTH: 38
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 20

Xaa Ser Gln Gly Thr Phe Thr Ser Asp Tyr Ser Arg Tyr Leu Asp Gly
1               5                   10                  15

Gly Gly His Gly Glu Gly Thr Phe Thr Ser Asp Leu Ser Lys Gln Met
            20                  25                  30

Glu Glu Glu Ala Val Lys
        35

<210> SEQ ID NO 21
<211> LENGTH: 30
<212> TYPE: PRT
<213> ORGANISM: Artificial Sequence

```
<220> FEATURE:
<223> OTHER INFORMATION: oxyntomodulin derivativ
<220> FEATURE:
<221> NAME/KEY: MISC_FEATURE
<222> LOCATION: (1)..(1)
<223> OTHER INFORMATION: 4-imidazoacetyl
<220> FEATURE:
<221> NAME/KEY: MISC_FEATURE
<222> LOCATION: (16)..(16)
<223> OTHER INFORMATION: alpha-methyl-glutamic acid
<220> FEATURE:
<221> NAME/KEY: MISC_FEATURE
<222> LOCATION: (20)..(20)
<223> OTHER INFORMATION: alpha-methyl-glutamic acid

<400> SEQUENCE: 21

Xaa Ser Gln Gly Thr Phe Thr Ser Asp Tyr Ser Arg Tyr Leu Asp Xaa
1               5                   10                  15

Glu Ala Val Xaa Leu Phe Ile Glu Trp Leu Met Asn Thr Lys
            20                  25                  30

<210> SEQ ID NO 22
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl
<220> FEATURE:
<221> NAME/KEY: MISC_FEATURE
<222> LOCATION: (20)..(20)
<223> OTHER INFORMATION: alpha-methyl-glutamic acid
<220> FEATURE:
<221> NAME/KEY: MISC_FEATURE
<222> LOCATION: (24)..(24)
<223> OTHER INFORMATION: alpha-methyl-glutamic acid

<400> SEQUENCE: 22

Xaa Gly Gln Gly Thr Phe Thr Ser Asp Tyr Ser Arg Tyr Leu Asp Glu
1               5                   10                  15

Glu Ala Val Xaa Leu Phe Ile Xaa Trp Leu Met Asn Thr Lys Arg Asn
            20                  25                  30

Arg Asn Asn Ile Ala
        35

<210> SEQ ID NO 23
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl
<220> FEATURE:
<221> NAME/KEY: MISC_FEATURE
<222> LOCATION: (24)..(24)
<223> OTHER INFORMATION: alpha-methyl-glutamic acid

<400> SEQUENCE: 23

Xaa Gly Gln Gly Thr Phe Thr Ser Asp Tyr Ser Arg Tyr Leu Asp Glu
1               5                   10                  15

Glu Ala Val Arg Leu Phe Ile Xaa Trp Leu Met Asn Thr Lys Arg Asn
            20                  25                  30

Arg Asn Asn Ile Ala
```

```
<210> SEQ ID NO 24
<211> LENGTH: 34
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 24

Xaa Ser Gln Gly Thr Phe Thr Ser Asp Leu Ser Arg Gln Leu Glu Gly
1               5                   10                  15

Gly Gly His Ser Gln Gly Thr Phe Thr Ser Asp Leu Ser Arg Gln Leu
            20                  25                  30

Glu Lys

<210> SEQ ID NO 25
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 25

Xaa Ser Gln Gly Thr Phe Thr Ser Asp Tyr Ser Arg Tyr Leu Asp Glu
1               5                   10                  15

Glu Ala Val Arg Leu Phe Ile Glu Trp Ile Arg Asn Thr Lys Arg Asn
            20                  25                  30

Arg Asn Asn Ile Ala
        35

<210> SEQ ID NO 26
<211> LENGTH: 40
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 26

Xaa Ser Gln Gly Thr Phe Thr Ser Asp Tyr Ser Arg Tyr Leu Asp Glu
1               5                   10                  15

Glu Ala Val Arg Leu Phe Ile Glu Trp Ile Arg Asn Gly Gly Pro Ser
            20                  25                  30

Ser Gly Ala Pro Pro Pro Ser Lys
        35                  40

<210> SEQ ID NO 27
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
```

```
<222> LOCATION: (1)..(1)
<223> OTHER INFORMATION: 4-imidazoacetyl

<400> SEQUENCE: 27

Xaa Ser Gln Gly Thr Phe Thr Ser Asp Tyr Ser Arg Tyr Leu Asp Glu
1               5                   10                  15

Glu Ala Val Lys Leu Phe Ile Glu Trp Ile Arg Asn Thr Lys Arg Asn
            20                  25                  30

Arg Asn Asn Ile Ala
        35

<210> SEQ ID NO 28
<211> LENGTH: 40
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 28

Xaa Ser Gln Gly Thr Phe Thr Ser Asp Tyr Ser Arg Tyr Leu Asp Glu
1               5                   10                  15

Glu Ala Val Lys Leu Phe Ile Glu Trp Ile Arg Asn Gly Gly Pro Ser
            20                  25                  30

Ser Gly Ala Pro Pro Pro Ser Lys
        35                  40

<210> SEQ ID NO 29
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 29

Xaa Ser Gln Gly Thr Phe Thr Ser Asp Tyr Ser Arg Gln Leu Glu Glu
1               5                   10                  15

Glu Ala Val Arg Leu Phe Ile Glu Trp Val Arg Asn Thr Lys Arg Asn
            20                  25                  30

Arg Asn Asn Ile Ala
        35

<210> SEQ ID NO 30
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: desamino-histidyl

<400> SEQUENCE: 30

Xaa Ser Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr Lys
            20                  25                  30
```

<210> SEQ ID NO 31
<211> LENGTH: 29
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 31

His Xaa Gln Gly Thr Phe Thr Ser Asp Tyr Ser Lys Tyr Leu Asp Glu
1               5                   10                  15

Lys Arg Ala Lys Glu Phe Val Cys Trp Leu Met Asn Thr
            20                  25

<210> SEQ ID NO 32
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 32

His Xaa Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr Cys
            20                  25                  30

<210> SEQ ID NO 33
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 33

His Xaa Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr Cys
            20                  25                  30

<210> SEQ ID NO 34
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 34

His Xaa Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr Cys

```
                    20                  25                  30
```

<210> SEQ ID NO 35
<211> LENGTH: 29
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 35

```
His Xaa Gln Gly Thr Phe Thr Ser Asp Tyr Ser Lys Tyr Leu Asp Glu
1               5                   10                  15

Gln Ala Ala Lys Glu Phe Ile Cys Trp Leu Met Asn Thr
            20                  25
```

<210> SEQ ID NO 36
<211> LENGTH: 29
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 36

```
His Xaa Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr
            20                  25
```

<210> SEQ ID NO 37
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: d-serine

<400> SEQUENCE: 37

```
His Xaa Gln Gly Thr Phe Thr Ser Asp Tyr Ser Lys Tyr Leu Asp Ser
1               5                   10                  15

Arg Arg Ala Gln Asp Phe Val Gln Trp Leu Met Asn Thr Lys Arg Asn
            20                  25                  30

Arg Asn Asn Ile Ala
        35
```

<210> SEQ ID NO 38
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl

<400> SEQUENCE: 38

```
Xaa Ser Gln Gly Thr Phe Thr Ser Asp Tyr Ser Lys Tyr Leu Asp Ser
1               5                   10                  15

Arg Arg Ala Gln Asp Phe Val Gln Trp Leu Met Asn Thr Lys Arg Asn
            20                  25                  30

Arg Asn Asn Ile Ala
        35

<210> SEQ ID NO 39
<211> LENGTH: 37
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl
<220> FEATURE:
<221> NAME/KEY: MISC_FEATURE
<222> LOCATION: (2)..(2)
<223> OTHER INFORMATION: d-serine

<400> SEQUENCE: 39

Xaa Xaa Gln Gly Thr Phe Thr Ser Asp Tyr Ser Lys Tyr Leu Asp Ser
1               5                   10                  15

Arg Arg Ala Gln Asp Phe Val Gln Trp Leu Met Asn Thr Lys Arg Asn
            20                  25                  30

Arg Asn Asn Ile Ala
        35

<210> SEQ ID NO 40
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (1)..(1)
<223> OTHER INFORMATION: 4-imidazoacetyl
<220> FEATURE:
<221> NAME/KEY: MISC_FEATURE
<222> LOCATION: (2)..(2)
<223> OTHER INFORMATION: aminoisobutyric acid

<400> SEQUENCE: 40

Xaa Xaa Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr Cys
            20                  25                  30

<210> SEQ ID NO 41
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 41

His Xaa Gln Gly Thr Phe Thr Ser Asp Tyr Ala Lys Tyr Leu Asp Glu
1               5                   10                  15

Lys Arg Ala Lys Glu Phe Val Gln Trp Leu Met Asn Thr Cys
            20                  25                  30
```

```
<210> SEQ ID NO 42
<211> LENGTH: 30
<212> TYPE: PRT
<213> ORGANISM: Artificial Sequence
<220> FEATURE:
<223> OTHER INFORMATION: oxyntomodulin derivative
<220> FEATURE:
<221> NAME/KEY: MISC_FEATURE
<222> LOCATION: (2)..(2)
<223> OTHER INFORMATION: aminoisobutyric acid

<400> SEQUENCE: 42

Tyr Xaa Gln Gly Thr Phe Thr Ser Asp Tyr Ser Lys Tyr Leu Asp Glu
1               5                   10                  15

Lys Arg Ala Lys Glu Phe Val Gln Trp Leu Met Asn Thr Cys
            20                  25                  30
```